US012175350B2

(12) United States Patent
Vahdat et al.

(10) Patent No.: US 12,175,350 B2
(45) Date of Patent: Dec. 24, 2024

(54) MACHINE-LEARNING-BASED ARCHITECTURE SEARCH METHOD FOR A NEURAL NETWORK

(71) Applicant: NVIDIA Corporation, Santa Clara, CA (US)

(72) Inventors: Arash Vahdat, Santa Clara, CA (US); Arun Mohanray Mallya, San Jose, CA (US); Ming-Yu Liu, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 1020 days.

(21) Appl. No.: 16/566,797

(22) Filed: Sep. 10, 2019

(65) Prior Publication Data

US 2021/0073612 A1 Mar. 11, 2021

(51) Int. Cl.
| | |
|---|---|
| *G06N 20/00* | (2019.01) |
| *G06F 7/57* | (2006.01) |
| *G06N 3/04* | (2023.01) |
| *G06N 3/063* | (2023.01) |
| *G06N 3/08* | (2023.01) |
| *G05B 13/02* | (2006.01) |

(52) U.S. Cl.
CPC ............ *G06N 3/04* (2013.01); *G06F 7/57* (2013.01); *G06N 3/063* (2013.01); *G06N 3/08* (2013.01); *G05B 13/027* (2013.01)

(58) Field of Classification Search
None
See application file for complete search history.

(56) References Cited

U.S. PATENT DOCUMENTS

| | | | | |
|---|---|---|---|---|
| 10,997,503 | B2* | 5/2021 | Dohan | G06N 3/045 |
| 11,182,677 | B2* | 11/2021 | Rawal | G06N 3/045 |
| 2017/0061326 | A1* | 3/2017 | Talathi | G06K 9/6267 |
| 2019/0236438 | A1* | 8/2019 | Odena | G06N 3/006 |
| 2019/0286984 | A1* | 9/2019 | Vasudevan | G06N 5/01 |
| 2019/0378210 | A1* | 12/2019 | Merrill | G06N 5/02 |

FOREIGN PATENT DOCUMENTS

| | | |
|---|---|---|
| CN | 108563906 A | 9/2018 |
| WO | 2019033381 A1 | 2/2019 |

OTHER PUBLICATIONS

Baker et al., "Designing Neural Network Architectures using Reinforcement Learning," ICLR, 2017, 18 pages.
Bender et al., "Understanding and Simplifying One-Shot Architecture Search," ICML, 2018, 10 pages.
Cai et al., "Efficient Architecture Search by Network Transformation," AAAI Conference on Artificial Intelligence, 2018, 8 pages.

(Continued)

*Primary Examiner* — David R Vincent
(74) *Attorney, Agent, or Firm* — Davis Wright Tremaine LLP

(57) ABSTRACT

In at least one embodiment, differentiable neural architecture search and reinforcement learning are combined under one framework to discover network architectures with desired properties such as high accuracy, low latency, or both. In at least one embodiment, an objective function for search based on generalization error prevents the selection of architectures prone to overfitting.

25 Claims, 59 Drawing Sheets

(56) References Cited

OTHER PUBLICATIONS

Cai et al., "ProxylessNAS: Direct Neural Architecture Search on Target Task and Hardware,"Feb. 23, 2019, 13 pages.
Chang et al., "Differentiable Architecture Search with Ensemble Gumbel Softmax," May 6, 2019, 12 pages.
Deng et al. "Imagenet: A Large-Scale Hierarchical Image Database," ICLR, 2009, 8 pages.
Elsken et al., "Neural Architecture Search: A survey," Sep. 5, 2018, 17 pages.
Goyal et al., "Accurate, Large Minibatch SGD: Training ImageNet in 1 Hour," Jun. 8, 2017, 12 pages.
Grathwohl et al., "Backpropagation Through the Void: Optimizing Control Variates for Black-Box Gradient Estimation," ICLR, Feb. 23, 2018, 17 pages.
He et al., "Deep Residual Learning for Image Recognition," CVPR, 2016, 9 pages.
Howard et al., "Mobilenets: Efficient Convolutional Neural Networks for Mobile Vision Applications," Apr. 17, 2017, 9 pages.
Hu et al., "Squeeze-and-Excitation Networks," CVPR, 2018, 10 pages.
Huang et al., "Densely Connected Convolutional Networks," in the IEEE Conference on Computer Vision and Pattern Recognition (CVPR), Jul. 2017, 9 pages.
IEEE, "IEEE Standard 754-2008 (Revision of IEEE Standard 754-1985): IEEE Standard for Floating-Point Arithmetic," Aug. 29, 2008, 70 pages.
International Search Report and Written Opinion mailed Dec. 21, 2020, for International Patent Application No. PCT/US2020/049987, filed Sep. 9, 2020, 19 pages.
Jang et al., "Categorical Reparameterization with Gumbel-Softmax," Nov. 22, 2016, 12 pages.
Kocic et al., "An End-to-End Deep Neural Network for Autonomous Driving Designed for Embedded Automotive Platforms", School of Electrical Engineering, Mar. 15, 2019, 26 pages.
Krizhevsky et al., "Learning Multiple Layers of Features from Tiny Images," Technical Report, Apr. 8, 2009, 60 pages.
Liu et al., "DARTS: Differentiable Architecture Search," Apr. 23, 2019, 13 pages.
Liu et al., "DARTS: Differentiable Architecture Search," ICLR, Apr. 23, 2019, 13 pages.
Liu et al., "Hierarchical Representations for Efficient Architecture Search," ICLR, Feb. 22, 2018, 13 pages.
Liu et al., "Progressive Neural Architecture Search," Proceedings of the European Conference on Computer Vision, Sep. 8, 2018, 16 pages.
Ma et al., "Shufflenet V2: Practical Guidelines for Efficient CNN Architecture Design," ECCV, 2018, 16 pages.
Maddison et al., "The Concrete Distribution: A Continuous Relaxation of Discrete Random Variables," Nov. 6, 2016, 17 pages.
Mnih et al., "Neural Variational Inference and Learning in Belief Networks," ICML, 2014, 9 pages.
Paisley et al., "Variational Bayesian Inference with Stochastic Search," ICML, 2012, 8 pages.
Pham et al., "Efficient Neural Architecture Search via Parameter Sharing," International Conference on Machine Learning, Feb. 9, 2018, 11 pages.
Ranganath et al., "Black Box Variational Inference," in Artificial Intelligence and Statistics, 2014, 9 pages.
Real et al., "Large-Scale Evolution of Image Classifiers," ICML, Jun. 11, 2017, 18 pages.
Real et al., "Regularized Evolution for Image Classifier Architecture Search," Oct. 26, 2018, 16 pages.
Sandler et al., "Mobilenetv2: Inverted Residuals and Linear Bottlenecks," CVPR, 2018, 11 pages.
Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Srinivas et al., "Hardware Aware Neural Network Architectures (Using FBNet)," Jun. 17, 2019, 8 pages.
Szegedy et al., "Going Deeper with Convolutions," CVPR, 2015, 9 pages.
Tan et al., "Mnasnet: Platform-Aware Neural Architecture Search for Mobile," Jul. 31, 2018, 9 pages.
Tucker et al., "REBAR: Low-variance, Unbiased Gradient Estimates for Discrete Latent Variable Models," NIPS, Nov. 6, 2017, 17 pages.
Williams, "Simple Statistical Gradient—Following Algorithms for Connectionist Reinforcement Learning," Machine Learning, 1992, 28 pages.
Wu et al., "FBNet: Hardware-Aware Efficient Convnet Design via Differentiable Neural Architecture Search," Dec. 14, 2018, 10 pages.
Xie et al., "Exploring Randomly Wired Neural Networks for Image Recognition," Apr. 8, 2019, 10 pages.
Xie et al., "Genetic CNN," ICCV, 2017, 10 pages.
Xie et al., "SNAS: Stochastic Neural Architecture Search," ICLR, 2019, 17 pages.
Zhong et al., "Practical Block-Wise Neural Network Architecture Generation," CVPR, 2018, 10 pages.
Zoph et al., "Learning Transferable Architectures for Scalable Image Recognition," CVPR, Jun. 18, 2018, 14 pages.
Zoph et al., "Neural Architecture Search with Reinforcement Learning," Nov. 5, 2016, 16 pages.
Office Action for United Kingdom Application No. GB2202271.9, mailed Mar. 29, 2023, 6 pages.
Brownlee et al., "How to Avoid Overfitting in Deep Learning Neural Networks," retrieved from https://machinelearningmastery.com/introduction-to-regularization-to-reduce-overfitting-and-improve-generalization-error/, Aug. 6, 2019, 18 pages.
Office Action for United Kingdom Application No. GB2202271.9, mailed Aug. 30, 2023, 5 pages.
Office Action for United Kingdom Application No. GB2202271.9, mailed Jan. 22, 2024, 4 pages.
Office Action for United Kingdom Application No. GB2202271.9, mailed Apr. 29, 2024, 4 pages.
Examination Report for United Kingdom Application No. GB2202271.9, mailed May 21, 2024, 1 page.

* cited by examiner

| OBJECTIVE FUNCTION | GRADIENT ESTIMATOR | # ARCH. SAMPLES | AVG. TEST ERROR |
|---|---|---|---|
| $\mathcal{L}_{TRAIN}$ | GUMBEL-SOFT. | B | 3.23±0.23 |
| $\mathcal{L}_{VAL}$ | GUMBEL-SOFT. | B | 3.11±0.17 |
| $\mathcal{L}_{GEN}$ | GUMBEL-SOFT. | B | 3.00±0.10 |
| $\mathcal{L}_{GEN}$ | REINFORCE | B | 2.94±0.09 |
| $\mathcal{L}_{GEN}$ | REBAR | B | 2.83±0.14 |
| $\mathcal{L}_{GEN}$ | GUMBEL-SOFT. | 1 | 2.99±0.09 |
| $\mathcal{L}_{GEN}$ | REINFORCE | 1 | 2.99±0.06 |
| $\mathcal{L}_{GEN}$ | REBAR | 1 | 3.06±0.07 |

*FIG. 4*

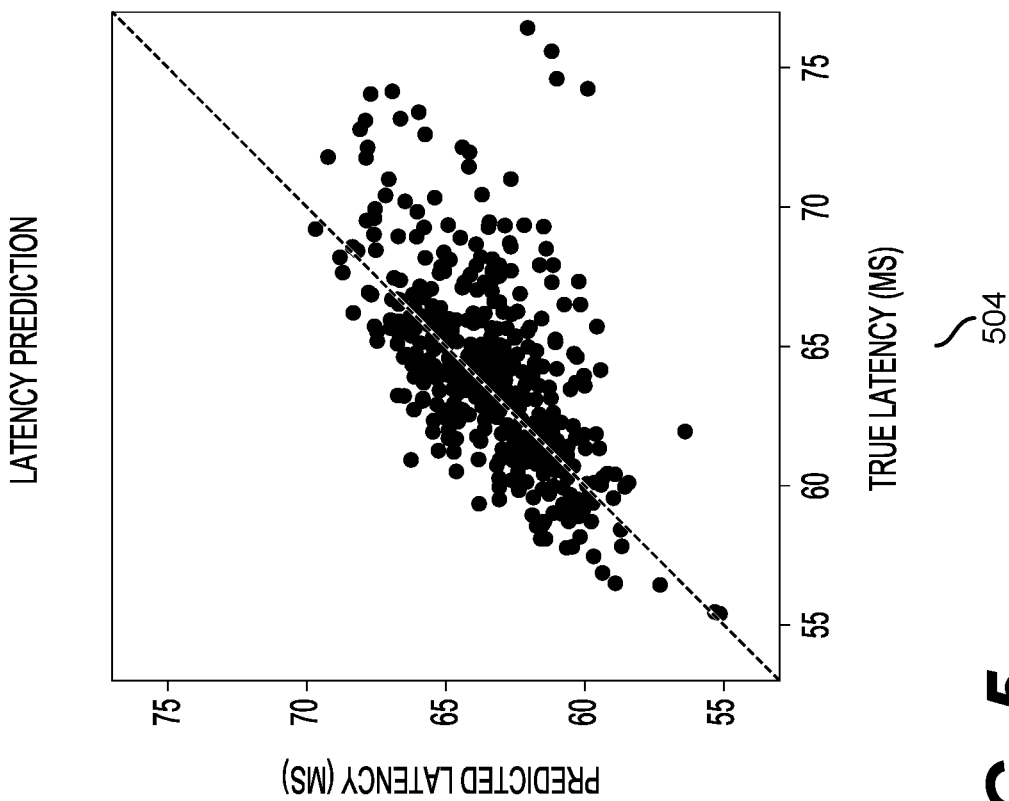
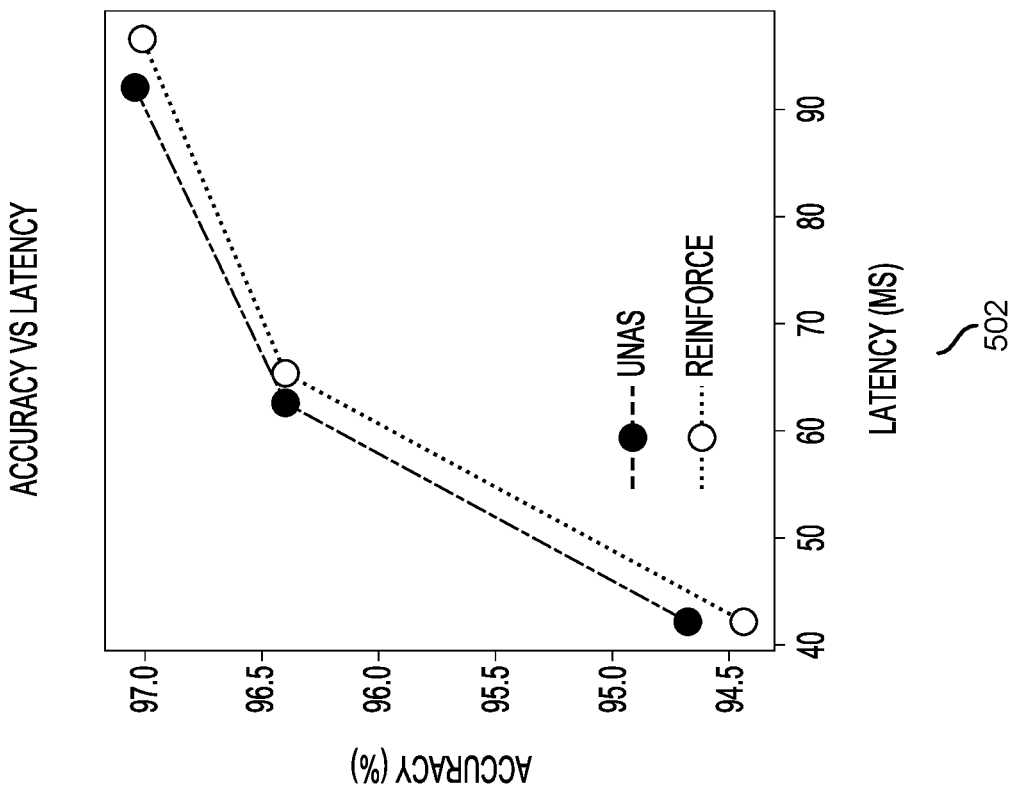
FIG. 5

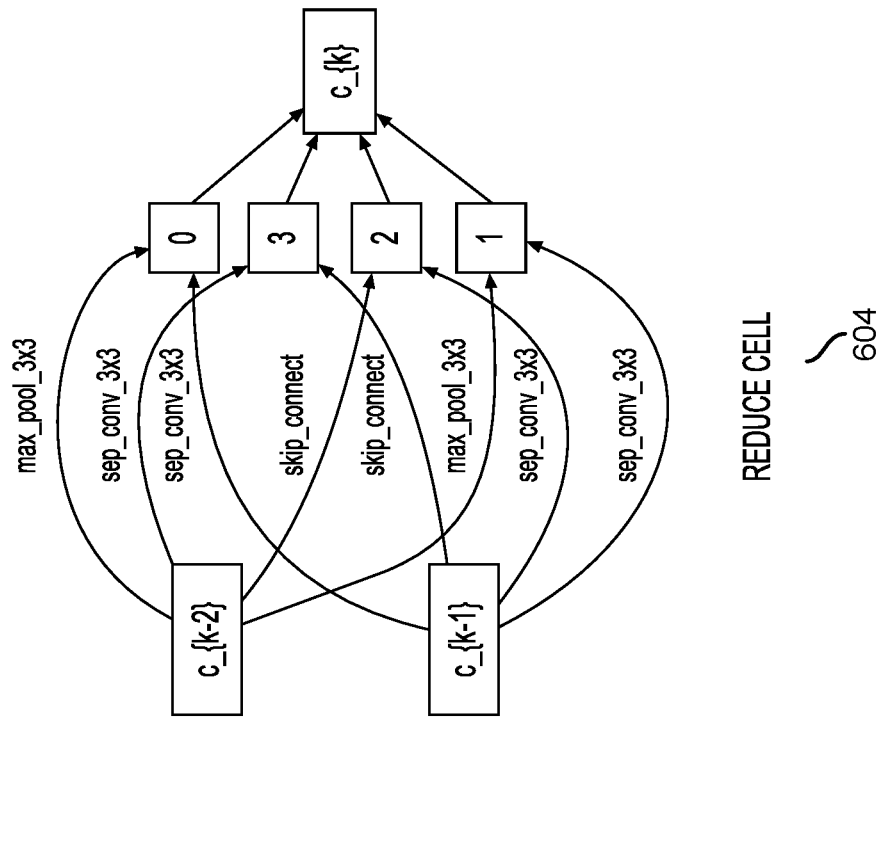
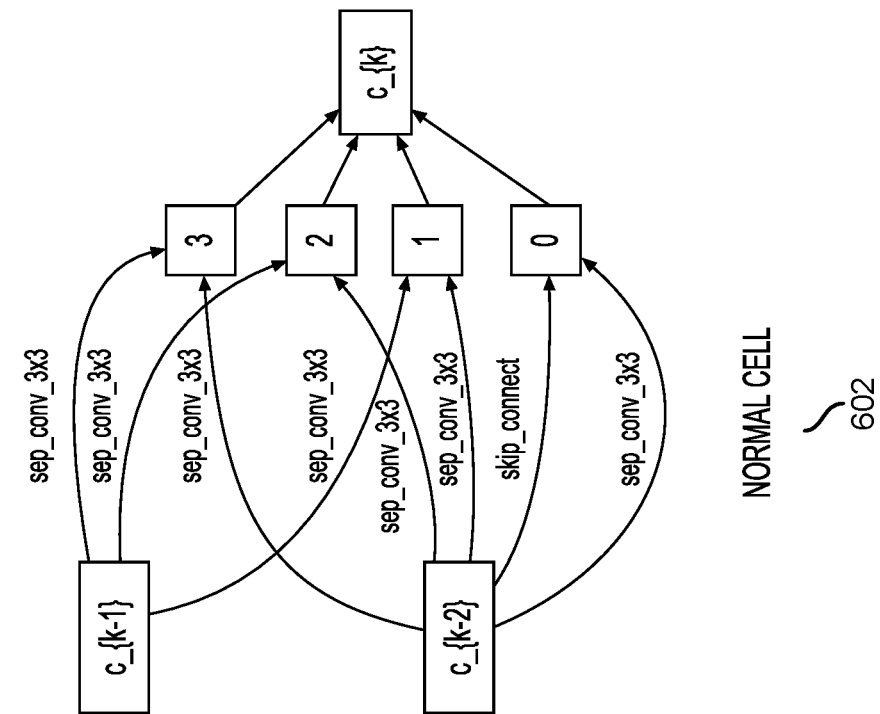
FIG. 6

| ARCHITECTURE | TEST ERROR (%) | PARAMS (M) | SEARCH COST (GPU DAYS) | #OPS | SEARCH METHOD |
|---|---|---|---|---|---|
| NASNET-A + CUTOUT [37] | 2.65 | 3.3 | 2000 | 13 | RL |
| BLOCKQNN [35] | 3.54 | 39.8 | 96 | 8 | RL |
| AMOEBANET-A + CUTOUT [25] | 3.12 | 3.1 | 3150 | 19 | EVOLUTION |
| AMOEBANET-B + CUTOUT [25] | 2.55 ± 0.05 | 2.8 | 3150 | 19 | EVOLUTION |
| HIERARCHICAL EVOLUTION [16] | 3.75 ± 0.12 | 15.7 | 300 | 6 | EVOLUTION |
| PNAS [16] | 3.41 ± 0.09 | 3.2 | 225 | 8 | SMBO |
| ENAS + CUTOUT [22] | 2.89 | 4.6 | 0.45 | 6 | RL |
| RANDOM + CUTOUT [17] | 3.29 ± 0.15 | 3.2 | 4 | 7 | RANDOM |
| DARTS (FIRST ORDER) + CUTOUT [17] | 3.00 ± 0.14 | 3.3 | 1.5 | 7 | GRADIENT-BASED |
| DARTS (SECOND ORDER) + CUTOUT [17] | 2.76 ± 0.09 | 3.3 | 4 | 7 | GRADIENT-BASED |
| SNAS (MODERATE) + CUTOUT [34] | 2.85 ± 0.02 | 2.8 | 1.5 | 7 | GRADIENT-BASED |
| UNAS | 2.75 ± 0.02 | 3.9 | 4.5 | 7 | GRADIENT-BASED RL |

FIG. 7

| ARCHITECTURE | VAL ERROR (%) TOP-1 | VAL ERROR (%) TOP-5 | PARAMS (M) | x + (M) | SEARCH COST (GPU DAYS) | SEARCH METHOD |
|---|---|---|---|---|---|---|
| MOBILENET V2 [26] | 25.3 | - | 6.9 | 585 | - | MANUAL |
| SHUFFLENET 2x (V2) [18] | 25.1 | 7.8 | 7.4 | 591 | - | MANUAL |
| NASANET-A [37] | 26.0 | 8.4 | 5.3 | 564 | 2000 | RL |
| AMOEBANET-B [25] | 26.0 | 8.5 | 5.3 | 555 | 3150 | EVOLUTION |
| AMOEBANET-C [25] | 24.3 | 7.6 | 6.4 | 570 | 3150 | EVOLUTION |
| PNAS [15] | 25.8 | 8.1 | 5.1 | 588 | ~255 | SMBO |
| DARTS [17] | 26.7 | 8.7 | 4.7 | 574 | 4 | GRADIENT-BASED |
| SNAS [34] | 27.3 | 9.2 | 4.3 | 522 | 1.5 | GRADIENT-BASED |
| UNAS - RANDOM CELL | 25.55 | 8.06 | 5.37 | 597.61 | ~250 | RANDOM |
| UNAS - CIFAR-10 | 25.14 | 7.82 | 5.13 | 574.61 | 4.5 | GRADIENT-BASED RL |
| UNAS - IMAGENET | 24.74 | 7.63 | 5.39 | 599.69 | 20 | GRADIENT-BASED RL |

*FIG. 8*

| ARCHITECTURE | VAL ERROR | | PARAMS (M) | x + (M) |
|---|---|---|---|---|
| | TOP-1 | TOP-5 | | |
| RANDWIRE-WS [33] | 25.3 | 7.8 | 5.6 | 585 |
| MNASNET-B1 [28] | 25.5 | - | - | - |
| MNASNET-A3 [28] | 23.3 | 6.7 | 5.2 | 403 |
| PROXYLESSNAS[4] | 24.9 | 7.5 | - | - |
| UNAS | 24.7 | 7.6 | 5.4 | 600 |

*FIG. 9*

| OBJECTIVE FUNCTION | GRADIENT ESTIMATOR | # ARCH. SAMPLES | VAL ERROR TOP-1 |
|---|---|---|---|
| $\mathcal{L}_{VAL}$ | GUMBEL-SOFT. | B | 26.45±0.41 |
| $\mathcal{L}_{GEN}$ | GUMBEL-SOFT. | 1 | 25.83±0.25 |
| $\mathcal{L}_{GEN}$ | GUMBEL-SOFT. | B | 25.37±0.23 |
| $\mathcal{L}_{GEN}$ | REBAR | B | 25.15±0.17 |

FIG. 10

| ARCHITECTURE | VAL ERROR | | PARAMS (M) | MA (M) |
|---|---|---|---|---|
| | TOP-1 | TOP-5 | | |
| RANDOM BEST CHOSEN FROM 10 MODELS, AVERAGED OVER 5 EVAL RUNS | | | | |
| RANDOM BEST | 25.61±0.07 | 8.09±0.10 | 5.37 | 597.61 |
| BEST CELL SEARCHED ON CIFAR-10, AVERAGED OVER 5 EVAL RUNS | | | | |
| SEARCHED ON CIFAR-10 BEST | 25.38±0.17 | 7.88±0.08 | 5.13 | 574.61 |
| BEST CELL SEARCHED ON IMAGENET, AVERAGED OVER 5 EVAL RUNS | | | | |
| SEARCHED ON IMAGENET BEST | 25.02±0.36 | 7.73±0.20 | 5.39 | 599.69 |

*FIG. 12*

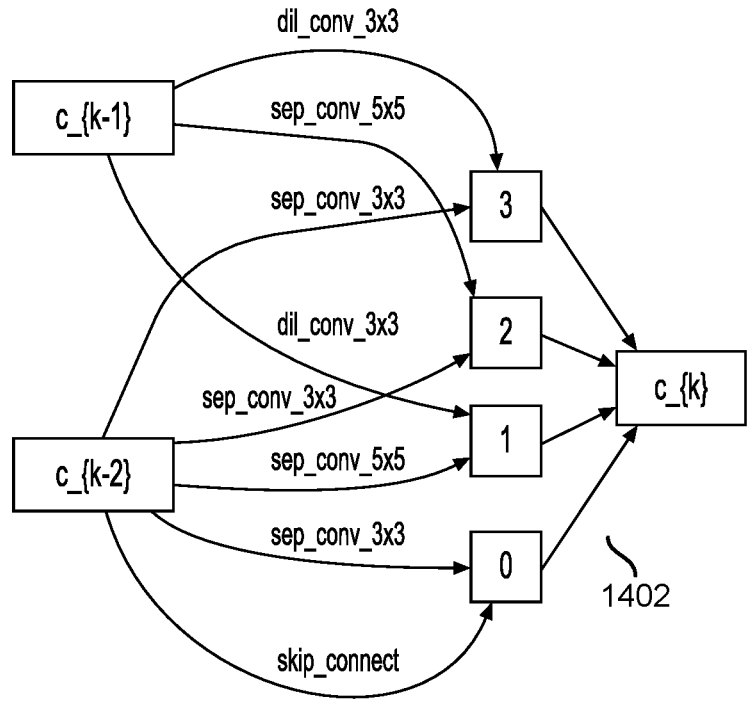
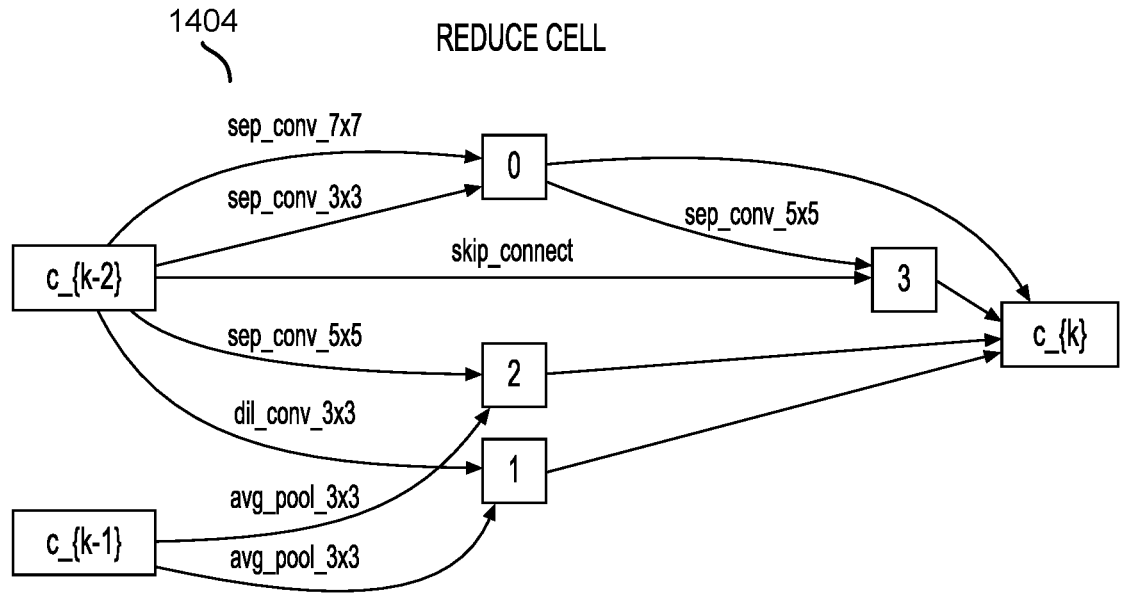
FIG. 14

NORMAL CELL
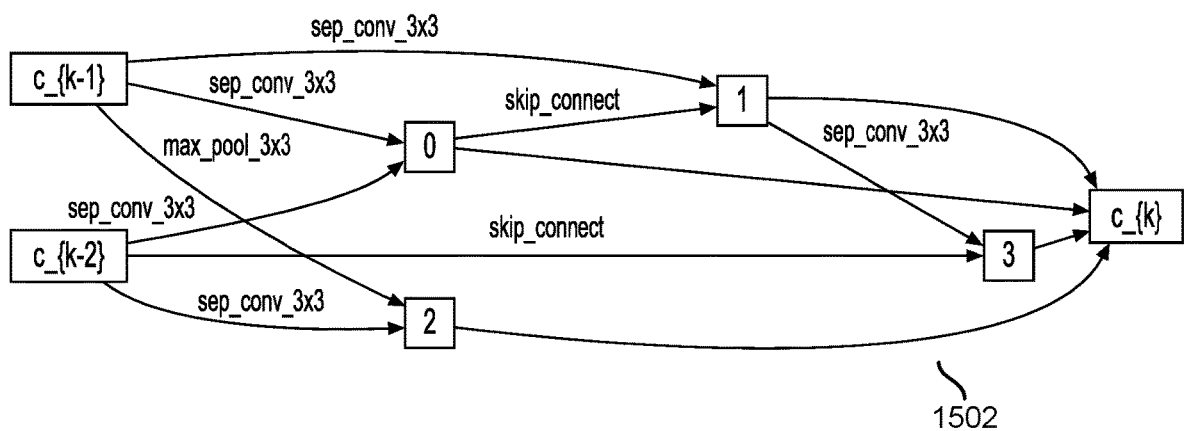
REDUCE CELL
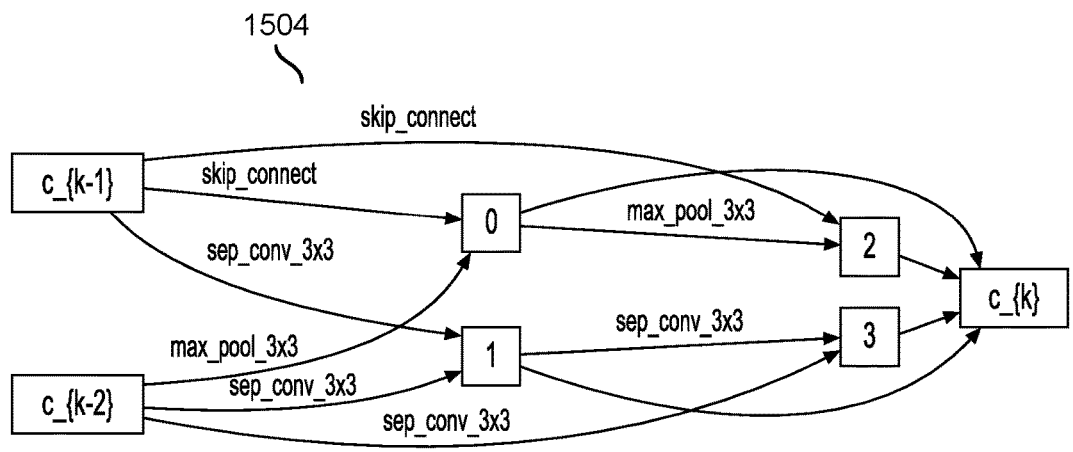
FIG. 15

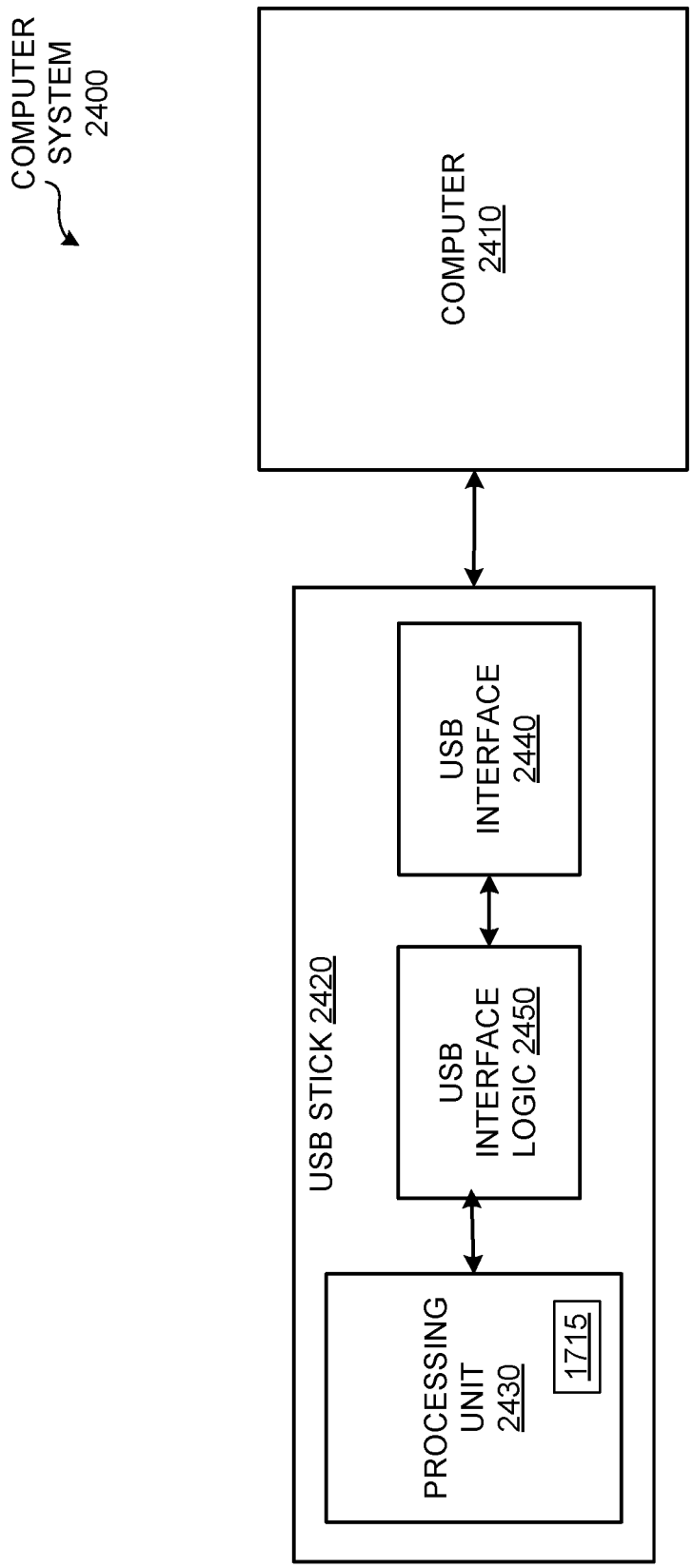

MACHINE-LEARNING-BASED ARCHITECTURE SEARCH METHOD FOR A NEURAL NETWORK

FIELD

At least one embodiment pertains to processing resources used to perform network architecture search. For example, at least one embodiment pertains to processors or computing systems used to learn a network architecture for a neural network.

BACKGROUND

Neural networks are an important developing area of computer science and are useful when solving many difficult technical problems such as image recognition, pattern matching, speech recognition, and machine control. Implementing a neural network system generally involves constructing a network in accordance with a set of architectural parameters, and then training a network to produce a particular result using training data or a calculated reward value. Determining a proper neural network architecture is an important prerequisite, as an incorrect architecture can result in a system that will overgeneralize, overfit, or even fail to converge on a solution altogether. Determining workable architectural parameters can be particularly challenging, as architecture-search techniques are often based on trial and error. Therefore, development of automated network architecture search methods is an important problem.

BRIEF DESCRIPTION OF DRAWINGS

Various techniques will be described with reference to drawings, in which:

FIG. 4 illustrates results of ablation experiments, in accordance with an embodiment;

FIG. 5 illustrates an example of a latency-based architecture search, in accordance with an embodiment;

FIG. 6 illustrates an example of a normal and reduce cell, in accordance with an embodiment;

FIG. 7 illustrates an example of network architecture search results, in accordance with an embodiment;

FIG. 8 illustrates an example of network architecture search results in a mobile setting, in accordance with an embodiment;

FIG. 9 illustrates an example of results on ImageNet obtained with architectures searched using different operation search space and layer connectivity, in accordance with an embodiment;

FIG. 10 illustrates an example of ablation experiment results, in accordance with an embodiment;

FIG. 12 illustrates an example of ImageNet performance of best models, averaged over five evaluation runs, in accordance with an embodiment;

FIG. 14 illustrates an example of cell models discovered on CIFAR-10 (a machine-learning test dataset), in accordance with an embodiment;

FIG. 15 illustrates an example of randomly proposed cell models on ImageNet, in accordance with an embodiment;

FIG. 24 illustrates a computer system, according at least one embodiment;

DETAILED DESCRIPTION

Figure 1:
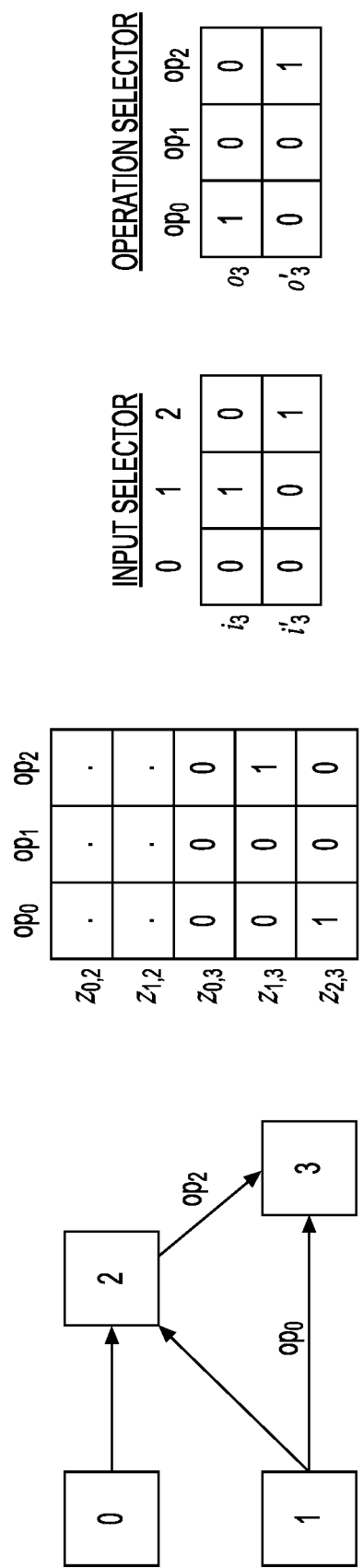
FIG. 1 illustrates an example of a paired-input cell structure, in accordance with an embodiment.

In at least one embodiment, a network architecture search method is performed that supports both differentiable and non-differentiable objective functions. Discovering a new architecture that meets a particular criterion often involves a tedious and costly manual process of trial-and-error searching in an exponentially large space of hyperparameters. For example, discovering a novel architecture such as Inception, ResNet, and DenseNet often involves a tedious and costly process of trial-and-error searching in an exponentially large space of hyperparameters. In at least one embodiment, an automated neural architecture search ("NAS") process discovers new networks and can easily find architectures for new problem domains and criteria.

In at least one embodiment, differentiable neural architecture search ("DNAS") techniques show promising results while reducing search cost. In at least one embodiment, however, these approaches assume that an objective is differentiable with respect to architecture parameters. In at least one embodiment, a NAS approach assumes that an objective is differentiable with respect to architecture parameters and relies on continuous relaxation of discrete variables for search, which can introduce additional bias. In at least one embodiment, a goal of neural architecture search is to automate a process for discovering new networks so that it can be performed easily for new problem domains and criteria.

In at least one embodiment, techniques described herein include a generic framework that bridges a gap between several previous approaches. In at least one embodiment, techniques described herein may be used to search for an architecture using a non-differentiable objective function which was not possible using differentiable architecture search models. In at least one embodiment, RL-based approaches search using non-differentiable objective functions; however, techniques described herein provide gradient estimators that have lower variance in comparison to other RL-based approaches. In at least one embodiment, techniques described herein trade gradient variance for efficiency without introducing bias. In at least one embodiment, techniques described herein utilize an objective function for architecture search based on a generalization error. In at least one embodiment, this objective function is superior in comparison to commonly used training/validation-based objective functions. In at least one embodiment, techniques described herein can search with differentiable and non-differentiable functions and do not require an accurate approximation of non-differentiable terms in an objective.

In at least one embodiment, techniques described herein can be used for hardware-aware architecture search. In at least one embodiment, an objective of these techniques is to design a neural architecture for a specific task such that it achieves an improved accuracy while running sufficiently fast. In at least one embodiment, using techniques described herein, users are able to produce network architectures that are adapted to particular hardware. In at least one embodiment, techniques described herein provide a unified framework for NAS ("UNAS") that bridges a gap between differentiable and RL-based architecture search.

In at least one embodiment, neural architecture search aims to discover network architectures with desired properties such as high accuracy, low latency, or both. In at least one embodiment, techniques that utilize differentiable neural architecture search exhibit promising results while maintaining a search cost several orders of magnitude lower than reinforcement-learning-based NAS. In at least one embodiment, techniques described herein enable NAS with different objective functions including differentiable functions such cross-entropy classification loss as well as non-differentiable functions such as network latency. In at least one embodiment, techniques described herein also allow a tradeoff of search gradient noise for search efficiency (in terms of GPU memory and hours). In at least one embodiment, techniques described herein provide a new objective function for search based on generalization error that prevents selection of architectures prone to overfitting. In at least one embodiment, extensive experiments using CIFAR-10 and ImageNet datasets and show that UNAS obtains state-of-the-art accuracy on ImageNet when compared to architectures searched on similar search spaces.

In light of this disclosure, certain embodiments may be capable of achieving certain advantages, including some or all of following: (1) enabling searching for architectures using both differentiable objective functions (such as cross-entropy loss) and non-differentiable functions (such as network latency); (2) trading of gradient noise for search efficiency (in terms of GPU memory and hours) without introducing any additional bias; and (3) a new objective function based on a generalization error which is empirically shown to find architectures less prone to overfitting.

In at least one embodiment of differentiable architecture search, a cell is represented by a directed acyclic graph, where each node in a graph denotes a hidden representation (such as feature maps in CNNs) and each directed edge represents an operation transforming a state of an input node. In at least one embodiment, an $n^{th}$ node $x_n$ is initially connected to its predecessors (i.e. $x_{<n}$) and its content is computed by $x_n = \Sigma_{m<n} O_{m,n}(x_m)$, where $O_{m,n}$ is an operation applied to $x_m$. In at least one embodiment, a goal of architecture search is then to find $O_{m,n}$ for each edge m, n. In at least one embodiment, representing a set of all possible operations that can be applied to an edge e:=(m, n) using $\{O_e^{(1)}, O_e^{(2)}, \ldots, O_e^{(K)}\}$ where K is a number of operations, this discrete assignment problem can be formulated as a mixed operation denoted by $O_e(x_m) = \sum_{k=1}^{K} z_e^{(k)} O_e^{(k)}(x_m)$, where $z_e = \{z_e^{(1)}, z_e^{(2)} \ldots, z_e^{(K)}\}$ is a one-hot binary vector (i.e. $z_e^{(k)} \in \{0,1\}$) with a single one indicating a selected operation. In at least one embodiment, it is assumed that a set of operations also includes a zero operation that enables omitting edges in a cell and, thus, learning connectivity as well.

In at least one embodiment, a cell architecture is determined given a set of all operation assignments for all edges denoted by $z=\{z_e\}$. In at least one embodiment, therefore, an objective of architecture search is to find a distribution over architecture parameters, z such that it minimizes expected loss $\mathbb{E}_{p_\phi(z)}[\mathcal{L}(z)]$ where $p_\phi$ is a $\phi$-parameterized distribution over z and $\mathcal{L}(z)$ is a loss function measuring performance of architecture specified by z using a performance measure such as classification loss.

In at least one embodiment, architecture distribution is a factorial distribution with a form of $p_\phi(z) = \Pi_e p_{\phi_e}(z_e)$ where $p_{\phi_e}(z_e)$ is a $\phi_e$-parameterized categorical distribution defined over one-hot vector $z_e$. In at least one embodiment, SNAS proposed using Gumbel-Softmax relaxation for optimizing expected loss, and in this case, categorical distribution $p_\phi(z)$ is replaced with a Gumbel-sSoftmax distribution $p_\phi(\zeta)$ where $\zeta$ denotes continuous relaxation of architecture parameter (z). In at least one embodiment, SNAS assumes that loss $\mathcal{L}(z)$ is differentiable with respect to z and it uses reparameterization trick to minimize expectation of relaxed loss $\mathbb{E}_{p_\phi(\zeta)}[\mathcal{L}(\zeta)]$.

In at least one embodiment, a general framework for optimizing expected loss $\mathbb{E}_{p_\phi(z)}[\mathcal{L}(z)]$ is provided. In at least one embodiment, a formulation of loss function $\mathcal{L}$ is presented.

In at least one embodiment, a generic approach for optimizing expected loss is REINFORCE gradient estimator $$\frac{\partial}{\partial \phi} \mathbb{E}_{p_\phi(z)}[\mathcal{L}(Z)] = \mathbb{E}_{p_\phi(z)}[\mathcal{L}(Z) \partial_\phi \log p_\phi(Z)] \quad (1)$$

which can be applied even to a loss function $\mathcal{L}(z)$ that is not differentiable with respect to z. In at least one embodiment, however, this estimator may suffer from high variance and, therefore, a large number of trained architecture samples may be necessary to reduce its variance, making it extremely compute intensive. In at least one embodiment, REINFORCE estimator in Eq. 1 can be rewritten as $$\frac{\partial}{\partial \phi} \mathbb{E}_{p_\phi(z)}[\mathcal{L}(Z)] = \qquad (2)$$
$$\mathbb{E}_{p_\phi(z)}[(\mathcal{L}(Z) - c(Z))\partial_\phi \log p_\phi(Z)] + \partial_\phi \mathbb{E}_{p_\phi(z)}[c(Z)]$$

where c(z) is a control variate. In at least one embodiment, gradient estimator in Eq. 2 has lower variance than Eq. 1, if c(z) is correlated with $\mathcal{L}(z)$, and $\partial_\phi \mathbb{E}_{p_\phi(z)}[c(z)]$ has a low variance gradient estimator. In at least one embodiment, without loss of generality, it can be assumed that loss function is decomposed into $\mathcal{L}(z) = \mathcal{L}_d(z) + \mathcal{L}_n(z)$ where $\mathcal{L}_d(z)$ contains terms that are differentiable with respect to z and $\mathcal{L}_n(z)$ includes non-differentiable terms. In at least one embodiment, a baseline function in form of $c(z) = c_d(z) + c_n(z)$ is presented, where $c_d(z)$ and $c_n(z)$ are for $\mathcal{L}_d(Z)$ and $\mathcal{L}_n(z)$ respectively. In at least one embodiment, a baseline is designed such that term $\partial_\phi \mathbb{E}_{p_\phi(z)}[c(Z)]$ in Eq. 2 can be approximated using a low-variance reparameterization trick.

In at least one embodiment, a Gradient Estimation for Differentiable Loss $\mathcal{L}_d$ is presented. In at least one embodiment, following REBAR, in order to construct a control variate for $\mathcal{L}_d$, a stochastic continuous relaxation $r_\phi(\zeta|z)$ is used that samples from a conditional Gumbel-Softmax distribution given an architecture sample z. In at least one embodiment, $\zeta$ can be considered as a smooth architecture defined based on z. In at least one embodiment, it is highly correlated with z (as in REBAR). In at least one embodiment, with definition $c_d(z):=\mathbb{E}_{r_\phi(\zeta|z)}[\mathcal{L}_d(\zeta)]$, gradient in Eq. 2 can be written as $$\frac{\partial}{\partial \phi} \mathbb{E}_{p_\phi(z)}[\mathcal{L}_d(Z)] = \underbrace{\mathbb{E}_{p_\phi(z)}[(\mathcal{L}_d(Z) - c_d(Z))\partial_\phi \log p_\phi(Z)]}_{(i) \, reinforce} - \qquad (3)$$
$$\underbrace{\mathbb{E}_{p_\phi(z)}[\partial_\phi c_d(Z)]}_{(ii) \, correction} + \underbrace{\partial_\phi \mathbb{E}_{p_\phi(z)}[c_d(Z)]}_{(iii) \, Gumbel-Softmax}$$

In at least one embodiment, gradient estimator in Eq. 3 consists of three terms. In at least one embodiment, (i) is reinforce term, which is estimated using a Monte Carlo method by sampling $z \sim p_\phi(z)$ and then sampling $\zeta \sim r_\phi(\zeta|z)$. In at least one embodiment, (ii) is correction term due to dependency of $c_d(z)$ on $\phi$. In at least one embodiment, this term is approximate using a reparameterization trick applied to conditional Gumbel-Softmax $r_\phi(\zeta|z)$. In at least one embodiment, (iii) can be written as $$\mathbb{E}_{p_\phi(z)}[c_d(z)] = \mathbb{E}_{p_\phi(z)}[\mathbb{E}_{r_\phi(\zeta|z)}[\mathcal{L}_d(\zeta)]] = \mathbb{E}_{p_\phi(\zeta)}[\mathcal{L}_d(\zeta)], \qquad (4)$$

which is expected value of loss evaluated under Gumbel-Softmax distribution $p_\phi(\zeta)$. In at least one embodiment, its gradient is computed using a low-variance reparameterization trick. In at least one embodiment, in practice, two function evaluations are used for estimating gradient in Eq. 3, one for computing $\mathcal{L}_d(Z)$, and one for $\mathcal{L}_d(\zeta)$. In at least one embodiment, gradients are computed using an automatic differentiation library.

In at least one embodiment, Eq. 3 unifies differentiable architecture search with policy gradient-based methods. In at least one embodiment, this estimator is unbiased and uses Gumbel-Softmax estimation of differentiable loss for reducing variance of an estimate. In at least one embodiment, under this framework, it is easy to see that SNAS is a biased estimation of a policy gradient as it only uses (iii) for search. In at least one embodiment, however, policy gradient-based NAS assumes a constant control variate ($c_d(z)=C$) which only requires computing (i).

In at least one embodiment, gradient estimation for non-differentiable loss $\mathcal{L}_n$ is presented. In at least one embodiment, gradient estimator in Eq. 3 cannot be applied to non-differentiable loss $\mathcal{L}_n(z)$ as a reparameterization trick is only applicable to differentiable functions. In at least one embodiment, for $\mathcal{L}_n(z)$, an embodiment uses RELAX that lifts this limitation by defining baseline function $c_n(z):=\mathbb{E}_{r_\phi(\zeta|z)}$, where $g(\bullet)$ is a surrogate function (such as a neural network) trained to be correlated with $\mathcal{L}_n(z)$. In at least one embodiment, a surrogate function is a neural network that estimates a non differentiable loss such as latency. In at least one embodiment, a gradient estimator for $\mathcal{L}_n$ is obtained by replacing $c_d$ in Eq. 3 with $c_n$. In at least one embodiment however, a difference is that here a reparameterization trick is applied to $\mathbb{E}_{r_\phi(\zeta|z)}[g(\zeta)]$ in (ii) and similarly to $\mathbb{E}_{p_\phi(\zeta)}[g(\zeta)]$ in (iii).

In at least one embodiment, in RELAX, $g(\zeta)$ is trained to minimize a variance of an estimator. In at least one embodiment however, this requires backpropagating through a gradient function, which can be slow. In at least one embodiment, an embodiment trains g by minimizing $|g(z)-\mathcal{L}_n(z)|$ during architecture search. In at least one embodiment, in case of latency, this corresponds to training g to predict latency. In at least one embodiment, experiments indicate that a simple fully connected network can predict latency with a reasonable accuracy.

In at least one embodiment, RELAX is more general than REBAR as it can be used for minimizing expectation of differentiable loss function $\mathcal{L}_d(z)$. In at least one embodiment, this requires ability to approximate $\mathcal{L}_d(z)$ using g. In at least one embodiment, preliminary experiments on using RELAX for minimizing classification loss as $\mathcal{L}_d(z)$ indicate that it is very challenging to predict classification loss for a network by another network.

In at least one embodiment, bi-level training of architecture parameters and network parameters is proposed. In at least one embodiment, in architecture update, either training loss, or validation loss given current network parameters $w$, are used to update architecture parameters using $$\min_\phi \mathbb{E}_{p_\phi(z)}[\mathcal{L}_{train}(\mathcal{Z}, \mathcal{W})] \text{ or } \min_\phi \mathbb{E}_{p_\phi(z)}[\mathcal{L}_{val}(\mathcal{Z}, \mathcal{W})]. \quad (5)$$

In at least one embodiment, network parameters $w$ are updated given samples from architecture by minimizing $$\min_\phi \mathbb{E}_{p_\phi(z)}[\mathcal{L}_{train}(\mathcal{Z}, \mathcal{W})] \quad (6)$$

In at least one embodiment, parameters $\phi$ and $w$ are updated iteratively by taking a single gradient step in Eq. 5 and Eq. 6. It has been shown that by sharing network parameters among all architecture instances, we gain several orders of magnitude speedup in search. In at least one embodiment, however, this comes with cost of updating architecture parameters at suboptimal $w$. In at least one embodiment, this translates to making decision on architecture without considering its optimal performance.

In at least one embodiment, to overfitting, an objective function is based on generalization error of an architecture. In at least one embodiment, rationale behind this is that a selected architecture not only should perform well on training set but also should generalize equally well to examples in validation set, even when network parameters are not yet optimized. In at least one embodiment, this prevents search from discovering architectures that do not generalize well. In at least one embodiment, we define objective function for $\phi$ as $$\min_\phi \mathcal{L}_{gen}(\mathcal{Z}, \mathcal{W}) = \quad (7)$$

$$\mathbb{E}_{p_\phi(z)}[\mathcal{L}_{train}(\mathcal{Z}, \mathcal{W}) + \lambda|\mathcal{L}_{val}(\mathcal{Z}, \mathcal{W}) - \mathcal{L}_{train}(\mathcal{Z}, \mathcal{W})|],$$

where $\lambda$ is a scalar balancing training loss and generalization error. In at least one embodiment, $\lambda=0.5$ often works well in experiments. In at least one embodiment, for training, we iterate between updating $\phi$ using Eq. 7 and updating $w$ using Eq. 6. In at least one embodiment, in each parameter update, a simple gradient descent update is performed.

In at least one embodiment, a goal is to find an architecture that has a low latency as well as high accuracy. In at least one embodiment, latency of network specified by z can be measured in each parameter update. In at least one embodiment, representing latency of network using $\mathcal{L}_{lat}(z)$, we augment objective function in Eq. 7 with $\mathbb{E}_{p_\phi(z)}[\lambda_{lat}\mathcal{L}_{lat}(z)]$, where $\lambda_{lat}$ is a scalar balancing trade-off between architecture loss and latency loss. In at least one embodiment, although $\mathcal{L}_{lat}(z)$ is not differentiable w.r.t. z, it can be approximated using a surrogate function, thus, RELAX can be used to optimize this term.

In at least one embodiment, both objectives in Eq. 7 and Eq. 6 involve expectations with respect to $p_\phi(z)$. In at least one embodiment, for gradient estimation, as shown in Sec. 3.1, Monte Carlo estimate is computed by drawing samples from $p_\phi(z)$. In at least one embodiment, since we compute training/validation loss in an objective function using a mini-batch of data, we can choose to set a number of architecture samples to a value between one and a number of samples in mini-batch (such as batch size). In this section, we review an effect of choosing a number of architecture samples on variance and efficiency of search, in an embodiment.

In at least one embodiment, Architecture Sample Size is set to a Batch Size. In at least one embodiment, this option corresponds to examining many architectures at a same time with shared $w$ for updating $\phi$. In at least one embodiment, this has a lower gradient variance for updating $\phi$, as it uses many z samples for estimating a gradient. In at least one embodiment, however, this approach is compute and memory intensive at it requires computing mixed operations in cells.

In at least one embodiment, a single architecture sample is used. In at least one embodiment, gradient variance can be traded for efficiency by using a single architecture sample. In at least one embodiment, a single sample Monte Carlo estimate of $\mathbb{E}_{p_\phi(z)}[\mathcal{L}(z)]$ can be computed efficiently, as for every mixed operation in a cell we require computing only a single operation. In at least one embodiment, this can reduce memory and compute requirements for evaluating loss in each parameter update. In at least one embodiment, however, this only applies to expectation involving discrete architecture samples, and it is not clear if a similar improvement can be made for expectation with continuous Gumbel-Softmax samples. In at least one embodiment, in Appendix A, a simple approach for reducing a computational and memory requirement of relaxed mixed operations is presented. In at least one embodiment, different values of Gumbel-Softmax temperature are applied to different factors in $p(\zeta)$.

FIG. 1 illustrates an example of a paired-input cell structure, in accordance with an embodiment. In at least one embodiment, a paired-input cell structure ensures that each node of a prospective architecture depends on two previous nodes. In at least one embodiment, this ensures that an architecture search algorithm produces a reasonably spares architecture. In at least one embodiment, on left of FIG. 1, a small graph with 4 nodes is visualized. In at least one embodiment, in middle of FIG. 1, z={$z_e$}, operation assignment for incoming edges to node 3 is shown. In at least one embodiment, on right of FIG. 1, input and operation selectors for these edges are shown. In at least one embodiment, a shaded matrix on z is parameterized by outer product $i_3 \otimes \sigma_3 + i_3' \otimes \sigma_3'$.

In at least one embodiment, training a cell structure introduced above may result in a densely connected cell where each node depends on an output of all previous nodes. In at least one embodiment, in order to induce sparsity on connectivity, prior work requires that each node in a cell can only be connected to two other nodes as input. In at least one embodiment, DARTS uses a heuristic to prune a number of input edges to two by choosing operations with largest weights. In at least one embodiment, SNAS unexpectedly discovers a cell with only two inputs per node.

In at least one embodiment, in order to explicitly induce sparsity, an operation assignment problem is reformulated on edges using two selection problems: i) an input selector that selects two nodes out of previous nodes and ii) an operation selector that selects two operations that are applied to each selected input. In at least one embodiment, this structure is named a paired-input cell as it ensures that content of each node depends only on two previous nodes without relying on any post-search heuristic. In at least one embodiment, $i_n$ and $i_n'$ are introduced, two one-hot vectors for an nth node representing input selectors as well as two one-hot vectors on and on denoting operation selectors. In at least one embodiment, an architecture is specified by sets $$\{i_n, i_n'\}_{n=1}^{N}, \text{ and } \{\sigma_n, \sigma_n'\}_{n=1}^{N},$$

where N is a number of nodes in a cell. In at least one embodiment, this formulation is easily converted to an operation assignment problem on edges (i.e. $\{z_e\}$) in Sec. 2 using outer product $i_3 \otimes \sigma_3 + i_3' \otimes \sigma_3'$, as shown in FIG. 1. In at least one embodiment, a product of categorical distributions in a form $\Pi_n p(i_n) p(i_n') p(\sigma_n) p(\sigma_n')$ is used to represent a distribution over architecture parameters. In at least one embodiment, this distributing by $p_\phi(z)$ is referred to for ease of notation.

In at least one embodiment, one issue with a paired-input structure is that architecture search may choose a same input and operation pair for both incoming edges of a node due to a symmetric expression in our reformulation $i_3 \otimes \sigma_3 + i_3' \otimes \sigma_3'$. In at least one embodiment, to prevent this, an architecture penalty term is added to objective function using $\mathcal{L}_{arch}(z) = \mathbb{E}[\lambda_{arch} \Sigma_e [i_n, m\sigma_n]^T [i_{n,m}', o_n']]$ where $\lambda_{arch}$ is a trade-off parameter ($\lambda_{arch}$=0.2). In at least one embodiment, a term inside summation becomes one if a same input and operation is selected on an edge.

In at least one embodiment, techniques described herein are applied to a proposed UNAS framework to a problem of architecture search for image classification. In at least one embodiment, an embodiment uses an experimental setup introduced in DARTS with minor modifications outlined below. In at least one embodiment, in a search phase, a computer system searches for a cell using a network with a small number of feature maps and/or layers. In at least one embodiment, given a stochastic representation of an architecture, a final cell is obtained by taking an input/operation that has highest probability for each node. In at least one embodiment, in evaluation phase, a cell is stacked into a larger network which is retrained from scratch.

In at least one embodiment, architecture search results on CIFAR-10 dataset are presented below. In at least one embodiment, more sophisticated approaches such as offline training improve prediction quality of g. In at least one embodiment however, an important advantage of techniques described herein is that gradient estimation is still unbiased even if g is not accurate. In contrast, various examples of ProxylessNAS and FBNet require an accurate function estimating latency, as this function is used for minimizing latency.

Figure 2:
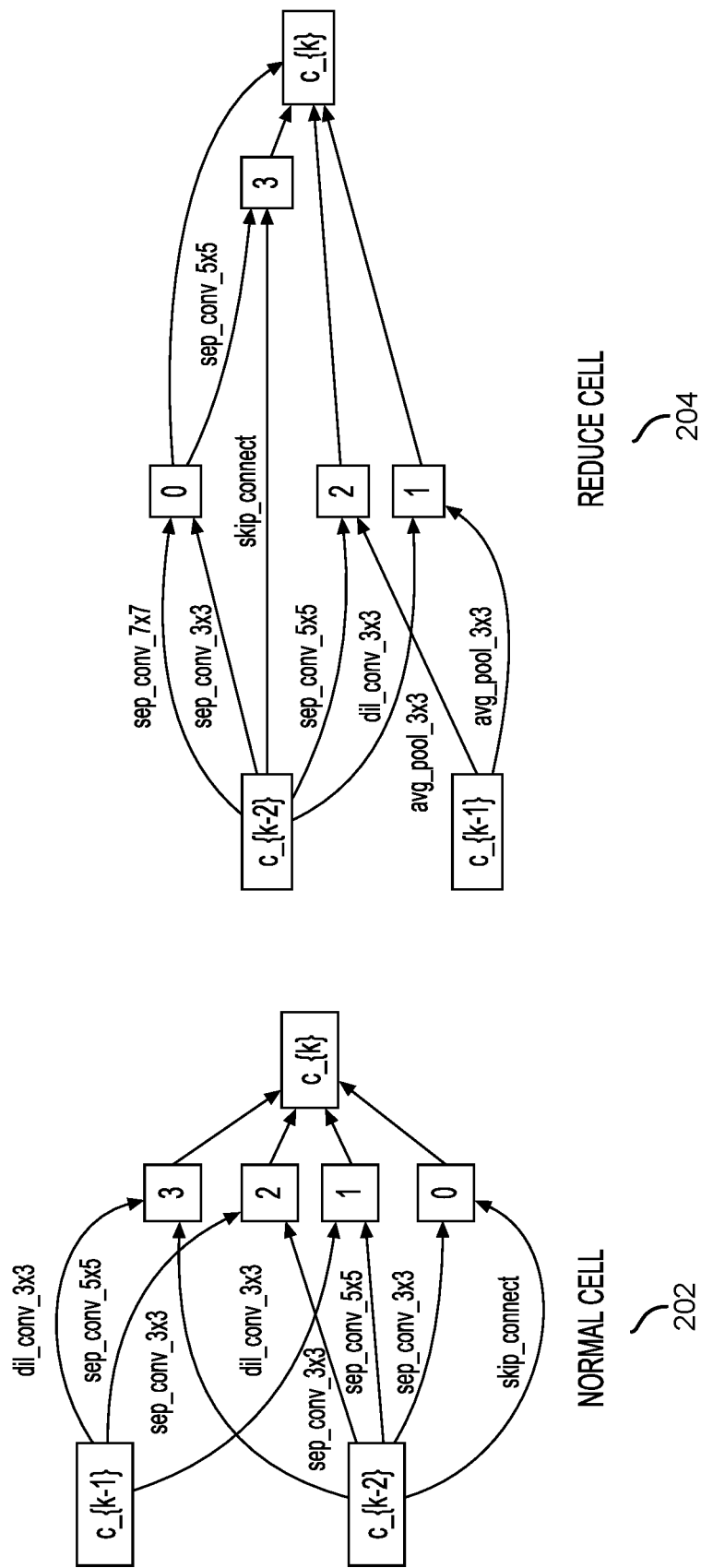
FIG. 2 illustrates an example of a normal cell and a reduce cell, in accordance with an embodiment.

FIG. 2 illustrates an example of a normal cell 202 and a reduce cell 204, in accordance with an embodiment. In at least one embodiment, normal cell 202 is an example of a normal cell produced by techniques described herein when using an CIFAR-10 dataset. In at least one embodiment, normal cell 204 is an example of a reduce cell produced by techniques described herein when using CIFAR-10 dataset.

Figure 3:
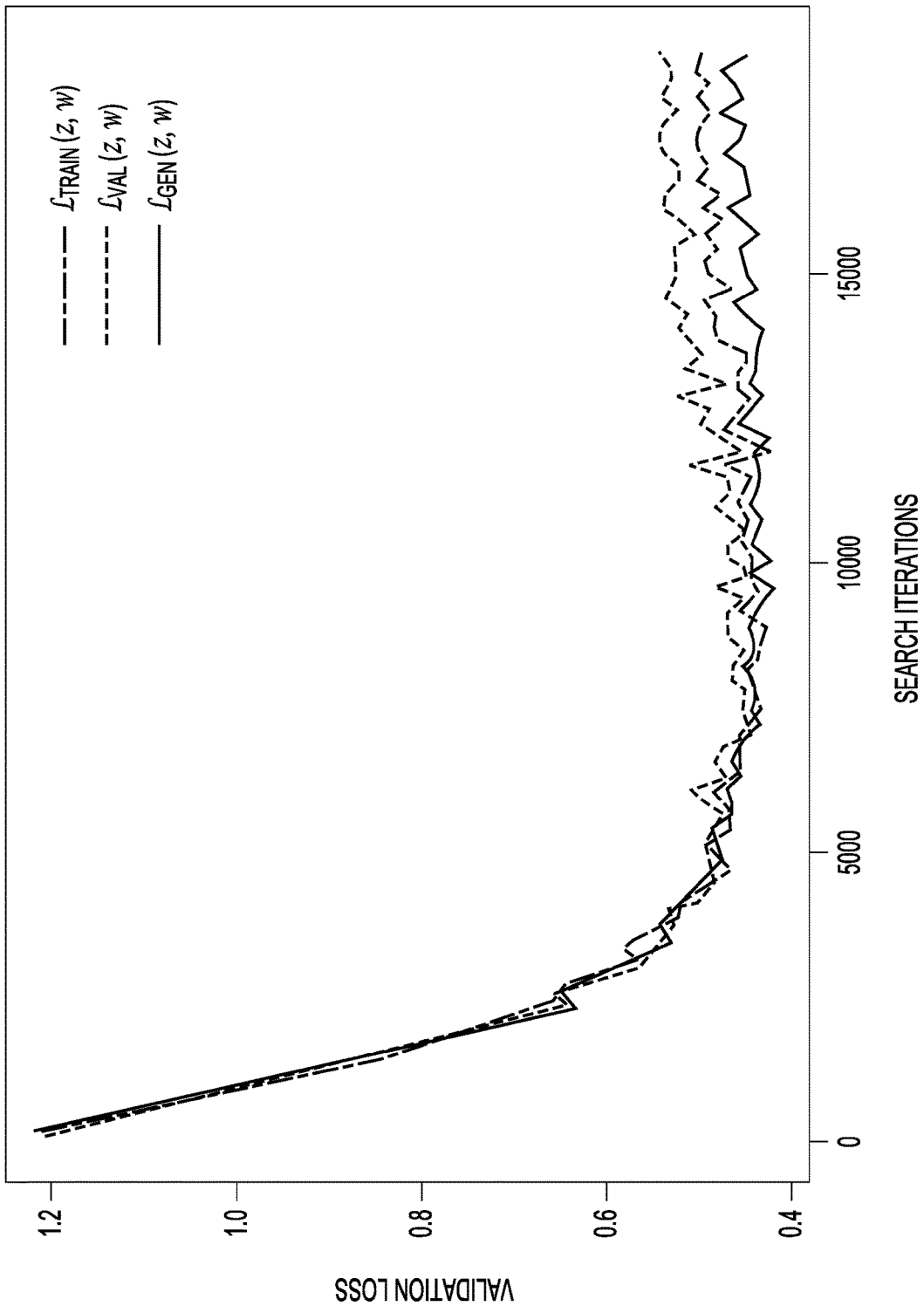
FIG. 3 illustrates an example of a validation loss in search, in accordance with an embodiment.

FIG. 3 illustrates an example of validation loss in search, in accordance with an embodiment. In at least one embodiment, validation loss illustrated in FIG. 3 is produced when training with an CIFAR-10 dataset.

In at least one embodiment, for ablation experiments, search and evaluation phases are run end-to-end four times and mean and standard deviation of final test accuracy are reported. In at least one embodiment, differentiable loss functions with respect to z are considered. In at least one embodiment, different baselines are summarized in FIG. 4.

In at least one embodiment, a training objective baseline is summarized in FIG. 4. In at least one embodiment, in a first group in table shown in FIG. 4, a number of architecture samples is fixed to a batch size (B), and Gumbel-Softmax is used to minimize architecture loss. In at least one embodiment, for this group, an objective function for updating $\phi$ is varied between expectation of $L_{train}$, $L_{val}$, and $L_{gen}$. In at least one embodiment, architecture search with generalization loss yields a better model by avoiding overfitting of the data to the discovered architecture. In at least one embodiment, this is due to updating $\phi$ using suboptimal $w$ that fails in capturing true generalization of architecture. In at least one embodiment, validation loss during architecture search using different loss functions is visualized in FIG. 3. In at least one embodiment, even updating architecture parameters using validation loss does not prevent network from overfitting.

In at least one embodiment, there is a question as to whether generalization loss is required for original RL-based NAS that updates architecture parameters using optimal $w$. In at least one embodiment, ENAS-like training is examined where network parameters $w$ are updated for half epoch in every $\phi$ update. In at least one embodiment, architectures found by generalization loss, on average, obtain a test error of 2.92% while those found by validation loss based search achieve 3.12%. In at least one embodiment, this provides strong evidence that architecture search models should consider generalization.

A gradient estimation baseline in accordance with at least one embodiment is summarized in FIG. 4. In at least one embodiment, in second group, search objective is fixed to $\mathbb{E}[\mathcal{L}_{gen}(z, w)]$, and different gradient estimators are examined including: Gumbel-Softmax examined in a first group, REINFORCE (Eq. 2) with exponential moving average of loss as baseline, and REBAR (Eq. 3). In at least one embodiment, REBAR gradient estimator with generalization error achieves best results. In at least one embodiment, REINFORCE estimator, which is typically not compared directly against DNAS methods also achieves competitive results.

In at least one embodiment, a number of architecture samples is summarized in FIG. 4. In at least one embodiment, in a last group, a number of architecture samples are set to one (i.e., all samples in a mini-batch have same architecture). In at least one embodiment, comparing this against a previous group, using a single architecture sample in search yields an inferior architecture for both REINFORCE and REBAR. In at least one embodiment, Gumbel-Softmax shows less sensitivity to sample size.

In at least one embodiment, a proposed framework for searching architecture with low latency is utilized. In at least one embodiment, RELAX is used with a simple fully connected network as surrogate function g. In at least one embodiment, a network consists of 5 layers, with 200 units in each layer with tan h activation.

In at least one embodiment, for latency optimization, a single architecture sample is used in each ϕ update as it enables us to measure latency of a network while computing $\mathcal{L}(z)$. In at least one embodiment, a history of 5,000 measured latency values paired with architecture samples is used for training parameters of g.

FIG. 5 illustrates an example of latency-based architecture search, in accordance with an embodiment. In at least one embodiment, using CIFAR-10 data, techniques described herein produce a relationship between latency and accuracy as shown in a first graph 502. In at least one embodiment, using CIFAR-10 data, techniques described herein produce a relationship between predicted latency and true accuracy as shown in a second graph 504.

FIG. 6 illustrates an example of a normal and reduce cell, in accordance with an embodiment. In at least one embodiment, normal cell 602 is an example of a normal cell produced by techniques described herein when using an ImageNet dataset. In at least one embodiment, normal cell 604 is an example of a reduce cell produced by techniques described herein when using an ImageNet dataset.

In at least one embodiment, a search for models is performed with different latency by varying latency loss coefficient $\lambda_{lat}$ in set {0.3, 3, 30}. In at least one embodiment, a final accuracy of models vs. their latency is visualized on left side of FIG. 5. In comparison to REINFORCE, improved latency is achieved while maintaining similar accuracy. In at least one embodiment, on right side of FIG. 5, output of g for unseen architectures is visualized vs. true latency values measured for architectures. In at least one embodiment, a surrogate function g has a Pearson correlation coefficient of 0.54 with true latency.

In at least one embodiment, in FIG. 7, our best cell discovered using generalization loss and REBAR, visualized in FIG. 2, is compared against previous work that uses similar search space. In at least one embodiment, evaluation network is trained four times and report mean and standard deviation of test error. In at least one embodiment, UNAS achieves performance comparable to DARTS. In at least one embodiment, a search objective differs from DARTS' second-order approach that considers dependency of $w$ updates on continuous architecture updates requiring Hessian-vector calculation. In at least one embodiment, post-search cell pruning required by DARTS is not required.

FIG. 7 illustrates an example of network architecture search results, in accordance with an embodiment. In at least one embodiment, results on ImageNet dataset in three different settings are presented and evaluated: (i) randomly generated architectures are evaluated, and set a surprisingly strong baseline, (ii) a cell discovered on CIFAR-10, and (iii) direct search for cells on ImageNet. In at least one embodiment, since direct search on ImageNet is computationally expensive, search space is reduced to three operations including skip connection, depthwise separable 3×3 convolution, and max pooling. In at least one embodiment, prior work on ResNets, DenseNets, as well as recent RandWire suggests that it should be possible to achieve high accuracy by using only these three operations. In at least one embodiment, FIG. 8 illustrates a summary of results.

FIG. 8 illustrates an example of network architecture search results in a mobile setting, in accordance with an embodiment. In at least one embodiment, results illustrated in FIG. 8 are produced using an ImageNet data set. In at least one embodiment, a strong random baseline is provided, indicated by "Random Cell" in FIG. 8, that outperforms most prior NAS methods. In at least one embodiment, random cells are generated as follows: Each node randomly chooses two nodes as input (without replacement) from available inputs (such as two previous layers and previous nodes in a cell), and also samples operations on those edges randomly (with replacement). In at least one embodiment, a total of 10 networks constructed by randomly generated Normal and Reduce cells are trained. In at least one embodiment, network yields top-1 and top-5 errors are 25.55% and 8.06% respectively (see FIGS. 13-15 for cell structure). In at least one embodiment, performance of a randomly discovered cell on ImageNet is presented. In at least one embodiment, high performance of this baseline indicates that an associated search space is of paramount importance.

In at least one embodiment, direct searching on ImageNet data produces cell in FIG. 6 which is flatter than cell discovered on CIFAR-10 and bears resemblance to ResNet module. In at least one embodiment, search and evaluation details are provided below. In at least one embodiment, as seen in FIG. 8, cell searched on CIFAR-10 on 7-op search space, similar to DARTS, and SNAS, obtains 25.14% top-1 error, significantly lower than other prior approaches. In at least one embodiment, an UNAS cell searched on ImageNet gives second-lowest error overall, obtaining a top-1 and top-5 error of 24.74% and 7.63% resp. at a fraction of cost (0.6%) required by a best AmoebaNet-C. In at least one embodiment, UNAS cells outperform a randomly searched cell. In at least one embodiment, directly searching on a target task instead of transferring helped us obtain higher accuracy. In at least one embodiment, AmoebaNet-C has lowest error, due in part to very large-scale evolutionary search in an exponentially large architecture space and, in addition, AmoebaNet-C was hand-picked and tuned, while UNAS was final output of search.

In at least one embodiment, work in a different search space is compared. In at least one embodiment, in FIG. 9, an UNAS network is compared against those searched using different layer connectivity and search spaces. In at least one embodiment, other work suggests that these settings can affect accuracy and computational demands. In RandWire for example, network layer connectivity may be produced by a random graph generator, while other approaches use a fixed connectivity graph. In at least one embodiment, UNAS connects each layer to previous two layers. MnasNet and ProxylessNAS connect each layer to previous and use a mobile inverted bottleneck convolution. MnasNet-A3 uses Squeeze-and-Excitation layer in its search space. In at least one embodiment, UNAS obtains comparable accuracy, even though powerful mobile inverted bottleneck is not in our search space.

FIG. 9 illustrates an example of results on ImageNet obtained with architectures searched using different operation search space and layer connectivity, in accordance with an embodiment. In at least one embodiment, search and evaluation phases are run end-to-end five times on ImageNet and a mean and standard deviation of a final validation accuracy are reported in FIG. 10, using a three-operation search space. FIG. 10 illustrates an example of ablation experiment results, in accordance with an embodiment. In at least one embodiment, generalization loss, REBAR estimator, and multiple architecture samples provide best accuracy.

In at least one embodiment, UNAS unifies differentiable and RL-based NAS. In at least one embodiment, UNAS uses a gradient of an objective function for search without introducing a bias due to continuous relaxation. In at least one embodiment, in contrast to previous DNAS methods, UNAS's search objective is not limited to differentiable loss functions as it can also search using non-differentiable loss functions. In at least one embodiment, a new objective function for search based on generalization error is used that outperforms previously proposed training or validation loss functions.

In at least one embodiment, distribution over architecture parameters are represented using a factorial distribution $p(z)=\Pi_e p_e(z_e)$ where $z_e$ represents an operation assigned to an $e^{th}$ edge. In at least one embodiment, for Gumbel-Softmax distribution similarly a factorial distribution is defined by $p(\zeta)=\Pi_e p_e(\zeta_e, T_e)$ where $T_e$ is a temperature used for relaxing each variable. In at least one embodiment, however, instead of using a shared temperature parameter (T) for edges in cell, ($T_e$) is made into a stochastic temperature sampled for each edge using a Bernoulli distribution:

$$T_e = \begin{cases} 0 & \text{with probability } 1-q \\ T & \text{with probability } q \end{cases} \quad (8)$$

where q is a probability of using temperature T. In at least one embodiment, a Gumbel-Softmax sample drawn with $T_e=0$ is, in fact, a discrete sample since a Gumbel-Softmax distribution becomes a categorical distribution in limit of $T_e=0$. In at least one embodiment, for samples drawn $T_e=0$ (i.e. edges with binary operation assignment vectors), memory and compute requirements are reduced by computing a single operation that is specified by one-hot $\zeta_e$. In at least one embodiment, q controls an average number of mixed operations that will become discrete and a GPU memory and time required for search.

In at least one embodiment, sampling a temperature parameter from a bimodal distribution, as shown above, does not introduce a bias to a gradient estimator in Eq. 3. In at least one embodiment however, it potentially increases a variance of an estimator as a gradient contribution from reparameterized samples becomes zero with $T_e=0$ and a gradient estimation relies on REINFORCE term.

Figure 11:
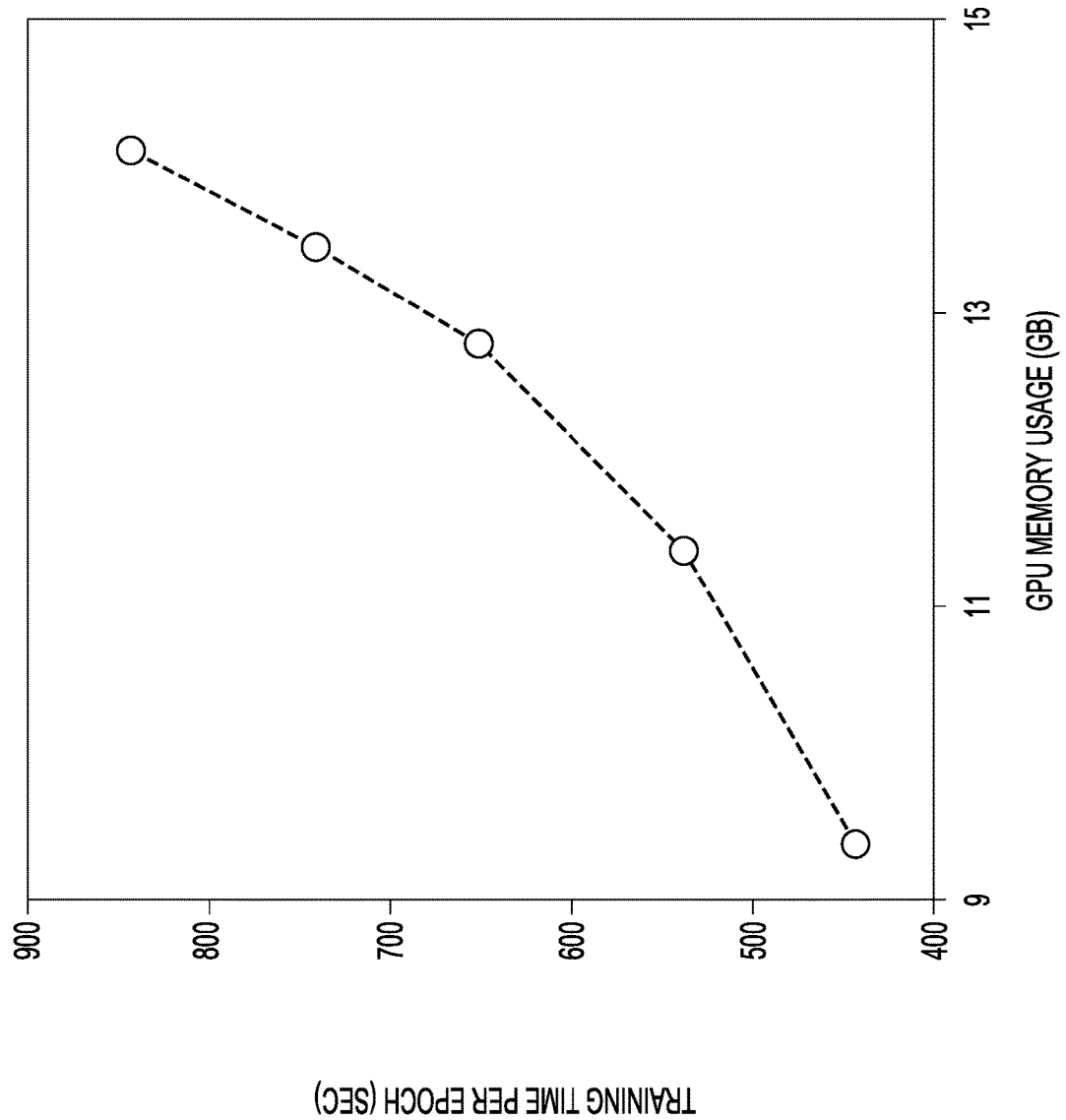
FIG. 11 illustrates an example of a relationship between GPU memory use and time used during search, in accordance with an embodiment.

In at least one embodiment, a same idea can be applied to a paired input cell structure by applying a different temperature to each input and operation selector. In FIG. 11, memory and time required for searching for an architecture are shown with different values of q ranging in {0.2, 0.4, 0.6, 0.8, 1.0} using REBAR. Interestingly, searches found an architecture with similar test error in a range 3.0±0.05%. However, GPU memory and time can be reduced significantly by using smaller q.

FIG. 11 illustrates an example of a relationship between GPU memory use and time used during search, in accordance with an embodiment. In at least one embodiment, GPU memory and time used during search can be reduced by sampling different temperatures for different factors in architecture distribution $p(\zeta)$ as shown in Eq. 8. In at least one embodiment, q is changed from 0.2 to 1.0 in increments of 0.2 from left to right. In at least one embodiment, as q increases, both GPU time and memory required for architecture search increase.

Search Space:

In at least one embodiment, 7 operations in our search on CIFAR-10 are used:
1. skip_connect: identity connection
2. sep_conv_3×3: depthwise-separable 3×3 convolution
3. max_pool_3×3: max pooling with 3×3 kernel
4. dil_conv_3×3: dilated depthwise-separable 3×3 convolution
5. sep_conv_5×5: depthwise-separable 5×5 convolution
6. avg_pool_3×3: average pooling with 3×3 kernel
7. sep_conv_7×7: depthwise-separable 7×7 convolution In at least one embodiment, in ImageNet, in order to make search tractable, a first three operations are used. In at least one embodiment, operations use a stride of 1 when part of Normal Cell, and a stride of 2 when part of Reduce Cell. In at least one embodiment, appropriate padding is added to input features to preserve spatial dimensions. In at least one embodiment, each convolution consists of a (ReLU-Conv-BN) block, and depthwise separable convolutions are always applied twice, consistent with prior work.

CIFAR-10

CIFAR-10 dataset consists of 50,000 training images and 10,000 test images. In at least one embodiment, during search, 45,000 images from original training set are used as a training set and remaining are used as a validation set. In at least one embodiment, final evaluation phase uses an original split. In at least one embodiment, during architecture search, a network is constructed by stacking 8 cells with 4 hidden nodes. In at least one embodiment, cells are stacked in blocks of 2-2-2 Normal cells with Reduction cells in between, similar to DARTS. In at least one embodiment, networks are trained using 4 Tesla V100 GPUs with a batch size of 192, for 100 epochs. In at least one embodiment, for a first 15 epochs, only network parameters ($w$) are trained, while architecture parameters ($\phi$) are frozen. In at least one embodiment, this pretraining phase prevents search from ignoring operations that are typically slower to train. In at least one embodiment, architecture parameters are trained using an Adam optimizer with cosine learning rate schedule starting from $3\times10^{-3}$ annealed down to $3\times10^{-4}$. In at least one embodiment, network parameters are also trained using Adam with cosine learning rate schedule starting from $9\times10^{-4}$ annealed down to $1\times10^{-4}$.

ImageNet:

In at least one embodiment, a 14-layer network with 16 initial channels is used to search, over 8 V100 GPUs, needing around 2.5 days. In at least one embodiment, a learning rate of $3\times10^{-4}$ with SGD is used to learn network parameters of a mixed-op network. In at least one embodiment, architecture parameters are trained with a learning rate of $3\times10^{-4}$ using Adam. In at least one embodiment, training is parallelized over 8 GPUs without scaling a learning rate. In at least one embodiment, for a first 5 epochs, only network parameters ($w$) are trained. In at least one embodiment, $\lambda=0.5$ and $\lambda_{arch}=0.2$ are used, same as CIFAR-10, and a Gumbel-Softmax temperature of 0.4. In at least one embodiment, a weight decay of $3\times10^{-4}$ on weight parameters is used, and $1\times10^{-6}$ on architecture parameters is used. In at least one embodiment, 90% of ImageNet train set is used to train weight parameters, while a remainder is used as a validation set for training architecture parameters.

Architecture Evaluation Settings
CIFAR-10

In at least one embodiment, a final network is constructed by stacking a total of 20 cells. In at least one embodiment, networks are trained on 4 V100 GPUs with a batch size of 224 for 300 epochs. In at least one embodiment, SGD is used with momentum 0.9. In at least one embodiment, a cosine learning rate schedule is used starting from $8.7 \times 10^{-2}$ annealed down to zero. In at least one embodiment, similar to DARTS, path dropout of probability 0.2 and cutout of 16 pixels is used as regularization.

ImageNet

In at least one embodiment, data augmentation uses same settings as DARTS. In at least one embodiment, training images are randomly cropped to a size of 224×224 px along with a random horizontal flip, and jitter a color. In at least one embodiment, during evaluation, a single center crop of size 224×224 px is used after resizing image to 256×256 px.

In at least one embodiment, for final evaluation, a 14-layer network is trained for 250 epochs with an initial channel count such that multiply-adds of network is <600M. For results presented in FIG. 8, as well as FIG. 9, networks are trained using SGD with momentum of 0.9, base learning rate of 0.1, weight decay of $3 \times 10^{-5}$, with a batch size of 128 per GPU. In at least one embodiment, a model is trained for 250 epochs in line with prior work, annealing a learning rate to 0 at end of training using a cosine learning rate decay. In at least one embodiment, training is scaled to 8 V100 GPUs using a linear scaling rule, with a learning rate warmup for first 5 epochs.

FIG. 12 illustrates an example of ImageNet performance of best models, averaged over five evaluation runs, in accordance with an embodiment. In at least one embodiment, FIG. 12 shows results obtained when only best models are trained 5 times, with different random seeds. In at least one embodiment, lowest errors obtained over 5 runs were 24.74% and 7.63% for top-1 and top-5 errors respectively, using a cell searched on ImageNet.

Figure 13:
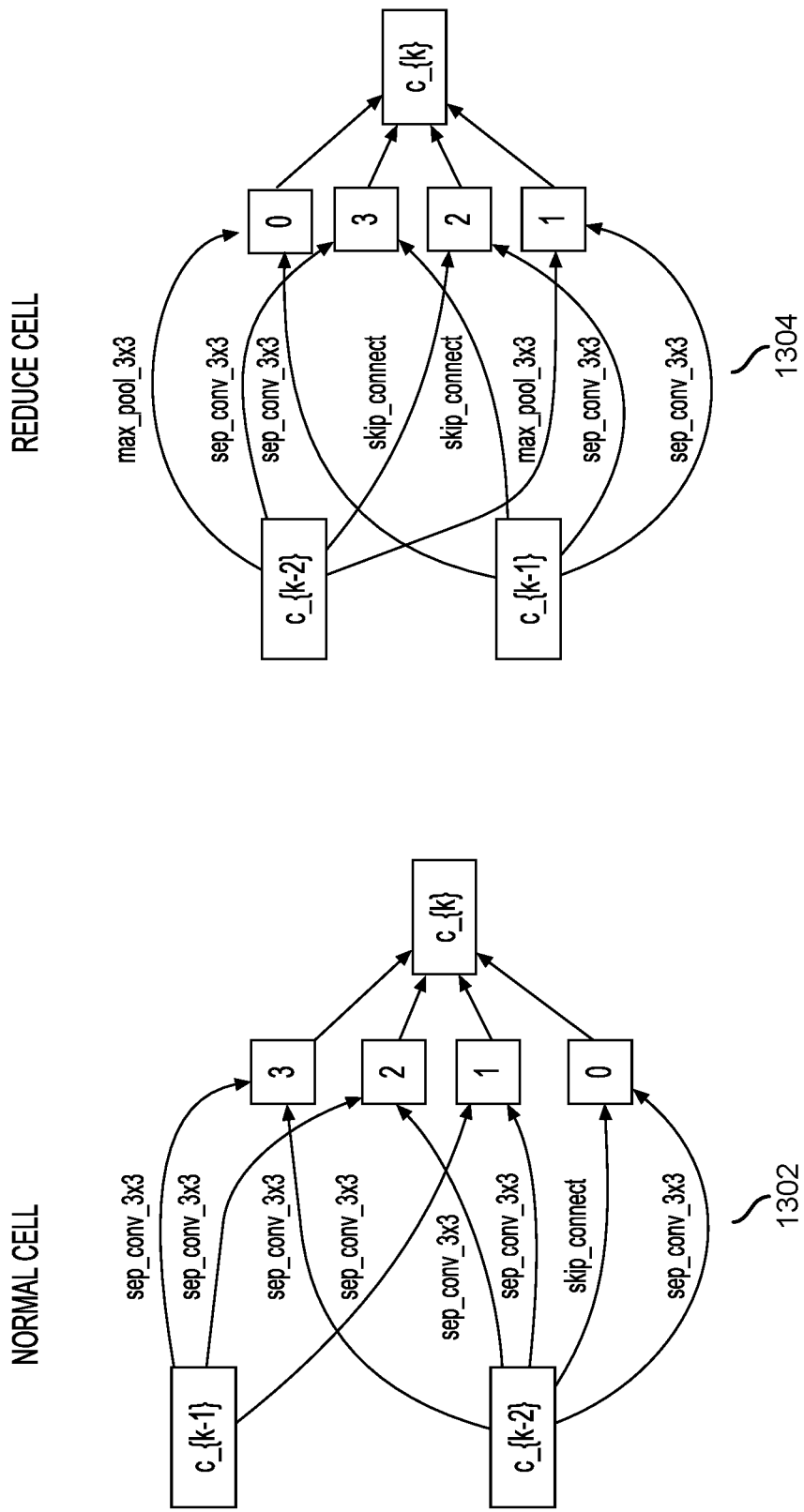
FIG. 13 illustrates an example of cell models discovered on ImageNet, in accordance with an embodiment.

FIG. 13 illustrates an example of cell models discovered on ImageNet, in accordance with an embodiment. In at least one embodiment, a best performing cell discovered on ImageNet is illustrated as a normal cell 1302 and a reduce cell 1304. FIG. 14 illustrates an example of cell models discovered on CIFAR-10, in accordance with an embodiment. In at least one embodiment, a best performing cell discovered on CIFAR-10 is illustrated as a normal cell 1402 and a reduce cell 1404. FIG. 15 illustrates an example of randomly proposed cell models on ImageNet, in accordance with an embodiment. In at least one embodiment, a best performing randomly proposed cell on Imagenet is illustrated as a normal cell 1502 and a reduce cell 1504.

Figure 16:
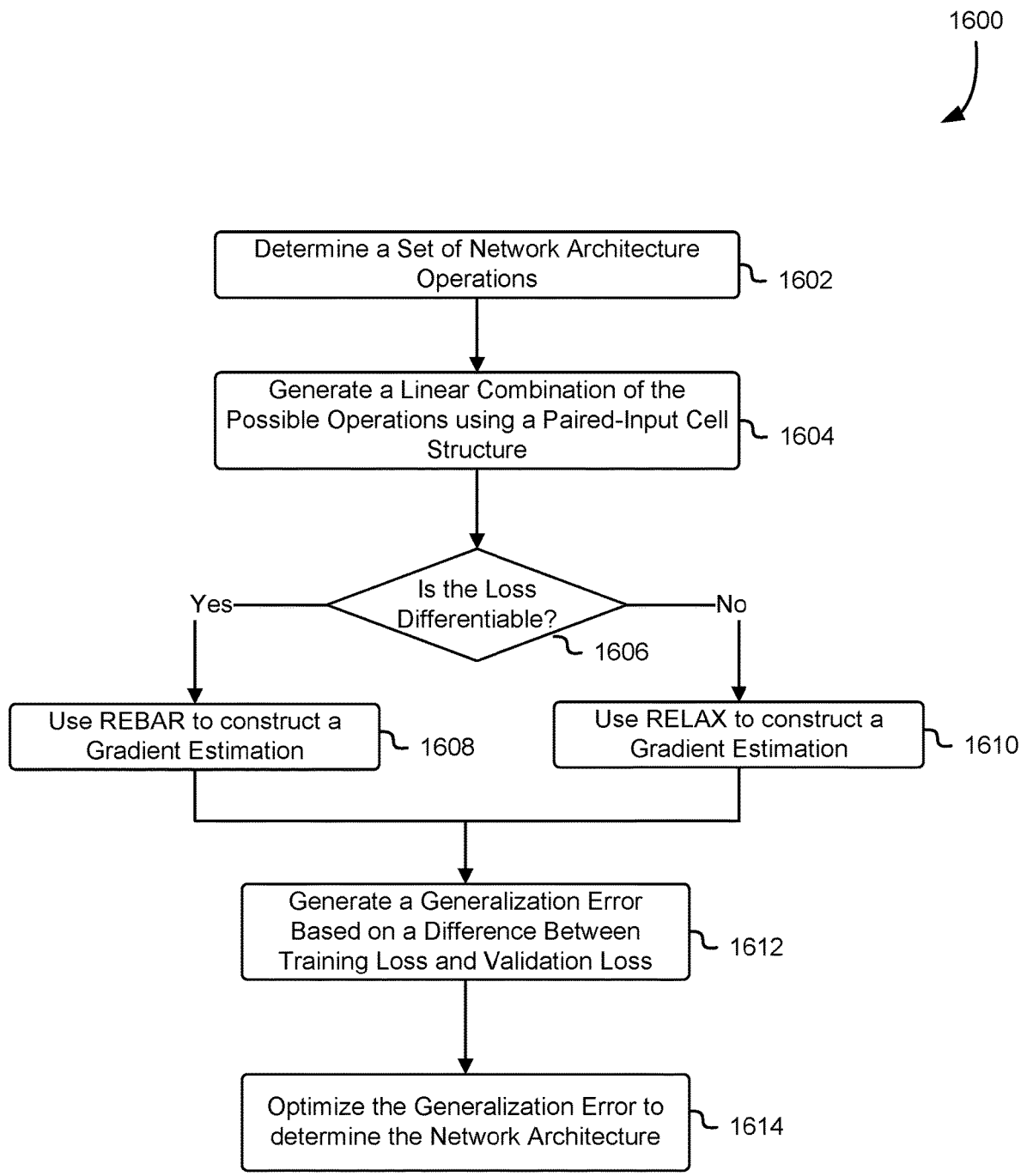
FIG. 16 illustrates an example of a process that, as a result of being performed by a computer system, identifies a neural network architecture for a particular problem, in accordance with an embodiment.

FIG. 16 illustrates an example of a process 1600 that, as a result of being performed by a computer system, identifies a neural network architecture for a particular problem, in accordance with an embodiment. In at least one embodiment, at block 1602, a network architecture search problem is formulated as a set of options which can be optimized as a linear equation. In at least one embodiment, at block 1604, combinations are constrained using a paired-input cell structure that limits a number of links and operations applied to each cell. In at least one embodiment, this enforces sparsity in resulting network discovered.

In at least one embodiment, at decision block 1606, if a loss is differentiable, such as network accuracy, execution proceeds to block 1608 and REBAR is used to estimate a gradient. In at least one embodiment, if loss is non-differentiable, such as latency, execution proceeds to block 1610 and RELAX is used to estimate a gradient. In at least one embodiment, at block 1612, system calculates an objective based on generalization error of a network. In at least one embodiment, generalization error is determined as a difference between a training loss and a validation loss. In at least one embodiment, a set of test data includes a first portion used for training, which produces a training loss, and a second portion used for validation (but not for training), that produces a validation loss. In at least one embodiment, at block 1614, using a determined gradient and an objective based on generalization error, network architecture is determined.

Figure 17A:
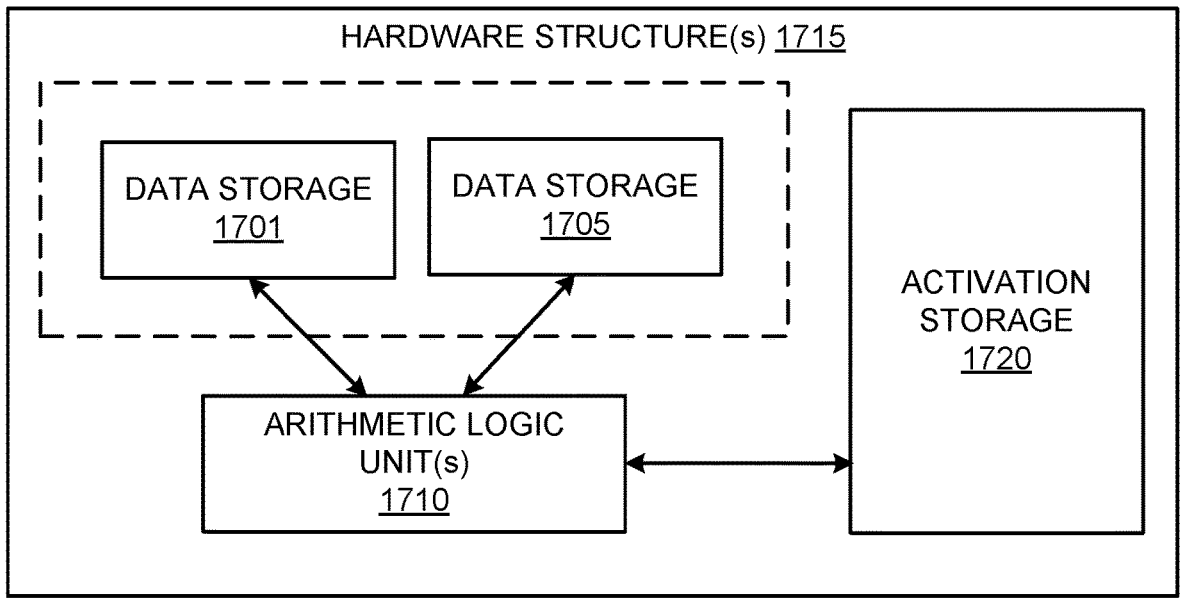
FIG. 17A illustrates inference and/or training logic, according to at least one embodiment.

In at least one embodiment, an autonomous vehicle includes a computer system that implements a neural network. In at least one embodiment, an architecture for said neural network is generated using techniques described above. In at least one embodiment, said autonomous vehicle includes a camera that obtains images used to control said vehicle. In at least one embodiment, images are processed by said neural network to identify and/or locate objects in proximity to said autonomous vehicle. In at least one embodiment, said neural network generates one or more vehicle control signals such as a brake signal, a throttle signal, or a turn control signal. In at least one embodiment, Inference and Training Logic FIG. 17A illustrates inference and/or training logic 1715 used to perform inferencing and/or training operations associated with one or more embodiments. Details regarding inference and/or training logic 1715 are provided below in conjunction with FIGS. 17A and/or 17B.

In at least one embodiment, inference and/or training logic 1715 may include, without limitation, code and/or data storage 1701 to store forward and/or output weight and/or input/output data, and/or other parameters to configure neurons or layers of a neural network trained and/or used for inferencing in aspects of one or more embodiments. In at least one embodiment, training logic 1715 may include, or be coupled to code and/or data storage 1701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which code corresponds. In at least one embodiment code and/or data storage 1701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1701 may be included with other on-chip or off-chip data storage, including a processor's L1, L2, or L3 cache or system memory.

In at least one embodiment, any portion of code and/or data storage 1701 may be internal or external to one or more processors or other hardware logic devices or circuits. In at least one embodiment, code and/or code and/or data storage 1701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1715 may include, without limitation, a code and/or data storage 1705 to store backward and/or output weight and/or input/output data corresponding to neurons or layers of a neural network trained and/or used for inferencing in aspects of one or more embodiments. In at least one embodiment, code and/or data storage 1705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1715 may include, or be coupled to code and/or data storage 1705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which code corresponds. In at least one embodiment, any portion of code and/or data storage 1705 may be included with other on-chip or off-chip data storage, including a processor's L1, L2, or L3 cache or system memory. In at least one embodiment, any portion of code and/or data storage 1705 may be internal or external to on one or more processors or other hardware logic devices or circuits. In at least one embodiment, code and/or data storage 1705 may be cache memory, DRAM, SRAM, non-volatile memory (e.g., Flash memory), or other storage. In at least one embodiment, choice of whether code and/or data storage 1705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1701 and code and/or data storage 1705 may be separate storage structures. In at least one embodiment, code and/or data storage 1701 and code and/or data storage 1705 may be same storage structure. In at least one embodiment, code and/or data storage 1701 and code and/or data storage 1705 may be partially same storage structure and partially separate storage structures. In at least one embodiment, any portion of code and/or data storage 1701 and code and/or data storage 1705 may be included with other on-chip or off-chip data storage, including a processor's L1, L2, or L3 cache or system memory.

In at least one embodiment, inference and/or training logic 1715 may include, without limitation, one or more arithmetic logic unit(s) ("ALU(s)") 1710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1720 that are functions of input/output and/or weight parameter data stored in code and/or data storage 1701 and/or code and/or data storage 1705. In at least one embodiment, activations stored in activation storage 1720 are generated according to linear algebraic and or matrix-based mathematics performed by ALU(s) 1710 in response to performing instructions or other code, wherein weight values stored in code and/or data storage 1705 and/or data 1701 are used as operands along with other values, such as bias values, gradient information, momentum values, or other parameters or hyperparameters, any or all of which may be stored in code and/or data storage 1705 or code and/or data storage 1701 or another storage on or off-chip.

In at least one embodiment, ALU(s) 1710 are included within one or more processors or other hardware logic devices or circuits, whereas in another embodiment, ALU(s) 1710 may be external to a processor or other hardware logic device or circuit that uses them (e.g., a co-processor). In at least one embodiment, ALUs 1710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1701, code and/or data storage 1705, and activation storage 1720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1720 may be cache memory, DRAM, SRAM, non-volatile memory (e.g., Flash memory), or other storage. In at least one embodiment, activation storage 1720 may be completely or partially within or external to one or more processors or other logical circuits. In at least one embodiment, choice of whether activation storage 1720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1715 illustrated in FIG. 17A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1715 illustrated in FIG. 17A may be used in conjunction with central processing unit ("CPU") hardware, graphics processing unit ("GPU") hardware or other hardware, such as field programmable gate arrays ("FPGAs").

Figure 17B:
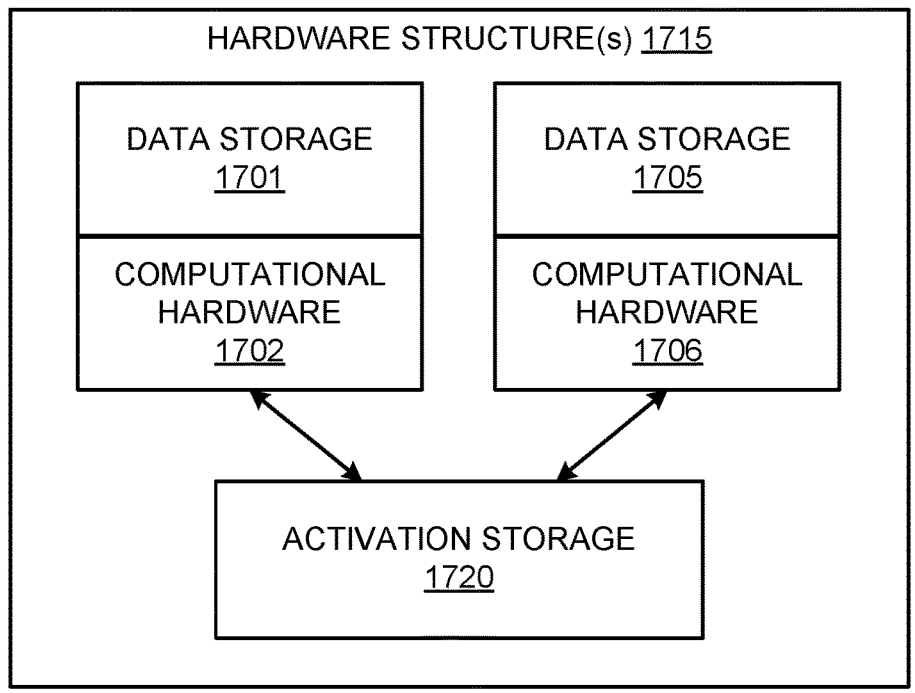
FIG. 17B illustrates inference and/or training logic, according to at least one embodiment.

FIG. 17B illustrates inference and/or training logic 1715, according to at least one embodiment various. In at least one embodiment, inference and/or training logic 1715 may include, without limitation, hardware logic in which computational resources are dedicated or otherwise exclusively used in conjunction with weight values or other information corresponding to one or more layers of neurons within a neural network. In at least one embodiment, inference and/or training logic 1715 illustrated in FIG. 17B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1715 illustrated in FIG. 17B may be used in conjunction with central processing unit (CPU) hardware, graphics processing unit (GPU) hardware or other hardware, such as field programmable gate arrays (FPGAs). In at least one embodiment, inference and/or training logic 1715 includes, without limitation, code and/or data storage 1701 and code and/or data storage 1705, which may be used to store code (e.g., graph code), weight values and/or other information, including bias values, gradient information, momentum values, and/or other parameter or hyperparameter information. In at least one embodiment illustrated in FIG. 17B, each of code and/or data storage 1701 and code and/or data storage 1705 is associated with a dedicated computational resource, such as computational hardware 1702 and computational hardware 1706, respectively. In at least one embodiment, each of computational hardware 1702 and computational hardware 1706 comprises one or more ALUs that perform mathematical functions, such as linear algebraic functions, only on information stored in code and/or data storage 1701 and code and/or data storage 1705, respectively, result of which is stored in activation storage 1720.

In at least one embodiment, each of code and/or data storage 1701 and 1705 and corresponding computational hardware 1702 and 1706, respectively, correspond to different layers of a neural network, such that resulting activation from one "storage/computational pair 1701/1702" of code and/or data storage 1701 and computational hardware 1702 is provided as an input to next "storage/computational pair 1705/1706" of code and/or data storage 1705 and computational hardware 1706, in order to mirror conceptual organization of a neural network. In at least one embodiment, each of storage/computational pairs 1701/1702 and 1705/1706 may correspond to more than one neural network layer. In at least one embodiment, additional storage/computation pairs (not shown) subsequent to or in parallel with storage computation pairs 1701/1702 and 1705/1706 may be included in inference and/or training logic 1715.

Neural Network Training and Deployment

Figure 18:
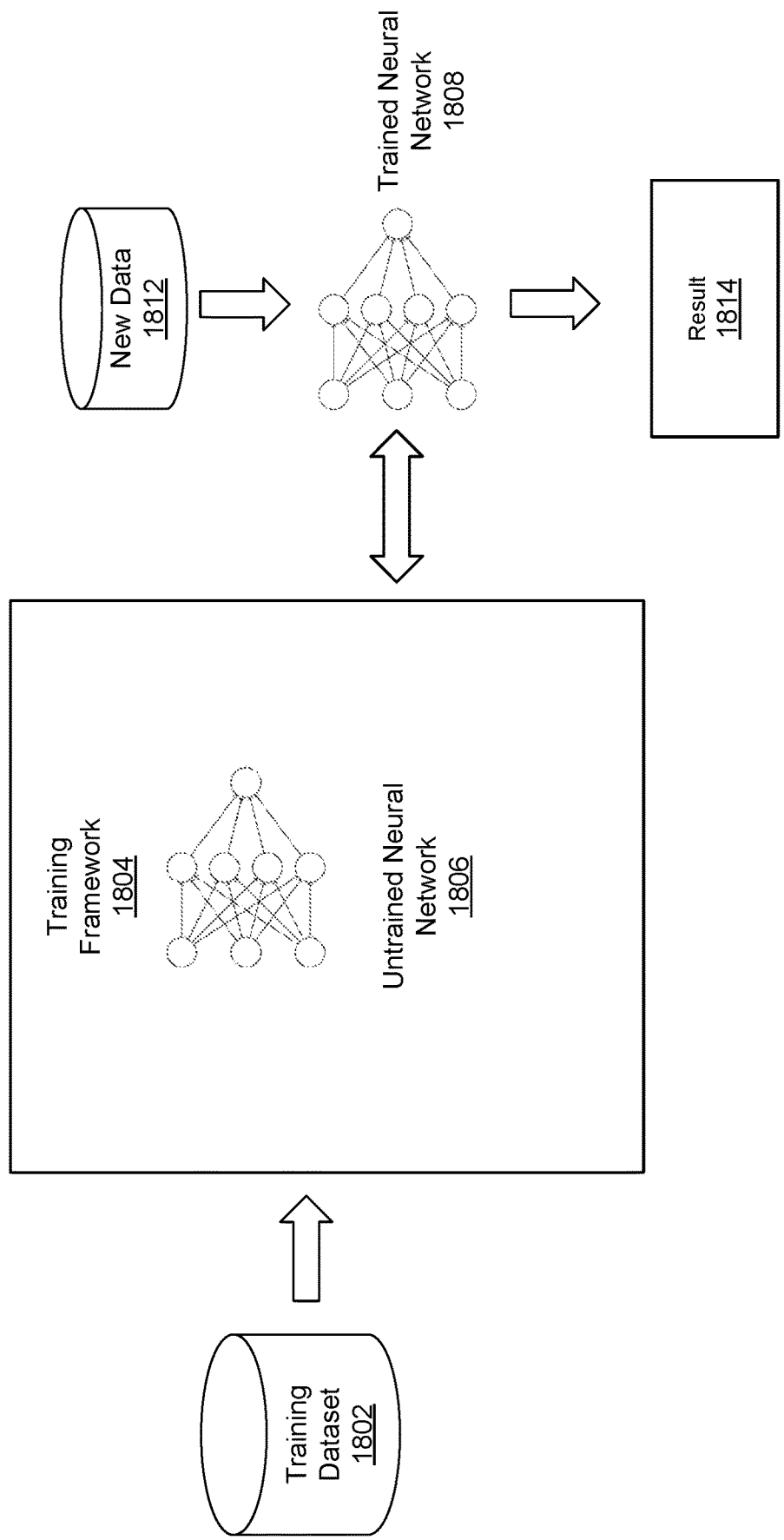
FIG. 18 illustrates training and deployment of a neural network, according to at least one embodiment.

FIG. 18 illustrates training and deployment of a deep neural network, according to at least one embodiment. In at least one embodiment, untrained neural network 1808 is trained using a training dataset 1802. In at least one embodiment, training framework 1804 is a PyTorch framework, whereas in other embodiments, training framework 1804 is a Tensorflow, Boost, Caffe, Microsoft Cognitive Toolkit/ CNTK, MXNet, Chainer, Keras, Deeplearning4j, or other training framework. In at least one embodiment training framework 1804 trains an untrained neural network 1806 and enables it to be trained using processing resources described herein to generate a trained neural network 1808. In at least one embodiment, weights may be chosen randomly or by pre-training using a deep belief network. In at least one embodiment, training may be performed in either a supervised, partially supervised, or unsupervised manner.

In at least one embodiment, untrained neural network 1806 is trained using supervised learning, wherein training dataset 1802 includes an input paired with a desired output for an input, or where training dataset 1802 includes input having a known output and an output of neural network 1806 is manually graded. In at least one embodiment, untrained neural network 1806 is trained in a supervised manner processes inputs from training dataset 1802 and compares resulting outputs against a set of expected or desired outputs. In at least one embodiment, errors are then propagated back through untrained neural network 1806. In at least one embodiment, training framework 1804 adjusts weights that control untrained neural network 1806. In at least one embodiment, training framework 1804 includes tools to monitor how well untrained neural network 1806 is converging towards a model, such as trained neural network 1808, suitable to generating correct answers, such as in result 1814, based on known input data, such as new data 1812. In at least one embodiment, training framework 1804 trains untrained neural network 1806 repeatedly while adjust weights to refine an output of untrained neural network 1806 using a loss function and adjustment algorithm, such as stochastic gradient descent. In at least one embodiment, training framework 1804 trains untrained neural network 1806 until untrained neural network 1806 achieves a desired accuracy. In at least one embodiment, trained neural network 1808 can then be deployed to implement any number of machine learning operations.

In at least one embodiment, untrained neural network 1806 is trained using unsupervised learning, wherein untrained neural network 1806 attempts to train itself using unlabeled data. In at least one embodiment, unsupervised learning training dataset 1802 will include input data without any associated output data or "ground truth" data. In at least one embodiment, untrained neural network 1806 can learn groupings within training dataset 1802 and can determine how individual inputs are related to untrained dataset 1802. In at least one embodiment, unsupervised training can be used to generate a self-organizing map, which is a type of trained neural network 1808 capable of performing operations useful in reducing dimensionality of new data 1812. In at least one embodiment, unsupervised training can also be used to perform anomaly detection, which allows identification of data points in a new dataset 1812 that deviate from normal patterns of new dataset 1812.

In at least one embodiment, semi-supervised learning may be used, which is a technique in which in training dataset 1802 includes a mix of labeled and unlabeled data. In at least one embodiment, training framework 1804 may be used to perform incremental learning, such as through transferred learning techniques. In at least one embodiment, incremental learning enables trained neural network 1808 to adapt to new data 1812 without forgetting knowledge instilled within network during initial training.

Data Center

Figure 19:
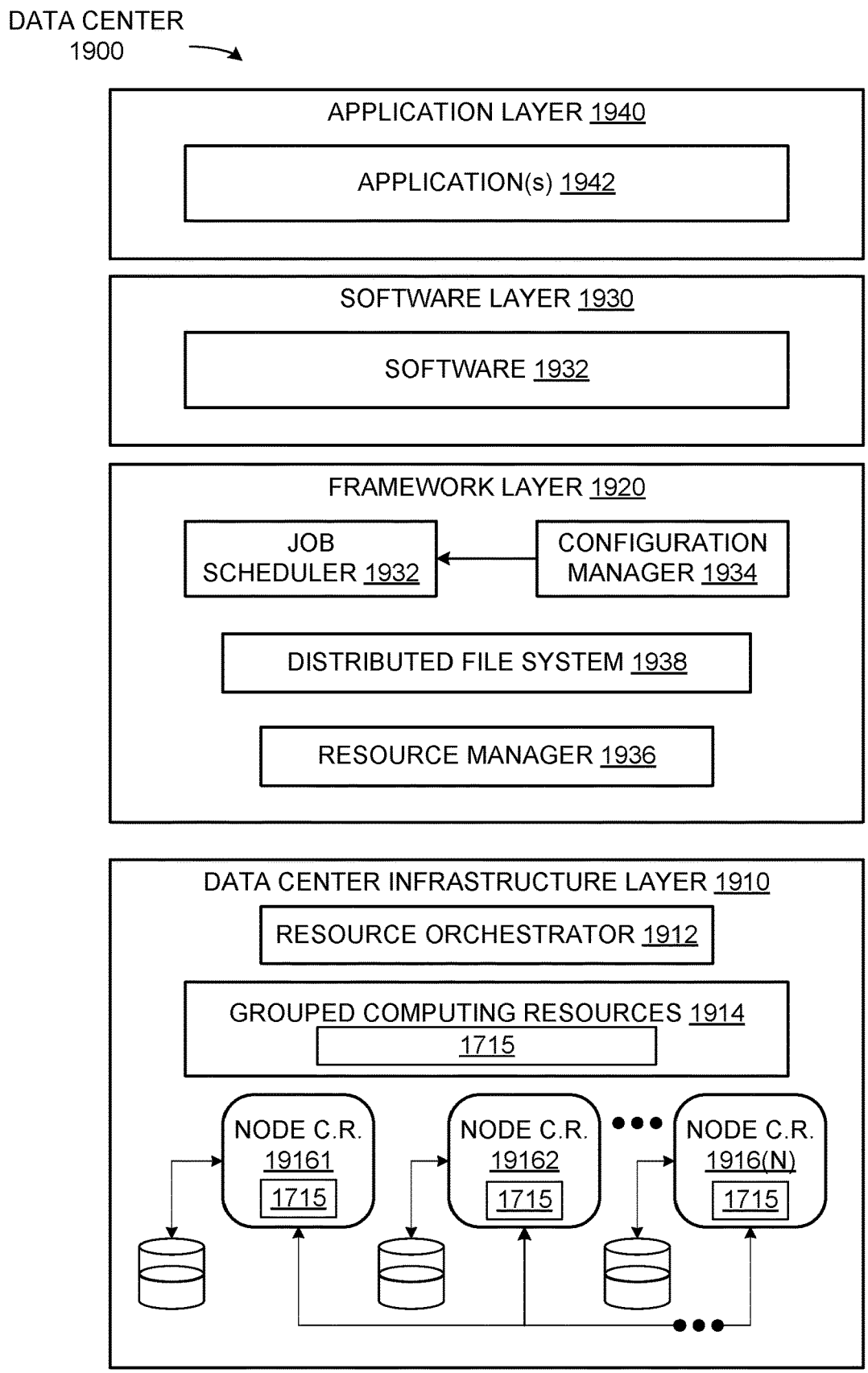
FIG. 19 illustrates an example data center system, according to at least one embodiment.

FIG. 19 illustrates an example data center 1900, in which at least one embodiment may be used. In at least one embodiment, data center 1900 includes a data center infrastructure layer 1910, a framework layer 1920, a software layer 1930 and an application layer 1940.

In at least one embodiment, as shown in FIG. 19, data center infrastructure layer 1910 may include a resource orchestrator 1912, grouped computing resources 1914, and node computing resources ("node C.R.s") 1916(1)-1916(N), where "N" represents any whole, positive integer. In at least one embodiment, node C.R.s 1916(1)-1916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1916(1)-1916(N) may be a server having one or more of above-mentioned computing resources.

In at least one embodiment, grouped computing resources 1914 may include separate groupings of node C.R.s housed within one or more racks (not shown), or many racks housed in data centers at various geographical locations (also not shown), separate groupings of node C.R.s within grouped computing resources 1914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1912 may configure or otherwise control one or more node C.R.s 1916(1)-1916(N) and/or grouped computing resources 1914. In at least one embodiment, resource orchestrator 1912 may include a software design infrastructure ("SDI") management entity for data center 1900. In at least one embodiment, resource orchestrator may include hardware, software or some combination thereof.

In at least one embodiment, as shown in FIG. 19, framework layer 1920 includes a job scheduler 1932, a configuration manager 1934, a resource manager 1936 and a distributed file system 1938. In at least one embodiment, framework layer 1920 may include a framework to support software 1932 of software layer 1930 and/or one or more application(s) 1942 of application layer 1940. In at least one embodiment, software 1932 or application(s) 1942 may respectively include web-based service software or applications, such as those provided by Amazon Web Services, Google Cloud and Microsoft Azure. In at least one embodiment, framework layer 1920 may be, but is not limited to, a type of free and open-source software web application framework such as Apache Spark (hereinafter "Spark") that may utilize distributed file system 1938 for large-scale data processing (e.g., "big data"). In at least one embodiment, job scheduler 1932 may include a Spark driver to facilitate scheduling of workloads supported by various layers of data center 1900. In at least one embodiment, configuration manager 1934 may be capable of configuring different layers such as software layer 1930 and framework layer 1920 including Spark and distributed file system 1938 for supporting large-scale data processing. In at least one embodiment, resource manager 1936 may be capable of managing clustered or grouped computing resources mapped to or allocated for support of distributed file system 1938 and job scheduler 1932. In at least one embodiment, clustered or grouped computing resources may include grouped computing resource 1914 at data center infrastructure layer 1910. In at least one embodiment, resource manager 1936 may coordinate with resource orchestrator 1912 to manage these mapped or allocated computing resources.

In at least one embodiment, software 1932 included in software layer 1930 may include software used by at least portions of node C.R.s 1916(1)-1916(N), grouped computing resources 1914, and/or distributed file system 1938 of framework layer 1920, one or more types of software may include, but are not limited to, Internet web page search software, e-mail virus scan software, database software, and streaming video content software.

In at least one embodiment, application(s) 1942 included in application layer 1940 may include one or more types of applications used by at least portions of node C.R.s 1916(1)-1916(N), grouped computing resources 1914, and/or distributed file system 1938 of framework layer 1920, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1934, resource manager 1936, and resource orchestrator 1912 may implement any number and type of self-modifying actions based on any amount and type of data acquired in any technically feasible fashion. In at least one embodiment, self-modifying actions may relieve a data center operator of data center 1900 from making possibly bad configuration decisions and possibly avoiding underutilized and/or poor performing portions of a data center.

In at least one embodiment, data center 1900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1900. In at least one embodiment, trained machine learning models corresponding to one or more neural networks may be used to infer or predict information using resources described above with respect to data center 1900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 19 for inferencing or predicting operations based, at least in part, on weight parameters calculated using neural network training operations, neural network functions and/or architectures, or neural network use cases described herein.

Autonomous Vehicle

Figure 20A:
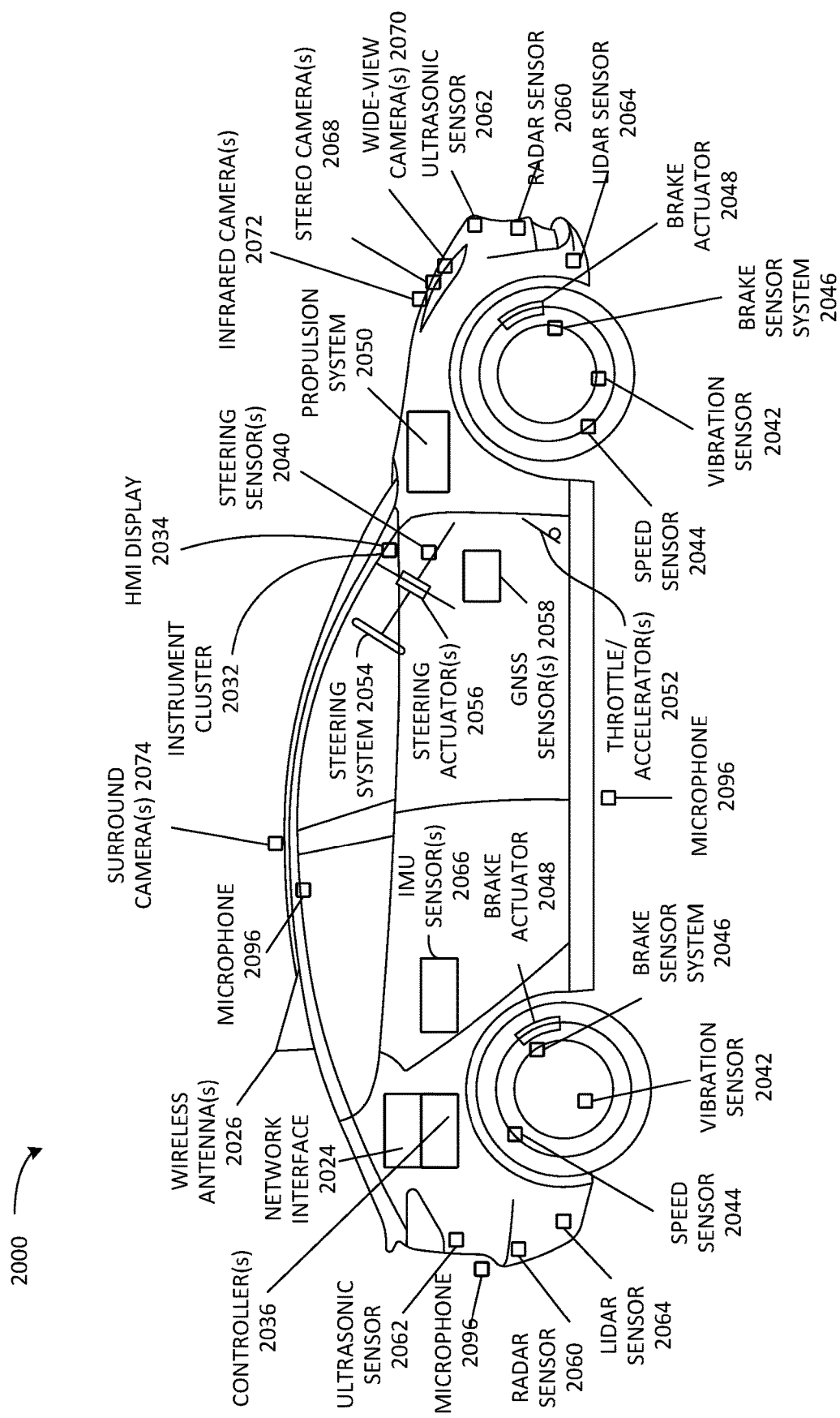
FIG. 20A illustrates an example of an autonomous vehicle, according to at least one embodiment.

FIG. 20A illustrates an example of an autonomous vehicle 2000, according to at least one embodiment. In at least one embodiment, autonomous vehicle 2000 (alternatively referred to herein as "vehicle 2000") may be, without limitation, a passenger vehicle, such as a car, a truck, a bus, and/or another type of vehicle that accommodates one or more passengers. In at least one embodiment, vehicle 2000 may be a semi-tractor-trailer truck used for hauling cargo. In at least one embodiment, vehicle 2000 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 2000 may be capable of functionality in accordance with one or more of level 1-level 5 of autonomous driving levels. For example, in at least one embodiment, vehicle 2000 may be capable of conditional automation (Level 3), high automation (Level 4), and/or full automation (Level 5), depending on embodiment.

In at least one embodiment, vehicle 2000 may include, without limitation, components such as a chassis, a vehicle body, wheels (e.g., 2, 4, 6, 8, 18, etc.), tires, axles, and other components of a vehicle. In at least one embodiment, vehicle 2000 may include, without limitation, a propulsion system 2050, such as an internal combustion engine, hybrid electric power plant, an all-electric engine, and/or another propulsion system type. In at least one embodiment, propulsion system 2050 may be connected to a drive train of vehicle 2000, which may include, without limitation, a transmission, to enable propulsion of vehicle 2000. In at least one embodiment, propulsion system 2050 may be controlled in response to receiving signals from a throttle/accelerator(s) 2052.

In at least one embodiment, a steering system 2054, which may include, without limitation, a steering wheel, is used to steer a vehicle 2000 (e.g., along a desired path or route) when a propulsion system 2050 is operating (e.g., when vehicle is in motion). In at least one embodiment, a steering system 2054 may receive signals from steering actuator(s) 2056. steering wheel may be optional for full automation (Level 5) functionality. In at least one embodiment, a brake sensor system 2046 may be used to operate vehicle brakes in response to receiving signals from brake actuator(s) 2048 and/or brake sensors.

In at least one embodiment, controller(s) 2036, which may include, without limitation, one or more system on chips ("SoCs") (not shown in FIG. 20A) and/or graphics processing unit(s) ("GPU(s)"), provide signals (e.g., representative of commands) to one or more components and/or systems of vehicle 2000. For instance, in at least one embodiment, controller(s) 2036 may send signals to operate vehicle brakes via brake actuators 2048, to operate steering system 2054 via steering actuator(s) 2056, to operate propulsion system 2050 via throttle/accelerator(s) 2052, controller(s) 2036 may include one or more onboard (e.g., integrated) computing devices (e.g., supercomputers) that process sensor signals, and output operation commands (e.g., signals representing commands) to enable autonomous driving and/or to assist a human driver in driving vehicle 2000. In at least one embodiment, controller(s) 2036 may include a first controller 2036 for autonomous driving functions, a second controller 2036 for functional safety functions, a third controller 2036 for artificial intelligence functionality (e.g., computer vision), a fourth controller 2036 for infotainment functionality, a fifth controller 2036 for redundancy in emergency conditions, and/or other controllers. In at least one embodiment, a single controller 2036 may handle two or more of above functionalities, two or more controllers 2036 may handle a single functionality, and/or any combination thereof.

In at least one embodiment, controller(s) 2036 provide signals for controlling one or more components and/or systems of vehicle 2000 in response to sensor data received from one or more sensors (e.g., sensor inputs). In at least one embodiment, sensor data may be received from, for example and without limitation, global navigation satellite systems ("GNSS") sensor(s) 2058 (e.g., Global Positioning System sensor(s)), RADAR sensor(s) 2060, ultrasonic sensor(s) 2062, LIDAR sensor(s) 2064, inertial measurement unit ("IMU") sensor(s) 2066 (e.g., accelerometer(s), gyroscope(s), magnetic compass(es), magnetometer(s), etc.), microphone(s) 2096, stereo camera(s) 2068, wide-view camera(s) 2070 (e.g., fisheye cameras), infrared camera(s) 2072, surround camera(s) 2074 (e.g., 360 degree cameras), long-range cameras (not shown in FIG. 20A), mid-range camera(s) (not shown in FIG. 20A), speed sensor(s) 2044 (e.g., for measuring speed of vehicle 2000), vibration sensor(s) 2042, steering sensor(s) 2040, brake sensor(s) (e.g., as part of brake sensor system 2046), and/or other sensor types.

In at least one embodiment, one or more of controller(s) 2036 may receive inputs (e.g., represented by input data) from an instrument cluster 2032 of vehicle 2000 and provide outputs (e.g., represented by output data, display data, etc.) via a human-machine interface ("HMI") display 2034, an audible annunciator, a loudspeaker, and/or via other components of vehicle 2000. In at least one embodiment, outputs may include information such as vehicle velocity, speed, time, map data (e.g., a High Definition map (not shown in FIG. 20A), location data (e.g., vehicle's 2000 location, such as on a map), direction, location of other vehicles (e.g., an occupancy grid), information about objects and status of objects as perceived by controller(s) 2036, etc. For example, in at least one embodiment, HMI display 2034 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 2000 further includes a network interface 2024 which may use wireless antenna(s) 2026 and/or modem(s) to communicate over one or more networks. For example, in at least one embodiment, network interface 2024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 2026 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 20A for inferencing or predicting operations based, at least in part, on weight parameters calculated using neural network training operations, neural network functions and/or architectures, or neural network use cases described herein.

Figure 20B:
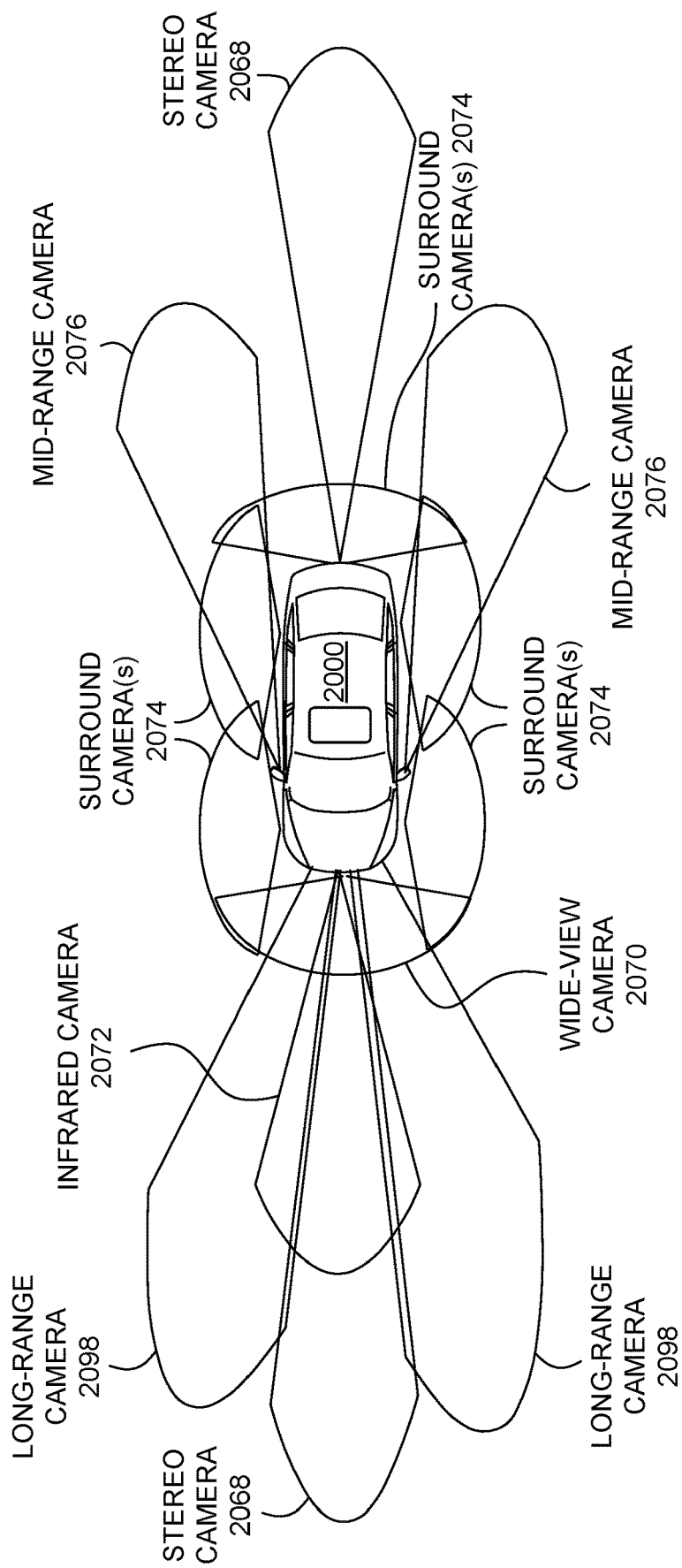
FIG. 20B illustrates an example of camera locations and fields of view for autonomous vehicle of FIG. 20A, according to at least one embodiment.

FIG. 20B illustrates an example of camera locations and fields of view for autonomous vehicle 2000 of FIG. 20A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 2000.

In at least one embodiment, camera types for cameras may include, but are not limited to, digital cameras that may be adapted for use with components and/or systems of vehicle 2000, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab In at least one embodiment.

In at least one embodiment, cameras with a field of view that include portions of environment in front of vehicle 2000 (e.g., front-facing cameras) may be used for surround view, to help identify forward facing paths and obstacles, as well as aid in, with help of one or more of controllers 2036 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 2070 may be used to perceive objects coming into view from periphery (e.g., pedestrians, crossing traffic or bicycles). Although only one wide-view camera 2070 is illustrated in FIG. 20B, in other embodiments, there may be any number (including zero) of wide-view camera(s) 2070 on vehicle 2000. In at least one embodiment, any number of long-range camera(s) 2098 (e.g., a long-view stereo camera pair) may be used for depth-based object detection, especially for objects for which a neural network has not yet been trained. In at least one embodiment, long-range camera(s) 2098 may also be used for object detection and classification, as well as basic object tracking.

In at least one embodiment, any number of stereo camera(s) 2068 may also be included in a front-facing configuration. In at least one embodiment, one or more of stereo camera(s) 2068 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 2000, including a distance estimate for all points in image. In at least one embodiment, one or more of stereo camera(s) 2068 may include, without limitation, compact stereo vision sensor(s) that may include, without limitation, two camera lenses (one each on left and right) and an image processing chip that may measure distance from vehicle 2000 to target object and use generated information (e.g., metadata) to activate autonomous emergency braking and lane departure warning functions. In at least one embodiment, other types of stereo camera(s) 2068 may be used in addition to, or alternatively from, those described herein.

In at least one embodiment, cameras with a field of view that include portions of environment to side of vehicle 2000 (e.g., side-view cameras) may be used for surround view, providing information used to create and update occupancy grid, as well as to generate side impact collision warnings. For example, in at least one embodiment, surround camera(s) 2074 (e.g., four surround cameras 2074 as illustrated in FIG. 20B) could be positioned on vehicle 2000, surround camera(s) 2074 may include, without limitation, any number and combination of wide-view camera(s) 2070, fisheye camera(s), 360 degree camera(s), and/or like. For instance, in at least one embodiment, four fisheye cameras may be positioned on front, rear, and sides of vehicle 2000. In at least one embodiment, vehicle 2000 may use three surround camera(s) 2074 (e.g., left, right, and rear), and may leverage one or more other camera(s) (e.g., a forward-facing camera) as a fourth surround-view camera.

In at least one embodiment, cameras with a field of view that include portions of environment to rear of vehicle 2000 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 2098 and/or mid-range camera(s) 2076, stereo camera(s) 2068), infrared camera(s) 2072, etc.), as described herein.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 20B for inferencing or predicting operations based, at least in part, on weight parameters calculated using neural network training operations, neural network functions and/or architectures, or neural network use cases described herein.

Figure 20C:
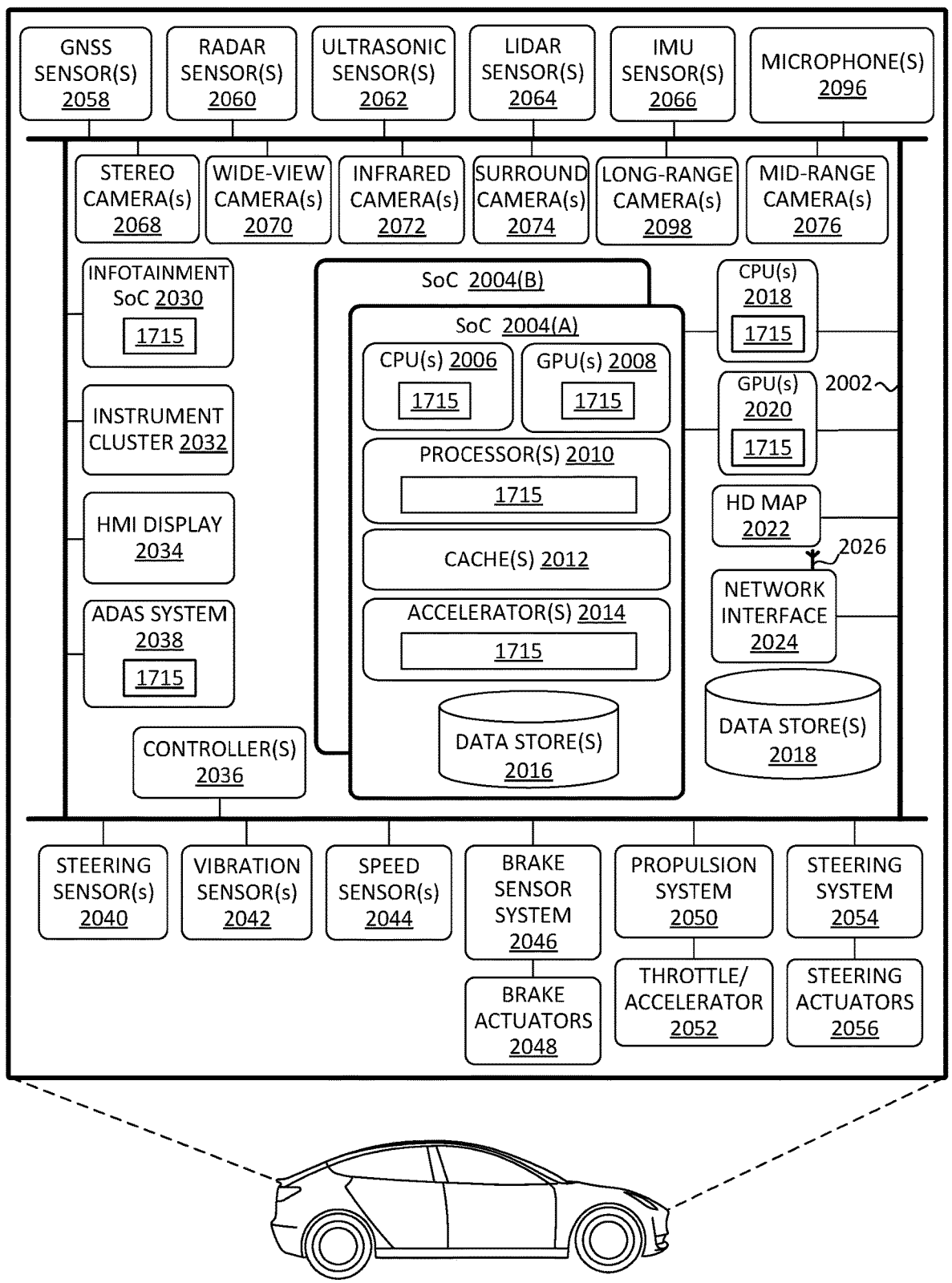
FIG. 20C is a block diagram illustrating an example system architecture for autonomous vehicle of FIG. 20A, according to at least one embodiment.

FIG. 20C is a block diagram illustrating an example system architecture for autonomous vehicle 2000 of FIG. 20A, according to at least one embodiment. In at least one embodiment, each of components, features, and systems of vehicle 2000 in FIG. 20C are illustrated as being connected via a bus 2002. In at least one embodiment, bus 2002 may include, without limitation, a CAN data interface (alternatively referred to herein as a "CAN bus"). In at least one embodiment, a CAN may be a network inside vehicle 2000 used to aid in control of various features and functionality of vehicle 2000, such as actuation of brakes, acceleration, braking, steering, windshield wipers, etc. In at least one embodiment, bus 2002 may be configured to have dozens or even hundreds of nodes, each with its own unique identifier (e.g., a CAN ID). In at least one embodiment, bus 2002 may be read to find steering wheel angle, ground speed, engine revolutions per minute ("RPMs"), button positions, and/or other vehicle status indicators. In at least one embodiment, bus 2002 may be a CAN bus that is ASIL B compliant.

In at least one embodiment, in addition to, or alternatively from CAN, FlexRay and/or Ethernet may be used. In at least one embodiment, there may be any number of busses 2002, which may include, without limitation, zero or more CAN busses, zero or more FlexRay busses, zero or more Ethernet busses, and/or zero or more other types of busses using a different protocol. In at least one embodiment, two or more busses 2002 may be used to perform different functions, and/or may be used for redundancy. For example, a first bus 2002 may be used for collision avoidance functionality and a second bus 2002 may be used for actuation control. In at least one embodiment, each bus 2002 may communicate with any of components of vehicle 2000, and two or more busses 2002 may communicate with same components. In at least one embodiment, each of any number of system(s) on chip(s) ("SoC(s)") 2004, each of controller(s) 2036, and/or each computer within vehicle may have access to same input data (e.g., inputs from sensors of vehicle 2000), and may be connected to a common bus, such CAN bus.

In at least one embodiment, vehicle 2000 may include one or more controller(s) 2036, such as those described herein with respect to FIG. 20A, controller(s) 2036 may be used for a variety of functions. In at least one embodiment, controller(s) 2036 may be coupled to any of various other components and systems of vehicle 2000, and may be used for control of vehicle 2000, artificial intelligence of vehicle 2000, infotainment for vehicle 2000, and/or like.

In at least one embodiment, vehicle 2000 may include any number of SoCs 2004. Each of SoCs 2004 may include, without limitation, central processing units ("CPU(s)") 2006, graphics processing units ("GPU(s)") 2008, processor(s) 2010, cache(s) 2012, accelerator(s) 2014, data store(s) 2016, and/or other components and features not illustrated. In at least one embodiment, SoC(s) 2004 may be used to control vehicle 2000 in a variety of platforms and systems. For example, in at least one embodiment, SoC(s) 2004 may be combined in a system (e.g., system of vehicle 2000) with a High Definition ("HD") map 2022 which may obtain map refreshes and/or updates via network interface 2024 from one or more servers (not shown in FIG. 20C).

In at least one embodiment, CPU(s) 2006 may include a CPU cluster or CPU complex (alternatively referred to herein as a "CCPLEX"). In at least one embodiment, CPU(s) 2006 may include multiple cores and/or level two ("L2") caches. For instance, in at least one embodiment, CPU(s) 2006 may include eight cores in a coherent multi-processor configuration. In at least one embodiment, CPU(s) 2006 may include four dual-core clusters where each cluster has a dedicated L2 cache (e.g., a 2 MB L2 cache). In at least one embodiment, CPU(s) 2006 (e.g., CCPLEX) may be configured to support simultaneous cluster operation enabling any combination of clusters of CPU(s) 2006 to be active at any given time.

In at least one embodiment, one or more of CPU(s) 2006 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 2006 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 2008 may include an integrated GPU (alternatively referred to herein as an "iGPU"). In at least one embodiment, GPU(s) 2008 may be programmable and may be efficient for parallel workloads. In at least one embodiment, GPU(s) 2008, in at least one embodiment, may use an enhanced tensor instruction set. In on embodiment, GPU(s) 2008 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 2008 may include at least eight streaming microprocessors. In at least one embodiment, GPU(s) 2008 may use compute application programming interface(s) (API(s)). In at least one embodiment, GPU(s) 2008 may use one or more parallel computing platforms and/or programming models (e.g., NVIDIA's CUDA).

In at least one embodiment, one or more of GPU(s) 2008 may be power-optimized for best performance in automotive and embedded use cases. For example, in on embodiment, GPU(s) 2008 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 2008 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 2008 may include unified memory technology. In at least one embodiment, address translation services ("ATS") support may be used to allow GPU(s) 2008 to access CPU(s) 2006 page tables directly. In at least one embodiment, embodiment, when GPU(s) 2008 memory management unit ("MMU") experiences a miss, an address translation request may be transmitted to CPU(s) 2006. In response, CPU(s) 2006 may look in its page tables for virtual-to-physical mapping for address and transmits translation back to GPU(s) 2008, in at least one embodiment. In at least one embodiment, unified memory technology may allow a single unified virtual address space for memory of both CPU(s) 2006 and GPU(s) 2008, thereby simplifying GPU(s) 2008 programming and porting of applications to GPU(s) 2008.

In at least one embodiment, GPU(s) 2008 may include any number of access counters that may keep track of frequency of access of GPU(s) 2008 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 2004 may include any number of cache(s) 2012, including those described herein. For example, in at least one embodiment, cache(s) 2012 could include a level three ("L3") cache that is available to both CPU(s) 2006 and GPU(s) 2008 (e.g., that is connected both CPU(s) 2006 and GPU(s) 2008). In at least one embodiment, cache(s) 2012 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 2004 may include one or more accelerator(s) 2014 (e.g., hardware accelerators, software accelerators, or a combination thereof). In at least one embodiment, SoC(s) 2004 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 2008 and to off-load some of tasks of GPU(s) 2008 (e.g., to free up more cycles of GPU(s) 2008 for performing other tasks). In at least one embodiment, accelerator(s) 2014 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 2014 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 2096; a CNN for facial recognition and vehicle owner identification using data from camera sensors; and/or a CNN for security and/or safety related events.

In at least one embodiment, DLA(s) may perform any function of GPU(s) 2008, and by using an inference accelerator, for example, a designer may target either DLA(s) or GPU(s) 2008 for any function. For example, in at least one embodiment, designer may focus processing of CNNs and floating point operations on DLA(s) and leave other functions to GPU(s) 2008 and/or other accelerator(s) 2014.

In at least one embodiment, accelerator(s) 2014 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 2038, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 2006. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 2014 (e.g., hardware acceleration cluster) may include a computer vision network on-chip and static random-access memory ("SRAM"), for providing a high-bandwidth, low latency SRAM for accelerator(s) 2014. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 2004 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 2014 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 2000, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 2066 that correlates with vehicle 2000 orientation, distance, 3D location estimates of object obtained from neural network and/or other sensors (e.g., LIDAR sensor(s) 2064 or RADAR sensor(s) 2060), among others.

In at least one embodiment, one or more of SoC(s) 2004 may include data store(s) 2016 (e.g., memory). In at least one embodiment, data store(s) 2016 may be on-chip memory of SoC(s) 2004, which may store neural networks to be executed on GPU(s) 2008 and/or DLA. In at least one embodiment, data store(s) 2016 may be large enough in capacity to store multiple instances of neural networks for redundancy and safety. In at least one embodiment, data store(s) 2012 may comprise L2 or L3 cache(s).

In at least one embodiment, one or more of SoC(s) 2004 may include any number of processor(s) 2010 (e.g., embedded processors), processor(s) 2010 may include a boot and power management processor that may be a dedicated processor and subsystem to handle boot power and management functions and related security enforcement. In at least one embodiment, boot and power management processor may be a part of SoC(s) 2004 boot sequence and may provide runtime power management services. In at least one embodiment, boot power and management processor may provide clock and voltage programming, assistance in system low power state transitions, management of SoC(s) 2004 thermals and temperature sensors, and/or management of SoC(s) 2004 power states. In at least one embodiment, each temperature sensor may be implemented as a ring-oscillator whose output frequency is proportional to temperature, and SoC(s) 2004 may use ring-oscillators to detect temperatures of CPU(s) 2006, GPU(s) 2008, and/or accelerator(s) 2014. In at least one embodiment, if temperatures are determined to exceed a threshold, then boot and power management processor may enter a temperature fault routine and put SoC(s) 2004 into a lower power state and/or put vehicle 2000 into a chauffeur to safe stop mode (e.g., bring vehicle 2000 to a safe stop).

In at least one embodiment, processor(s) 2010 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 2010 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 2010 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 2010 may further include a real-time camera engine that may include, without limitation, a dedicated processor subsystem for handling real-time camera management. In at least one embodiment, processor(s) 2010 may further include a high-dynamic range signal processor that may include, without limitation, an image signal processor that is a hardware engine that is part of camera processing pipeline.

In at least one embodiment, processor(s) 2010 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 2070, surround camera(s) 2074, and/or on in-cabin monitoring camera sensor(s). In at least one embodiment, in-cabin monitoring camera sensor(s) are preferably monitored by a neural network running on another instance of SoC 2004, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 2008 are not required to continuously render new surfaces. In at least one embodiment, when GPU(s) 2008 are powered on and active doing 3D rendering, video image compositor may be used to offload GPU(s) 2008 to improve performance and responsiveness.

In at least one embodiment, one or more of SoC(s) 2004 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 2004 may further include an input/output controller(s) that may be controlled by software and may be used for receiving I/O signals that are uncommitted to a specific role.

In at least one embodiment, one or more of SoC(s) 2004 may further include a broad range of peripheral interfaces to enable communication with peripherals, audio encoders/decoders ("codecs"), power management, and/or other devices. SoC(s) 2004 may be used to process data from cameras (e.g., connected over Gigabit Multimedia Serial Link and Ethernet), sensors (e.g., LIDAR sensor(s) 2064, RADAR sensor(s) 2060, etc. that may be connected over Ethernet), data from bus 2002 (e.g., speed of vehicle 2000, steering wheel position, etc.), data from GNSS sensor(s) 2058 (e.g., connected over Ethernet or CAN bus), etc. In at least one embodiment, one or more of SoC(s) 2004 may further include dedicated high-performance mass storage controllers that may include their own DMA engines, and that may be used to free CPU(s) 2006 from routine data management tasks.

In at least one embodiment, SoC(s) 2004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 2004 may be faster, more reliable, and even more energy-efficient and space-efficient than conventional systems. For example, in at least one embodiment, accelerator(s) 2014, when combined with CPU(s) 2006, GPU(s) 2008, and data store(s) 2016, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 2020) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 2008.

In at least one embodiment, a CNN for facial recognition and vehicle owner identification may use data from camera sensors to identify presence of an authorized driver and/or owner of vehicle 2000. In at least one embodiment, an always on sensor processing engine may be used to unlock vehicle when owner approaches driver door and turn on lights, and, in security mode, to disable vehicle when owner leaves vehicle. In this way, SoC(s) 2004 provide for security against theft and/or carjacking.

In at least one embodiment, a CNN for emergency vehicle detection and identification may use data from microphones 2096 to detect and identify emergency vehicle sirens. In at least one embodiment, SoC(s) 2004 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 2058. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 2062, until emergency vehicle(s) passes.

In at least one embodiment, vehicle 2000 may include CPU(s) 2018 (e.g., discrete CPU(s), or dCPU(s)), that may be coupled to SoC(s) 2004 via a high-speed interconnect (e.g., PCIe). In at least one embodiment, CPU(s) 2018 may include an X86 processor, for example. CPU(s) 2018 may be used to perform any of a variety of functions, including arbitrating potentially inconsistent results between ADAS sensors and SoC(s) 2004, and/or monitoring status and health of controller(s) 2036 and/or an infotainment system on a chip ("infotainment SoC") 2030, for example.

In at least one embodiment, vehicle 2000 may include GPU(s) 2020 (e.g., discrete GPU(s), or dGPU(s)), that may be coupled to SoC(s) 2004 via a high-speed interconnect (e.g., NVIDIA's NVLINK). In at least one embodiment, GPU(s) 2020 may provide additional artificial intelligence functionality, such as by executing redundant and/or different neural networks, and may be used to train and/or update neural networks based at least in part on input (e.g., sensor data) from sensors of vehicle 2000.

In at least one embodiment, vehicle 2000 may further include network interface 2024 which may include, without limitation, wireless antenna(s) 2026 (e.g., one or more wireless antennas 2026 for different communication protocols, such as a cellular antenna, a Bluetooth antenna, etc.). In at least one embodiment, network interface 2024 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 200 and other vehicle and/or an indirect link may be established (e.g., across networks and over Internet). In at least one embodiment, direct links may be provided using a vehicle-to-vehicle communication link, vehicle-to-vehicle communication link may provide vehicle 2000 information about vehicles in proximity to vehicle 2000 (e.g., vehicles in front of, on side of, and/or behind vehicle 2000). In at least one embodiment, aforementioned functionality may be part of a cooperative adaptive cruise control functionality of vehicle 2000.

In at least one embodiment, network interface 2024 may include an SoC that provides modulation and demodulation functionality and enables controller(s) 2036 to communicate over wireless networks. In at least one embodiment, network interface 2024 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 2000 may further include data store(s) 2028 which may include, without limitation, off-chip (e.g., off SoC(s) 2004) storage. In at least one embodiment, data store(s) 2028 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 2000 may further include GNSS sensor(s) 2058 (e.g., GPS and/or assisted GPS sensors), to assist in mapping, perception, occupancy grid generation, and/or path planning functions. In at least one embodiment, any number of GNSS sensor(s) 2058 may be used, including, for example and without limitation, a GPS using a USB connector with an Ethernet to Serial (e.g., RS-232) bridge.

In at least one embodiment, vehicle 2000 may further include RADAR sensor(s) 2060. RADAR sensor(s) 2060 may be used by vehicle 2000 for long-range vehicle detection, even in darkness and/or severe weather conditions. In at least one embodiment, RADAR functional safety levels may be ASIL B. RADAR sensor(s) 2060 may use CAN and/or bus 2002 (e.g., to transmit data generated by RADAR sensor(s) 2060) for control and to access object tracking data, with access to Ethernet to access raw data in some examples. In at least one embodiment, wide variety of RADAR sensor types may be used. For example, and without limitation, RADAR sensor(s) 2060 may be suitable for front, rear, and side RADAR use. In at least one embodiment, one or more of RADAR sensors(s) 2060 are Pulse Doppler RADAR sensor(s).

In at least one embodiment, RADAR sensor(s) 2060 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 2060 may help in distinguishing between static and moving objects, and may be used by ADAS system 2038 for emergency brake assist and forward collision warning, sensors 2060(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 2000 surroundings at higher speeds with minimal interference from traffic in adjacent lanes. In at least one embodiment, other two antennae may expand field of view, making it possible to quickly detect vehicles entering or leaving vehicle's 2000 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 2060 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 2038 for blind spot detection and/or lane change assist.

In at least one embodiment, vehicle 2000 may further include ultrasonic sensor(s) 2062, ultrasonic sensor(s) 2062, which may be positioned at front, back, and/or sides of vehicle 2000, may be used for park assist and/or to create and update an occupancy grid. In at least one embodiment, a wide variety of ultrasonic sensor(s) 2062 may be used, and different ultrasonic sensor(s) 2062 may be used for different ranges of detection (e.g., 2.5 m, 4 m). In at least one embodiment, ultrasonic sensor(s) 2062 may operate at functional safety levels of ASIL B.

In at least one embodiment, vehicle 2000 may include LIDAR sensor(s) 2064. LIDAR sensor(s) 2064 may be used for object and pedestrian detection, emergency braking, collision avoidance, and/or other functions. In at least one embodiment, LIDAR sensor(s) 2064 may be functional safety level ASIL B. In at least one embodiment, vehicle 2000 may include multiple LIDAR sensors 2064 (e.g., two, four, six, etc.) that may use Ethernet (e.g., to provide data to a Gigabit Ethernet switch).

In at least one embodiment, LIDAR sensor(s) 2064 may be capable of providing a list of objects and their distances for a 360-degree field of view. In at least one embodiment, commercially available LIDAR sensor(s) 2064 may have an advertised range of approximately 100 m, with an accuracy of 2 cm-3 cm, and with support for a 100 Mbps Ethernet connection, for example. In at least one embodiment, one or more non-protruding LIDAR sensors 2064 may be used. In such an embodiment, LIDAR sensor(s) 2064 may be implemented as a small device that may be embedded into front, rear, sides, and/or corners of vehicle 2000. In at least one embodiment, LIDAR sensor(s) 2064, in such an embodiment, may provide up to a 120-degree horizontal and 35-degree vertical field-of-view, with a 200 m range even for low-reflectivity objects. In at least one embodiment, front-mounted LIDAR sensor(s) 2064 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 2000 up to approximately 200 m. In at least one embodiment, a flash LIDAR unit includes, without limitation, a receptor, which records laser pulse transit time and reflected light on each pixel, which in turn corresponds to range from vehicle 2000 to objects. In at least one embodiment, flash LIDAR may allow for highly accurate and distortion-free images of surroundings to be generated with every laser flash. In at least one embodiment, four flash LIDAR sensors may be deployed, one at each side of vehicle 2000. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 2066. In at least one embodiment, IMU sensor(s) 2066 may be located at a center of rear axle of vehicle 2000, in at least one embodiment. In at least one embodiment, IMU sensor(s) 2066 may include, for example and without limitation, accelerometer(s), magnetometer(s), gyroscope(s), magnetic compass(es), and/or other sensor types. In at least one embodiment, such as in six-axis applications, IMU sensor(s) 2066 may include, without limitation, accelerometers and gyroscopes. In at least one embodiment, such as in nine-axis applications, IMU sensor(s) 2066 may include, without limitation, accelerometers, gyroscopes, and magnetometers.

In at least one embodiment, IMU sensor(s) 2066 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 2066 may enable vehicle 2000 to estimate heading without requiring input from a magnetic sensor by directly observing and correlating changes in velocity from GPS to IMU sensor(s) 2066. In at least one embodiment, IMU sensor(s) 2066 and GNSS sensor(s) 2058 may be combined in a single integrated unit.

In at least one embodiment, vehicle 2000 may include microphone(s) 2096 placed in and/or around vehicle 2000. In at least one embodiment, microphone(s) 2096 may be used for emergency vehicle detection and identification, among other things.

In at least one embodiment, vehicle 2000 may further include any number of camera types, including stereo camera(s) 2068, wide-view camera(s) 2070, infrared camera(s) 2072, surround camera(s) 2074, long-range camera(s) 2098, mid-range camera(s) 2076, and/or other camera types. In at least one embodiment, cameras may be used to capture image data around an entire periphery of vehicle 2000. In at least one embodiment, types of cameras used depends vehicle 2000. In at least one embodiment, any combination of camera types may be used to provide necessary coverage around vehicle 2000. In at least one embodiment, number of cameras may differ depending on embodiment. For example, in at least one embodiment, vehicle 2000 could include six cameras, seven cameras, ten cameras, twelve cameras, or another number of cameras, cameras may support, as an example and without limitation, Gigabit Multimedia Serial Link ("GMSL") and/or Gigabit Ethernet. In at least one embodiment, each of camera(s) is described with more detail previously herein with respect to FIG. 20A and FIG. 20B.

In at least one embodiment, vehicle 2000 may further include vibration sensor(s) 2042, vibration sensor(s) 2042 may measure vibrations of components of vehicle 2000, such as axle(s). For example, in at least one embodiment, changes in vibrations may indicate a change in road surfaces. In at least one embodiment, when two or more vibration sensors 2042 are used, differences between vibrations may be used to determine friction or slippage of road surface (e.g., when difference in vibration is between a power-driven axle and a freely rotating axle).

In at least one embodiment, vehicle 2000 may include ADAS system 2038. ADAS system 2038 may include, without limitation, an SoC, in some examples. In at least one embodiment, ADAS system 2038 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 2060, LIDAR sensor(s) 2064, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 2000 and automatically adjust speed of vehicle 2000 to maintain a safe distance from vehicles ahead. In at least one embodiment, lateral ACC system performs distance keeping, and advises vehicle 2000 to change lanes when necessary. In at least one embodiment, lateral ACC is related to other ADAS applications such as LC and CW.

In at least one embodiment, CACC system uses information from other vehicles that may be received via network interface 2024 and/or wireless antenna(s) 2026 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 2000), while I2V communication concept provides information about traffic further ahead. In at least one embodiment, CACC system may include either or both I2V and V2V information sources. In at least one embodiment, given information of vehicles ahead of vehicle 2000, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 2060, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 2060, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 2000 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 2000 if vehicle 2000 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 2060, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 2000 is backing up. In at least one embodiment, RCTW system includes AEB system to ensure that vehicle brakes are applied to avoid a crash. In at least one embodiment, RCTW system may use one or more rear-facing RADAR sensor(s) 2060, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 2000 itself decides, in case of conflicting results, whether to heed result from a primary computer or a secondary computer (e.g., first controller 2036 or second controller 2036). For example, in at least one embodiment, ADAS system 2038 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 2038 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 2004.

In at least one embodiment, ADAS system 2038 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 2038 may be fed into primary computer's perception block and/or primary computer's dynamic driving task block. For example, in at least one embodiment, if ADAS system 2038 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 2000 may further include infotainment SoC 2030 (e.g., an in-vehicle infotainment system (IVI)). Although illustrated and described as an SoC, infotainment system 2030, in at least one embodiment, may not be an SoC, and may include, without limitation, two or more discrete components. In at least one embodiment, infotainment SoC 2030 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 2000. For example, infotainment SoC 2030 could include radios, disk players, navigation systems, video players, USB and Bluetooth connectivity, carputers, in-car entertainment, WiFi, steering wheel audio controls, hands free voice control, a heads-up display ("HUD"), HMI display 2034, a telematics device, a control panel (e.g., for controlling and/or interacting with various components, features, and/or systems), and/or other components. In at least one embodiment, infotainment SoC 2030 may further be used to provide information (e.g., visual and/or audible) to user(s) of vehicle, such as information from ADAS system 2038, autonomous driving information such as planned vehicle maneuvers, trajectories, surrounding environment information (e.g., intersection information, vehicle information, road information, etc.), and/or other information.

In at least one embodiment, infotainment SoC 2030 may include any amount and type of GPU functionality. In at least one embodiment, infotainment SoC 2030 may communicate over bus 2002 (e.g., CAN bus, Ethernet, etc.) with other devices, systems, and/or components of vehicle 2000. In at least one embodiment, infotainment SoC 2030 may be coupled to a supervisory MCU such that GPU of infotainment system may perform some self-driving functions in event that primary controller(s) 2036 (e.g., primary and/or backup computers of vehicle 2000) fail. In at least one embodiment, infotainment SoC 2030 may put vehicle 2000 into a chauffeur to safe stop mode, as described herein.

In at least one embodiment, vehicle 2000 may further include instrument cluster 2032 (e.g., a digital dash, an electronic instrument cluster, a digital instrument panel, etc.), instrument cluster 2032 may include, without limitation, a controller and/or supercomputer (e.g., a discrete controller or supercomputer). In at least one embodiment, instrument cluster 2032 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 2030 and instrument cluster 2032. In at least one embodiment, instrument cluster 2032 may be included as part of infotainment SoC 2030, or vice versa.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 20C for inferencing or predicting operations based, at least in part, on weight parameters calculated using neural network training operations, neural network functions and/or architectures, or neural network use cases described herein.

Figure 20D:
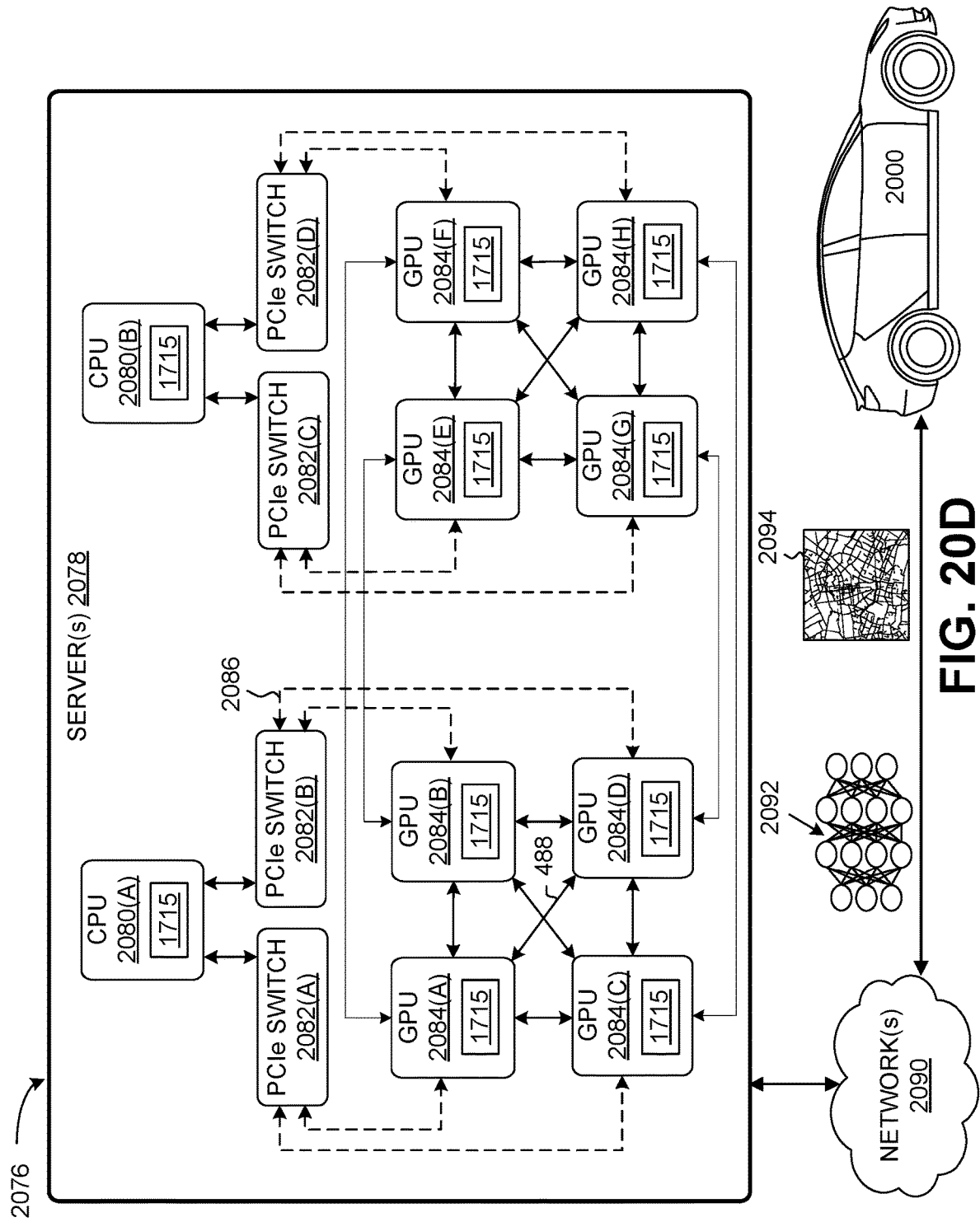
FIG. 20D is a diagram illustrating a system for communication between cloud-based server(s) and autonomous vehicle of FIG. 20A, according to at least one embodiment.

FIG. 20D is a diagram of a system 2076 for communication between cloud-based server(s) and autonomous vehicle 2000 of FIG. 20A, according to at least one embodiment. In at least one embodiment, system 2076 may include, without limitation, server(s) 2078, network(s) 2090, and any number and type of vehicles, including vehicle 2000, server(s) 2078 may include, without limitation, a plurality of GPUs 2084(A)-2084(H) (collectively referred to herein as GPUs 2084), PCIe switches 2082(A)-2082(H) (collectively referred to herein as PCIe switches 2082), and/or CPUs 2080(A)-2080(B) (collectively referred to herein as CPUs 2080). GPUs 2084, CPUs 2080, and PCIe switches 2082 may be interconnected with high-speed interconnects such as, for example and without limitation, NVLink interfaces 2088 developed by NVIDIA and/or PCIe connections 2086. In at least one embodiment, GPUs 2084 are connected via an NVLink and/or NVSwitch SoC and GPUs 2084 and PCIe switches 2082 are connected via PCIe interconnects. In at least one embodiment, although eight GPUs 2084, two CPUs 2080, and four PCIe switches 2082 are illustrated, this is not intended to be limiting. In at least one embodiment, each of server(s) 2078 may include, without limitation, any number of GPUs 2084, CPUs 2080, and/or PCIe switches 2082, in any combination. For example, in at least one embodiment, server(s) 2078 could each include eight, sixteen, thirty-two, and/or more GPUs 2084.

In at least one embodiment, server(s) 2078 may receive, over network(s) 2090 and from vehicles, image data representative of images showing unexpected or changed road conditions, such as recently commenced road-work. In at least one embodiment, server(s) 2078 may transmit, over network(s) 2090 and to vehicles, neural networks 2092, updated neural networks 2092, and/or map information 2094, including, without limitation, information regarding traffic and road conditions. In at least one embodiment, updates to map information 2094 may include, without limitation, updates for HD map 2022, such as information regarding construction sites, potholes, detours, flooding, and/or other obstructions. In at least one embodiment, neural networks 2092, updated neural networks 2092, and/or map information 2094 may have resulted from new training and/or experiences represented in data received from any number of vehicles in environment, and/or based at least in part on training performed at a data center (e.g., using server(s) 2078 and/or other servers).

In at least one embodiment, server(s) 2078 may be used to train machine learning models (e.g., neural networks) based at least in part on training data, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 2090, and/or machine learning models may be used by server(s) 2078 to remotely monitor vehicles.

In at least one embodiment, server(s) 2078 may receive data from vehicles and apply data to up-to-date real-time neural networks for real-time intelligent inferencing. In at least one embodiment, server(s) 2078 may include deep-learning supercomputers and/or dedicated AI computers powered by GPU(s) 2084, such as a DGX and DGX Station machines developed by NVIDIA. However, in at least one embodiment, server(s) 2078 may include deep learning infrastructure that use CPU-powered data centers.

In at least one embodiment, deep-learning infrastructure of server(s) 2078 may be capable of fast, real-time inferencing, and may use that capability to evaluate and verify health of processors, software, and/or associated hardware in vehicle 2000. For example, in at least one embodiment, deep-learning infrastructure may receive periodic updates from vehicle 2000, such as a sequence of images and/or objects that vehicle 2000 has located in that sequence of images (e.g., via computer vision and/or other machine learning object classification techniques). In at least one embodiment, deep-learning infrastructure may run its own neural network to identify objects and compare them with objects identified by vehicle 2000 and, if results do not match and deep-learning infrastructure concludes that AI in vehicle 2000 is malfunctioning, then server(s) 2078 may transmit a signal to vehicle 2000 instructing a fail-safe computer of vehicle 2000 to assume control, notify passengers, and complete a safe parking maneuver.

In at least one embodiment, server(s) 2078 may include GPU(s) 2084 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1715 are used to perform one or more embodiments. Details regarding hardware structure(x) 1715 are provided herein in conjunction with FIGS. 17A and/or 17B.

Computer Systems

Figure 21:
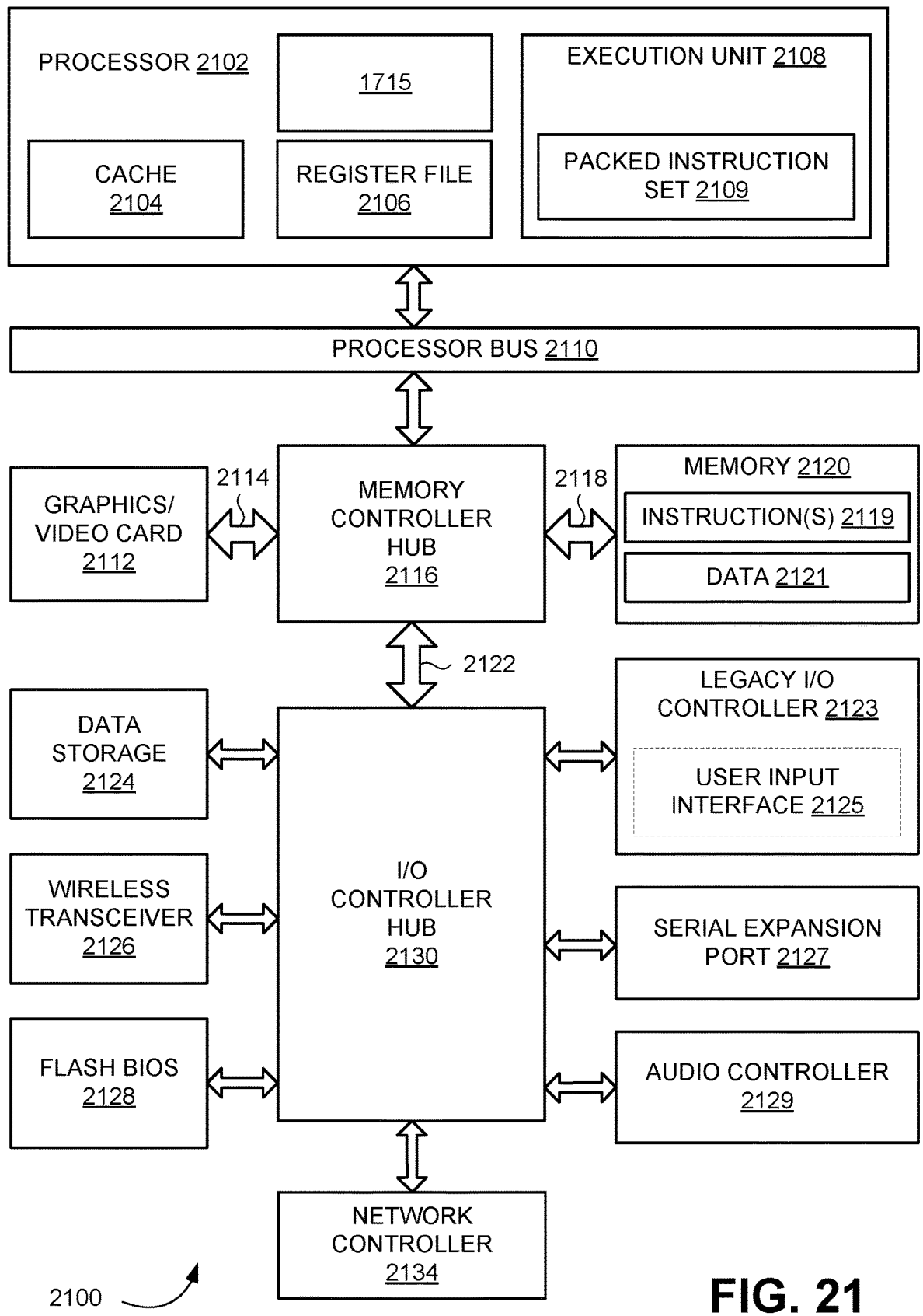
FIG. 21 is a block diagram illustrating a computer system, according to at least one embodiment.

FIG. 21 is a block diagram illustrating an exemplary computer system, which may be a system with interconnected devices and components, a system-on-a-chip (SOC) or some combination thereof 2100 formed with a processor that may include execution units to execute an instruction, according to at least one embodiment. In at least one embodiment, computer system 2100 may include, without limitation, a component, such as a processor 2102 to employ execution units including logic to perform algorithms for process data, in accordance with present disclosure, such as in embodiment described herein. In at least one embodiment, computer system 2100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2100 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2100 may include, without limitation, processor 2102 that may include, without limitation, one or more execution units 2108 to perform machine learning model training and/or inferencing according to techniques described herein. In at least one embodiment, system 21 is a single processor desktop or server system, but in another embodiment system 21 may be a multiprocessor system. In at least one embodiment, processor 2102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2102 may be coupled to a processor bus 2110 that may transmit data signals between processor 2102 and other components in computer system 2100.

In at least one embodiment, processor 2102 may include, without limitation, a Level 1 ("L1") internal cache memory ("cache") 2104. In at least one embodiment, processor 2102 may have a single internal cache or multiple levels of internal cache. In at least one embodiment, cache memory may reside external to processor 2102. Other embodiments may also include a combination of both internal and external caches depending on particular implementation and needs. In at least one embodiment, register file 2106 may store different types of data in various registers including, without limitation, integer registers, floating point registers, status registers, and instruction pointer register.

In at least one embodiment, execution unit 2108, including, without limitation, logic to perform integer and floating point operations, also resides in processor 2102, processor 2102 may also include a microcode ("ucode") read only memory ("ROM") that stores microcode for certain macro instructions. In at least one embodiment, execution unit 2108 may include logic to handle a packed instruction set 2109. In at least one embodiment, by including packed instruction set 2109 in instruction set of a general-purpose processor 2102, along with associated circuitry to execute instructions, operations used by many multimedia applications may be performed using packed data in a general-purpose processor 2102. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 2108 may also be used in microcontrollers, embedded processors, graphics devices, DSPs, and other types of logic circuits. In at least one embodiment, computer system 2100 may include, without limitation, a memory 2120. In at least one embodiment, memory 2120 may be implemented as a Dynamic Random Access Memory ("DRAM") device, a Static Random Access Memory ("SRAM") device, flash memory device, or other memory device, memory 2120 may store instruction(s) 2119 and/or data 2121 represented by data signals that may be executed by processor 2102.

In at least one embodiment, system logic chip may be coupled to processor bus 2110 and memory 2120. In at least one embodiment, system logic chip may include, without limitation, a memory controller hub ("MCH") 2116, and processor 2102 may communicate with MCH 2116 via processor bus 2110. In at least one embodiment, MCH 2116 may provide a high bandwidth memory path 2118 to memory 2120 for instruction and data storage and for storage of graphics commands, data and textures. In at least one embodiment, MCH 2116 may direct data signals between processor 2102, memory 2120, and other components in computer system 2100 and to bridge data signals between processor bus 2110, memory 2120, and a system I/O 2122. In at least one embodiment, system logic chip may provide a graphics port for coupling to a graphics controller. In at least one embodiment, MCH 2116 may be coupled to memory 2120 through a high bandwidth memory path 2118 and graphics/video card 2112 may be coupled to MCH 2116 through an Accelerated Graphics Port ("AGP") interconnect 2114.

In at least one embodiment, computer system 2100 may use system I/O 2122 that is a proprietary hub interface bus to couple MCH 2116 to I/O controller hub ("ICH") 2130. In at least one embodiment, ICH 2130 may provide direct connections to some I/O devices via a local I/O bus. In at least one embodiment, local I/O bus may include, without limitation, a high-speed I/O bus for connecting peripherals to memory 2120, chipset, and processor 2102. Examples may include, without limitation, an audio controller 2129, a firmware hub ("flash BIOS") 2128, a wireless transceiver 2126, a data storage 2124, a legacy I/O controller 2123 containing user input and keyboard interfaces, a serial expansion port 2127, such as Universal Serial Bus ("USB"), and a network controller 2134, data storage 2124 may comprise a hard disk drive, a floppy disk drive, a CD-ROM device, a flash memory device, or other mass storage device.

In at least one embodiment, FIG. 21 illustrates a system, which includes interconnected hardware devices or "chips," whereas in other embodiments, FIG. 21 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of system 2100 are interconnected using compute express link (CXL) interconnects.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 21 for inferencing or predicting operations based, at least in part, on weight parameters calculated using neural network training operations, neural network functions and/or architectures, or neural network use cases described herein.

Figure 22:
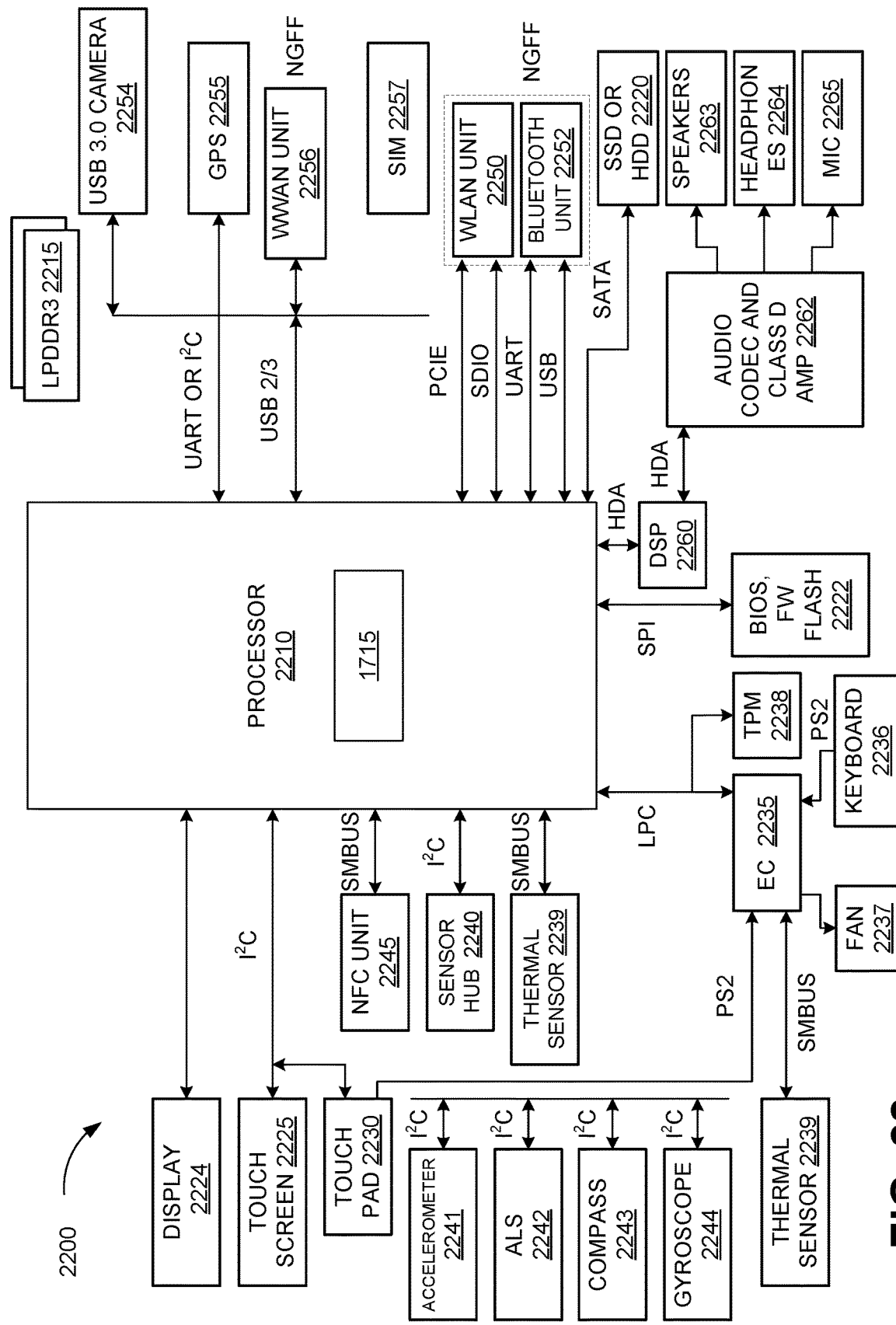
FIG. 22 is a block diagram illustrating computer system, according to at least one embodiment.

FIG. 22 is a block diagram illustrating an electronic device 2200 for utilizing a processor 2210, according to at least one embodiment. In at least one embodiment, electronic device 2200 may be, for example and without limitation, a notebook, a tower server, a rack server, a blade server, a laptop, a desktop, a tablet, a mobile device, a phone, an embedded computer, or any other suitable electronic device.

In at least one embodiment, system 2200 may include, without limitation, processor 2210 communicatively coupled to any suitable number or kind of components, peripherals, modules, or devices. In at least one embodiment, processor 2210 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 22 illustrates a system, which includes interconnected hardware devices or "chips," whereas in other embodiments, FIG. 22 may illustrate an exemplary System on a Chip ("SoC"). In at least one embodiment, devices illustrated in FIG. 22 may be interconnected with proprietary interconnects, standardized interconnects (e.g., PCIe) or some combination thereof. In at least one embodiment, one or more components of FIG. 22 are interconnected using compute express link (CXL) interconnects.

In at least one embodiment, FIG. 22 may include a display 2224, a touch screen 2225, a touch pad 2230, a Near Field Communications unit ("NFC") 2245, a sensor hub 2240, a thermal sensor 2246, an Express Chipset ("EC") 2235, a Trusted Platform Module ("TPM") 2238, BIOS/firmware/flash memory ("BIOS, FW Flash") 2222, a DSP 2260, a drive "SSD or HDD") 2220 such as a Solid State Disk ("SSD") or a Hard Disk Drive ("HDD"), a wireless local area network unit ("WLAN") 2250, a Bluetooth unit 2252, a Wireless Wide Area Network unit ("WWAN") 2256, a Global Positioning System (GPS) 2255, a camera ("USB 3.0 camera") 2254 such as a USB 3.0 camera, or a Low Power Double Data Rate ("LPDDR") memory unit ("LPDDR3") 2215 implemented in, for example, LPDDR3 standard. These components may each be implemented in any suitable manner.

In at least one embodiment, other components may be communicatively coupled to processor 2210 through components discussed above. In at least one embodiment, an accelerometer 2241, Ambient Light Sensor ("ALS") 2242, compass 2243, and a gyroscope 2244 may be communicatively coupled to sensor hub 2240. In at least one embodiment, thermal sensor 2239, a fan 2237, a keyboard 2246, and a touch pad 2230 may be communicatively coupled to EC 2235. In at least one embodiment, speaker 2263, a headphones 2264, and a microphone ("mic") 2265 may be communicatively coupled to an audio unit ("audio codec and class d amp") 2264, which may in turn be communicatively coupled to DSP 2260. In at least one embodiment, audio unit 2264 may include, for example and without limitation, an audio coder/decoder ("codec") and a class D amplifier. In at least one embodiment, SIM card ("SIM") 2257 may be communicatively coupled to WWAN unit 2256. In at least one embodiment, components such as WLAN unit 2250 and Bluetooth unit 2252, as well as WWAN unit 2256 may be implemented in a Next Generation Form Factor ("NGFF").

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 22 for inferencing or predicting operations based, at least in part, on weight parameters calculated using neural network training operations, neural network functions and/or architectures, or neural network use cases described herein.

Figure 23:
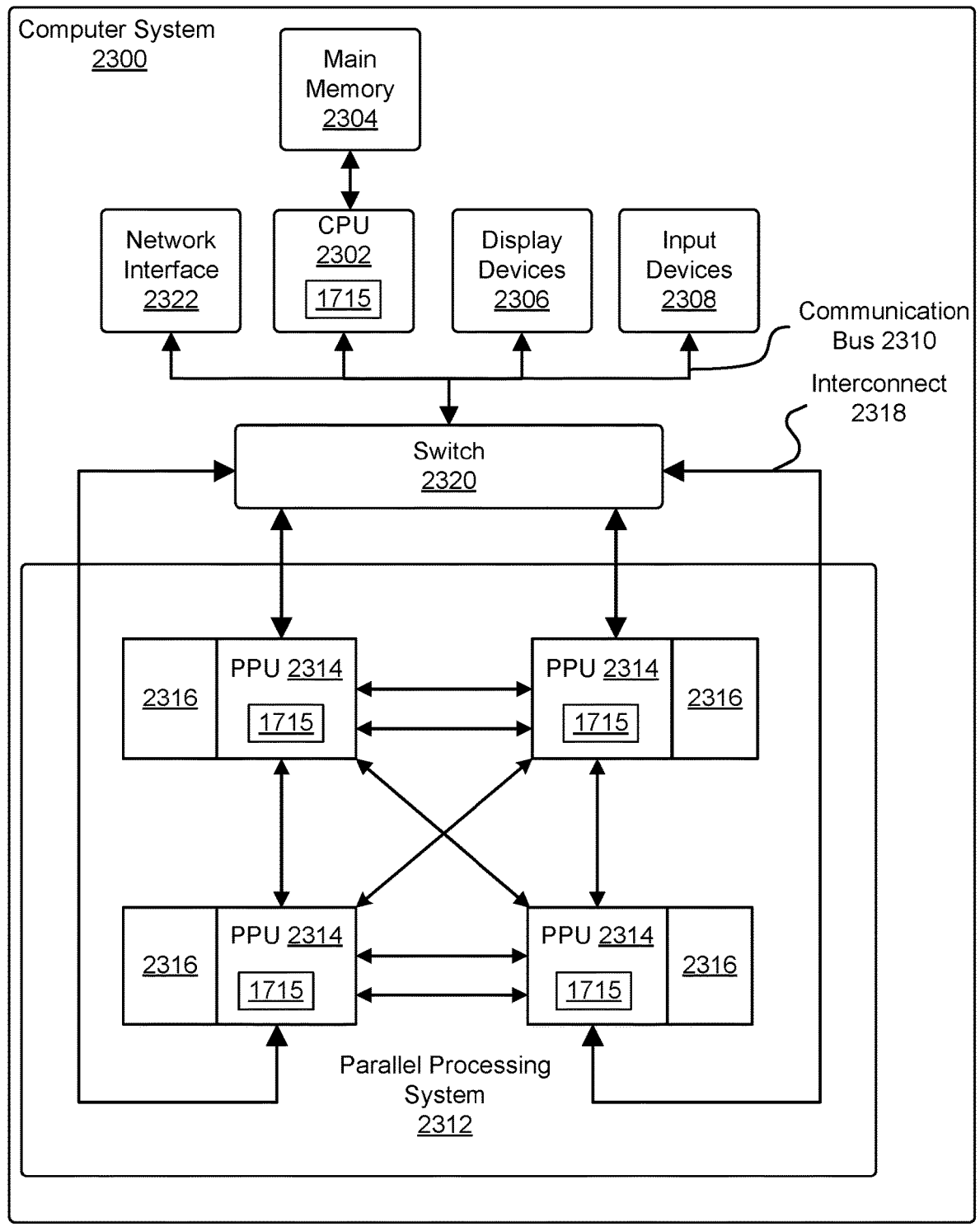
FIG. 23 illustrates a computer system, according to at least one embodiment.

FIG. 23 illustrates a computer system 2300, according to at least one embodiment. In at least one embodiment, computer system 2300 is configured to implement various processes and methods described throughout this disclosure.

In at least one embodiment, computer system 2300 comprises, without limitation, at least one central processing unit ("CPU") 2302 that is connected to a communication bus 2310 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2300 includes, without limitation, a main memory 2304 and control logic (e.g., implemented as hardware, software, or a combination thereof) and data are stored in main memory 2304 which may take form of random access memory ("RAM"). In at least one embodiment, a network interface subsystem ("network interface") 2322 provides an interface to other computing devices and networks for receiving data from and transmitting data to other systems from computer system 2300.

In at least one embodiment, computer system 2300, in at least one embodiment, includes, without limitation, input devices 2308, parallel processing system 2312, and display devices 2306 which can be implemented using a conventional cathode ray tube ("CRT"), liquid crystal display ("LCD"), light emitting diode ("LED"), plasma display, or other suitable display technologies. In at least one embodiment, user input is received from input devices 2308 such as keyboard, mouse, touchpad, microphone, and more. In at least one embodiment, each of foregoing modules can be situated on a single semiconductor platform to form a processing system.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 23 for inferencing or predicting operations based, at least in part, on weight parameters calculated using neural network training operations, neural network functions and/or architectures, or neural network use cases described herein.

FIG. 24 illustrates a computer system 2400, according to at least one embodiment. In at least one embodiment, computer system 2400 includes, without limitation, a computer 2410 and a USB stick 2420. In at least one embodiment, computer 2410 may include, without limitation, any number and type of processor(s) (not shown) and a memory (not shown). In at least one embodiment, computer 2410 includes, without limitation, a server, a cloud instance, a laptop, and a desktop computer.

In at least one embodiment, USB stick 2420 includes, without limitation, a processing unit 2430, a USB interface 2440, and USB interface logic 2450. In at least one embodiment, processing unit 2430 may be any instruction execution system, apparatus, or device capable of executing instructions. In at least one embodiment, processing unit 2430 may include, without limitation, any number and type of processing cores (not shown). In at least one embodiment, processing core 2430 comprises an application specific integrated circuit ("ASIC") that is optimized to perform any amount and type of operations associated with machine learning. For instance, in at least one embodiment, processing core 2430 is a tensor processing unit ("TPC") that is optimized to perform machine learning inference operations. In at least one embodiment, processing core 2430 is a vision processing unit ("VPU") that is optimized to perform machine vision and machine learning inference operations.

In at least one embodiment, USB interface 2440 may be any type of USB connector or USB socket. For instance, in at least one embodiment, USB interface 2440 is a USB 3.0 Type-C socket for data and power. In at least one embodiment, USB interface 2440 is a USB 3.0 Type-A connector. In at least one embodiment, USB interface logic 2450 may include any amount and type of logic that enables processing unit 2430 to interface with or devices (e.g., computer 2410) via USB connector 2440.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 24 for inferencing or predicting operations based, at least in part, on weight parameters calculated using neural network training operations, neural network functions and/or architectures, or neural network use cases described herein.

Figure 25A:
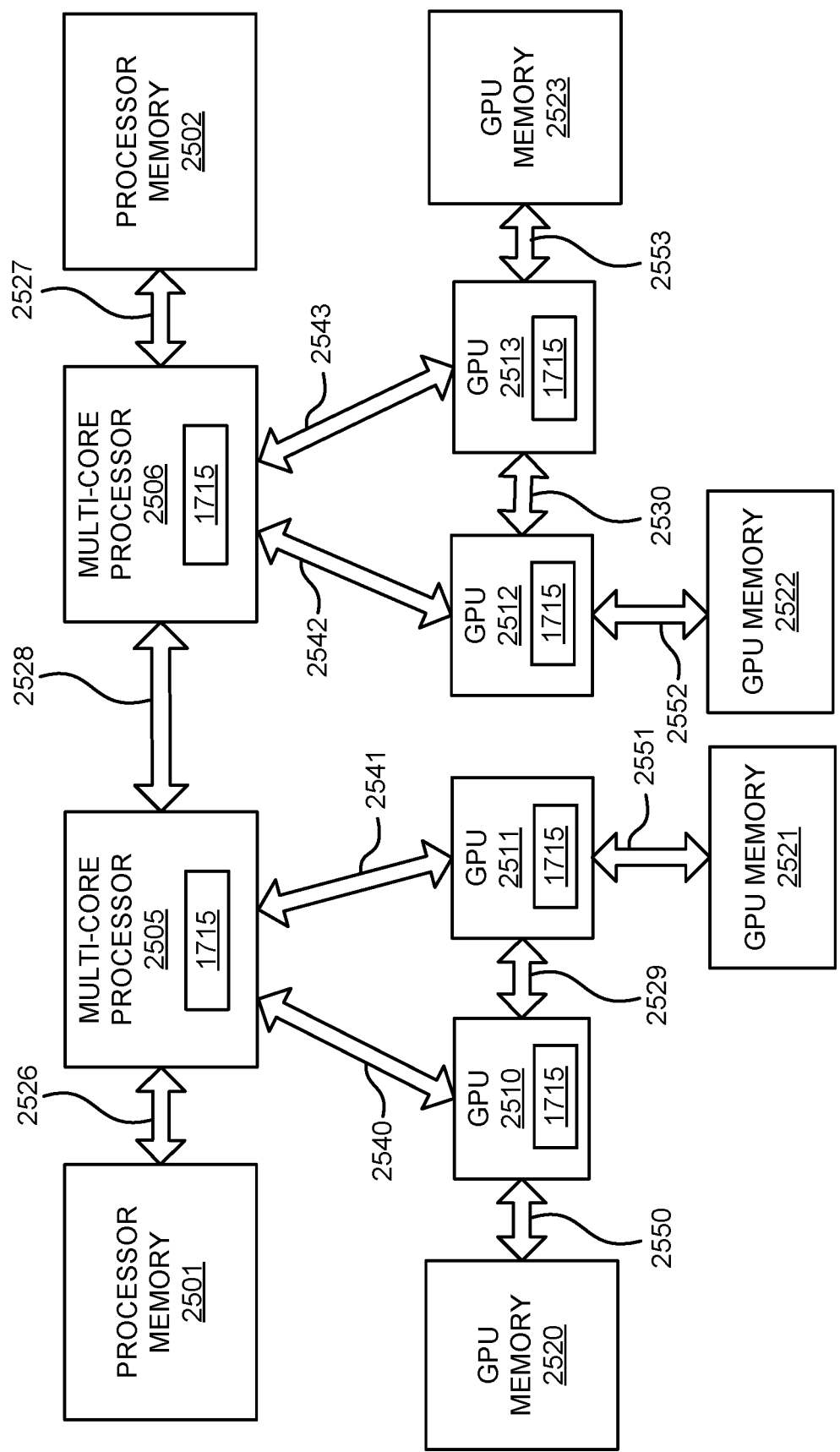
FIG. 25A illustrates a computer system, according to at least one embodiment.

FIG. 25A illustrates an exemplary architecture in which a plurality of GPUs 2510-2513 is communicatively coupled to a plurality of multi-core processors 2505-2506 over high-speed links 2540-2543 (e.g., buses, point-to-point interconnects, etc.). In one embodiment, high-speed links 2540-2543 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2510-2513 are interconnected over high-speed links 2529-2530, which may be implemented using same or different protocols/links than those used for high-speed links 2540-2543. Similarly, two or more of multi-core processors 2505-2506 may be connected over high speed link 2528 which may be symmetric multi-processor (SMP) buses operating at 20 GB/s, 30 GB/s, 120 GB/s or higher. Alternatively, all communication between various system components shown in FIG. 25A may be accomplished using same protocols/links (e.g., over a common interconnection fabric).

In one embodiment, each multi-core processor 2505-2506 is communicatively coupled to a processor memory 2501-2502, via memory interconnects 2526-2527, respectively, and each GPU 2510-2513 is communicatively coupled to GPU memory 2520-2523 over GPU memory interconnects 2550-2553, respectively. Memory interconnects 2526-2527 and 2550-2553 may utilize same or different memory access technologies. By way of example, and not limitation, processor memories 2501-2502 and GPU memories 2520-2523 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2501-2502 may be volatile memory and another portion may be non-volatile memory (e.g., using a two-level memory (2 LM) hierarchy).

As described herein, although various processors 2505-2506 and GPUs 2510-2513 may be physically coupled to a particular memory 2501-2502, 2520-2523, respectively, a unified memory architecture may be implemented in which a same virtual system address space (also referred to as "effective address" space) is distributed among various physical memories. For example, processor memories 2501-2502 may each comprise 64 GB of system memory address space and GPU memories 2520-2523 may each comprise 32 GB of system memory address space (resulting in a total of 256 GB addressable memory in this example).

Figure 25B:
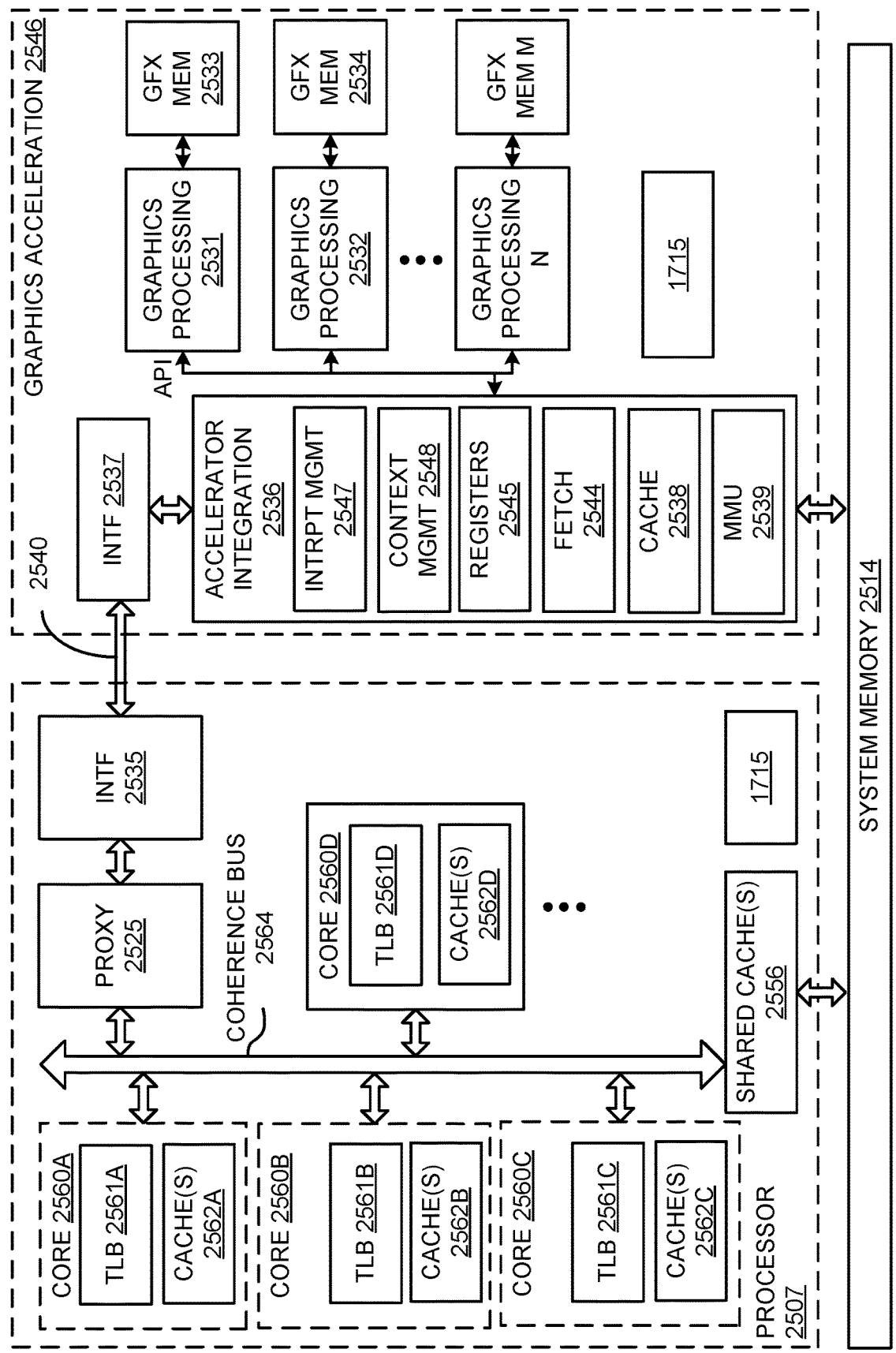
FIG. 25B illustrates a computer system, according to at least one embodiment.

FIG. 25B illustrates additional details for an interconnection between a multi-core processor 2507 and a graphics acceleration module 2546 in accordance with one exemplary embodiment. Graphics acceleration module 2546 may include one or more GPU chips integrated on a line card which is coupled to processor 2507 via high-speed link 2540. Alternatively, graphics acceleration module 2546 may be integrated on a same package or chip as processor 2507.

In at least one embodiment, illustrated processor 2507 includes a plurality of cores 2560A-2560D, each with a translation lookaside buffer 2561A-2561D and one or more caches 2562A-2562D. In at least one embodiment, cores 2560A-2560D may include various other components for executing instructions and processing data which are not illustrated. Caches 2562A-2562D may comprise level 1 (L1) and level 2 (L2) caches. In addition, one or more shared caches 2556 may be included in caches 2562A-2562D and shared by sets of cores 2560A-2560D. For example, one embodiment of processor 2507 includes 24 cores, each with its own L1 cache, twelve shared L2 caches, and twelve shared L3 caches. In this embodiment, one or more L2 and L3 caches are shared by two adjacent cores. Processor 2507 and graphics acceleration module 2546 connect with system memory 2514, which may include processor memories 2501-2502 of FIG. 25A.

Coherency is maintained for data and instructions stored in various caches 2562A-2562D, 2556 and system memory 2514 via inter-core communication over a coherence bus 2564. For example, each cache may have cache coherency logic/circuitry associated therewith to communicate over coherence bus 2564 in response to detected reads or writes to particular cache lines. In one implementation, a cache snooping protocol is implemented over coherence bus 2564 to snoop cache accesses.

In one embodiment, a proxy circuit 2525 communicatively couples graphics acceleration module 2546 to coherence bus 2564, allowing graphics acceleration module 2546 to participate in a cache coherence protocol as a peer of cores 2560A-2560D. In particular, an interface 2535 provides connectivity to proxy circuit 2525 over high-speed link 2540 (e.g., a PCIe bus, NVLink, etc.) and an interface 2537 connects graphics acceleration module 2546 to link 2540.

In one implementation, an accelerator integration circuit 2536 provides cache management, memory access, context management, and interrupt management services on behalf of a plurality of graphics processing engines 2531, 2532, N of graphics acceleration module 2546. Graphics processing engines 2531, 2532, N may each comprise a separate graphics processing unit (GPU). Alternatively, graphics processing engines 2531, 2532, N may comprise different types of graphics processing engines within a GPU such as graphics execution units, media processing engines (e.g., video encoders/decoders), samplers, and blit engines. In at least one embodiment, graphics acceleration module 2546 may be a GPU with a plurality of graphics processing engines 2531-2532, N or graphics processing engines 2531-2532, N may be individual GPUs integrated on a common package, line card, or chip.

In one embodiment, accelerator integration circuit 2536 includes a memory management unit (MMU) 2539 for performing various memory management functions such as virtual-to-physical memory translations (also referred to as effective-to-real memory translations) and memory access protocols for accessing system memory 2514. MMU 2539 may also include a translation lookaside buffer (TLB) (not shown) for caching virtual/effective to physical/real address translations. In one implementation, a cache 2538 stores commands and data for efficient access by graphics processing engines 2531-2532, N. In one embodiment, data stored in cache 2538 and graphics memories 2533-2534, M is kept coherent with core caches 2562A-2562D, 2556 and system memory 2514. As mentioned, this may be accomplished via proxy circuit 2525 on behalf of cache 2538 and memories 2533-2534, M (e.g., sending updates to cache 2538 related to modifications/accesses of cache lines on processor caches 2562A-2562D, 2556 and receiving updates from cache 2538).

A set of registers 2545 store context data for threads executed by graphics processing engines 2531-2532, N and a context management circuit 2548 manages thread contexts. For example, context management circuit 2548 may perform save and restore operations to save and restore contexts of various threads during contexts switches (e.g., where a first thread is saved and a second thread is stored so that a second thread can be execute by a graphics processing engine). For example, on a context switch, context management circuit 2548 may store current register values to a designated region in memory (e.g., identified by a context pointer). It may then restore register values when returning to a context. In one embodiment, an interrupt management circuit 2547 receives and processes interrupts received from system devices.

In one implementation, virtual/effective addresses from a graphics processing engine 2531 are translated to real/physical addresses in system memory 2514 by MMU 2539. One embodiment of accelerator integration circuit 2536 supports multiple (e.g., 4, 8, 16) graphics accelerator modules 2546 and/or other accelerator devices. Graphics accelerator module 2546 may be dedicated to a single application executed on processor 2507 or may be shared between multiple applications. In one embodiment, a virtualized graphics execution environment is presented in which resources of graphics processing engines 2531-2532, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2536 performs as a bridge to a system for graphics acceleration module 2546 and provides address translation and system memory cache services. In addition, accelerator integration circuit 2536 may provide virtualization facilities for a host processor to manage virtualization of graphics processing engines 2531-2532, interrupts, and memory management.

Because hardware resources of graphics processing engines 2531-2532, N are mapped explicitly to a real address space seen by host processor 2507, any host processor can address these resources directly using an effective address value. One function of accelerator integration circuit 2536, in one embodiment, is physical separation of graphics processing engines 2531-2532, N so that they appear to a system as independent units.

In at least one embodiment, one or more graphics memories 2533-2534, M are coupled to each of graphics processing engines 2531-2532, N, respectively. Graphics memories 2533-2534, M store instructions and data being processed by each of graphics processing engines 2531-2532, N. Graphics memories 2533-2534, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2540, biasing techniques are used to ensure that data stored in graphics memories 2533-2534, M is data which will be used most frequently by graphics processing engines 2531-2532, N and preferably not used by cores 2560A-2560D (at least not frequently). Similarly, a biasing mechanism attempts to keep data needed by cores (and preferably not graphics processing engines 2531-2532, N) within caches 2562A-2562D, 2556 of cores and system memory 2514.

Figure 25C:
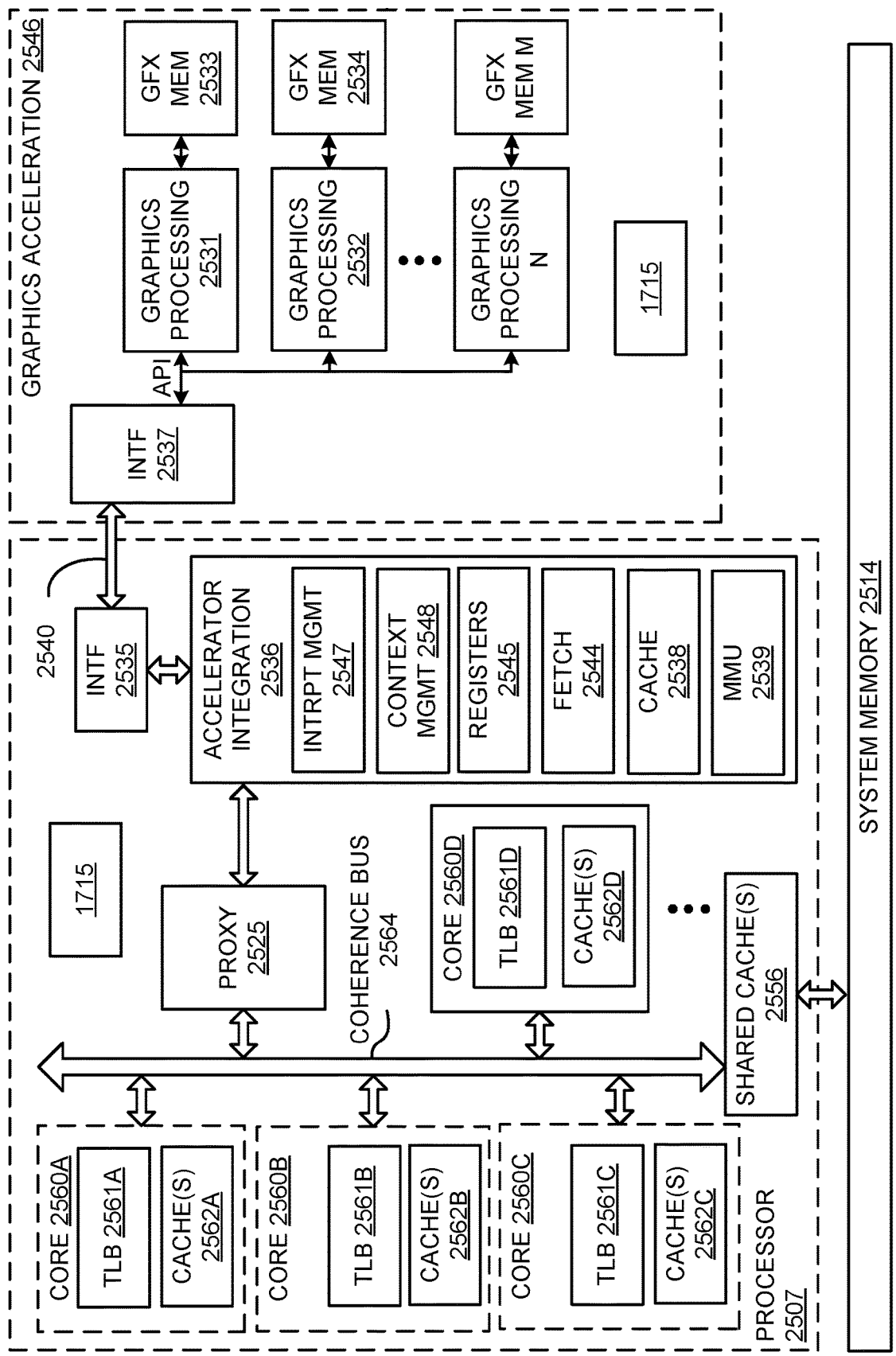
FIG. 25C illustrates a computer system, according to at least one embodiment.

FIG. 25C illustrates another exemplary embodiment in which accelerator integration circuit 2536 is integrated within processor 2507. In this embodiment, graphics processing engines 2531-2532, N communicate directly over high-speed link 2540 to accelerator integration circuit 2536 via interface 2537 and interface 2535 (which, again, may be utilize any form of bus or interface protocol). Accelerator integration circuit 2536 may perform same operations as those described with respect to FIG. 25B, but potentially at a higher throughput given its close proximity to coherence bus 2564 and caches 2562A-2562D, 2556. One embodiment supports different programming models including a dedicated-process programming model (no graphics acceleration module virtualization) and shared programming models (with virtualization), which may include programming models which are controlled by accelerator integration circuit 2536 and programming models which are controlled by graphics acceleration module 2546.

In at least one embodiment, graphics processing engines 2531-2532, N are dedicated to a single application or process under a single operating system. In at least one embodiment, a single application can funnel other application requests to graphics processing engines 2531-2532, N, providing virtualization within a VM/partition.

In at least one embodiment, graphics processing engines 2531-2532, N, may be shared by multiple VM/application partitions. In at least one embodiment, shared models may use a system hypervisor to virtualize graphics processing engines 2531-2532, N to allow access by each operating system. For single-partition systems without a hypervisor, graphics processing engines 2531-2532, N are owned by an operating system. In at least one embodiment, an operating system can virtualize graphics processing engines 2531-2532, N to provide access to each process or application.

In at least one embodiment, graphics acceleration module 2546 or an individual graphics processing engine 2531-2532, N selects a process element using a process handle. In one embodiment, process elements are stored in system memory 2514 and are addressable using an effective address to real address translation techniques described herein. In at least one embodiment, a process handle may be an implementation-specific value provided to a host process when registering its context with graphics processing engine 2531-2532, N (that is, calling system software to add a process element to a process element linked list). In at least one embodiment, a lower 16-bits of a process handle may be an offset of process element within a process element linked list.

Figure 25D:
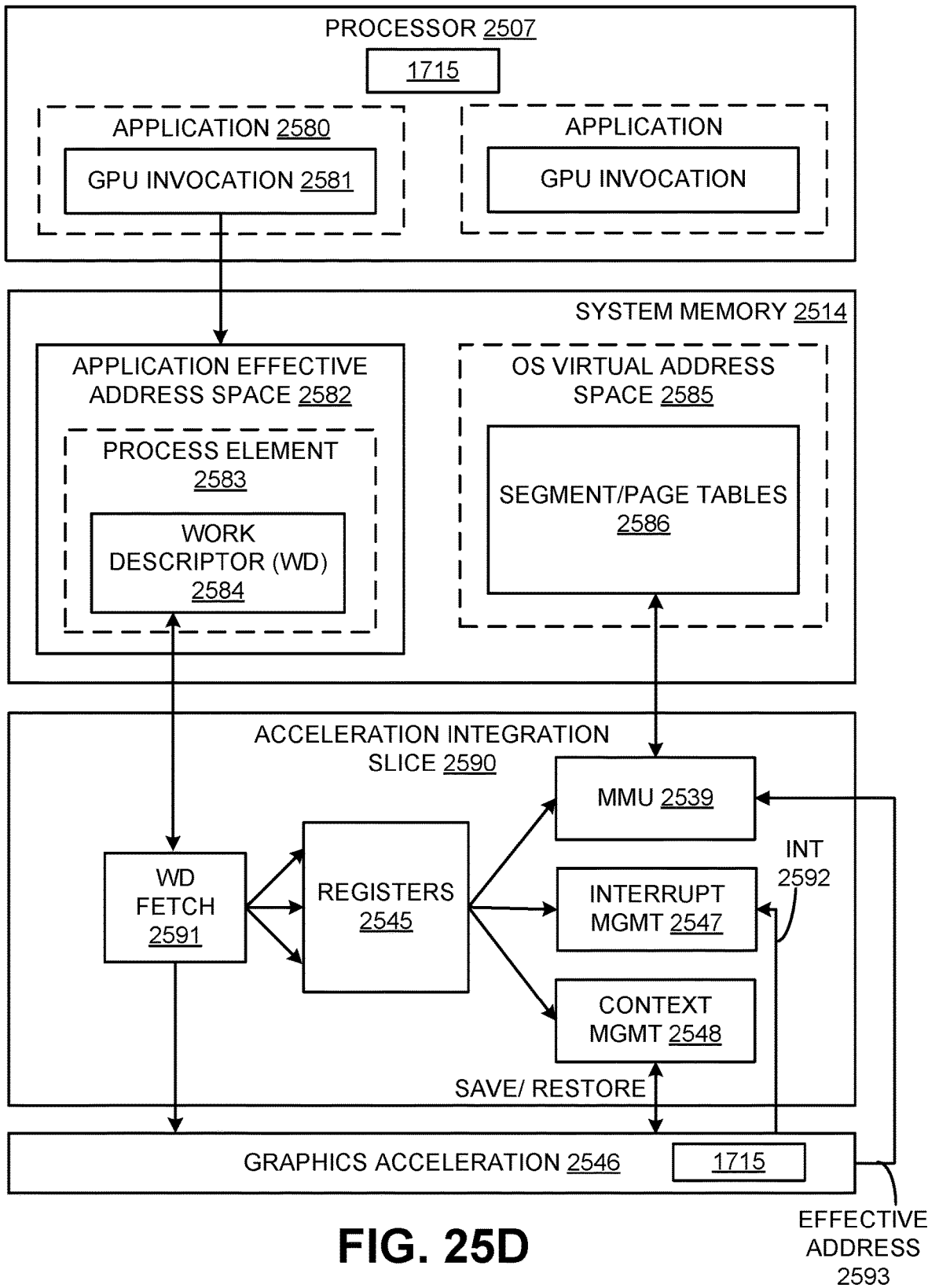
FIG. 25D illustrates a computer system, according to at least one embodiment.

FIG. 25D illustrates an exemplary accelerator integration slice 2590. As used herein, a "slice" comprises a specified portion of processing resources of accelerator integration circuit 2536. Application effective address space 2582 within system memory 2514 stores process elements 2583. In one embodiment, process elements 2583 are stored in response to GPU invocations 2581 from applications 2580 executed on processor 2507. A process element 2583 contains process state for corresponding application 2580. A work descriptor (WD) 2584 contained in process element 2583 can be a single job requested by an application or may contain a pointer to a queue of jobs. In at least one embodiment, WD 2584 is a pointer to a job request queue in an application's address space 2582.

Graphics acceleration module 2546 and/or individual graphics processing engines 2531-2532, N can be shared by all or a subset of processes in a system. In at least one embodiment, an infrastructure for setting up process state and sending a WD 2584 to a graphics acceleration module 2546 to start a job in a virtualized environment may be included.

In at least one embodiment, a dedicated-process programming model is implementation-specific. In this model, a single process owns graphics acceleration module 2546 or an individual graphics processing engine 2531. Because graphics acceleration module 2546 is owned by a single process, a hypervisor initializes accelerator integration circuit 2536 for an owning partition and an operating system initializes accelerator integration circuit 2536 for an owning process when graphics acceleration module 2546 is assigned.

In operation, a WD fetch unit 2591 in accelerator integration slice 2590 fetches next WD 2584 which includes an indication of work to be done by one or more graphics processing engines of graphics acceleration module 2546. Data from WD 2584 may be stored in registers 2545 and used by MMU 2539, interrupt management circuit 2547 and/or context management circuit 2548 as illustrated. For example, one embodiment of MMU 2539 includes segment/page walk circuitry for accessing segment/page tables 2586 within OS virtual address space 2585. Interrupt management circuit 2547 may process interrupt events 2592 received from graphics acceleration module 2546. When performing graphics operations, an effective address 2593 generated by a graphics processing engine 2531-2532, N is translated to a real address by MMU 2539.

In one embodiment, a same set of registers 2545 are duplicated for each graphics processing engine 2531-2532, N and/or graphics acceleration module 2546 and may be initialized by a hypervisor or operating system. Each of these duplicated registers may be included in an accelerator integration slice 2590. Exemplary registers that may be initialized by a hypervisor are shown in Table 1.

TABLE 1

Hypervisor Initialized Registers

1   Slice Control Register
2   Real Address (RA) Scheduled Processes Area Pointer
3   Authority Mask Override Register
4   Interrupt Vector Table Entry Offset
5   Interrupt Vector Table Entry Limit
6   State Register
7   Logical Partition ID
8   Real address (RA) Hypervisor Accelerator Utilization Record Pointer
9   Storage Description Register Exemplary registers that may be initialized by an operating system are shown in Table 2.

TABLE 2

Operating System Initialized Registers

1   Process and Thread Identification
2   Effective Address (EA) Context Save/Restore Pointer
3   Virtual Address (VA) Accelerator Utilization Record Pointer
4   Virtual Address (VA) Storage Segment Table Pointer
5   Authority Mask
6   Work descriptor In one embodiment, each WD 2584 is specific to a particular graphics acceleration module 2546 and/or graphics processing engines 2531-2532, N. It contains all information required by a graphics processing engine 2531-2532, N to do work or it can be a pointer to a memory location where an application has set up a command queue of work to be completed.

Figure 25E:
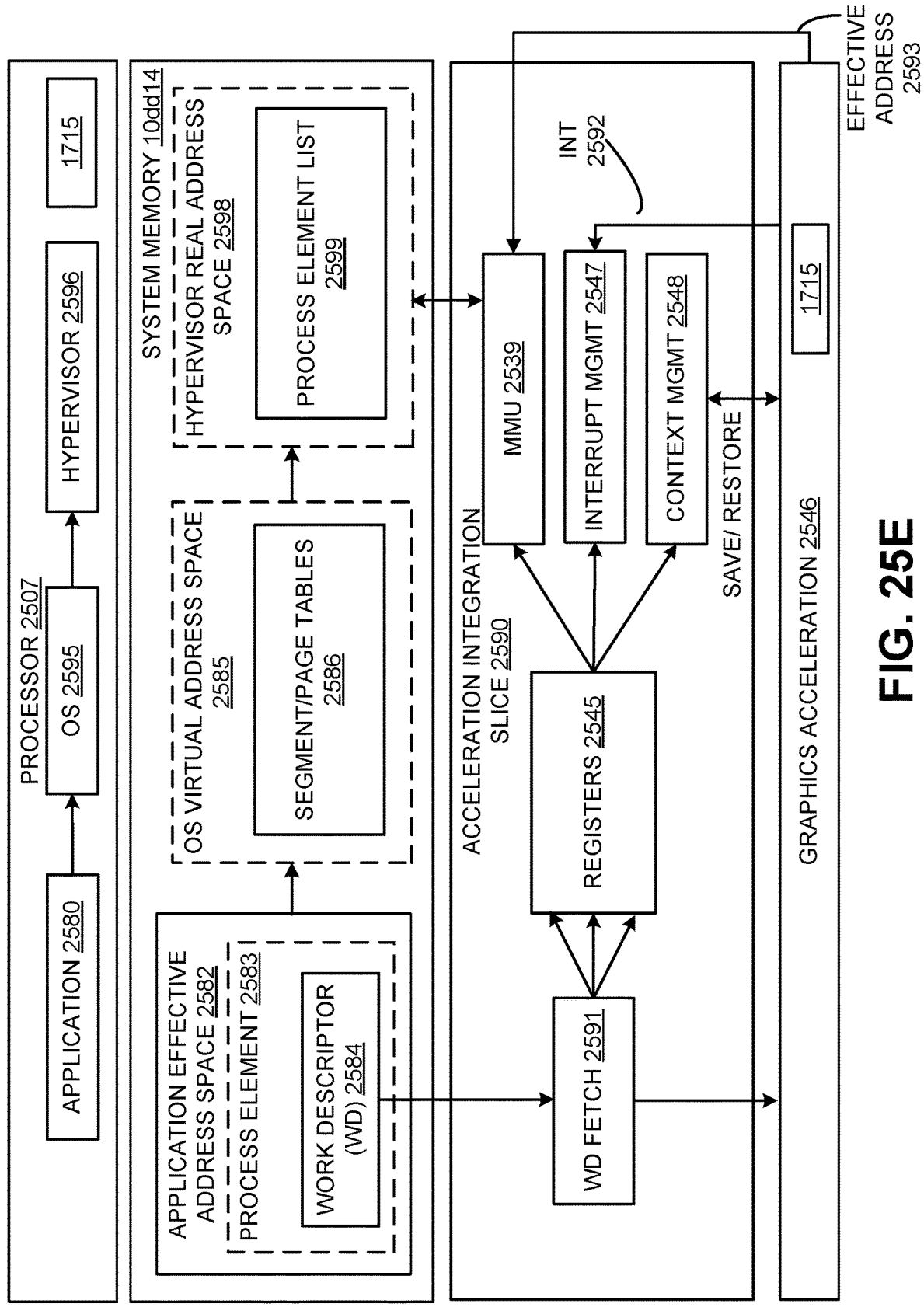
FIGS. 25E and 25F illustrate a shared programming model, according to at least one embodiment.

FIG. 25E illustrates additional details for one exemplary embodiment of a shared model. This embodiment includes a hypervisor real address space 2598 in which a process element list 2599 is stored. Hypervisor real address space 2598 is accessible via a hypervisor 2596 which virtualizes graphics acceleration module engines for operating system 2595.

In at least one embodiment, shared programming models allow for all or a subset of processes from all or a subset of partitions in a system to use a graphics acceleration module 2546. There are two programming models where graphics acceleration module 2546 is shared by multiple processes and partitions: time-sliced shared and graphics directed shared.

In this model, system hypervisor 2596 owns graphics acceleration module 2546 and makes its function available to all operating systems 2595. For a graphics acceleration module 2546 to support virtualization by system hypervisor 2596, graphics acceleration module 2546 may adhere to following: 1) An application's job request must be autonomous (that is, state does not need to be maintained between jobs), or graphics acceleration module 2546 must provide a context save and restore mechanism. 2) An application's job request is guaranteed by graphics acceleration module 2546 to complete in a specified amount of time, including any translation faults, or graphics acceleration module 2546 provides an ability to preempt processing of a job. 3) Graphics acceleration module 2546 must be guaranteed fairness between processes when operating in a directed shared programming model.

In at least one embodiment, application 2580 is required to make an operating system 2595 system call with a graphics acceleration module 2546 type, a work descriptor (WD), an authority mask register (AMR) value, and a context save/restore area pointer (CSRP). In at least one embodiment, graphics acceleration module 2546 type describes a targeted acceleration function for a system call. In at least one embodiment, graphics acceleration module 2546 type may be a system-specific value. In at least one embodiment, WD is formatted specifically for graphics acceleration module 2546 and can be in a form of a graphics acceleration module 2546 command, an effective address pointer to a user-defined structure, an effective address pointer to a queue of commands, or any other data structure to describe work to be done by graphics acceleration module 2546. In one embodiment, an AMR value is an AMR state to use for a current process. In at least one embodiment, a value passed to an operating system is similar to an application setting an AMR. If accelerator integration circuit 2536 and graphics acceleration module 2546 implementations do not support a User Authority Mask Override Register (UAMOR), an operating system may apply a current UAMOR value to an AMR value before passing an AMR in a hypervisor call. Hypervisor 2596 may optionally apply a current Authority Mask Override Register (AMOR) value before placing an AMR into process element 2583. In at least one embodiment, CSRP is one of registers 2545 containing an effective address of an area in an application's address space 2582 for graphics acceleration module 2546 to save and restore context state. This pointer is optional if no state is required to be saved between jobs or when a job is preempted. In at least one embodiment, context save/restore area may be pinned system memory.

Upon receiving a system call, operating system 2595 may verify that application 2580 has registered and been given authority to use graphics acceleration module 2546. Operating system 2595 then calls hypervisor 2596 with information shown in Table 3.

TABLE 3

OS to Hypervisor Call Parameters

| | |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 2596 verifies that operating system 2595 has registered and been given authority to use graphics acceleration module 2546. Hypervisor 2596 then puts process element 2583 into a process element linked list for a corresponding graphics acceleration module 2546 type. A process element may include information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2590 registers 2545.

Figure 25F:
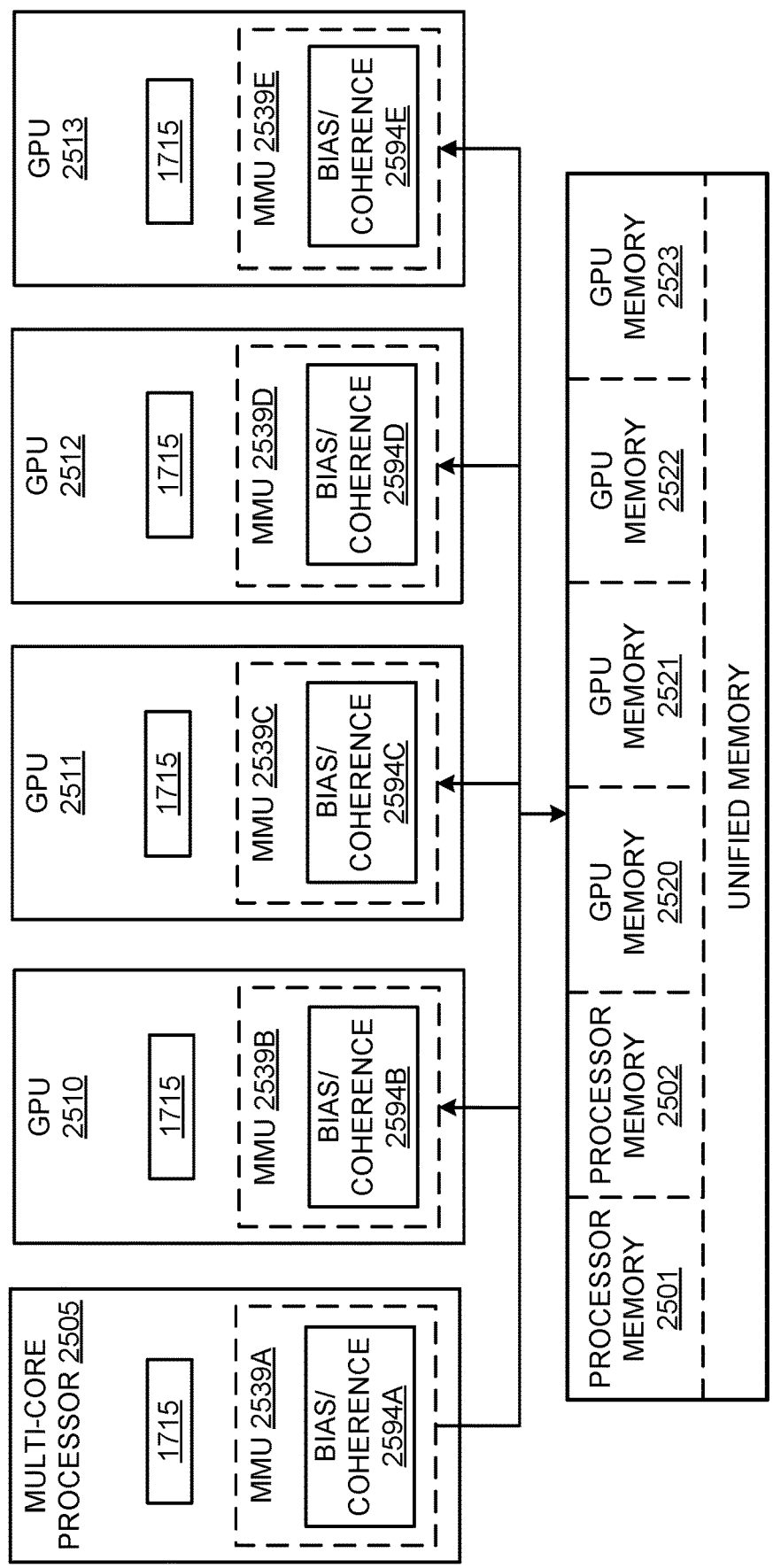

As illustrated in FIG. 25F, in at least one embodiment, a unified memory is used, addressable via a common virtual memory address space used to access physical processor memories 2501-2502 and GPU memories 2520-2523. In this implementation, operations executed on GPUs 2510-2513 utilize a same virtual/effective memory address space to access processor memories 2501-2502 and vice versa, thereby simplifying programmability. In one embodiment, a first portion of a virtual/effective address space is allocated to processor memory 2501, a second portion to second processor memory 2502, a third portion to GPU memory 2520, and so on. In at least one embodiment, an entire virtual/effective memory space (sometimes referred to as an effective address space) is thereby distributed across each of processor memories 2501-2502 and GPU memories 2520-2523, allowing any processor or GPU to access any physical memory with a virtual address mapped to that memory.

In one embodiment, bias/coherence management circuitry 2594A-2594E within one or more of MMUs 2539A-2539E ensures cache coherence between caches of one or more host processors (e.g., 2505) and GPUs 2510-2513 and implements biasing techniques indicating physical memories in which certain types of data should be stored. While multiple instances of bias/coherence management circuitry 2594A-2594E are illustrated in FIG. 25F, bias/coherence circuitry may be implemented within an MMU of one or more host processors 2505 and/or within accelerator integration circuit 2536.

One embodiment allows GPU-attached memory 2520-2523 to be mapped as part of system memory, and accessed using shared virtual memory (SVM) technology, but without suffering performance drawbacks associated with full system cache coherence. In at least one embodiment, an ability for GPU-attached memory 2520-2523 to be accessed as system memory without onerous cache coherence overhead provides a beneficial operating environment for GPU offload. This arrangement allows host processor 2505 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2520-2523 without cache coherence overheads can be critical to execution time of an offloaded computation. In cases with substantial streaming write memory traffic, for example, cache coherence overhead can significantly reduce an effective write bandwidth seen by a GPU 2510-2513. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2520-2523, with or without a bias cache in GPU 2510-2513 (e.g., to cache frequently/recently used entries of a bias table). Alternatively, an entire bias table may be maintained within a GPU.

In at least one embodiment, a bias table entry associated with each access to GPU-attached memory 2520-2523 is accessed prior to actual access to a GPU memory, causing following operations. First, local requests from GPU 2510-2513 that find their page in GPU bias are forwarded directly to a corresponding GPU memory 2520-2523. Local requests from a GPU that find their page in host bias are forwarded to processor 2505 (e.g., over a high-speed link as discussed above). In one embodiment, requests from processor 2505 that find a requested page in host processor bias complete a request like a normal memory read. Alternatively, requests directed to a GPU-biased page may be forwarded to GPU 2510-2513. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2505 bias to GPU bias, but is not for an opposite transition.

In one embodiment, cache coherency is maintained by temporarily rendering GPU-biased pages uncacheable by host processor 2505. To access these pages, processor 2505 may request access from GPU 2510 which may or may not grant access right away. Thus, to reduce communication between processor 2505 and GPU 2510 it is beneficial to ensure that GPU-biased pages are those which are required by a GPU but not host processor 2505 and vice versa.

Hardware structure(s) 1715 are used to perform one or more embodiments. Details regarding hardware structure(x) 1715 are provided herein in conjunction with FIGS. 17A and/or 17B.

Figure 26:
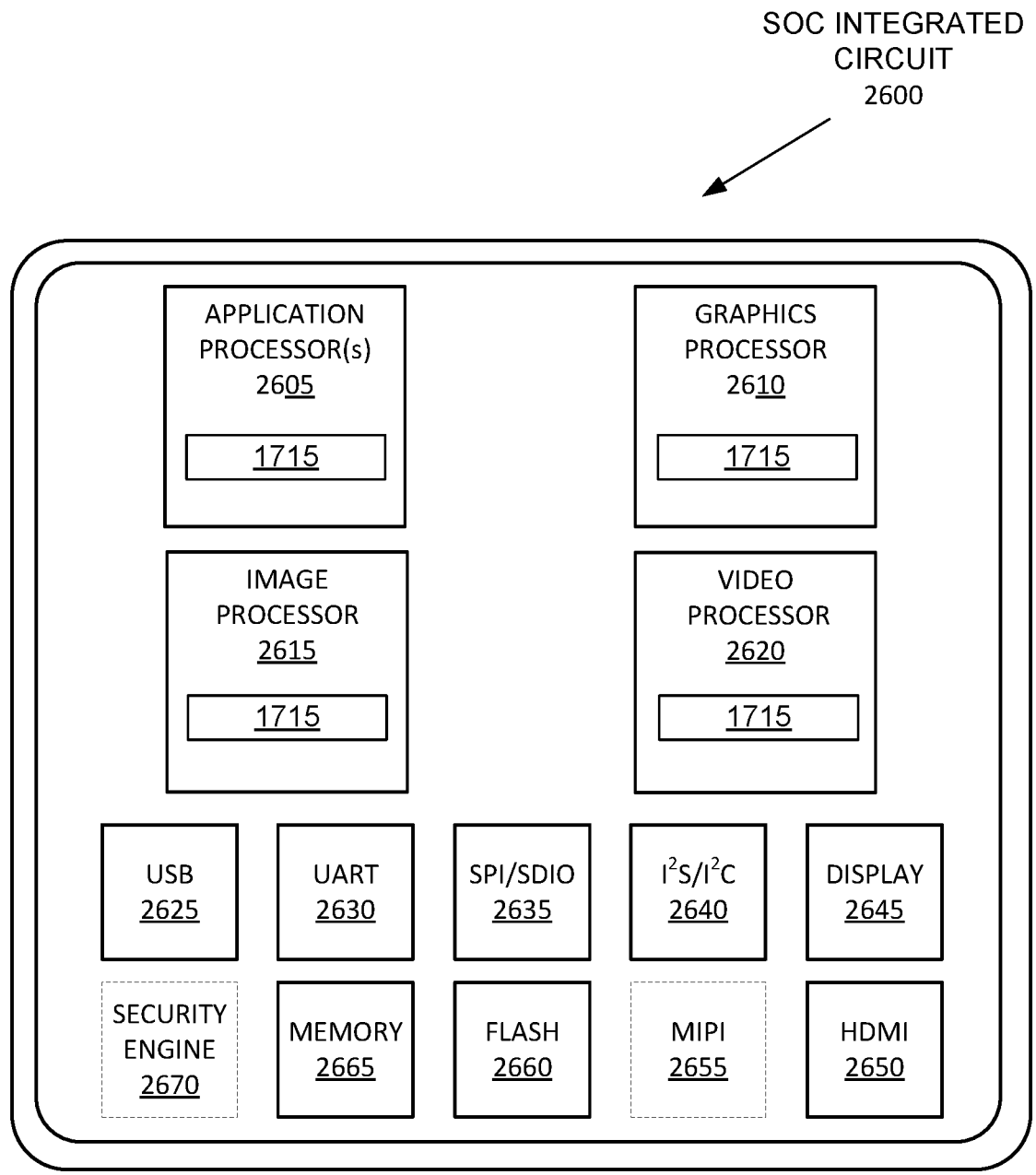
FIG. 26 illustrates exemplary integrated circuits and associated graphics processors, according to at least one embodiment.

FIG. 26 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 26 is a block diagram illustrating an exemplary system on a chip integrated circuit 2600 that may be fabricated using one or more IP cores, according to at least one embodiment. In at least one embodiment, integrated circuit 2600 includes one or more application processor(s) 2605 (e.g., CPUs), at least one graphics processor 2610, and may additionally include an image processor 2615 and/or a video processor 2620, any of which may be a modular IP core. In at least one embodiment, integrated circuit 2600 includes peripheral or bus logic including a USB controller 2625, UART controller 2630, an SPI/SDIO controller 2635, and an $I.^2S/I.^2C$ controller 2640. In at least one embodiment, integrated circuit 2600 can include a display device 2645 coupled to one or more of a high-definition multimedia interface (HDMI) controller 2650 and a mobile industry processor interface (MIPI) display interface 2655. In at least one embodiment, storage may be provided by a flash memory subsystem 2660 including flash memory and a flash memory controller. In at least one embodiment, memory interface may be provided via a memory controller 2665 for access to SDRAM or SRAM memory devices. In at least one embodiment, some integrated circuits additionally include an embedded security engine 2670.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in integrated circuit 2600 for inferencing or predicting operations based, at least in part, on weight parameters calculated using neural network training operations, neural network functions and/or architectures, or neural network use cases described herein.

Figure 27A:
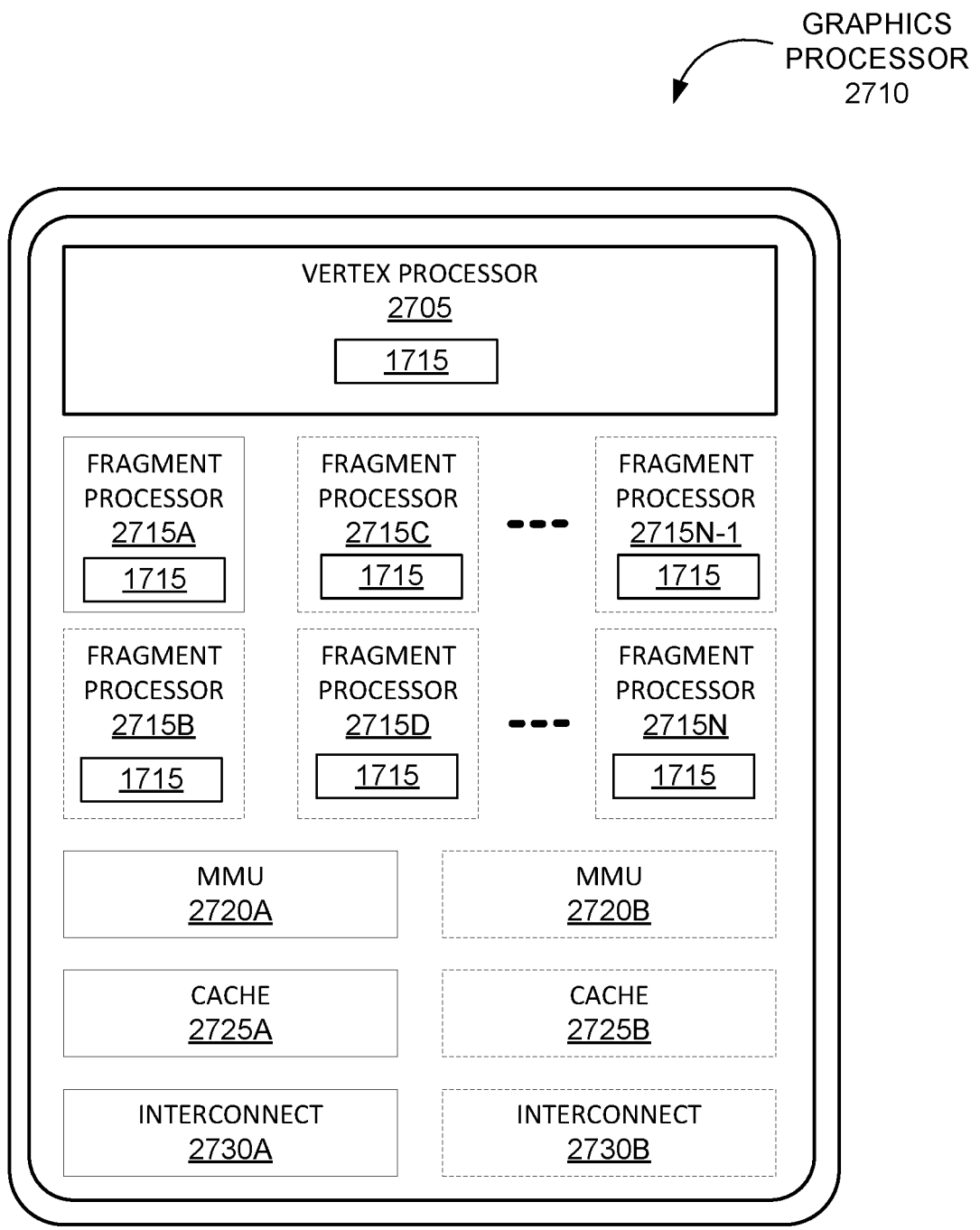
FIGS. 27A and 27B illustrate exemplary integrated circuits and associated graphics processors, according to at least one embodiment.
Figure 27B:
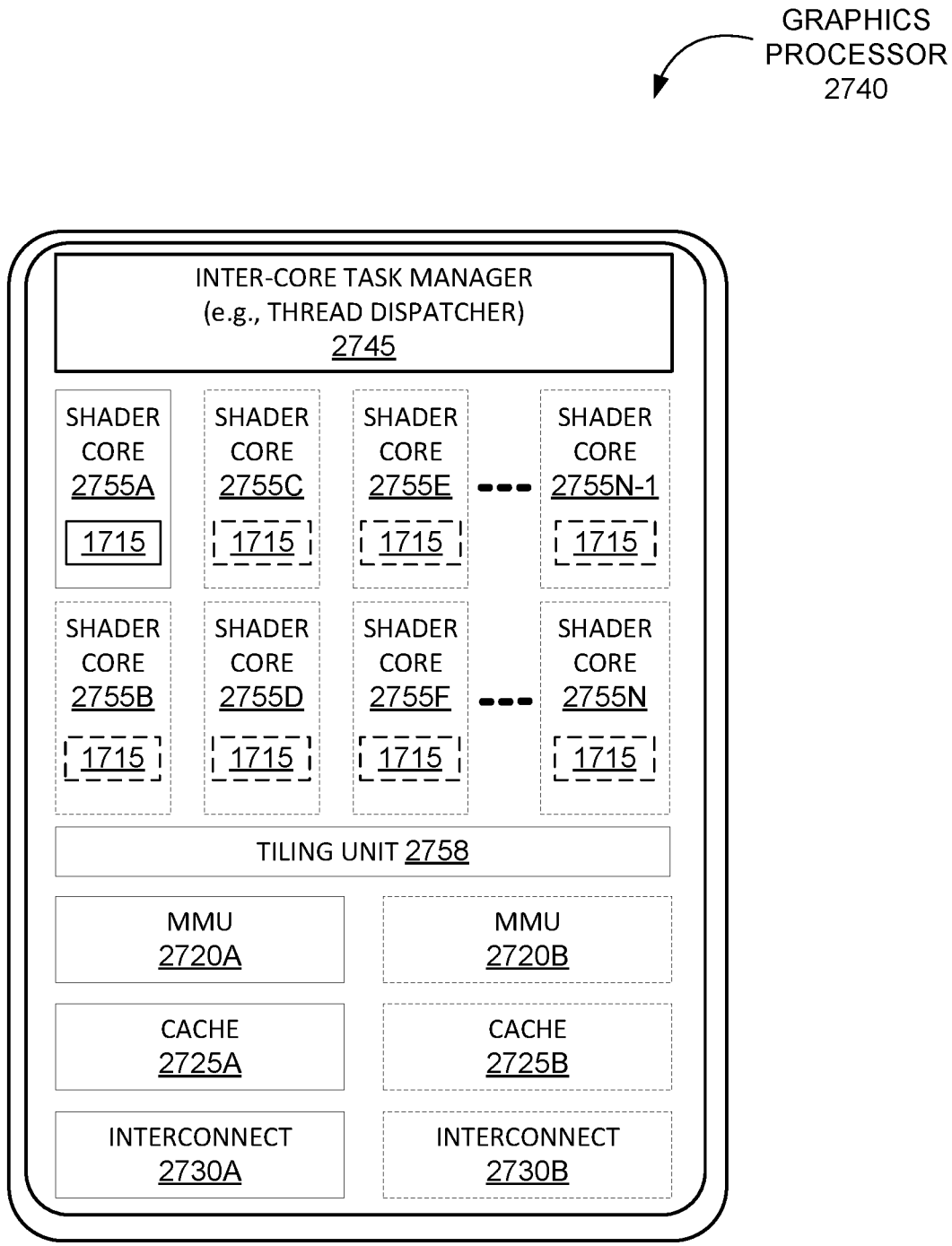

FIGS. 27A and 27B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 27A and 27B are block diagrams illustrating exemplary graphics processors for use within an SoC, according to embodiments described herein. FIG. 27A illustrates an exemplary graphics processor 2710 of a system on a chip integrated circuit that may be fabricated using one or more IP cores, according to at least one embodiment. FIG. 27B illustrates an additional exemplary graphics processor 2740 of a system on a chip integrated circuit that may be fabricated using one or more IP cores, according to at least one embodiment. In at least one embodiment, graphics processor 2710 of FIG. 27A is a low power graphics processor core. In at least one embodiment, graphics processor 2740 of FIG. 27B is a higher performance graphics processor core. In at least one embodiment, each of graphics processors 2710, 2740 can be variants of graphics processor 2610 of FIG. 26.

In at least one embodiment, graphics processor 2710 includes a vertex processor 2705 and one or more fragment processor(s) 2715A-2715N (e.g., 2715A, 2715B, 2715C, 2715D, through 2715N-1, and 2715N). In at least one embodiment, graphics processor 2710 can execute different shader programs via separate logic, such that vertex processor 2705 is optimized to execute operations for vertex shader programs, while one or more fragment processor(s) 2715A-2715N execute fragment (e.g., pixel) shading operations for fragment or pixel shader programs. In at least one embodiment, vertex processor 2705 performs a vertex processing stage of a 3D graphics pipeline and generates primitives and vertex data. In at least one embodiment, fragment processor(s) 2715A-2715N use primitive and vertex data generated by vertex processor 2705 to produce a framebuffer that is displayed on a display device. In at least one embodiment, fragment processor(s) 2715A-2715N are optimized to execute fragment shader programs as provided for in an OpenGL API, which may be used to perform similar operations as a pixel shader program as provided for in a Direct 3D API.

In at least one embodiment, graphics processor 2710 additionally includes one or more memory management units (MMUs) 2720A-2720B, cache(s) 2725A-2725B, and circuit interconnect(s) 2730A-2730B. In at least one embodiment, one or more MMU(s) 2720A-2720B provide for virtual to physical address mapping for graphics processor 2710, including for vertex processor 2705 and/or fragment processor(s) 2715A-2715N, which may reference vertex or image/texture data stored in memory, in addition to vertex or image/texture data stored in one or more cache(s) 2725A-2725B. In at least one embodiment, one or more MMU(s) 2720A-2720B may be synchronized with other MMUs within system, including one or more MMUs associated with one or more application processor(s) 2605, image processors 2615, and/or video processors 2620 of FIG. 26, such that each processor 2605-2620 can participate in a shared or unified virtual memory system. In at least one embodiment, one or more circuit interconnect(s) 2730A-2730B enable graphics processor 2710 to interface with other IP cores within SoC, either via an internal bus of SoC or via a direct connection.

In at least one embodiment, graphics processor 2740 includes one or more MMU(s) 2720A-2720B, caches 2725A-2725B, and circuit interconnects 2730A-2730B of graphics processor 2710 of FIG. 27A. In at least one embodiment, graphics processor 2740 includes one or more shader core(s) 2755A-2755N (e.g., 2755A, 2755B, 2755C, 2755D, 2755E, 2755F, through 2755N-1, and 2755N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2740 includes an inter-core task manager 2745, which acts as a thread dispatcher to dispatch execution threads to one or more shader cores 2755A-2755N and a tiling unit 2758 to accelerate tiling operations for tile-based rendering, in which rendering operations for a scene are subdivided in image space, for example to exploit local spatial coherence within a scene or to optimize use of internal caches.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in integrated circuit 27A and/or 27B for inferencing or predicting operations based, at least in part, on weight parameters calculated using neural network training operations, neural network functions and/or architectures, or neural network use cases described herein.

Figure 28A:
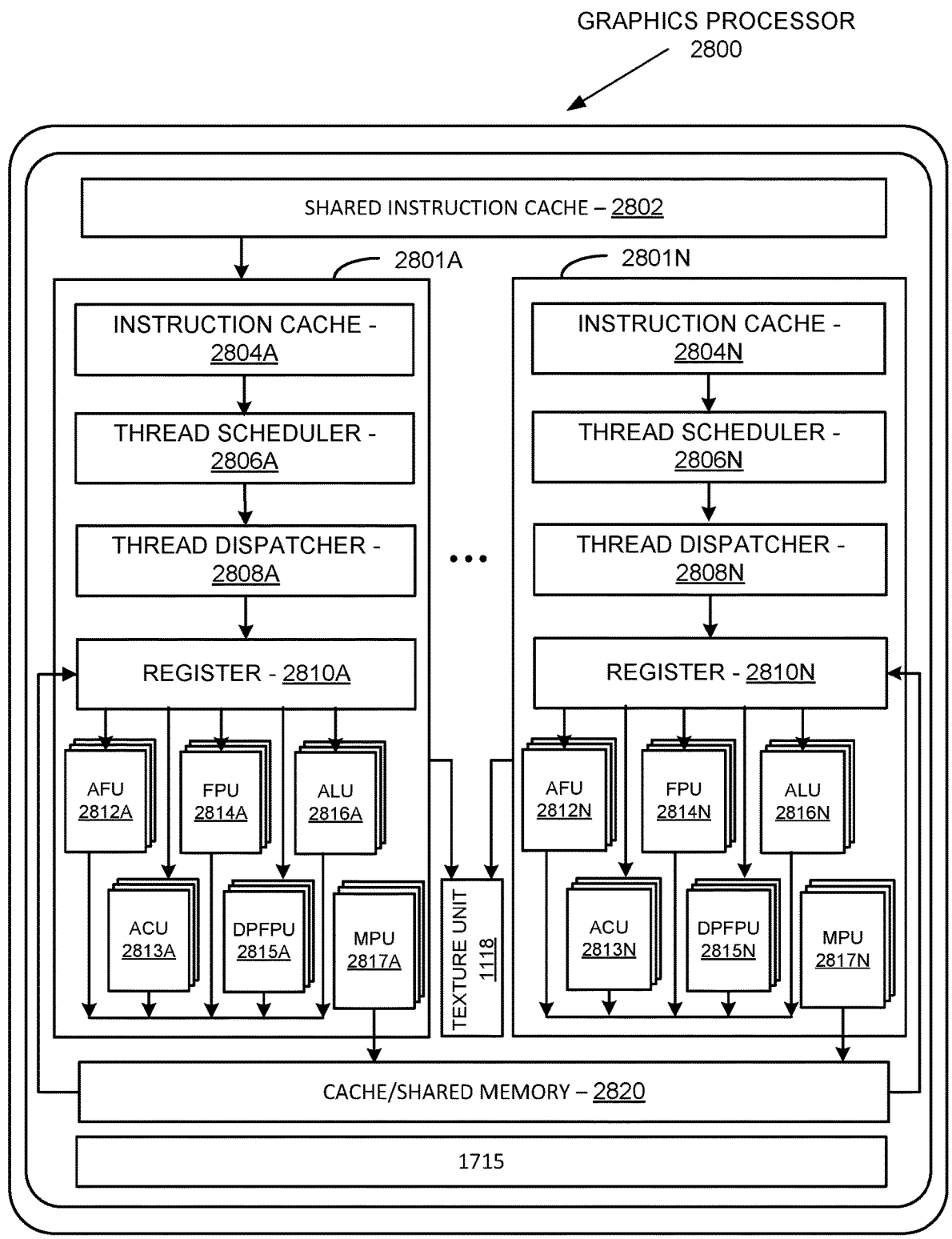
FIGS. 28A and 28B illustrate additional exemplary graphics processor logic according to at least one embodiment.
Figure 28B:
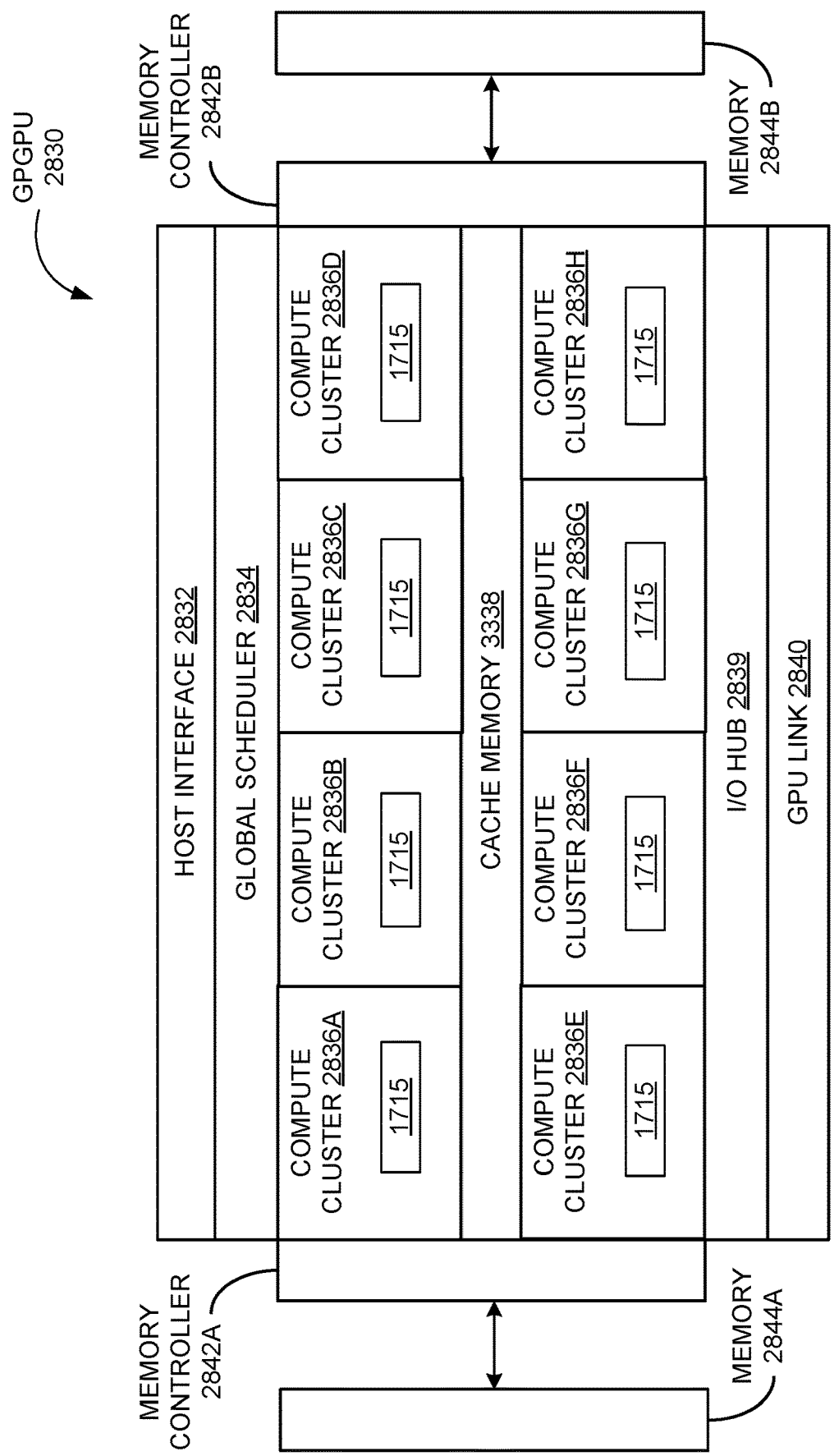

FIGS. 28A and 28B illustrate additional exemplary graphics processor logic according to embodiments described herein. FIG. 28A illustrates a graphics core 2800 that may be included within graphics processor 2610 of FIG. 26, in at least one embodiment, and may be a unified shader core 2755A-2755N as in FIG. 27B in at least one embodiment. FIG. 28B illustrates a highly-parallel general-purpose graphics processing unit 2830 suitable for deployment on a multi-chip module in at least one embodiment.

In at least one embodiment, graphics core 2800 includes a shared instruction cache 2802, a texture unit 2818, and a cache/shared memory 2820 that are common to execution resources within graphics core 2800. In at least one embodiment, graphics core 2800 can include multiple slices 2801A-2801N or partition for each core, and a graphics processor can include multiple instances of graphics core 2800. Slices 2801A-2801N can include support logic including a local instruction cache 2804A-2804N, a thread scheduler 2806A-2806N, a thread dispatcher 2808A-2808N, and a set of registers 2810A-2810N. In at least one embodiment, slices 2801A-2801N can include a set of additional function units (AFUs 2812A-2812N), floating-point units (FPU 2814A-2814N), integer arithmetic logic units (ALUs 2816-2816N), address computational units (ACU 2813A-2813N), double-precision floating-point units (DPFPU 2815A-2815N), and matrix processing units (MPU 2817A-2817N).

In at least one embodiment, FPUs 2814A-2814N can perform single-precision (32-bit) and half-precision (16-bit) floating point operations, while DPFPUs 2815A-2815N perform double precision (64-bit) floating point operations. In at least one embodiment, ALUs 2816A-2816N can perform variable precision integer operations at 8-bit, 16-bit, and 32-bit precision, and can be configured for mixed precision operations. In at least one embodiment, MPUs 2817A-2817N can also be configured for mixed precision matrix operations, including half-precision floating point and 8-bit integer operations. In at least one embodiment, MPUs 2817-2817N can perform a variety of matrix operations to accelerate machine learning application frameworks, including enabling support for accelerated general matrix to matrix multiplication (GEMM). In at least one embodiment, AFUs 2812A-2812N can perform additional logic operations not supported by floating-point or integer units, including trigonometric operations (e.g., Sine, Cosine, etc.).

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in graphics core 2800 for inferencing or predicting operations based, at least in part, on weight parameters calculated using neural network training operations, neural network functions and/or architectures, or neural network use cases described herein.

FIG. 28B illustrates a general-purpose processing unit (GPGPU) 2830 that can be configured to enable highly-parallel compute operations to be performed by an array of graphics processing units, in at least one embodiment. In at least one embodiment, GPGPU 2830 can be linked directly to other instances of GPGPU 2830 to create a multi-GPU cluster to improve training speed for deep neural networks. In at least one embodiment, GPGPU 2830 includes a host interface 2832 to enable a connection with a host processor. In at least one embodiment, host interface 2832 is a PCI Express interface. In at least one embodiment, host interface 2832 can be a vendor specific communications interface or communications fabric. In at least one embodiment, GPGPU 2830 receives commands from a host processor and uses a global scheduler 2834 to distribute execution threads associated with those commands to a set of compute clusters 2836A-2836H. In at least one embodiment, compute clusters 2836A-2836H share a cache memory 2838. In at least one embodiment, cache memory 2838 can serve as a higher-level cache for cache memories within compute clusters 2836A-2836H.

In at least one embodiment, GPGPU 2830 includes memory 2844A-2844B coupled with compute clusters 2836A-2836H via a set of memory controllers 2842A-2842B. In at least one embodiment, memory 2844A-2844B can include various types of memory devices including dynamic random access memory (DRAM) or graphics random access memory, such as synchronous graphics random access memory (SGRAM), including graphics double data rate (GDDR) memory.

In at least one embodiment, compute clusters 2836A-2836H each include a set of graphics cores, such as graphics core 2800 of FIG. 28A, which can include multiple types of integer and floating point logic units that can perform computational operations at a range of precisions including suited for machine learning computations. For example, in at least one embodiment, at least a subset of floating point units in each of compute clusters 2836A-2836H can be configured to perform 16-bit or 32-bit floating point operations, while a different subset of floating point units can be configured to perform 64-bit floating point operations.

In at least one embodiment, multiple instances of GPGPU 2830 can be configured to operate as a compute cluster. In at least one embodiment, communication used by compute clusters 2836A-2836H for synchronization and data exchange varies across embodiments. In at least one embodiment, multiple instances of GPGPU 2830 communicate over host interface 2832. In at least one embodiment, GPGPU 2830 includes an I/O hub 2839 that couples GPGPU 2830 with a GPU link 2840 that enables a direct connection to other instances of GPGPU 2830. In at least one embodiment, GPU link 2840 is coupled to a dedicated GPU-to-GPU bridge that enables communication and synchronization between multiple instances of GPGPU 2830. In at least one embodiment GPU link 2840 couples with a high speed interconnect to transmit and receive data to other GPGPUs or parallel processors. In at least one embodiment, multiple instances of GPGPU 2830 are located in separate data processing systems and communicate via a network device that is accessible via host interface 2832. In at least one embodiment GPU link 2840 can be configured to enable a connection to a host processor in addition to or as an alternative to host interface 2832.

In at least one embodiment, GPGPU 2830 can be configured to train neural networks. In at least one embodiment, GPGPU 2830 can be used within a inferencing platform. In at least one embodiment, in which GPGPU 2830 is used for inferencing, GPGPU may include fewer compute clusters 2836A-2836H relative to when GPGPU is used for training a neural network. In at least one embodiment, memory technology associated with memory 2844A-2844B may differ between inferencing and training configurations, with higher bandwidth memory technologies devoted to training configurations. In at least one embodiment, inferencing configuration of GPGPU 2830 can support inferencing specific instructions. For example, in at least one embodiment, an inferencing configuration can provide support for one or more 8-bit integer dot product instructions, which may be used during inferencing operations for deployed neural networks.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in GPGPU 2830 for inferencing or predicting operations based, at least in part, on weight parameters calculated using neural network training operations, neural network functions and/or architectures, or neural network use cases described herein.

Figure 29:
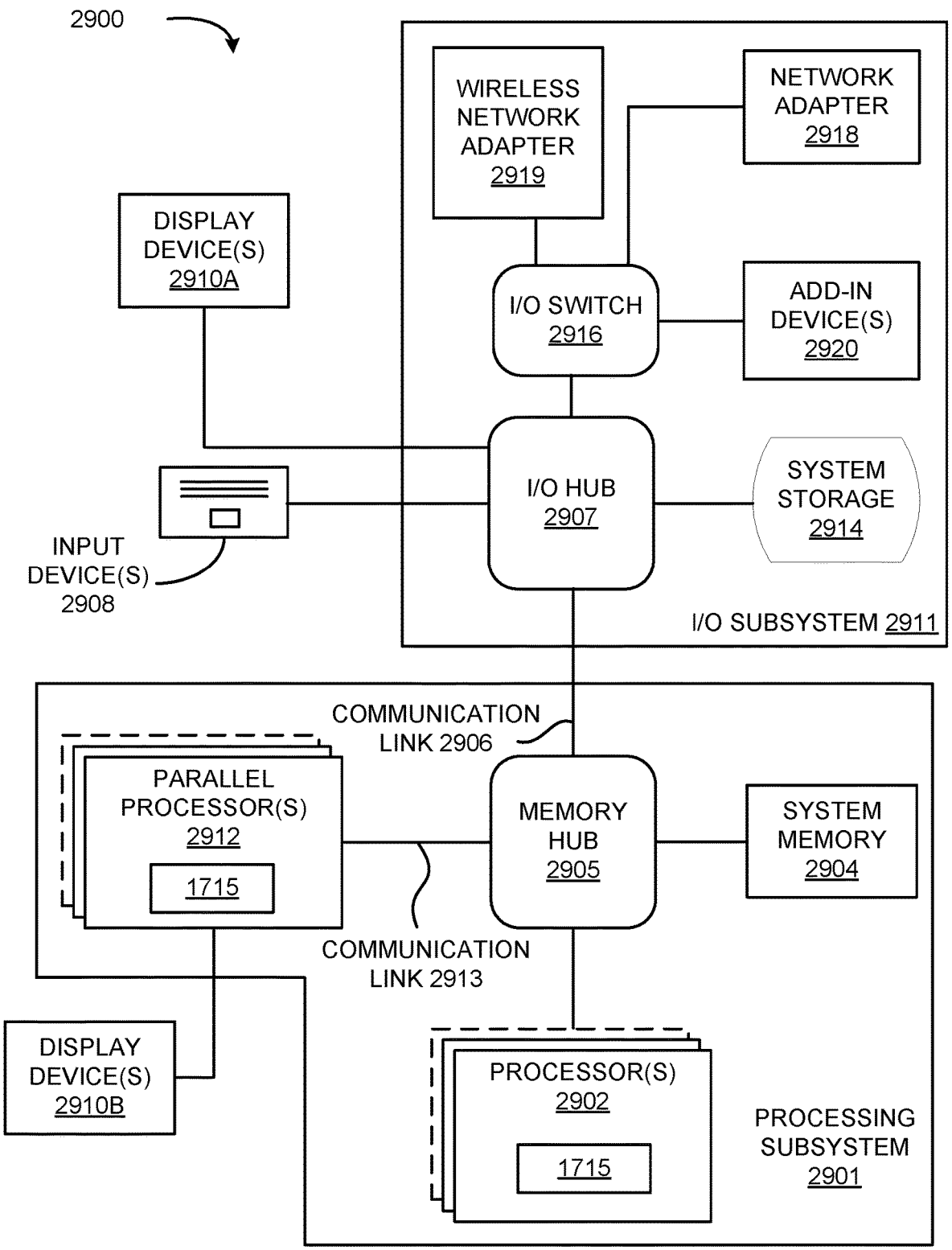
FIG. 29 illustrates a computer system, according to at least one embodiment.

FIG. 29 is a block diagram illustrating a computing system 2900 according to at least one embodiment. In at least one embodiment, computing system 2900 includes a processing subsystem 2901 having one or more processor(s) 2902 and a system memory 2904 communicating via an interconnection path that may include a memory hub 2905. In at least one embodiment, memory hub 2905 may be a separate component within a chipset component or may be integrated within one or more processor(s) 2902. In at least one embodiment, memory hub 2905 couples with an I/O subsystem 2911 via a communication link 2906. In at least one embodiment, I/O subsystem 2911 includes an I/O hub 2907 that can enable computing system 2900 to receive input from one or more input device(s) 2908. In at least one embodiment, I/O hub 2907 can enable a display controller, which may be included in one or more processor(s) 2902, to provide outputs to one or more display device(s) 2910A. In at least one embodiment, one or more display device(s) 2910A coupled with I/O hub 2907 can include a local, internal, or embedded display device.

In at least one embodiment, processing subsystem 2901 includes one or more parallel processor(s) 2912 coupled to memory hub 2905 via a bus or other communication link 2913. In at least one embodiment, communication link 2913 may be one of any number of standards based communication link technologies or protocols, such as, but not limited to PCI Express, or may be a vendor specific communications interface or communications fabric. In at least one embodiment, one or more parallel processor(s) 2912 form a computationally focused parallel or vector processing system that can include a large number of processing cores and/or processing clusters, such as a many integrated core (MIC) processor. In at least one embodiment, one or more parallel processor(s) 2912 form a graphics processing subsystem that can output pixels to one of one or more display device(s) 2910A coupled via I/O Hub 2907. In at least one embodiment, one or more parallel processor(s) 2912 can also include a display controller and display interface (not shown) to enable a direct connection to one or more display device(s) 2910B.

In at least one embodiment, a system storage unit 2914 can connect to I/O hub 2907 to provide a storage mechanism for computing system 2900. In at least one embodiment, an I/O switch 2916 can be used to provide an interface mechanism to enable connections between I/O hub 2907 and other components, such as a network adapter 2918 and/or wireless network adapter 2919 that may be integrated into platform, and various other devices that can be added via one or more add-in device(s) 2920. In at least one embodiment, network adapter 2918 can be an Ethernet adapter or another wired network adapter. In at least one embodiment, wireless network adapter 2919 can include one or more of a Wi-Fi, Bluetooth, near field communication (NFC), or other network device that includes one or more wireless radios.

In at least one embodiment, computing system 2900 can include other components not explicitly shown, including USB or other port connections, optical storage drives, video capture devices, and like, may also be connected to I/O hub 2907. In at least one embodiment, communication paths interconnecting various components in FIG. 29 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2912 incorporate circuitry optimized for graphics and video processing, including, for example, video output circuitry, and constitutes a graphics processing unit (GPU). In at least one embodiment, one or more parallel processor(s) 2912 incorporate circuitry optimized for general purpose processing. In at least embodiment, components of computing system 2900 may be integrated with one or more other system elements on a single integrated circuit. For example, in at least one embodiment, one or more parallel processor(s) 2912, memory hub 2905, processor(s) 2902, and I/O hub 2907 can be integrated into a system on chip (SoC) integrated circuit. In at least one embodiment, components of computing system 2900 can be integrated into a single package to form a system in package (SIP) configuration. In at least one embodiment, at least a portion of components of computing system 2900 can be integrated into a multi-chip module (MCM), which can be interconnected with other multi-chip modules into a modular computing system.

Figure 30A:
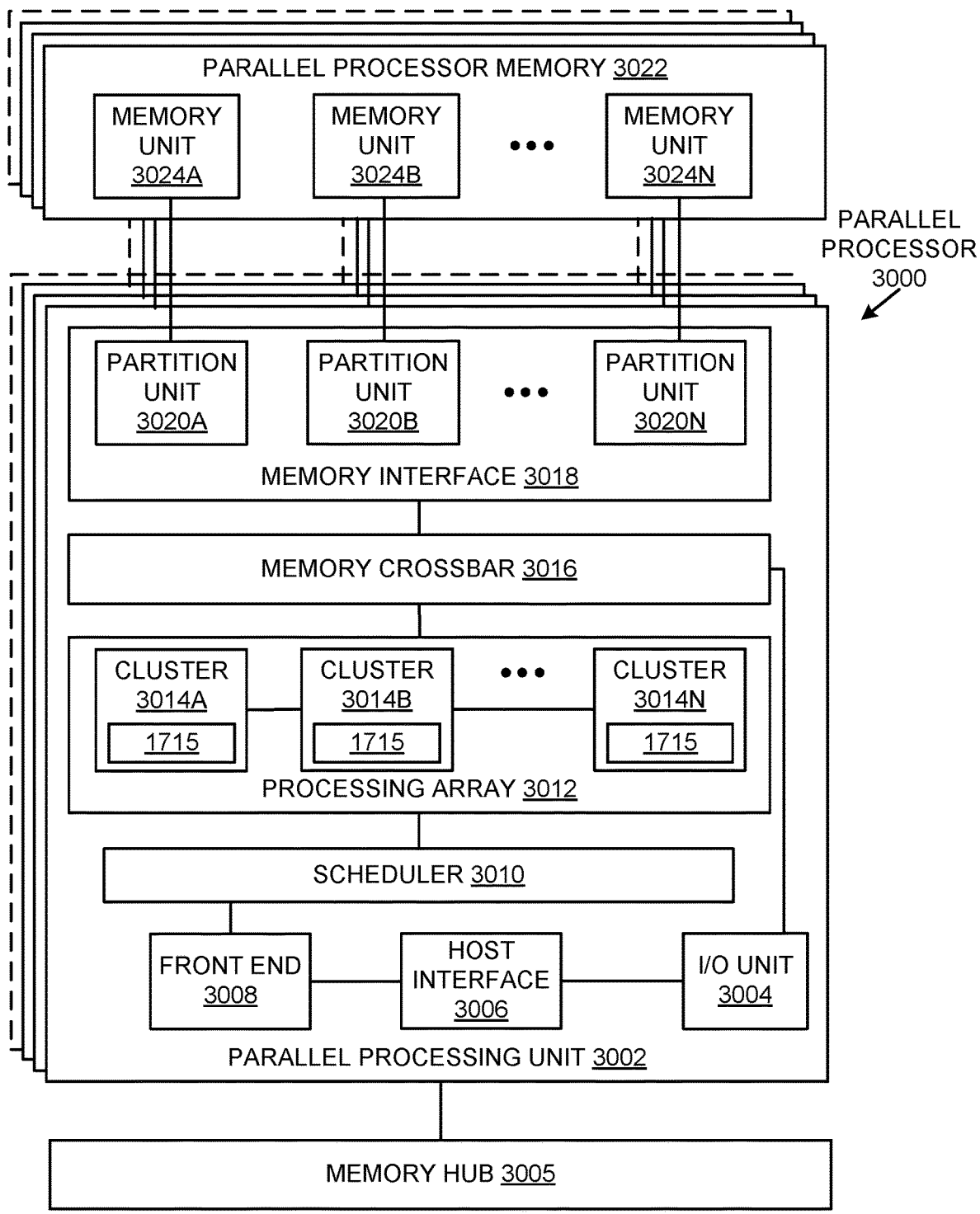
FIG. 30A illustrates a parallel processor, according to at least one embodiment.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in system FIG. 2900 for inferencing or predicting operations based, at least in part, on weight parameters calculated using neural network training operations, neural network functions and/or architectures, or neural network use cases described herein.
Processors FIG. 30A illustrates a parallel processor 3000 according to at least on embodiment. In at least one embodiment, various components of parallel processor 3000 may be implemented using one or more integrated circuit devices, such as programmable processors, application specific integrated circuits (ASICs), or field programmable gate arrays (FPGA). In at least one embodiment, illustrated parallel processor 3000 is a variant of one or more parallel processor(s) 2912 shown in FIG. 29 according to an exemplary embodiment.

In at least one embodiment, parallel processor 3000 includes a parallel processing unit 3002. In at least one embodiment, parallel processing unit 3002 includes an I/O unit 3004 that enables communication with other devices, including other instances of parallel processing unit 3002. In at least one embodiment, I/O unit 3004 may be directly connected to other devices. In at least one embodiment, I/O unit 3004 connects with other devices via use of a hub or switch interface, such as memory hub 2905. In at least one embodiment, connections between memory hub 2905 and I/O unit 3004 form a communication link 2913. In at least one embodiment, I/O unit 3004 connects with a host interface 3006 and a memory crossbar 3016, where host interface 3006 receives commands directed to performing processing operations and memory crossbar 3016 receives commands directed to performing memory operations.

In at least one embodiment, when host interface 3006 receives a command buffer via I/O unit 3004, host interface 3006 can direct work operations to perform those commands to a front end 3008. In at least one embodiment, front end 3008 couples with a scheduler 3010, which is configured to distribute commands or other work items to a processing cluster array 3012. In at least one embodiment, scheduler 3010 ensures that processing cluster array 3012 is properly configured and in a valid state before tasks are distributed to processing cluster array 3012 of processing cluster array 3012. In at least one embodiment, scheduler 3010 is implemented via firmware logic executing on a microcontroller. In at least one embodiment, microcontroller implemented scheduler 3010 is configurable to perform complex scheduling and work distribution operations at coarse and fine granularity, enabling rapid preemption and context switching of threads executing on processing array 3012. In at least one embodiment, host software can prove workloads for scheduling on processing array 3012 via one of multiple graphics processing doorbells. In at least one embodiment, workloads can then be automatically distributed across processing array 3012 by scheduler 3010 logic within a microcontroller including scheduler 3010.

In at least one embodiment, processing cluster array 3012 can include up to "N" processing clusters (e.g., cluster 3014A, cluster 3014B, through cluster 3014N). In at least one embodiment, each cluster 3014A-3014N of processing cluster array 3012 can execute a large number of concurrent threads. In at least one embodiment, scheduler 3010 can allocate work to clusters 3014A-3014N of processing cluster array 3012 using various scheduling and/or work distribution algorithms, which may vary depending on workload arising for each type of program or computation. In at least one embodiment, scheduling can be handled dynamically by scheduler 3010, or can be assisted in part by compiler logic during compilation of program logic configured for execution by processing cluster array 3012. In at least one embodiment, different clusters 3014A-3014N of processing cluster array 3012 can be allocated for processing different types of programs or for performing different types of computations.

In at least one embodiment, processing cluster array 3012 can be configured to perform various types of parallel processing operations. In at least one embodiment, processing cluster array 3012 is configured to perform general-purpose parallel compute operations. For example, in at least one embodiment, processing cluster array 3012 can include logic to execute processing tasks including filtering of video and/or audio data, performing modeling operations, including physics operations, and performing data transformations.

In at least one embodiment, processing cluster array 3012 is configured to perform parallel graphics processing operations. In at least one embodiment, processing cluster array 3012 can include additional logic to support execution of such graphics processing operations, including, but not limited to texture sampling logic to perform texture operations, as well as tessellation logic and other vertex processing logic. In at least one embodiment, processing cluster array 3012 can be configured to execute graphics processing related shader programs such as, but not limited to vertex shaders, tessellation shaders, geometry shaders, and pixel shaders. In at least one embodiment, parallel processing unit 3002 can transfer data from system memory via I/O unit 3004 for processing. In at least one embodiment, during processing, transferred data can be stored to on-chip memory (e.g., parallel processor memory 3022) during processing, then written back to system memory.

In at least one embodiment, when parallel processing unit 3002 is used to perform graphics processing, scheduler 3010 can be configured to divide a processing workload into approximately equal sized tasks, to better enable distribution of graphics processing operations to multiple clusters 3014A-3014N of processing cluster array 3012. In at least one embodiment, portions of processing cluster array 3012 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3014A-3014N may be stored in buffers to allow intermediate data to be transmitted between clusters 3014A-3014N for further processing.

In at least one embodiment, processing cluster array 3012 can receive processing tasks to be executed via scheduler 3010, which receives commands defining processing tasks from front end 3008. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3010 may be configured to fetch indices corresponding to tasks or may receive indices from front end 3008. In at least one embodiment, front end 3008 can be configured to ensure processing cluster array 3012 is configured to a valid state before a workload specified by incoming command buffers (e.g., batch-buffers, push buffers, etc.) is initiated.

In at least one embodiment, each of one or more instances of parallel processing unit 3002 can couple with parallel processor memory 3022. In at least one embodiment, parallel processor memory 3022 can be accessed via memory crossbar 3016, which can receive memory requests from processing cluster array 3012 as well as I/O unit 3004. In at least one embodiment, memory crossbar 3016 can access parallel processor memory 3022 via a memory interface 3018. In at least one embodiment, memory interface 3018 can include multiple partition units (e.g., partition unit 3020A, partition unit 3020B, through partition unit 3020N) that can each couple to a portion (e.g., memory unit) of parallel processor memory 3022. In at least one embodiment, a number of partition units 3020A-3020N is configured to be equal to a number of memory units, such that a first partition unit 3020A has a corresponding first memory unit 3024A, a second partition unit 3020B has a corresponding memory unit 3024B, and an Nth partition unit 3020N has a corresponding Nth memory unit 3024N. In at least one embodiment, a number of partition units 3020A-3020N may not be equal to a number of memory devices.

In at least one embodiment, memory units 3024A-3024N can include various types of memory devices, including dynamic random access memory (DRAM) or graphics random access memory, such as synchronous graphics random access memory (SGRAM), including graphics double data rate (GDDR) memory. In at least one embodiment, memory units 3024A-3024N may also include 3D stacked memory, including but not limited to high bandwidth memory (HBM). In at least one embodiment, render targets, such as frame buffers or texture maps may be stored across memory units 3024A-3024N, allowing partition units 3020A-3020N to write portions of each render target in parallel to efficiently use available bandwidth of parallel processor memory 3022. In at least one embodiment, a local instance of parallel processor memory 3022 may be excluded in favor of a unified memory design that utilizes system memory in conjunction with local cache memory.

In at least one embodiment, any one of clusters 3014A-3014N of processing cluster array 3012 can process data that will be written to any of memory units 3024A-3024N within parallel processor memory 3022. In at least one embodiment, memory crossbar 3016 can be configured to transfer an output of each cluster 3014A-3014N to any partition unit 3020A-3020N or to another cluster 3014A-3014N, which can perform additional processing operations on an output. In at least one embodiment, each cluster 3014A-3014N can communicate with memory interface 3018 through memory crossbar 3016 to read from or write to various external memory devices. In at least one embodiment, memory crossbar 3016 has a connection to memory interface 3018 to communicate with I/O unit 3004, as well as a connection to a local instance of parallel processor memory 3022, enabling processing units within different processing clusters 3014A-3014N to communicate with system memory or other memory that is not local to parallel processing unit 3002. In at least one embodiment, memory crossbar 3016 can use virtual channels to separate traffic streams between clusters 3014A-3014N and partition units 3020A-3020N.

In at least one embodiment, multiple instances of parallel processing unit 3002 can be provided on a single add-in card, or multiple add-in cards can be interconnected. In at least one embodiment, different instances of parallel processing unit 3002 can be configured to inter-operate even if different instances have different numbers of processing cores, different amounts of local parallel processor memory, and/or other configuration differences. For example, in at least one embodiment, some instances of parallel processing unit 3002 can include higher precision floating point units relative to other instances. In at least one embodiment, systems incorporating one or more instances of parallel processing unit 3002 or parallel processor 3000 can be implemented in a variety of configurations and form factors, including but not limited to desktop, laptop, or handheld personal computers, servers, workstations, game consoles, and/or embedded systems.

Figure 30B:
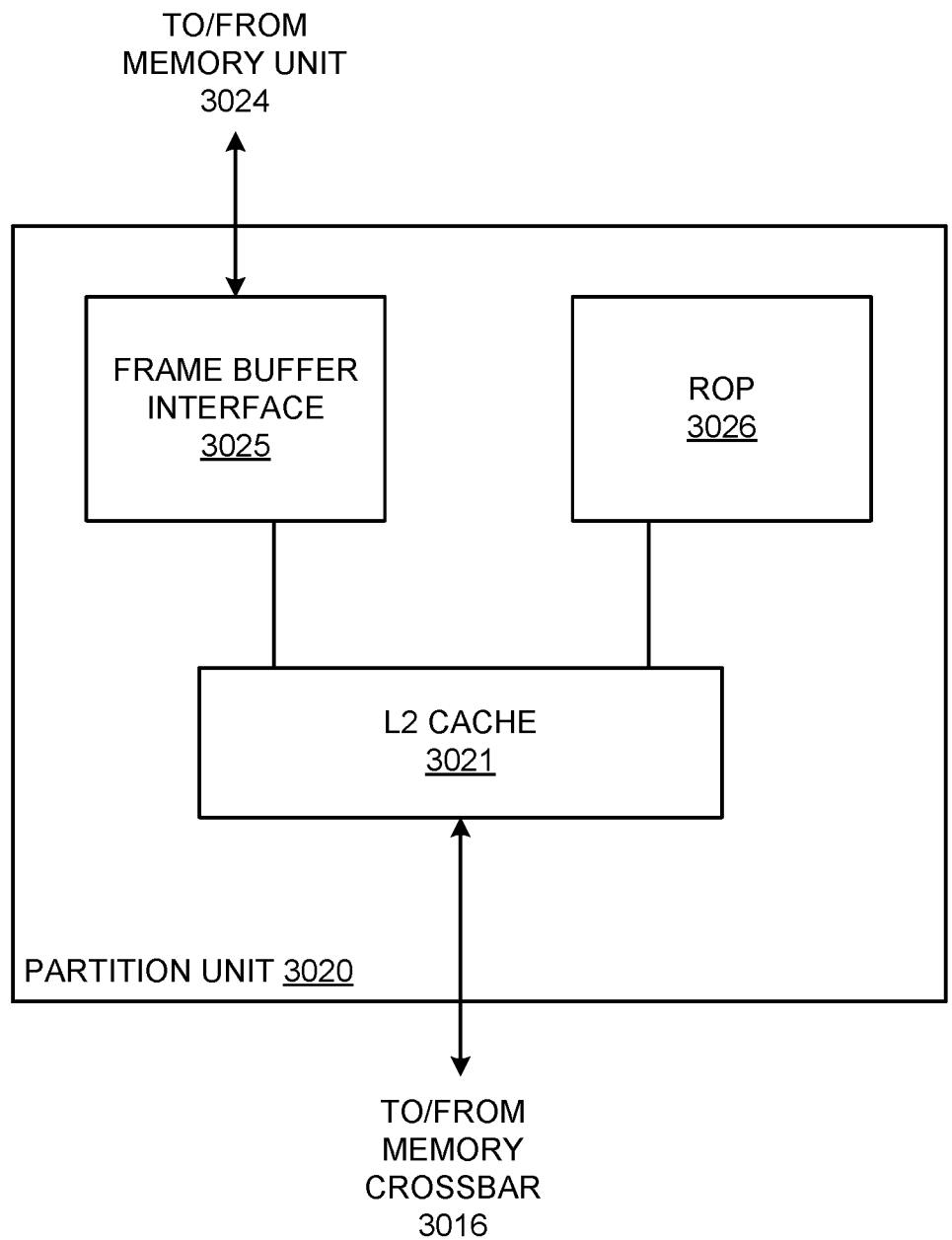
FIG. 30B illustrates a partition unit, according to at least one embodiment.

FIG. 30B is a block diagram of a partition unit 3020 according to at least one embodiment. In at least one embodiment, partition unit 3020 is an instance of one of partition units 3020A-3020N of FIG. 30A. In at least one embodiment, partition unit 3020 includes an L2 cache 3021, a frame buffer interface 3025, and a ROP 3026 (raster operations unit). L2 cache 3021 is a read/write cache that is configured to perform load and store operations received from memory crossbar 3016 and ROP 3026. In at least one embodiment, read misses and urgent write-back requests are output by L2 cache 3021 to frame buffer interface 3025 for processing. In at least one embodiment, updates can also be sent to a frame buffer via frame buffer interface 3025 for processing. In at least one embodiment, frame buffer interface 3025 interfaces with one of memory units in parallel processor memory, such as memory units 3024A-3024N of FIG. 30 (e.g., within parallel processor memory 3022).

In at least one embodiment, ROP 3026 is a processing unit that performs raster operations such as stencil, z test, blending, and like. In at least one embodiment, ROP 3026 then outputs processed graphics data that is stored in graphics memory. In at least one embodiment, ROP 3026 includes compression logic to compress depth or color data that is written to memory and decompress depth or color data that is read from memory. In at least one embodiment, compression logic can be lossless compression logic that makes use of one or more of multiple compression algorithms, type of compression that is performed by ROP 3026 can vary based on statistical characteristics of data to be compressed. For example, in at least one embodiment, delta color compression is performed on depth and color data on a per-tile basis.

In at least one embodiment, ROP 3026 is included within each processing cluster (e.g., cluster 3014A-3014N of FIG. 30) instead of within partition unit 3020. In at least one embodiment, read and write requests for pixel data are transmitted over memory crossbar 3016 instead of pixel fragment data. In at least one embodiment, processed graphics data may be displayed on a display device, such as one of one or more display device(s) 2910 of FIG. 29, routed for further processing by processor(s) 2902, or routed for further processing by one of processing entities within parallel processor 3000 of FIG. 30A.

Figure 30C:
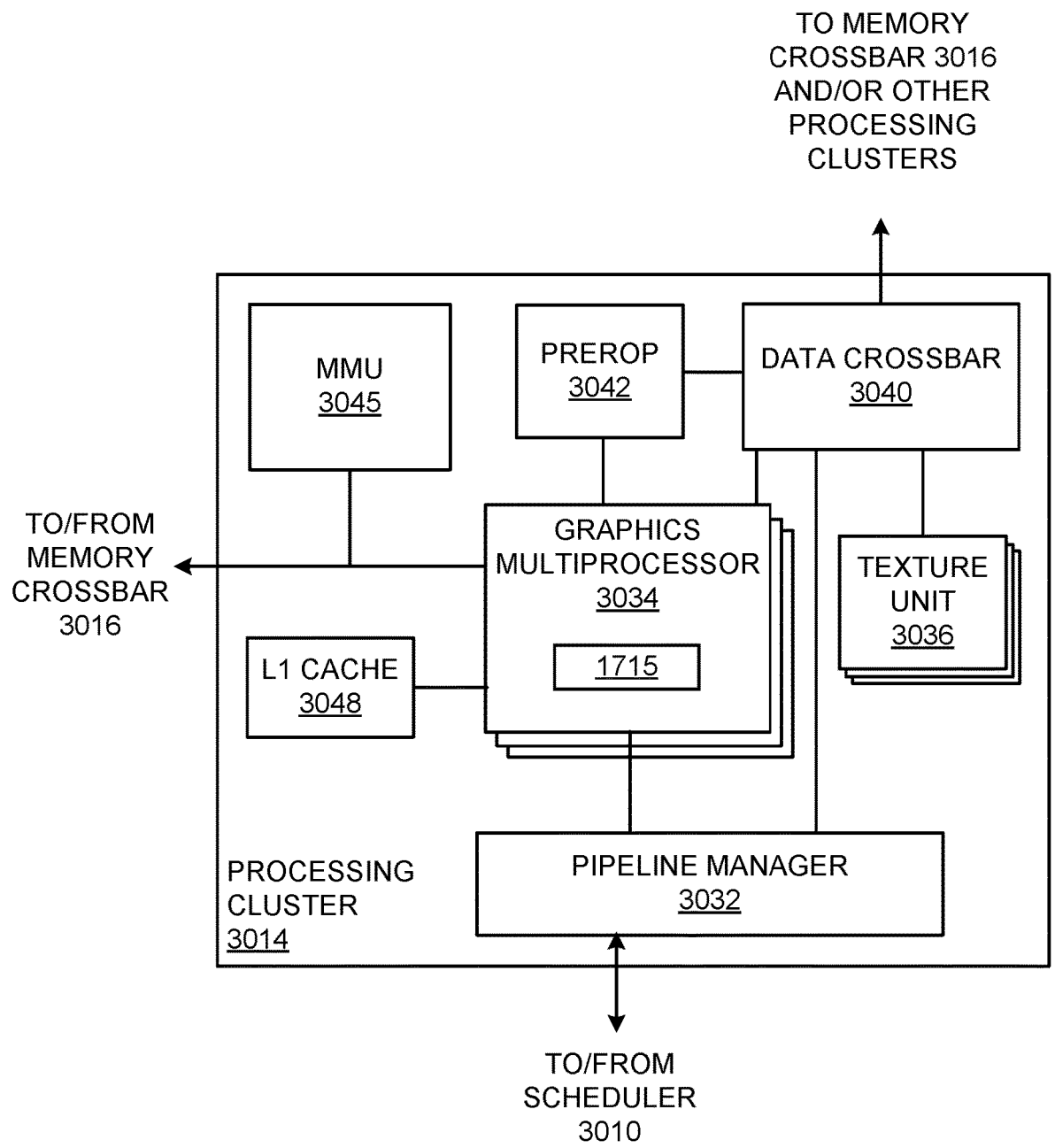
FIG. 30C illustrates a processing cluster, according to at least one embodiment.

FIG. 30C is a block diagram of a processing cluster 3014 within a parallel processing unit according to at least one embodiment. In at least one embodiment, a processing cluster is an instance of one of processing clusters 3014A-3014N of FIG. 30. In at least one embodiment, processing cluster 3014 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 3014 can be controlled via a pipeline manager 3032 that distributes processing tasks to SIMT parallel processors. In at least one embodiment, pipeline manager 3032 receives instructions from scheduler 3010 of FIG. 30 and manages execution of those instructions via a graphics multiprocessor 3034 and/or a texture unit 3036. In at least one embodiment, graphics multiprocessor 3034 is an exemplary instance of a SIMT parallel processor. However, in at least one embodiment, various types of SIMT parallel processors of differing architectures may be included within processing cluster 3014. In at least one embodiment, one or more instances of graphics multiprocessor 3034 can be included within a processing cluster 3014. In at least one embodiment, graphics multiprocessor 3034 can process data and a data crossbar 3040 can be used to distribute processed data to one of multiple possible destinations, including other shader units. In at least one embodiment, pipeline manager 3032 can facilitate distribution of processed data by specifying destinations for processed data to be distributed vis data crossbar 3040.

In at least one embodiment, each graphics multiprocessor 3034 within processing cluster 3014 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3014 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 3034. In at least one embodiment, a thread group may include fewer threads than a number of processing engines within graphics multiprocessor 3034. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3034. In at least one embodiment, when a thread group includes more threads than number of processing engines within graphics multiprocessor 3034, processing can be performed over consecutive clock cycles. In at least one embodiment, multiple thread groups can be executed concurrently on a graphics multiprocessor 3034.

In at least one embodiment, graphics multiprocessor 3034 includes an internal cache memory to perform load and store operations. In at least one embodiment, graphics multiprocessor 3034 can forego an internal cache and use a cache memory (e.g., L1 cache 3048) within processing cluster 3014. In at least one embodiment, each graphics multiprocessor 3034 also has access to L2 caches within partition units (e.g., partition units 3020A-3020N of FIG. 30) that are shared among all processing clusters 3014 and may be used to transfer data between threads. In at least one embodiment, graphics multiprocessor 3034 may also access off-chip global memory, which can include one or more of local parallel processor memory and/or system memory. In at least one embodiment, any memory external to parallel processing unit 3002 may be used as global memory. In at least one embodiment, processing cluster 3014 includes multiple instances of graphics multiprocessor 3034 can share common instructions and data, which may be stored in L1 cache 3048.

In at least one embodiment, each processing cluster 3014 may include an MMU 3045 (memory management unit) that is configured to map virtual addresses into physical addresses. In at least one embodiment, one or more instances of MMU 3045 may reside within memory interface 3018 of FIG. 30. In at least one embodiment, MMU 3045 includes a set of page table entries (PTEs) used to map a virtual address to a physical address of a tile (talk more about tiling) and optionally a cache line index. In at least one embodiment, MMU 3045 may include address translation lookaside buffers (TLB) or caches that may reside within graphics multiprocessor 3034 or L1 cache or processing cluster 3014. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 3014 may be configured such that each graphics multiprocessor 3034 is coupled to a texture unit 3036 for performing texture mapping operations, e.g., determining texture sample positions, reading texture data, and filtering texture data. In at least one embodiment, texture data is read from an internal texture L1 cache (not shown) or from an L1 cache within graphics multiprocessor 3034 and is fetched from an L2 cache, local parallel processor memory, or system memory, as needed. In at least one embodiment, each graphics multiprocessor 3034 outputs processed tasks to data crossbar 3040 to provide processed task to another processing cluster 3014 for further processing or to store processed task in an L2 cache, local parallel processor memory, or system memory via memory crossbar 3016. In at least one embodiment, preROP 3042 (pre-raster operations unit) is configured to receive data from graphics multiprocessor 3034, direct data to ROP units, which may be located with partition units as described herein (e.g., partition units 3020A-3020N of FIG. 30). In at least one embodiment, PreROP 3042 unit can perform optimizations for color blending, organize pixel color data, and perform address translations.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in graphics processing cluster 3014 for inferencing or predicting operations based, at least in part, on weight parameters calculated using neural network training operations, neural network functions and/or architectures, or neural network use cases described herein.

Figure 30D:
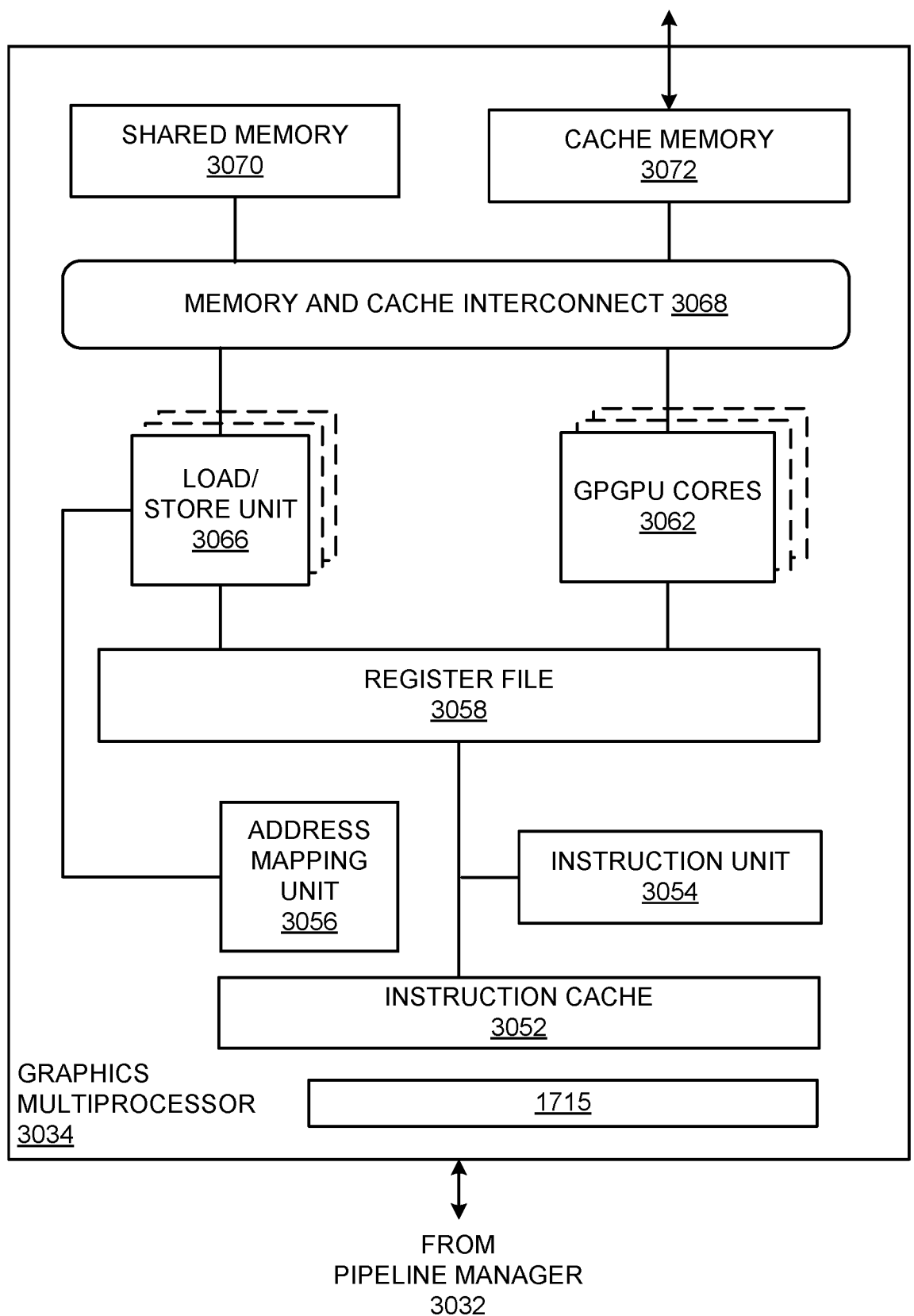
FIG. 30D illustrates a graphics multiprocessor, according to at least one embodiment.

FIG. 30D shows a graphics multiprocessor 3034 according to at least one embodiment. In at least one embodiment, graphics multiprocessor 3034 couples with pipeline manager 3032 of processing cluster 3014. In at least one embodiment, graphics multiprocessor 3034 has an execution pipeline including but not limited to an instruction cache 3052, an instruction unit 3054, an address mapping unit 3056, a register file 3058, one or more general purpose graphics processing unit (GPGPU) cores 3062, and one or more load/store units 3066. GPGPU cores 3062 and load/store units 3066 are coupled with cache memory 3072 and shared memory 3070 via a memory and cache interconnect 3068.

In at least one embodiment, instruction cache 3052 receives a stream of instructions to execute from pipeline manager 3032. In at least one embodiment, instructions are cached in instruction cache 3052 and dispatched for execution by instruction unit 3054. In at least one embodiment, instruction unit 3054 can dispatch instructions as thread groups (e.g., warps), with each thread of thread group assigned to a different execution unit within GPGPU core 3062. In at least one embodiment, an instruction can access any of a local, shared, or global address space by specifying an address within a unified address space. In at least one embodiment, address mapping unit 3056 can be used to translate addresses in a unified address space into a distinct memory address that can be accessed by load/store units 3066.

In at least one embodiment, register file 3058 provides a set of registers for functional units of graphics multiprocessor 3034. In at least one embodiment, register file 3058 provides temporary storage for operands connected to data paths of functional units (e.g., GPGPU cores 3062, load/store units 3066) of graphics multiprocessor 3034. In at least one embodiment, register file 3058 is divided between each of functional units such that each functional unit is allocated a dedicated portion of register file 3058. In at least one embodiment, register file 3058 is divided between different warps being executed by graphics multiprocessor 3034.

In at least one embodiment, GPGPU cores 3062 can each include floating point units (FPUs) and/or integer arithmetic logic units (ALUs) that are used to execute instructions of graphics multiprocessor 3034. GPGPU cores 3062 can be similar in architecture or can differ in architecture. In at least one embodiment, a first portion of GPGPU cores 3062 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 3034 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 3062 include SIMD logic capable of performing a single instruction on multiple sets of data. In at least one embodiment GPGPU cores 3062 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 3068 is an interconnect network that connects each functional unit of graphics multiprocessor 3034 to register file 3058 and to shared memory 3070. In at least one embodiment, memory and cache interconnect 3068 is a crossbar interconnect that allows load/store unit 3066 to implement load and store operations between shared memory 3070 and register file 3058. In at least one embodiment, register file 3058 can operate at a same frequency as GPGPU cores 3062, thus data transfer between GPGPU cores 3062 and register file 3058 is very low latency. In at least one embodiment, shared memory 3070 can be used to enable communication between threads that execute on functional units within graphics multiprocessor 3034. In at least one embodiment, cache memory 3072 can be used as a data cache for example, to cache texture data communicated between functional units and texture unit 3036. In at least one embodiment, shared memory 3070 can also be used as a program managed cached. In at least one embodiment, threads executing on GPGPU cores 3062 can programmatically store data within shared memory in addition to automatically cached data that is stored within cache memory 3072.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in graphics multiprocessor 3034 for inferencing or predicting operations based, at least in part, on weight parameters calculated using neural network training operations, neural network functions and/or architectures, or neural network use cases described herein.

Figure 31:
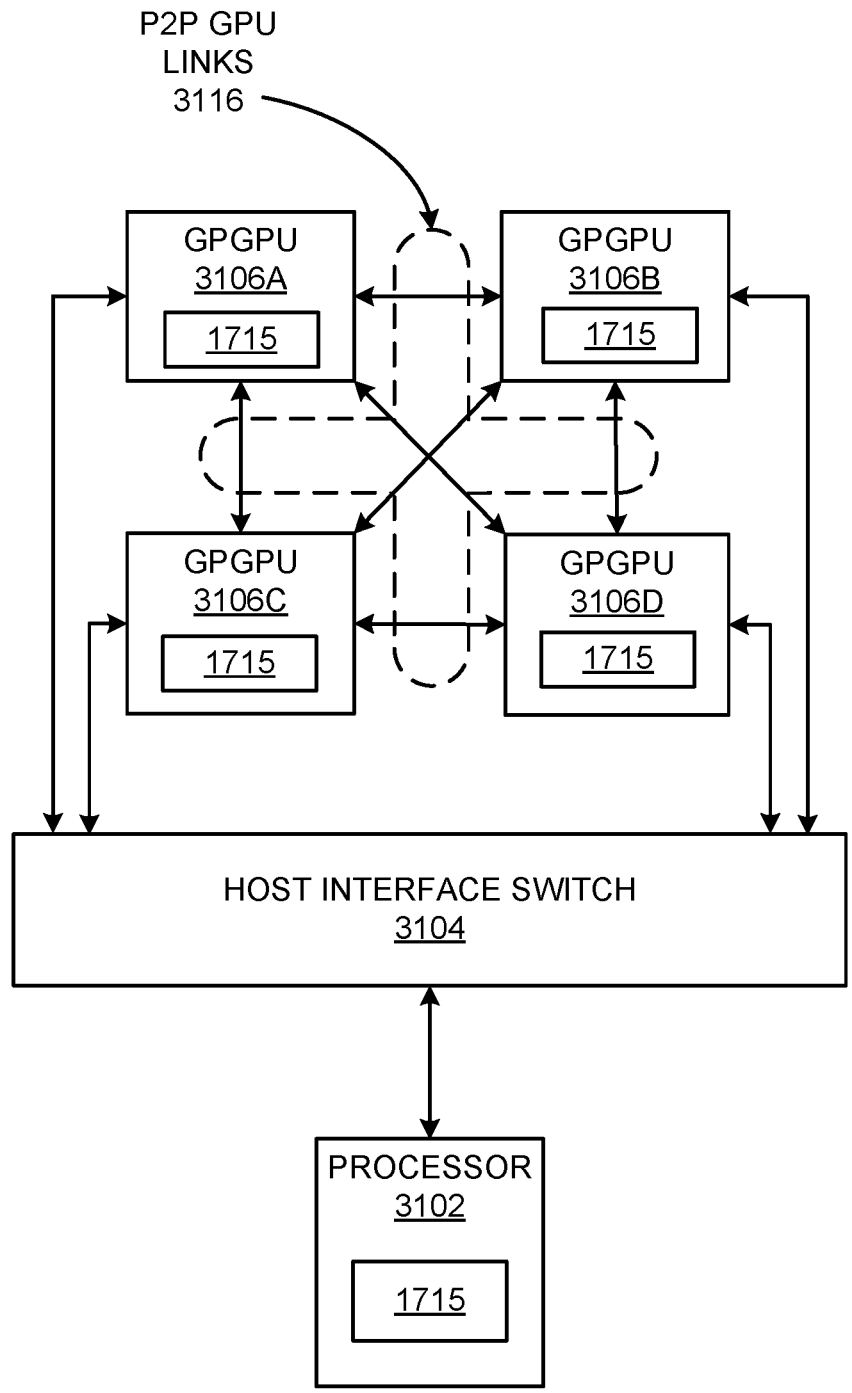
FIG. 31 illustrates a multi-graphics processing unit (GPU) system, according to at least one embodiment.

FIG. 31 illustrates a multi-GPU computing system 3100, according to at least one embodiment. In at least one embodiment, multi-GPU computing system 3100 can include a processor 3102 coupled to multiple general purpose graphics processing units (GPGPUs) 3106A-D via a host interface switch 3104. In at least one embodiment, host interface switch 3104 is a PCI express switch device that couples processor 3102 to a PCI express bus over which processor 3102 can communicate with GPGPUs 3106A-D. GPGPUs 3106A-D can interconnect via a set of high-speed point to point GPU to GPU links 3116. In at least one embodiment, GPU to GPU links 3116 connect to each of GPGPUs 3106A-D via a dedicated GPU link. In at least one embodiment, P2P GPU links 3116 enable direct communication between each of GPGPUs 3106A-D without requiring communication over host interface bus 3104 to which processor 3102 is connected. In at least one embodiment, with GPU-to-GPU traffic directed to P2P GPU links 3116, host interface bus 3104 remains available for system memory access or to communicate with other instances of multi-GPU computing system 3100, for example, via one or more network devices. While in at least one embodiment GPGPUs 3106A-D connect to processor 3102 via host interface switch 3104, in at least one embodiment processor 3102 includes direct support for P2P GPU links 3116 and can connect directly to GPGPUs 3106A-D.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in multi-GPU computing system 3100 for inferencing or predicting operations based, at least in part, on weight parameters calculated using neural network training operations, neural network functions and/or architectures, or neural network use cases described herein.

Figure 32:
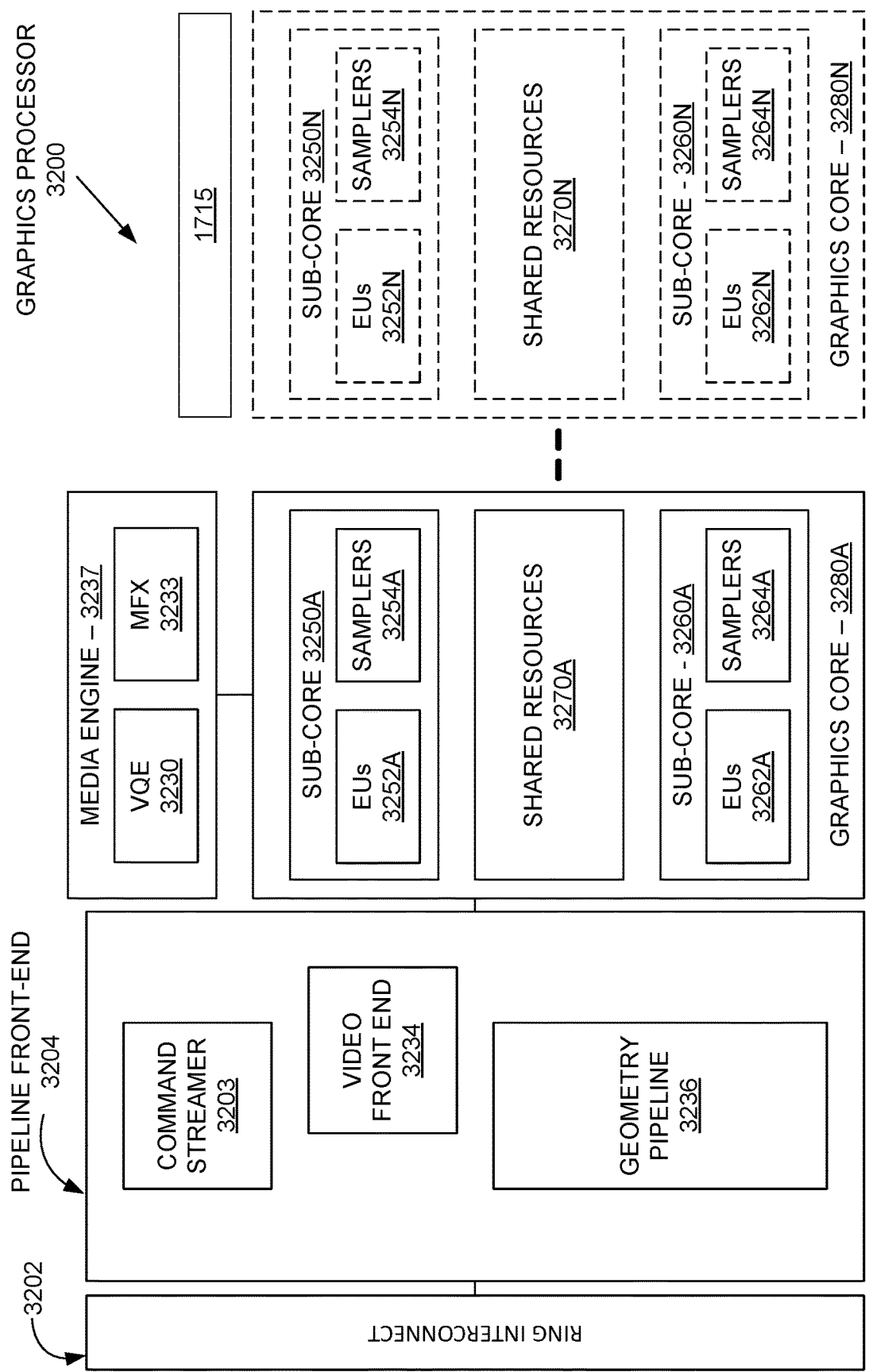
FIG. 32 illustrates a graphics processor, according to at least one embodiment.

FIG. 32 is a block diagram of a graphics processor 3200, according to at least one embodiment. In at least one embodiment, graphics processor 3200 includes a ring interconnect 3202, a pipeline front-end 3204, a media engine 3237, and graphics cores 3280A-3280N. In at least one embodiment, ring interconnect 3202 couples graphics processor 3200 to other processing units, including other graphics processors or one or more general-purpose processor cores. In at least one embodiment, graphics processor 3200 is one of many processors integrated within a multi-core processing system.

In at least one embodiment, graphics processor 3200 receives batches of commands via ring interconnect 3202. In at least one embodiment, incoming commands are interpreted by a command streamer 3203 in pipeline front-end 3204. In at least one embodiment, graphics processor 3200 includes scalable execution logic to perform 3D geometry processing and media processing via graphics core(s) 3280A-3280N. In at least one embodiment, for 3D geometry processing commands, command streamer 3203 supplies commands to geometry pipeline 3236. In at least one embodiment, for at least some media processing commands, command streamer 3203 supplies commands to a video front end 3234, which couples with a media engine 3237. In at least one embodiment, media engine 3237 includes a Video Quality Engine (VQE) 3230 for video and image post-processing and a multi-format encode/decode (MFX) 3233 engine to provide hardware-accelerated media data encode and decode. In at least one embodiment, geometry pipeline 3236 and media engine 3237 each generate execution threads for thread execution resources provided by at least one graphics core 3280A.

In at least one embodiment, graphics processor 3200 includes scalable thread execution resources featuring modular cores 3280A-3280N (sometimes referred to as core slices), each having multiple sub-cores 3250A-550N, 3260A-3260N (sometimes referred to as core sub-slices). In at least one embodiment, graphics processor 3200 can have any number of graphics cores 3280A through 3280N. In at least one embodiment, graphics processor 3200 includes a graphics core 3280A having at least a first sub-core 3250A and a second sub-core 3260A. In at least one embodiment, graphics processor 3200 is a low power processor with a single sub-core (e.g., 3250A). In at least one embodiment, graphics processor 3200 includes multiple graphics cores 3280A-3280N, each including a set of first sub-cores 3250-3250N and a set of second sub-cores 3260A-3260N. In at least one embodiment, each sub-core in first sub-cores 3250A-3250N includes at least a first set of execution units 3252A-3252N and media/texture samplers 3254A-3254N. In at least one embodiment, each sub-core in second sub-cores 3260A-3260N includes at least a second set of execution units 3262A-3262N and samplers 3264A-3264N. In at least one embodiment, each sub-core 3250A-3250N, 3260A-3260N shares a set of shared resources 3270A-3270N. In at least one embodiment, shared resources include shared cache memory and pixel operation logic.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, inference and/or training logic 1715 may be used in graphics processor 3200 for inferencing or predicting operations based, at least in part, on weight parameters calculated using neural network training operations, neural network functions and/or architectures, or neural network use cases described herein.

Figure 33:
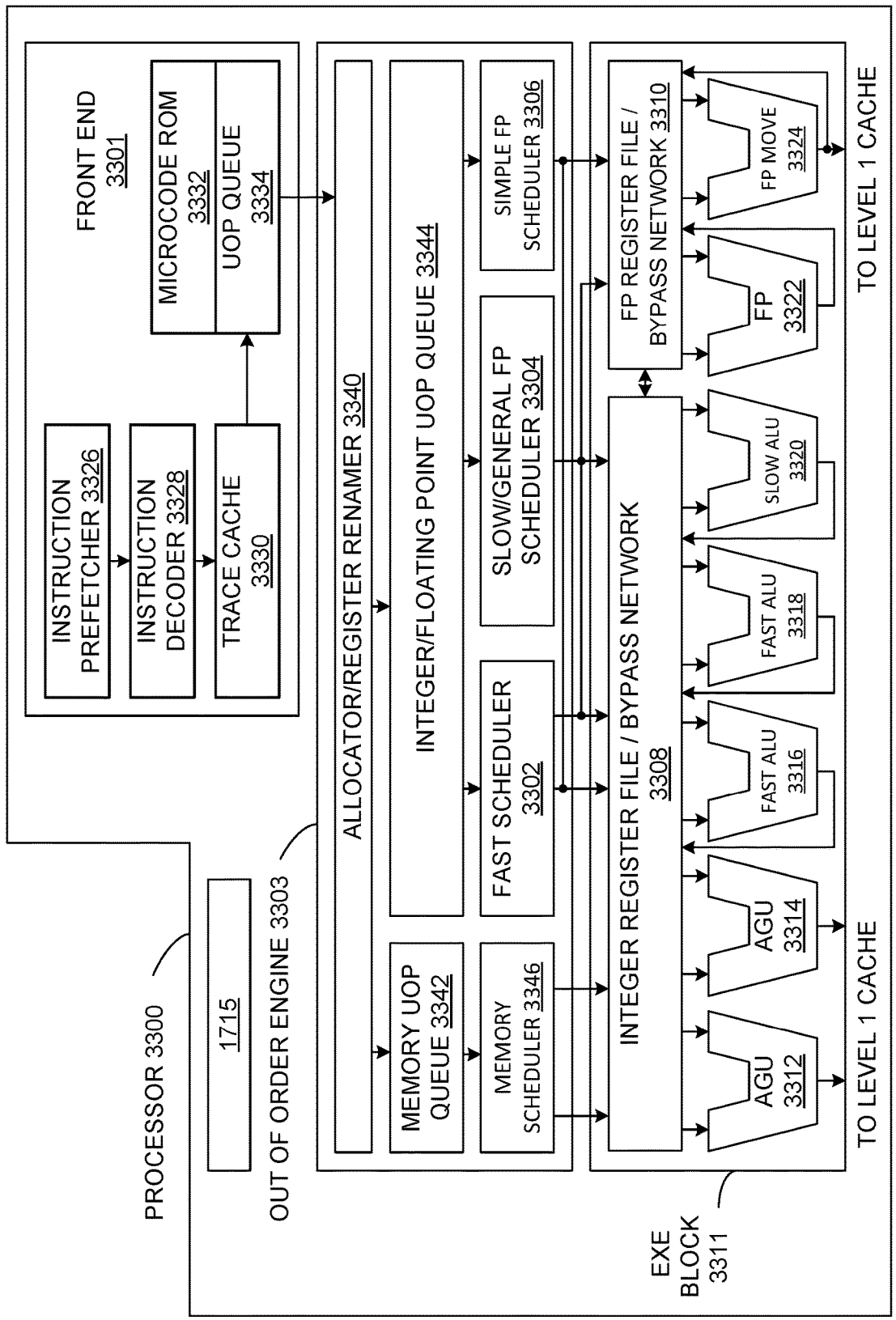
FIG. 33 is a block diagram illustrating a processor microarchitecture for a processor, according to at least one embodiment.

FIG. 33 is a block diagram illustrating micro-architecture for a processor 3300 that may include logic circuits to perform instructions, according to at least one embodiment. In at least one embodiment, processor 3300 may perform instructions, including x86 instructions, ARM instructions, specialized instructions for application-specific integrated circuits (ASICs), etc. In at least one embodiment, processor 3310 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3310 may perform instructions to accelerate machine learning or deep learning algorithms, training, or inferencing.

In at least one embodiment, processor 3300 includes an in-order front end ("front end") 3301 to fetch instructions to be executed and prepare instructions to be used later in processor pipeline. In at least one embodiment, front end 3301 may include several units. In at least one embodiment, an instruction prefetcher 3326 fetches instructions from memory and feeds instructions to an instruction decoder 3328 which in turn decodes or interprets instructions. For example, in at least one embodiment, instruction decoder 3328 decodes a received instruction into one or more operations called "micro-instructions" or "micro-operations" (also called "micro ops" or "uops") that machine may execute. In at least one embodiment, instruction decoder 3328 parses instruction into an opcode and corresponding data and control fields that may be used by micro-architecture to perform operations in accordance with at least one embodiment. In at least one embodiment, a trace cache 3330 may assemble decoded uops into program ordered sequences or traces in a uop queue 3334 for execution. In at least one embodiment, when trace cache 3330 encounters a complex instruction, a microcode ROM 3332 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3328 may access microcode ROM 3332 to perform instruction. In at least one embodiment, an instruction may be decoded into a small number of micro-ops for processing at instruction decoder 3328. In at least one embodiment, an instruction may be stored within microcode ROM 3332 should a number of micro-ops be needed to accomplish operation. In at least one embodiment, trace cache 3330 refers to an entry point programmable logic array ("PLA") to determine a correct micro-instruction pointer for reading microcode sequences to complete one or more instructions from microcode ROM 3332 in accordance with at least one embodiment. In at least one embodiment, after microcode ROM 3332 finishes sequencing micro-ops for an instruction, front end 3301 of machine may resume fetching micro-ops from trace cache 3330.

In at least one embodiment, out-of-order execution engine ("out of order engine") 3303 may prepare instructions for execution. In at least one embodiment, out-of-order execution logic has a number of buffers to smooth out and re-order flow of instructions to optimize performance as they go down pipeline and get scheduled for execution, out-of-order execution engine 3303 includes, without limitation, an allocator/register renamer 3340, a memory uop queue 3342, an integer/floating point uop queue 3344, a memory scheduler 3346, a fast scheduler 3302, a slow/general floating point scheduler ("slow/general FP scheduler") 3304, and a simple floating point scheduler ("simple FP scheduler") 3306. In at least one embodiment, fast schedule 3302, slow/general floating point scheduler 3304, and simple floating point scheduler 3306 are also collectively referred to herein as "uop schedulers 3302, 3304, 3306," allocator/register renamer 3340 allocates machine buffers and resources that each uop needs in order to execute. In at least one embodiment, allocator/register renamer 3340 renames logic registers onto entries in a register file. In at least one embodiment, allocator/register renamer 3340 also allocates an entry for each uop in one of two uop queues, memory uop queue 3342 for memory operations and integer/floating point uop queue 3344 for non-memory operations, in front of memory scheduler 3346 and uop schedulers 3302, 3304, 3306. In at least one embodiment, uop schedulers 3302, 3304, 3306, determine when a uop is ready to execute based on readiness of their dependent input register operand sources and availability of execution resources uops need to complete their operation. In at least one embodiment, fast scheduler 3302 of at least one embodiment may schedule on each half of main clock cycle while slow/general floating point scheduler 3304 and simple floating point scheduler 3306 may schedule once per main processor clock cycle. In at least one embodiment, uop schedulers 3302, 3304, 3306 arbitrate for dispatch ports to schedule uops for execution.

In at least one embodiment, execution block b11 includes, without limitation, an integer register file/bypass network 3308, a floating point register file/bypass network ("FP register file/bypass network") 3310, address generation units ("AGUs") 3312 and 3314, fast Arithmetic Logic Units (ALUs) ("fast ALUs") 3316 and 3318, a slow Arithmetic Logic Unit ("slow ALU") 3320, a floating point ALU ("FP") 3322, and a floating point move unit ("FP move") 3324. In at least one embodiment, integer register file/bypass network 3308 and floating point register file/bypass network 3310 are also referred to herein as "register files 3308, 3310." In at least one embodiment, AGUSs 3312 and 3314, fast ALUs 3316 and 3318, slow ALU 3320, floating point ALU 3322, and floating point move unit 3324 are also referred to herein as "execution units 3312, 3314, 3316, 3318, 3320, 3322, and 3324." In at least one embodiment, execution block b11 may include, without limitation, any number (including zero) and type of register files, bypass networks, address generation units, and execution units, in any combination.

In at least one embodiment, register files 3308, 3310 may be arranged between uop schedulers 3302, 3304, 3306, and execution units 3312, 3314, 3316, 3318, 3320, 3322, and 3324. In at least one embodiment, integer register file/bypass network 3308 performs integer operations. In at least one embodiment, floating point register file/bypass network 3310 performs floating point operations. In at least one embodiment, each of register files 3308, 3310 may include, without limitation, a bypass network that may bypass or forward just completed results that have not yet been written into register file to new dependent uops. In at least one embodiment, register files 3308, 3310 may communicate data with each other. In at least one embodiment, integer register file/bypass network 3308 may include, without limitation, two separate register files, one register file for low-order thirty-two bits of data and a second register file for high order thirty-two bits of data. In at least one embodiment, floating point register file/bypass network 3310 may include, without limitation, 128-bit wide entries because floating point instructions typically have operands from 64 to 128 bits in width.

In at least one embodiment, execution units 3312, 3314, 3316, 3318, 3320, 3322, 3324 may execute instructions. In at least one embodiment, register files 3308, 3310 store integer and floating point data operand values that microinstructions need to execute. In at least one embodiment, processor 3300 may include, without limitation, any number and combination of execution units 3312, 3314, 3316, 3318, 3320, 3322, 3324. In at least one embodiment, floating point ALU 3322 and floating point move unit 3324, may execute floating point, MMX, SIMD, AVX and SSE, or other operations, including specialized machine learning instructions. In at least one embodiment, floating point ALU 3322 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3316, 3318. In at least one embodiment, fast ALUS 3316, 3318 may execute fast operations with an effective latency of half a clock cycle. In at least one embodiment, most complex integer operations go to slow ALU 3320 as slow ALU 3320 may include, without limitation, integer execution hardware for long-latency type of operations, such as a multiplier, shifts, flag logic, and branch processing. In at least one embodiment, memory load/store operations may be executed by AGUS 312, 3314. In at least one embodiment, fast ALU 3316, fast ALU 3318, and slow ALU 3320 may perform integer operations on 64-bit data operands. In at least one embodiment, fast ALU 3316, fast ALU 3318, and slow ALU 3320 may be implemented to support a variety of data bit sizes including sixteen, thirty-two, 128, 256, etc. In at least one embodiment, floating point ALU 3322 and floating point move unit 3324 may be implemented to support a range of operands having bits of various widths. In at least one embodiment, floating point ALU 3322 and floating point move unit 3324 may operate on 128-bit wide packed data operands in conjunction with SIMD and multimedia instructions.

In at least one embodiment, uop schedulers 3302, 3304, 3306, dispatch dependent operations before parent load has finished executing. In at least one embodiment, as uops may be speculatively scheduled and executed in processor 3300, processor 3300 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment portions or all of inference and/or training logic 1715 may be incorporated into EXE Block 3311 and other memory or registers shown or not shown. For example, in at least one embodiment, training and/or inferencing techniques described herein may use one or more of ALUs illustrated in EXE Block 3311. Moreover, weight parameters may be stored in on-chip or off-chip memory and/or registers (shown or not shown) that configure ALUs of EXE Block 3311 to perform one or more machine learning algorithms, neural network architectures, use cases, or training techniques described herein.

Figure 34:
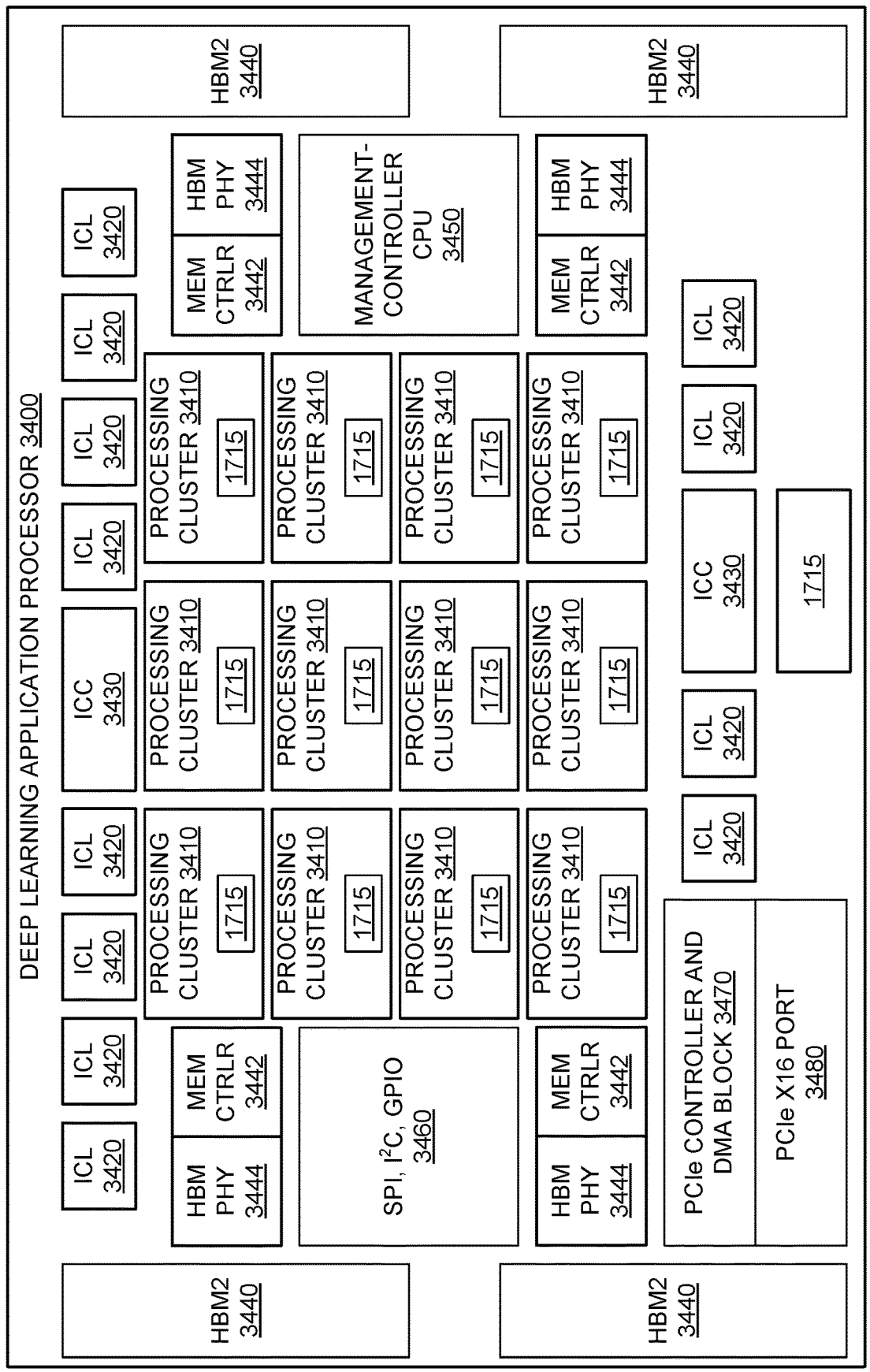
FIG. 34 illustrates a deep learning application processor, according to at least one embodiment.

FIG. 34 illustrates a deep learning application processor 3400, according to at least one embodiment. In at least one embodiment, deep learning application processor 3400 uses instructions that, if executed by deep learning application processor 3400, cause deep learning application processor 3400 to perform some or all of processes and techniques described throughout this disclosure. In at least one embodiment, deep learning application processor 3400 is an application-specific integrated circuit (ASIC). In at least one embodiment, application processor 3400 performs matrix multiply operations either "hard-wired" into hardware as a result of performing one or more instructions or both. In at least one embodiment, deep learning application processor 3400 includes, without limitation, processing clusters 3410(1)-3410(12), Inter-Chip Links ("ICLs") 3420(1)-3420(12), Inter-Chip Controllers ("ICCs") 3430(1)-3430(2), high bandwidth memory second generation ("HBM2") 3440(1)-3440(4), memory controllers ("Mem Ctrlrs") 3442(1)-3442(4), high bandwidth memory physical layer ("HBM PHY") 3444(1)-3444(4), a management-controller central processing unit ("management-controller CPU") 3450, a Serial Peripheral Interface, Inter-Integrated Circuit, and General Purpose Input/Output block ("SPI, I2C, GPIO") 3460, a peripheral component interconnect express controller and direct memory access block ("PCIe Controller and DMA") 3470, and a sixteen-lane peripheral component interconnect express port ("PCI Express×16") 3480.

In at least one embodiment, processing clusters 3410 may perform deep learning operations, including inference or prediction operations based on weight parameters calculated one or more training techniques, including those described herein. In at least one embodiment, each processing cluster 3410 may include, without limitation, any number and type of processors. In at least one embodiment, deep learning application processor 3400 may include any number and type of processing clusters 3400. In at least one embodiment, Inter-Chip Links 3420 are bi-directional. In at least one embodiment, Inter-Chip Links 3420 and Inter-Chip Controllers 3430 enable multiple deep learning application processors 3400 to exchange information, including activation information resulting from performing one or more machine learning algorithms embodied in one or more neural networks. In at least one embodiment, deep learning application processor 3400 may include any number (including zero) and type of ICLs 3420 and ICCs 3430.

In at least one embodiment, HBM2s 3440 provide a total of 32 Gigabytes (GB) of memory. HBM2 3440(i) is associated with both memory controller 3442(i) and HBM PHY 3444(i). In at least one embodiment, any number of HBM2s 3440 may provide any type and total amount of high bandwidth memory and may be associated with any number (including zero) and type of memory controllers 3442 and HBM PHYs 3444. In at least one embodiment, SPI, I2C, GPIO 3460, PCIe Controller and DMA 3470, and/or PCIe 3480 may be replaced with any number and type of blocks that enable any number and type of communication standards in any technically feasible fashion.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, deep learning application processor is used to train a machine learning model, such as a neural network, to predict or infer information provided to deep learning application processor 3400. In at least one embodiment, deep learning application processor 3400 is used to infer or predict information based on a trained machine learning model (e.g., neural network) that has been trained by another processor or system or by deep learning application processor 3400. In at least one embodiment, processor 3400 may be used to perform one or more neural network use cases described herein.

Figure 35:
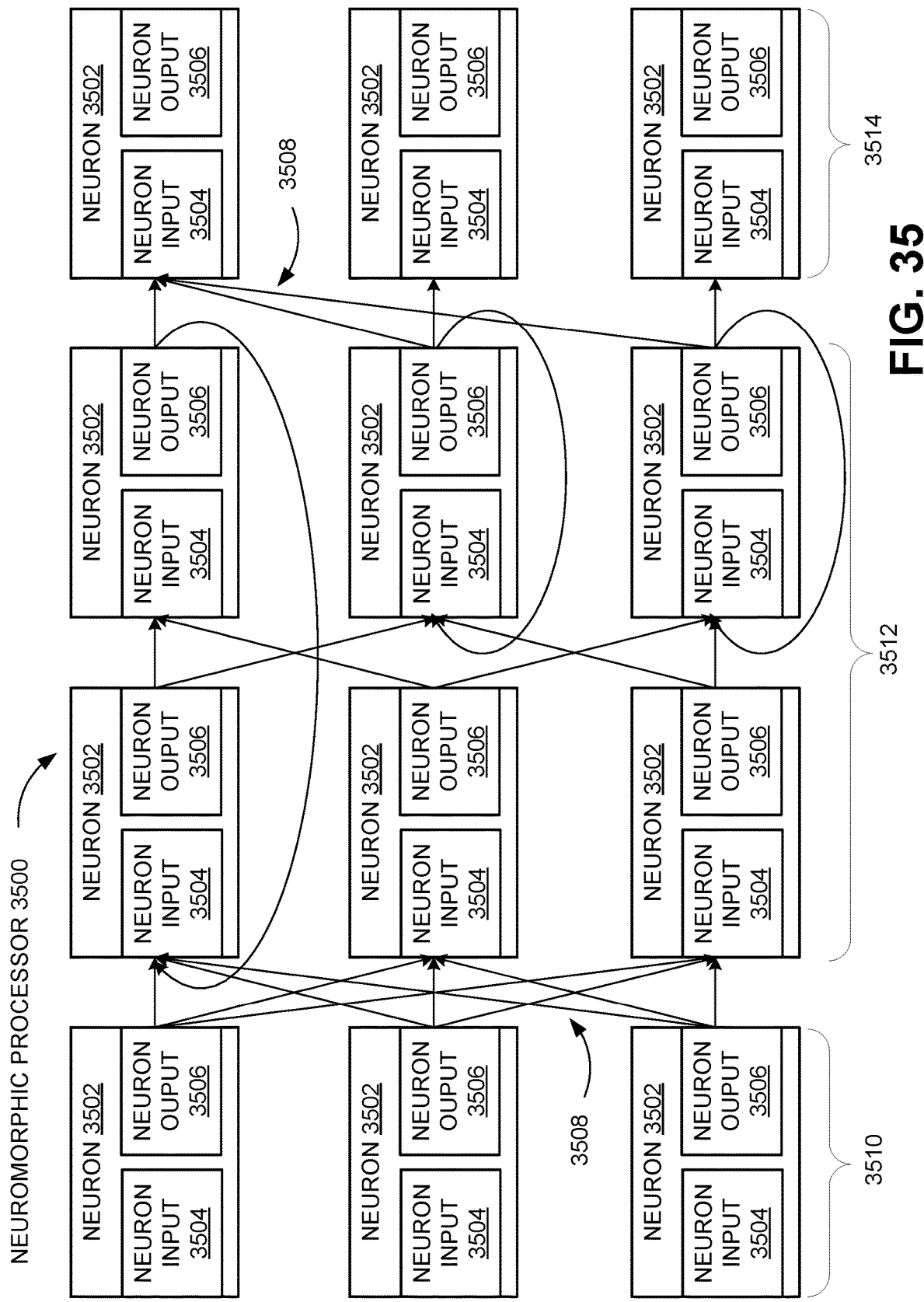
FIG. 35 is a block diagram illustrating an example neuromorphic processor, according to at least one embodiment.

FIG. 35 is a block diagram of a neuromorphic processor 3500, according to at least one embodiment. In at least one embodiment, neuromorphic processor 3500 may receive one or more inputs from sources external to neuromorphic processor 3500. In at least one embodiment, these inputs may be transmitted to one or more neurons 3502 within neuromorphic processor 3500. In at least one embodiment, neurons 3502 and components thereof may be implemented using circuitry or logic, including one or more arithmetic logic units (ALUs). In at least one embodiment, neuromorphic processor 3500 may include, without limitation, thousands or millions of instances of neurons 3502, but any suitable number of neurons 3502 may be used. In at least one embodiment, each instance of neuron 3502 may include a neuron input 3504 and a neuron output 3506. In at least one embodiment, neurons 3502 may generate outputs that may be transmitted to inputs of other instances of neurons 3502. For example, in at least one embodiment, neuron inputs 3504 and neuron outputs 3506 may be interconnected via synapses 3508.

In at least one embodiment, neurons 3502 and synapses 3508 may be interconnected such that neuromorphic processor 3500 operates to process or analyze information received by neuromorphic processor 3500. In at least one embodiment, neurons 3502 may transmit an output pulse (or "fire" or "spike") when inputs received through neuron input 3504 exceed a threshold. In at least one embodiment, neurons 3502 may sum or integrate signals received at neuron inputs 3504. For example, in at least one embodiment, neurons 3502 may be implemented as leaky integrate-and-fire neurons, wherein if a sum (referred to as a "membrane potential") exceeds a threshold value, neuron 3502 may generate an output (or "fire") using a transfer function such as a sigmoid or threshold function. In at least one embodiment, a leaky integrate-and-fire neuron may sum signals received at neuron inputs 3504 into a membrane potential and may also apply a decay factor (or leak) to reduce a membrane potential. In at least one embodiment, a leaky integrate-and-fire neuron may fire if multiple input signals are received at neuron inputs 3504 rapidly enough to exceed a threshold value (i.e., before a membrane potential decays too low to fire). In at least one embodiment, neurons 3502 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3502 may include, without limitation, comparator circuits or logic that generate an output spike at neuron output 3506 when result of applying a transfer function to neuron input 3504 exceeds a threshold. In at least one embodiment, once neuron 3502 fires, it may disregard previously received input information by, for example, resetting a membrane potential to 0 or another suitable default value. In at least one embodiment, once membrane potential is reset to 0, neuron 3502 may resume normal operation after a suitable period of time (or refractory period).

In at least one embodiment, neurons 3502 may be interconnected through synapses 3508. In at least one embodiment, synapses 3508 may operate to transmit signals from an output of a first neuron 3502 to an input of a second neuron 3502. In at least one embodiment, neurons 3502 may transmit information over more than one instance of synapse 3508. In at least one embodiment, one or more instances of neuron output 3506 may be connected, via an instance of synapse 3508, to an instance of neuron input 3504 in same neuron 3502. In at least one embodiment, an instance of neuron 3502 generating an output to be transmitted over an instance of synapse 3508 may be referred to as a "pre-synaptic neuron" with respect to that instance of synapse 3508. In at least one embodiment, an instance of neuron 3502 receiving an input transmitted over an instance of synapse 3508 may be referred to as a "post-synaptic neuron" with respect to that instance of synapse 3508. Because an instance of neuron 3502 may receive inputs from one or more instances of synapse 3508, and may also transmit outputs over one or more instances of synapse 3508, a single instance of neuron 3502 may therefore be both a "pre-synaptic neuron" and "post-synaptic neuron," with respect to various instances of synapses 3508, in at least one embodiment.

In at least one embodiment, neurons 3502 may be organized into one or more layers. Each instance of neuron 3502 may have one neuron output 3506 that may fan out through one or more synapses 3508 to one or more neuron inputs 3504. In at least one embodiment, neuron outputs 3506 of neurons 3502 in a first layer 3510 may be connected to neuron inputs 3504 of neurons 3502 in a second layer 3512. In at least one embodiment, layer 3510 may be referred to as a "feed-forward layer." In at least one embodiment, each instance of neuron 3502 in an instance of first layer 3510 may fan out to each instance of neuron 3502 in second layer 3512. In at least one embodiment, first layer 3510 may be referred to as a "fully connected feed-forward layer." In at least one embodiment, each instance of neuron 3502 in an instance of second layer 3512 may fan out to fewer than all instances of neuron 3502 in a third layer 3514. In at least one embodiment, second layer 3512 may be referred to as a "sparsely connected feed-forward layer." In at least one embodiment, neurons 3502 in second layer 3512 may fan out to neurons 3502 in multiple other layers, including to neurons 3502 in (same) second layer 3512. In at least one embodiment, second layer 3512 may be referred to as a "recurrent layer." neuromorphic processor 3500 may include, without limitation, any suitable combination of recurrent layers and feed-forward layers, including, without limitation, both sparsely connected feed-forward layers and fully connected feed-forward layers.

In at least one embodiment, neuromorphic processor 3500 may include, without limitation, a reconfigurable interconnect architecture or dedicated hard wired interconnects to connect synapse 3508 to neurons 3502. In at least one embodiment, neuromorphic processor 3500 may include, without limitation, circuitry or logic that allows synapses to be allocated to different neurons 3502 as needed based on neural network topology and neuron fan-in/out. For example, in at least one embodiment, synapses 3508 may be connected to neurons 3502 using an interconnect fabric, such as network-on-chip, or with dedicated connections. In at least one embodiment, synapse interconnections and components thereof may be implemented using circuitry or logic.

Figure 36:
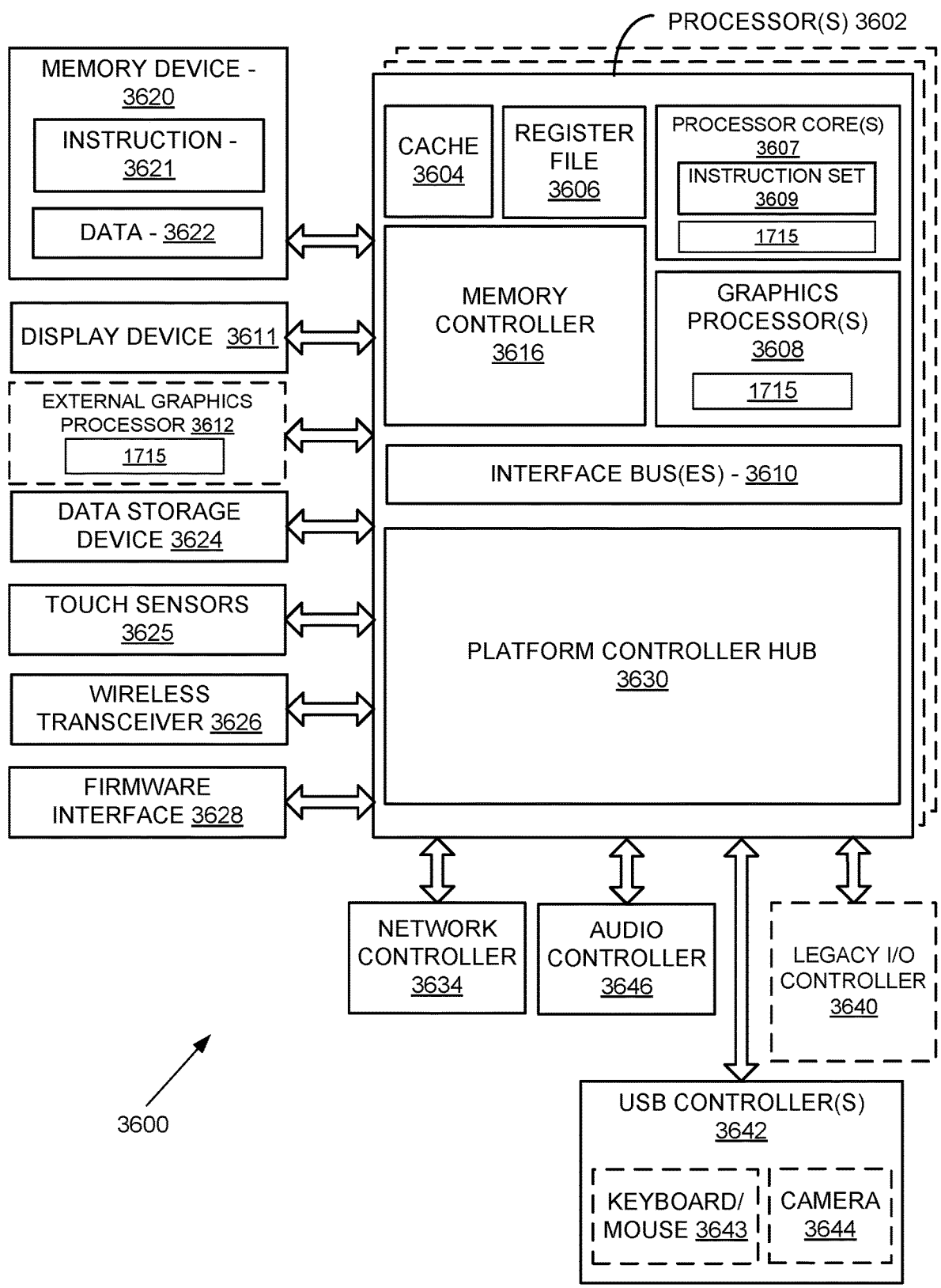
FIG. 36 illustrates at least portions of a graphics processor, according to one or more embodiments.

FIG. 36 is a block diagram of a processing system, according to at least one embodiment. In at least one embodiment, system 3600 includes one or more processors 3602 and one or more graphics processors 3608, and may be a single processor desktop system, a multiprocessor workstation system, or a server system having a large number of processors 3602 or processor cores 3607. In at least one embodiment, system 3600 is a processing platform incorporated within a system-on-a-chip (SoC) integrated circuit for use in mobile, handheld, or embedded devices.

In at least one embodiment, system 3600 can include, or be incorporated within a server-based gaming platform, a game console, including a game and media console, a mobile gaming console, a handheld game console, or an online game console. In at least one embodiment, system 3600 is a mobile phone, smart phone, tablet computing device or mobile Internet device. In at least one embodiment, processing system 3600 can also include, couple with, or be integrated within a wearable device, such as a smart watch wearable device, smart eyewear device, augmented reality device, or virtual reality device. In at least one embodiment, processing system 3600 is a television or set top box device having one or more processors 3602 and a graphical interface generated by one or more graphics processors 3608.

In at least one embodiment, one or more processors 3602 each include one or more processor cores 3607 to process instructions which, when executed, perform operations for system and user software. In at least one embodiment, each of one or more processor cores 3607 is configured to process a specific instruction set 3609. In at least one embodiment, instruction set 3609 may facilitate Complex Instruction Set Computing (CISC), Reduced Instruction Set Computing (RISC), or computing via a Very Long Instruction Word (VLIW). In at least one embodiment, processor cores 3607 may each process a different instruction set 3609, which may include instructions to facilitate emulation of other instruction sets. In at least one embodiment, processor core 3607 may also include other processing devices, such a Digital Signal Processor (DSP).

In at least one embodiment, processor 3602 includes cache memory 3604. In at least one embodiment, processor 3602 can have a single internal cache or multiple levels of internal cache. In at least one embodiment, cache memory is shared among various components of processor 3602. In at least one embodiment, processor 3602 also uses an external cache (e.g., a Level-3 (L3) cache or Last Level Cache (LLC)) (not shown), which may be shared among processor cores 3607 using known cache coherency techniques. In at least one embodiment, register file 3606 is additionally included in processor 3602 which may include different types of registers for storing different types of data (e.g., integer registers, floating point registers, status registers, and an instruction pointer register). In at least one embodiment, register file 3606 may include general-purpose registers or other registers.

In at least one embodiment, one or more processor(s) 3602 are coupled with one or more interface bus(es) 3610 to transmit communication signals such as address, data, or control signals between processor 3602 and other components in system 3600. In at least one embodiment interface bus 3610, in one embodiment, can be a processor bus, such as a version of a Direct Media Interface (DMI) bus. In at least one embodiment, interface 3610 is not limited to a DMI bus, and may include one or more Peripheral Component Interconnect buses (e.g., PCI, PCI Express), memory busses, or other types of interface busses. In at least one embodiment processor(s) 3602 include an integrated memory controller 3616 and a platform controller hub 3630. In at least one embodiment, memory controller 3616 facilitates communication between a memory device and other components of system 3600, while platform controller hub (PCH) 3630 provides connections to I/O devices via a local I/O bus.

In at least one embodiment, memory device 3620 can be a dynamic random access memory (DRAM) device, a static random access memory (SRAM) device, flash memory device, phase-change memory device, or some other memory device having suitable performance to serve as process memory. In at least one embodiment memory device 3620 can operate as system memory for system 3600, to store data 3622 and instructions 3621 for use when one or more processors 3602 executes an application or process. In at least one embodiment, memory controller 3616 also couples with an optional external graphics processor 3612, which may communicate with one or more graphics processors 3608 in processors 3602 to perform graphics and media operations. In at least one embodiment, a display device 3611 can connect to processor(s) 3602. In at least one embodiment display device 3611 can include one or more of an internal display device, as in a mobile electronic device or a laptop device or an external display device attached via a display interface (e.g., DisplayPort, etc.). In at least one embodiment, display device 3611 can include a head mounted display (HMD) such as a stereoscopic display device for use in virtual reality (VR) applications or augmented reality (AR) applications.

In at least one embodiment, platform controller hub 3630 enables peripherals to connect to memory device 3620 and processor 3602 via a high-speed I/O bus. In at least one embodiment, I/O peripherals include, but are not limited to, an audio controller 3646, a network controller 3634, a firmware interface 3628, a wireless transceiver 3626, touch sensors 3625, a data storage device 3624 (e.g., hard disk drive, flash memory, etc.). In at least one embodiment, data storage device 3624 can connect via a storage interface (e.g., SATA) or via a peripheral bus, such as a Peripheral Component Interconnect bus (e.g., PCI, PCI Express). In at least one embodiment, touch sensors 3625 can include touch screen sensors, pressure sensors, or fingerprint sensors. In at least one embodiment, wireless transceiver 3626 can be a Wi-Fi transceiver, a Bluetooth transceiver, or a mobile network transceiver such as a 3G, 4G, or Long Term Evolution (LTE) transceiver. In at least one embodiment, firmware interface 3628 enables communication with system firmware, and can be, for example, a unified extensible firmware interface (UEFI). In at least one embodiment, network controller 3634 can enable a network connection to a wired network. In at least one embodiment, a high-performance network controller (not shown) couples with interface bus 3610. In at least one embodiment, audio controller 3646 is a multi-channel high definition audio controller. In at least one embodiment, system 3600 includes an optional legacy I/O controller 3640 for coupling legacy (e.g., Personal System 2 (PS/2)) devices to system. In at least one embodiment, platform controller hub 3630 can also connect to one or more Universal Serial Bus (USB) controllers 3642 connect input devices, such as keyboard and mouse 3643 combinations, a camera 3644, or other USB input devices.

In at least one embodiment, an instance of memory controller 3616 and platform controller hub 3630 may be integrated into a discreet external graphics processor, such as external graphics processor 3612. In at least one embodiment, platform controller hub 3630 and/or memory controller 3616 may be external to one or more processor(s) 3602. For example, in at least one embodiment, system 3600 can include an external memory controller 3616 and platform controller hub 3630, which may be configured as a memory controller hub and peripheral controller hub within a system chipset that is in communication with processor(s) 3602.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment portions or all of inference and/or training logic 1715 may be incorporated into graphics processor 3600. For example, in at least one embodiment, training and/or inferencing techniques described herein may use one or more of ALUs embodied in 3D pipeline 3612. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3600 to perform one or more machine learning algorithms, neural network architectures, use cases, or training techniques described herein.

Figure 37:
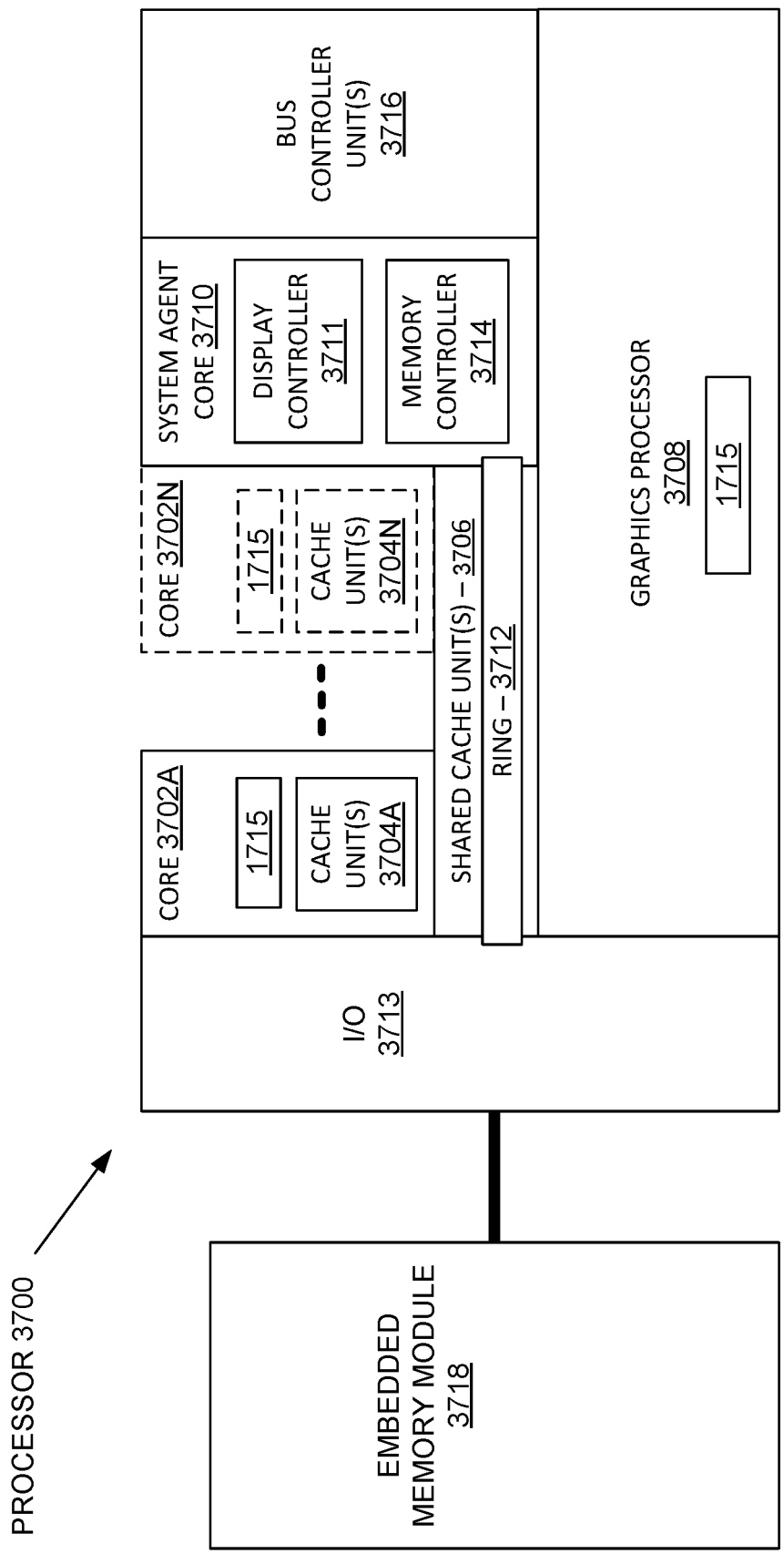
FIG. 37 illustrates at least portions of a graphics processor, according to one or more embodiments.

FIG. 37 is a block diagram of a processor 3700 having one or more processor cores 3702A-3702N, an integrated memory controller 3714, and an integrated graphics processor 3708, according to at least one embodiment. In at least one embodiment, processor 3700 can include additional cores up to and including additional core 3702N represented by dashed lined boxes. In at least one embodiment, each of processor cores 3702A-3702N includes one or more internal cache units 3704A-3704N. In at least one embodiment, each processor core also has access to one or more shared cached units 3706.

In at least one embodiment, internal cache units 3704A-3704N and shared cache units 3706 represent a cache memory hierarchy within processor 3700. In at least one embodiment, cache memory units 3704A-3704N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3706 and 3704A-3704N.

In at least one embodiment, processor 3700 may also include a set of one or more bus controller units 3716 and a system agent core 3710. In at least one embodiment, one or more bus controller units 3716 manage a set of peripheral buses, such as one or more PCI or PCI express busses. In at least one embodiment, system agent core 3710 provides management functionality for various processor components. In at least one embodiment, system agent core 3710 includes one or more integrated memory controllers 3714 to manage access to various external memory devices (not shown).

In at least one embodiment, one or more of processor cores 3702A-3702N include support for simultaneous multi-threading. In at least one embodiment, system agent core 3710 includes components for coordinating and operating cores 3702A-3702N during multi-threaded processing. In at least one embodiment, system agent core 3710 may additionally include a power control unit (PCU), which includes logic and components to regulate one or more power states of processor cores 3702A-3702N and graphics processor 3708.

In at least one embodiment, processor 3700 additionally includes graphics processor 3708 to execute graphics processing operations. In at least one embodiment, graphics processor 3708 couples with shared cache units 3706, and system agent core 3710, including one or more integrated memory controllers 3714. In at least one embodiment, system agent core 3710 also includes a display controller 3711 to drive graphics processor output to one or more coupled displays. In at least one embodiment, display controller 3711 may also be a separate module coupled with graphics processor 3708 via at least one interconnect, or may be integrated within graphics processor 3708.

In at least one embodiment, a ring based interconnect unit 3712 is used to couple internal components of processor 3700. In at least one embodiment, an alternative interconnect unit may be used, such as a point-to-point interconnect, a switched interconnect, or other techniques. In at least one embodiment, graphics processor 3708 couples with ring interconnect 3712 via an I/O link 3713.

In at least one embodiment, I/O link 3713 represents at least one of multiple varieties of I/O interconnects, including an on package I/O interconnect which facilitates communication between various processor components and a high-performance embedded memory module 3718, such as an eDRAM module. In at least one embodiment, each of processor cores 3702A-3702N and graphics processor 3708 use embedded memory modules 3718 as a shared Last Level Cache.

In at least one embodiment, processor cores 3702A-3702N are homogenous cores executing a common instruction set architecture. In at least one embodiment, processor cores 3702A-3702N are heterogeneous in terms of instruction set architecture (ISA), where one or more of processor cores 3702A-3702N execute a common instruction set, while one or more other cores of processor cores 3702A-3702N executes a subset of a common instruction set or a different instruction set. In at least one embodiment, processor cores 3702A-3702N are heterogeneous in terms of microarchitecture, where one or more cores having a relatively higher power consumption couple with one or more power cores having a lower power consumption. In at least one embodiment, processor 3700 can be implemented on one or more chips or as an SoC integrated circuit.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment portions or all of inference and/or training logic 1715 may be incorporated into graphics processor 3710. For example, in at least one embodiment, training and/or inferencing techniques described herein may use one or more of ALUs embodied in 3D pipeline 3612, graphics core(s) 3715A, shared function logic 3716, graphics core(s) 3715B, shared function logic 3720, or other logic in FIG. 37. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3710 to perform one or more machine learning algorithms, neural network architectures, use cases, or training techniques described herein.

Figure 38:
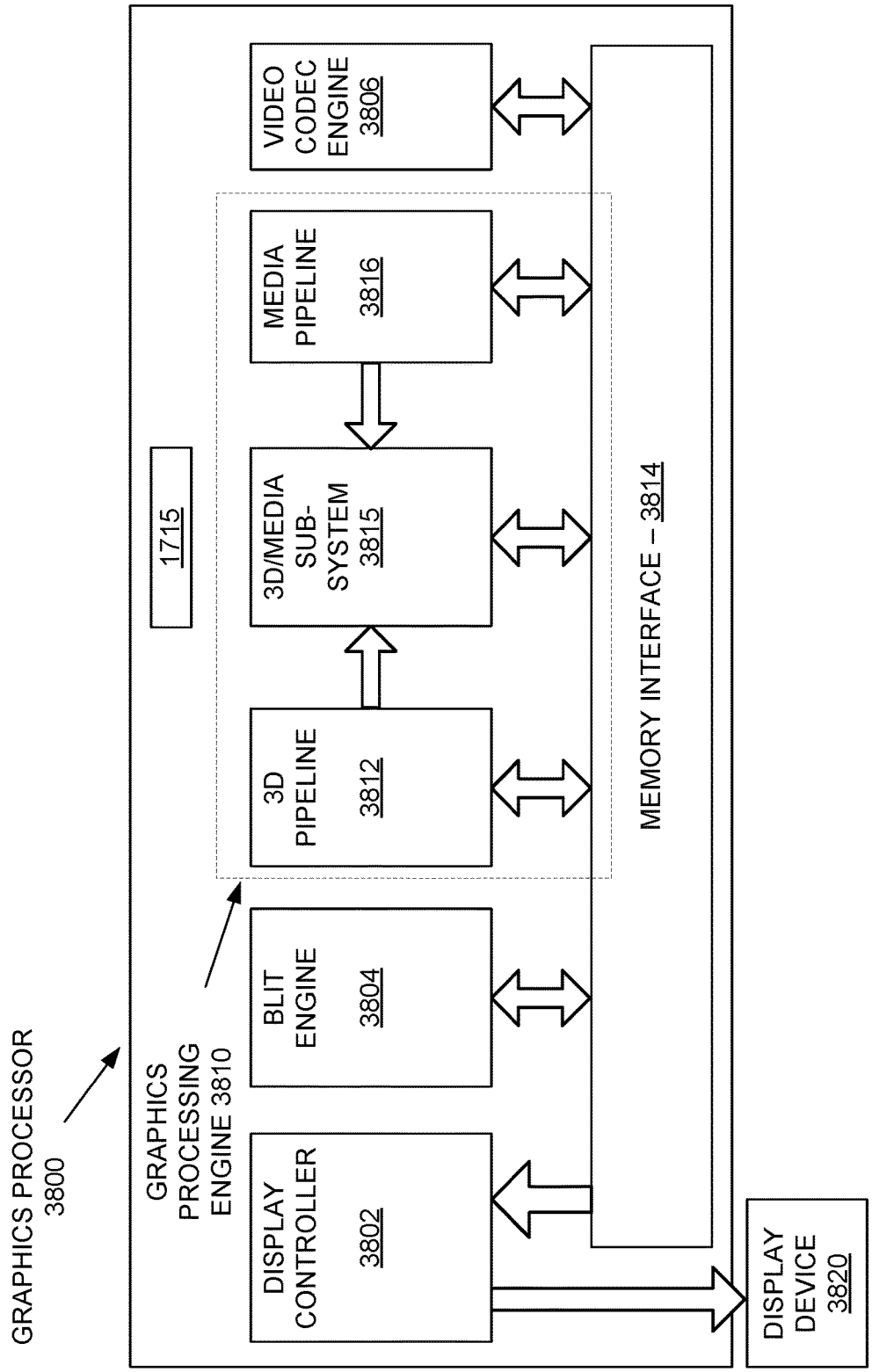
FIG. 38 illustrates at least portions of a graphics processor, according to one or more embodiments.

FIG. 38 is a block diagram of a graphics processor 3800, which may be a discrete graphics processing unit, or may be a graphics processor integrated with a plurality of processing cores. In at least one embodiment, graphics processor 3800 communicates via a memory mapped I/O interface to registers on graphics processor 3800 and with commands placed into memory. In at least one embodiment, graphics processor 3800 includes a memory interface 3814 to access memory. In at least one embodiment, memory interface 3814 is an interface to local memory, one or more internal caches, one or more shared external caches, and/or to system memory.

In at least one embodiment, graphics processor 3800 also includes a display controller 3802 to drive display output data to a display device 3820. In at least one embodiment, display controller 3802 includes hardware for one or more overlay planes for display device 3820 and composition of multiple layers of video or user interface elements. In at least one embodiment, display device 3820 can be an internal or external display device. In at least one embodiment, display device 3820 is a head mounted display device, such as a virtual reality (VR) display device or an augmented reality (AR) display device. In at least one embodiment, graphics processor 3800 includes a video codec engine 3806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3800 includes a block image transfer (BLIT) engine 3804 to perform two-dimensional (2D) rasterizer operations including, for example, bit-boundary block transfers. However, in at least one embodiment, 2D graphics operations are performed using one or more components of graphics processing engine (GPE) 3810. In at least one embodiment, GPE 3810 is a compute engine for performing graphics operations, including three-dimensional (3D) graphics operations and media operations.

In at least one embodiment, GPE 3810 includes a 3D pipeline 3812 for performing 3D operations, such as rendering three-dimensional images and scenes using processing functions that act upon 3D primitive shapes (e.g., rectangle, triangle, etc.). 3D pipeline 3812 includes programmable and fixed function elements that perform various tasks and/or spawn execution threads to a 3D/Media subsystem 3815. While 3D pipeline 3812 can be used to perform media operations, in at least one embodiment, GPE 3810 also includes a media pipeline 3816 that is used to perform media operations, such as video post-processing and image enhancement.

In at least one embodiment, media pipeline 3816 includes fixed function or programmable logic units to perform one or more specialized media operations, such as video decode acceleration, video de-interlacing, and video encode acceleration in place of, or on behalf of video codec engine 3806. In at least one embodiment, media pipeline 3816 additionally includes a thread spawning unit to spawn threads for execution on 3D/Media sub-system 3815. In at least one embodiment, spawned threads perform computations for media operations on one or more graphics execution units included in 3D/Media sub-system 3815.

In at least one embodiment, 3D/Media subsystem 3815 includes logic for executing threads spawned by 3D pipeline 3812 and media pipeline 3816. In at least one embodiment, 3D pipeline 3812 and media pipeline 3816 send thread execution requests to 3D/Media subsystem 3815, which includes thread dispatch logic for arbitrating and dispatching various requests to available thread execution resources. In at least one embodiment, execution resources include an array of graphics execution units to process 3D and media threads. In at least one embodiment, 3D/Media subsystem 3815 includes one or more internal caches for thread instructions and data. In at least one embodiment, subsystem 3815 also includes shared memory, including registers and addressable memory, to share data between threads and to store output data.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment portions or all of inference and/or training logic 1715 may be incorporated into graphics processor 3800. For example, in at least one embodiment, training and/or inferencing techniques described herein may use one or more of ALUs embodied in 3D pipeline 3812. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3800 to perform one or more machine learning algorithms, neural network architectures, use cases, or training techniques described herein.

Figure 39:
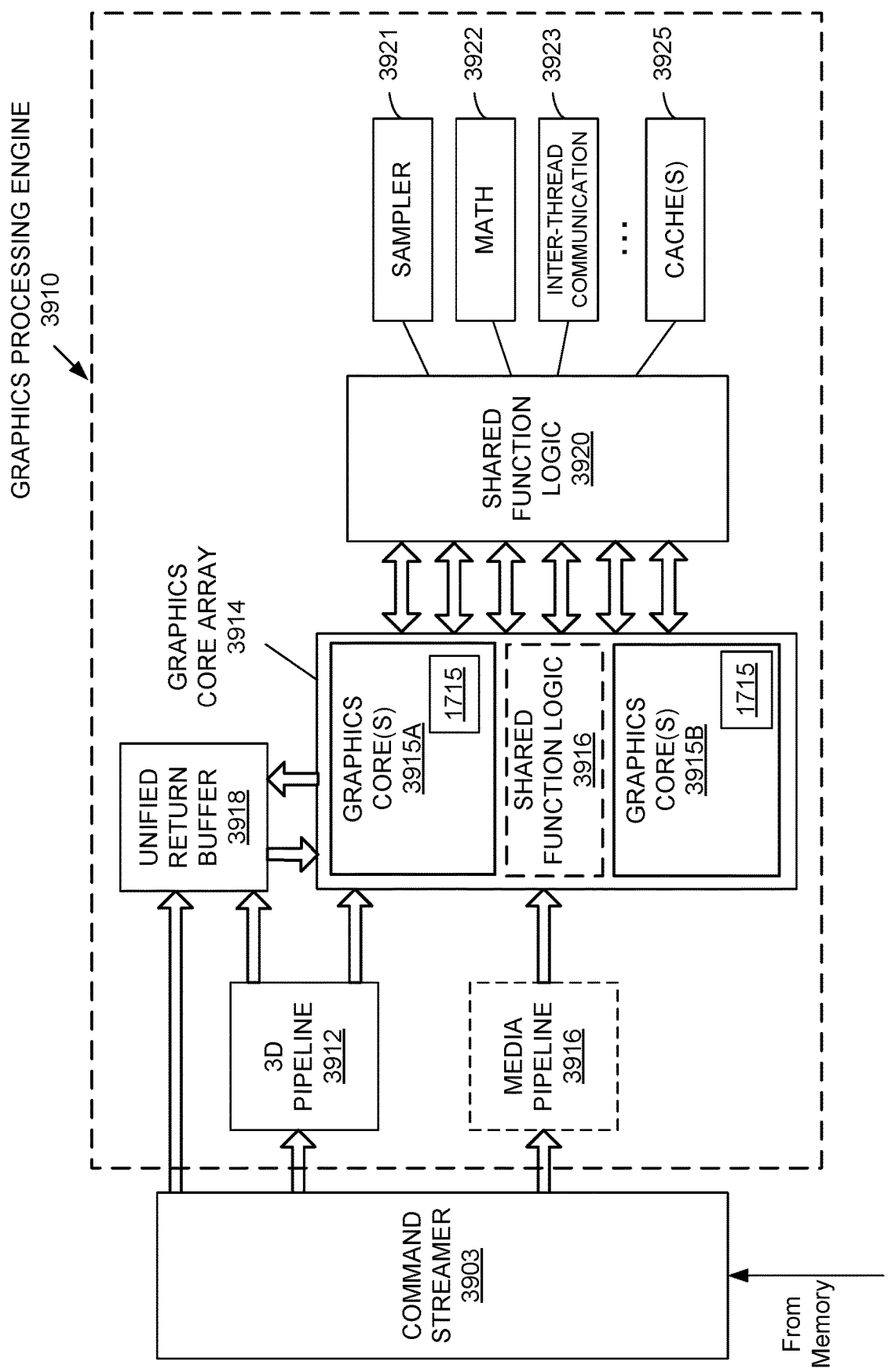
FIG. 39 is a block diagram of a graphics processing engine of a graphics processor in accordance with at least one embodiment.

FIG. 39 is a block diagram of a graphics processing engine 3910 of a graphics processor in accordance with at least one embodiment. In at least one embodiment, graphics processing engine (GPE) 3910 is a version of GPE 3810 shown in FIG. 38. In at least one embodiment, media pipeline 3816 is optional and may not be explicitly included within GPE 3910. In at least one embodiment, a separate media and/or image processor is coupled to GPE 3910.

In at least one embodiment, GPE 3910 is coupled to or includes a command streamer 3903, which provides a command stream to 3D pipeline 3812 and/or media pipelines 3816. In at least one embodiment, command streamer 3903 is coupled to memory, which can be system memory, or one or more of internal cache memory and shared cache memory. In at least one embodiment, command streamer 3903 receives commands from memory and sends commands to 3D pipeline 3812 and/or media pipeline 3816. In at least one embodiment, commands are instructions, primitives, or micro-operations fetched from a ring buffer, which stores commands for 3D pipeline 3812 and media pipeline 3816. In at least one embodiment, a ring buffer can additionally include batch command buffers storing batches of multiple commands. In at least one embodiment, commands for 3D pipeline 3812 can also include references to data stored in memory, such as but not limited to vertex and geometry data for 3D pipeline 3812 and/or image data and memory objects for media pipeline 3816. In at least one embodiment, 3D pipeline 3812 and media pipeline 3816 process commands and data by performing operations or by dispatching one or more execution threads to a graphics core array 3914. In at least one embodiment graphics core array 3914 includes one or more blocks of graphics cores (e.g., graphics core(s) 3915A, graphics core(s) 3915B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1715 in FIG. 17A and FIG. 17B.

In at least one embodiment, 3D pipeline 3812 includes fixed function and programmable logic to process one or more shader programs, such as vertex shaders, geometry shaders, pixel shaders, fragment shaders, compute shaders, or other shader programs, by processing instructions and dispatching execution threads to graphics core array 3914. In at least one embodiment, graphics core array 3914 provides a unified block of execution resources for use in processing shader programs. In at least one embodiment, multi-purpose execution logic (e.g., execution units) within graphics core(s) 3915A-3915B of graphic core array 3914 includes support for various 3D API shader languages and can execute multiple simultaneous execution threads associated with multiple shaders.

In at least one embodiment, graphics core array 3914 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3914 can output data to memory in a unified return buffer (URB) 3918. URB 3918 can store data for multiple threads. In at least one embodiment, URB 3918 may be used to send data between different threads executing on graphics core array 3914. In at least one embodiment, URB 3918 may additionally be used for synchronization between threads on graphics core array 3914 and fixed function logic within shared function logic 3920.

In at least one embodiment, graphics core array 3914 is scalable, such that graphics core array 3914 includes a variable number of graphics cores, each having a variable number of execution units based on a target power and performance level of GPE 3910. In at least one embodiment, execution resources are dynamically scalable, such that execution resources may be enabled or disabled as needed.

In at least one embodiment, graphics core array 3914 is coupled to shared function logic 3920 that includes multiple resources that are shared between graphics cores in graphics core array 3914. In at least one embodiment, shared functions performed by shared function logic 3920 are embodied in hardware logic units that provide specialized supplemental functionality to graphics core array 3914. In at least one embodiment, shared function logic 3920 includes but is not limited to sampler 3921, math 3922, and inter-thread communication (ITC) 3923 logic. In at least one embodiment, one or more cache(s) 3925 are in included in or couple to shared function logic 3920.

In at least one embodiment, a shared function is used if demand for a specialized function is insufficient for inclusion within graphics core array 3914. In at least one embodiment, a single instantiation of a specialized function is used in shared function logic 3920 and shared among other execution resources within graphics core array 3914. In at least one embodiment, specific shared functions within shared function logic 3920 that are used extensively by graphics core array 3914 may be included within shared function logic 3916 within graphics core array 3914. In at least one embodiment, shared function logic 3916 within graphics core array 3914 can include some or all logic within shared function logic 3920. In at least one embodiment, all logic elements within shared function logic 3920 may be duplicated within shared function logic 3916 of graphics core array 3914. In at least one embodiment, shared function logic 3920 is excluded in favor of shared function logic 3916 within graphics core array 3914.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment portions or all of inference and/or training logic 1715 may be incorporated into graphics processor 3910. For example, in at least one embodiment, training and/or inferencing techniques described herein may use one or more of ALUs embodied in 3D pipeline 3812, graphics core(s) 3915A, shared function logic 3916, graphics core(s) 3915B, shared function logic 3920, or other logic in FIG. 39. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3910 to perform one or more machine learning algorithms, neural network architectures, use cases, or training techniques described herein.

Figure 40:
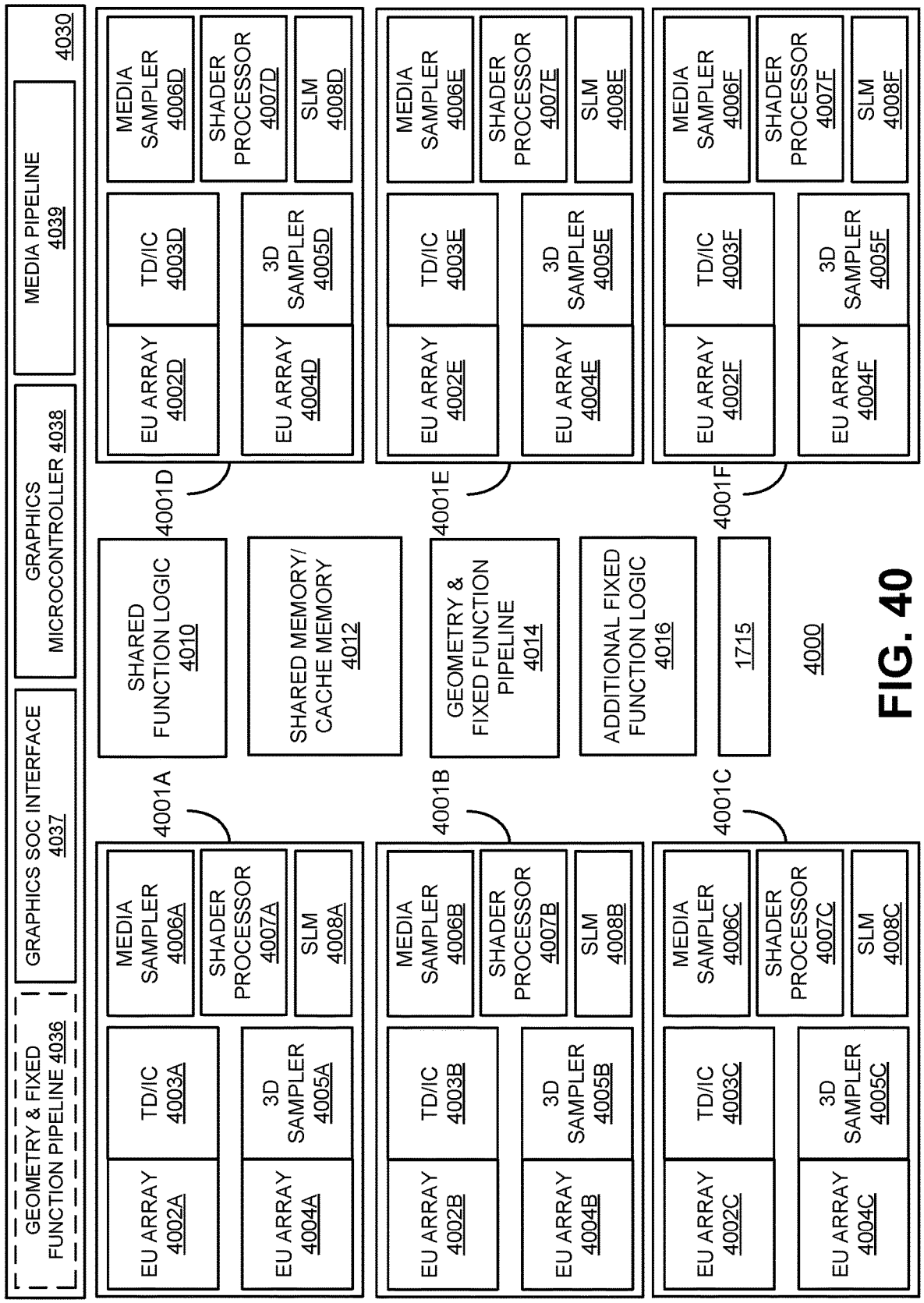
FIG. 40 is a block diagram of at least portions of a graphics processor core, according to at least one embodiment.

FIG. 40 is a block diagram of hardware logic of a graphics processor core 4000, according to at least one embodiment described herein. In at least one embodiment, graphics processor core 4000 is included within a graphics core array. In at least one embodiment, graphics processor core 4000, sometimes referred to as a core slice, can be one or multiple graphics cores within a modular graphics processor. In at least one embodiment, graphics processor core 4000 is exemplary of one graphics core slice, and a graphics processor as described herein may include multiple graphics core slices based on target power and performance envelopes. In at least one embodiment, each graphics core 4000 can include a fixed function block 4030 coupled with multiple sub-cores 4001A-4001F, also referred to as sub-slices, that include modular blocks of general-purpose and fixed function logic.

In at least one embodiment, fixed function block 4030 includes a geometry/fixed function pipeline 4036 that can be shared by all sub-cores in graphics processor 4000, for example, in lower performance and/or lower power graphics processor implementations. In at least one embodiment, geometry/fixed function pipeline 4036 includes a 3D fixed function pipeline, a video front-end unit, a thread spawner and thread dispatcher, and a unified return buffer manager, which manages unified return buffers.

In at least one embodiment fixed function block 4030 also includes a graphics SoC interface 4037, a graphics microcontroller 4038, and a media pipeline 4039. Graphics SoC interface 4037 provides an interface between graphics core 4000 and other processor cores within a system on a chip integrated circuit. In at least one embodiment, graphics microcontroller 4038 is a programmable sub-processor that is configurable to manage various functions of graphics processor 4000, including thread dispatch, scheduling, and pre-emption. In at least one embodiment, media pipeline 4039 includes logic to facilitate decoding, encoding, pre-processing, and/or post-processing of multimedia data, including image and video data. In at least one embodiment, media pipeline 4039 implement media operations via requests to compute or sampling logic within sub-cores 4001-4001F.

In at least one embodiment, SoC interface 4037 enables graphics core 4000 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 4037 can also enable communication with fixed function devices within an SoC, such as camera imaging pipelines, and enables use of and/or implements global memory atomics that may be shared between graphics core 4000 and CPUs within an SoC. In at least one embodiment, SoC interface 4037 can also implement power management controls for graphics core 4000 and enable an interface between a clock domain of graphic core 4000 and other clock domains within an SoC. In at least one embodiment, SoC interface 4037 enables receipt of command buffers from a command streamer and global thread dispatcher that are configured to provide commands and instructions to each of one or more graphics cores within a graphics processor. In at least one embodiment, commands and instructions can be dispatched to media pipeline 4039, when media operations are to be performed, or a geometry and fixed function pipeline (e.g., geometry and fixed function pipeline 4036, geometry and fixed function pipeline 4014) when graphics processing operations are to be performed.

In at least one embodiment, graphics microcontroller 4038 can be configured to perform various scheduling and management tasks for graphics core 4000. In at least one embodiment, graphics microcontroller 4038 can perform graphics and/or compute workload scheduling on various graphics parallel engines within execution unit (EU) arrays 4002A-4002F, 4004A-4004F within sub-cores 4001A-4001F. In at least one embodiment, host software executing on a CPU core of an SoC including graphics core 4000 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 4038 can also facilitate low-power or idle states for graphics core 4000, providing graphics core 4000 with an ability to save and restore registers within graphics core 4000 across low-power state transitions independently from an operating system and/or graphics driver software on a system.

In at least one embodiment, graphics core 4000 may have greater than or fewer than illustrated sub-cores 4001A-4001F, up to N modular sub-cores. For each set of N sub-cores, in at least one embodiment, graphics core 4000 can also include shared function logic 4010, shared and/or cache memory 4012, a geometry/fixed function pipeline 4014, as well as additional fixed function logic 4016 to accelerate various graphics and compute processing operations. In at least one embodiment, shared function logic 4010 can include logic units (e.g., sampler, math, and/or inter-thread communication logic) that can be shared by each N sub-cores within graphics core 4000. Shared and/or cache memory 4012 can be a last-level cache for N sub-cores 4001A-4001F within graphics core 4000 and can also serve as shared memory that is accessible by multiple sub-cores. In at least one embodiment, geometry/fixed function pipeline 4014 can be included instead of geometry/fixed function pipeline 4036 within fixed function block 4030 and can include same or similar logic units.

In at least one embodiment, graphics core 4000 includes additional fixed function logic 4016 that can include various fixed function acceleration logic for use by graphics core 4000. In at least one embodiment, additional fixed function logic 4016 includes an additional geometry pipeline for use in position only shading. In position-only shading, at least two geometry pipelines exist, whereas in a full geometry pipeline within geometry/fixed function pipeline 4016, 4036, and a cull pipeline, which is an additional geometry pipeline which may be included within additional fixed function logic 4016. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4016 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 4016 can also include machine-learning acceleration logic, such as fixed function matrix multiplication logic, for implementations including optimizations for machine learning training or inferencing.

In at least one embodiment, within each graphics sub-core 4001A-4001F includes a set of execution resources that may be used to perform graphics, media, and compute operations in response to requests by graphics pipeline, media pipeline, or shader programs. In at least one embodiment, graphics sub-cores 4001A-4001F include multiple EU arrays 4002A-4002F, 4004A-4004F, thread dispatch and inter-thread communication (TD/IC) logic 4003A-4003F, a 3D (e.g., texture) sampler 4005A-4005F, a media sampler 4006A-4006F, a shader processor 4007A-4007F, and shared local memory (SLM) 4008A-4008F. EU arrays 4002A-4002F, 4004A-4004F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 4003A-4003F performs local thread dispatch and thread control operations for execution units within a sub-core and facilitate communication between threads executing on execution units of a sub-core. In at least one embodiment, 3D sampler 4005A-4005F can read texture or other 3D graphics related data into memory. In at least one embodiment, 3D sampler can read texture data differently based on a configured sample state and texture format associated with a given texture. In at least one embodiment, media sampler 4006A-4006F can perform similar read operations based on a type and format associated with media data. In at least one embodiment, each graphics sub-core 4001A-4001F can alternately include a unified 3D and media sampler. In at least one embodiment, threads executing on execution units within each of sub-cores 4001A-4001F can make use of shared local memory 4008A-4008F within each sub-core, to enable threads executing within a thread group to execute using a common pool of on-chip memory.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, portions or all of inference and/or training logic 1715 may be incorporated into graphics processor 4010. For example, in at least one embodiment, training and/or inferencing techniques described herein may use one or more of ALUs embodied in 3D pipeline 4010, graphics microcontroller 4038, geometry & fixed function pipeline 4014 and 4036, or other logic in FIG. 37. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 4000 to perform one or more machine learning algorithms, neural network architectures, use cases, or training techniques described herein.

Figure 41A:
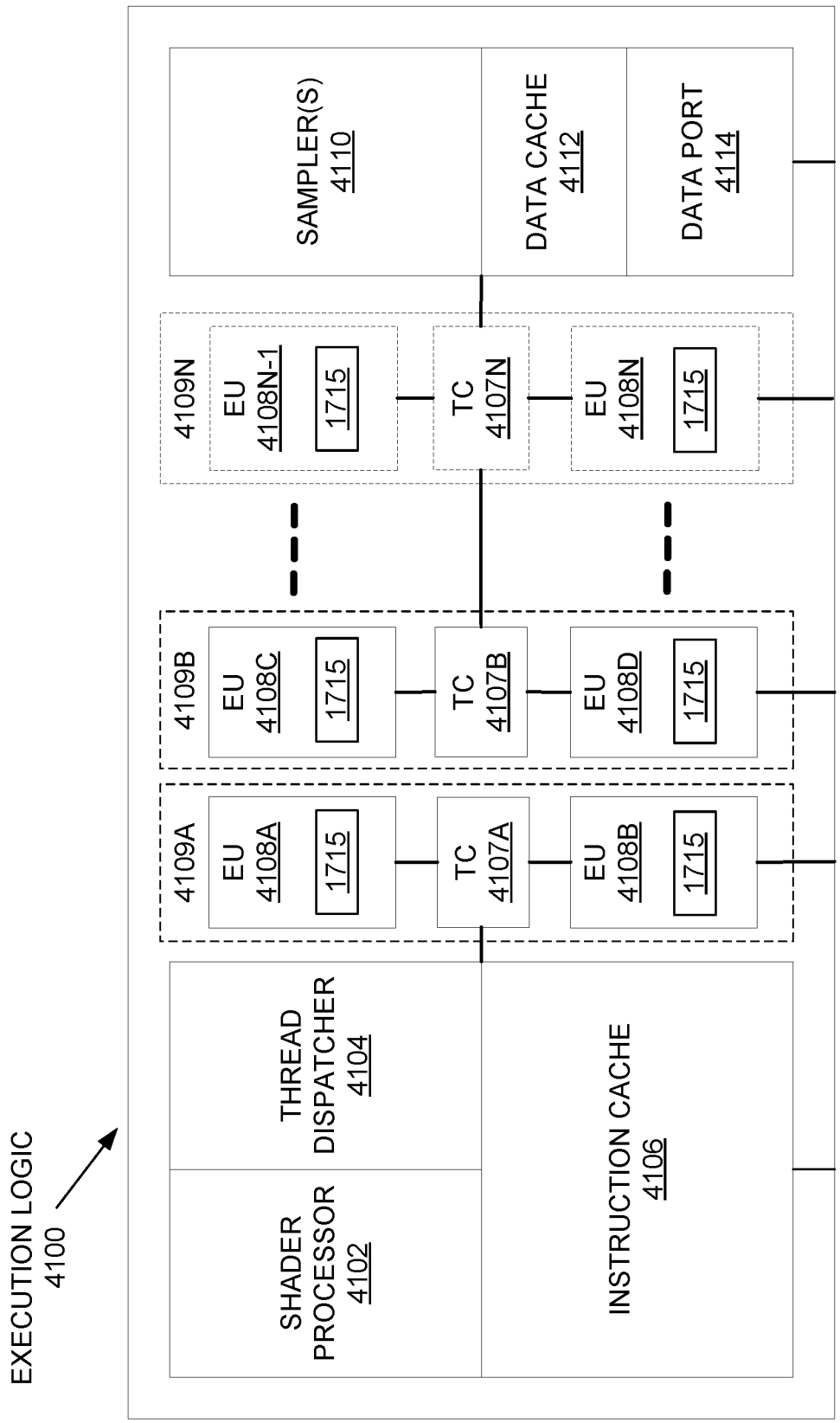
FIGS. 41A and 41B illustrate thread execution logic including an array of processing elements of a graphics processor core according to at least one embodiment
Figure 41B:
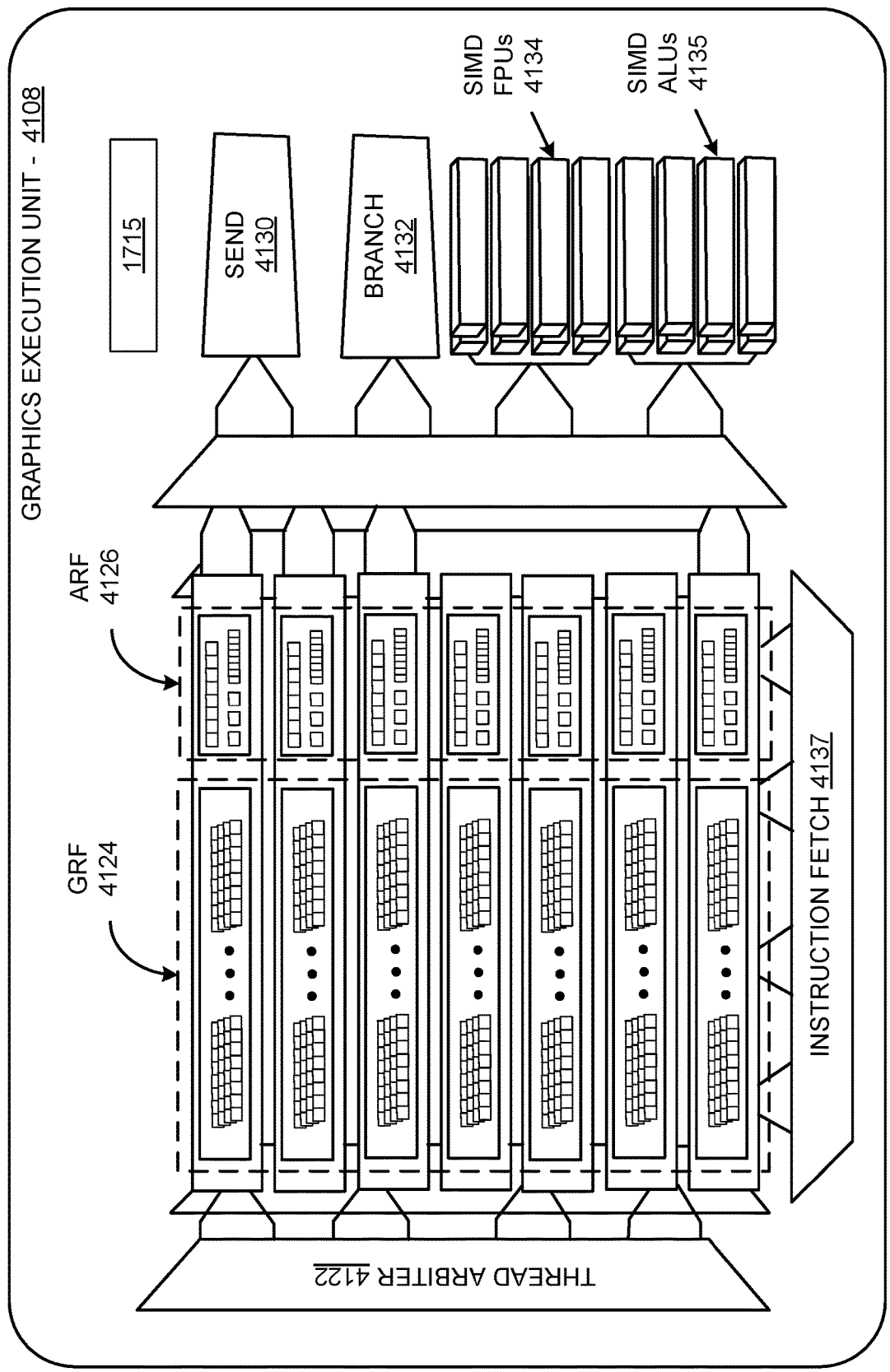

FIGS. 41A-41B illustrate thread execution logic 4100 including an array of processing elements of a graphics processor core according to at least one embodiment. FIG. 41A illustrates at least one embodiment, in which thread execution logic 4100 is used. FIG. 41B illustrates exemplary internal details of an execution unit, according to at least one embodiment.

As illustrated in FIG. 41A, in at least one embodiment, thread execution logic 4100 includes a shader processor 4102, a thread dispatcher 4104, instruction cache 4106, a scalable execution unit array including a plurality of execution units 4108A-4108N, a sampler 4110, a data cache 4112, and a data port 4114. In at least one embodiment a scalable execution unit array can dynamically scale by enabling or disabling one or more execution units (e.g., any of execution unit 4108A, 4108B, 4108C, 4108D, through 4108N-1 and 4108N) based on computational requirements of a workload, for example. In at least one embodiment, scalable execution units are interconnected via an interconnect fabric that links to each of execution unit. In at least one embodiment, thread execution logic 4100 includes one or more connections to memory, such as system memory or cache memory, through one or more of instruction cache 4106, data port 4114, sampler 4110, and execution units 4108A-4108N. In at least one embodiment, each execution unit (e.g., 4108A) is a stand-alone programmable general-purpose computational unit that is capable of executing multiple simultaneous hardware threads while processing multiple data elements in parallel for each thread. In at least one embodiment, array of execution units 4108A-4108N is scalable to include any number individual execution units.

In at least one embodiment, execution units 4108A-4108N are primarily used to execute shader programs. In at least one embodiment, shader processor 4102 can process various shader programs and dispatch execution threads associated with shader programs via a thread dispatcher 4104. In at least one embodiment, thread dispatcher 4104 includes logic to arbitrate thread initiation requests from graphics and media pipelines and instantiate requested threads on one or more execution units in execution units 4108A-4108N. For example, in at least one embodiment, a geometry pipeline can dispatch vertex, tessellation, or geometry shaders to thread execution logic for processing. In at least one embodiment, thread dispatcher 4104 can also process runtime thread spawning requests from executing shader programs.

In at least one embodiment, execution units 4108A-4108N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4108A-4108N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4108A-4108N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4108A-4108N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4108A-4108N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4109A-4109N having thread control logic (4107A-4107N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4109A-4109N includes at least two execution units. For example, in at least one embodiment, fused execution unit 4109A includes a first EU 4108A, second EU 4108B, and thread control logic 4107A that is common to first EU 4108A and second EU 4108B. In at least one embodiment, thread control logic 4107A controls threads executed on fused graphics execution unit 4109A, allowing each EU within fused execution units 4109A-4109N to execute using a common instruction pointer register.

In at least one embodiment, one or more internal instruction caches (e.g., 4106) are included in thread execution logic 4100 to cache thread instructions for execution units. In at least one embodiment, one or more data caches (e.g., 4112) are included to cache thread data during thread execution. In at least one embodiment, a sampler 4110 is included to provide texture sampling for 3D operations and media sampling for media operations. In at least one embodiment, sampler 4110 includes specialized texture or media sampling functionality to process texture or media data during sampling process before providing sampled data to an execution unit.

During execution, in at least one embodiment, graphics and media pipelines send thread initiation requests to thread execution logic 4100 via thread spawning and dispatch logic. In at least one embodiment, once a group of geometric objects has been processed and rasterized into pixel data, pixel processor logic (e.g., pixel shader logic, fragment shader logic, etc.) within shader processor 4102 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4102 then executes an application programming interface (API)-supplied pixel or fragment shader program. In at least one embodiment, to execute a shader program, shader processor 4102 dispatches threads to an execution unit (e.g., 4108A) via thread dispatcher 4104. In at least one embodiment, shader processor 4102 uses texture sampling logic in sampler 4110 to access texture data in texture maps stored in memory. In at least one embodiment, arithmetic operations on texture data and input geometry data compute pixel color data for each geometric fragment, or discards one or more pixels from further processing.

In at least one embodiment, data port 4114 provides a memory access mechanism for thread execution logic 4100 to output processed data to memory for further processing on a graphics processor output pipeline. In at least one embodiment, data port 4114 includes or couples to one or more cache memories (e.g., data cache 4112) to cache data for memory access via a data port.

As illustrated in FIG. 41B, in at least one embodiment, a graphics execution unit 4108 can include an instruction fetch unit 4137, a general register file array (GRF) 4124, an architectural register file array (ARF) 4126, a thread arbiter 4122, a send unit 4130, a branch unit 4132, a set of SIMD floating point units (FPUs) 4134, and In at least one embodiment a set of dedicated integer SIMD ALUs 4135. In at least one embodiment, GRF 4124 and ARF 4126 includes a set of general register files and architecture register files associated with each simultaneous hardware thread that may be active in graphics execution unit 4108. In at least one embodiment, per thread architectural state is maintained in ARF 4126, while data used during thread execution is stored in GRF 4124. In at least one embodiment, execution state of each thread, including instruction pointers for each thread, can be held in thread-specific registers in ARF 4126.

In at least one embodiment, graphics execution unit 4108 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4108 can co-issue multiple instructions, which may each be different instructions. In at least one embodiment, thread arbiter 4122 of graphics execution unit thread 4108 can dispatch instructions to one of send unit 4130, branch unit 4142, or SIMD FPU(s) 4134 for execution. In at least one embodiment, each execution thread can access 128 general-purpose registers within GRF 4124, where each register can store 32 bytes, accessible as a SIMD 8-element vector of 32-bit data elements. In at least one embodiment, each execution unit thread has access to 4 Kbytes within GRF 4124, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4124 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4130. In at least one embodiment, branch instructions are dispatched to a dedicated branch unit 4132 to facilitate SIMD divergence and eventual convergence.

In at least one embodiment graphics execution unit 4108 includes one or more SIMD floating point units (FPU(s)) 4134 to perform floating-point operations. In at least one embodiment, FPU(s) 4134 also support integer computation. In at least one embodiment FPU(s) 4134 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4135 are also present, and may be specifically optimized to perform operations associated with machine learning computations.

In at least one embodiment, arrays of multiple instances of graphics execution unit 4108 can be instantiated in a graphics sub-core grouping (e.g., a sub-slice). In at least one embodiment execution unit 4108 can execute instructions across a plurality of execution channels. In at least one embodiment, each thread executed on graphics execution unit 4108 is executed on a different channel.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, portions or all of inference and/or training logic 1715 may be incorporated into execution logic 4100. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of execution logic 4100 to perform one or more machine learning algorithms, neural network architectures, use cases, or training techniques described herein.

Figure 42:
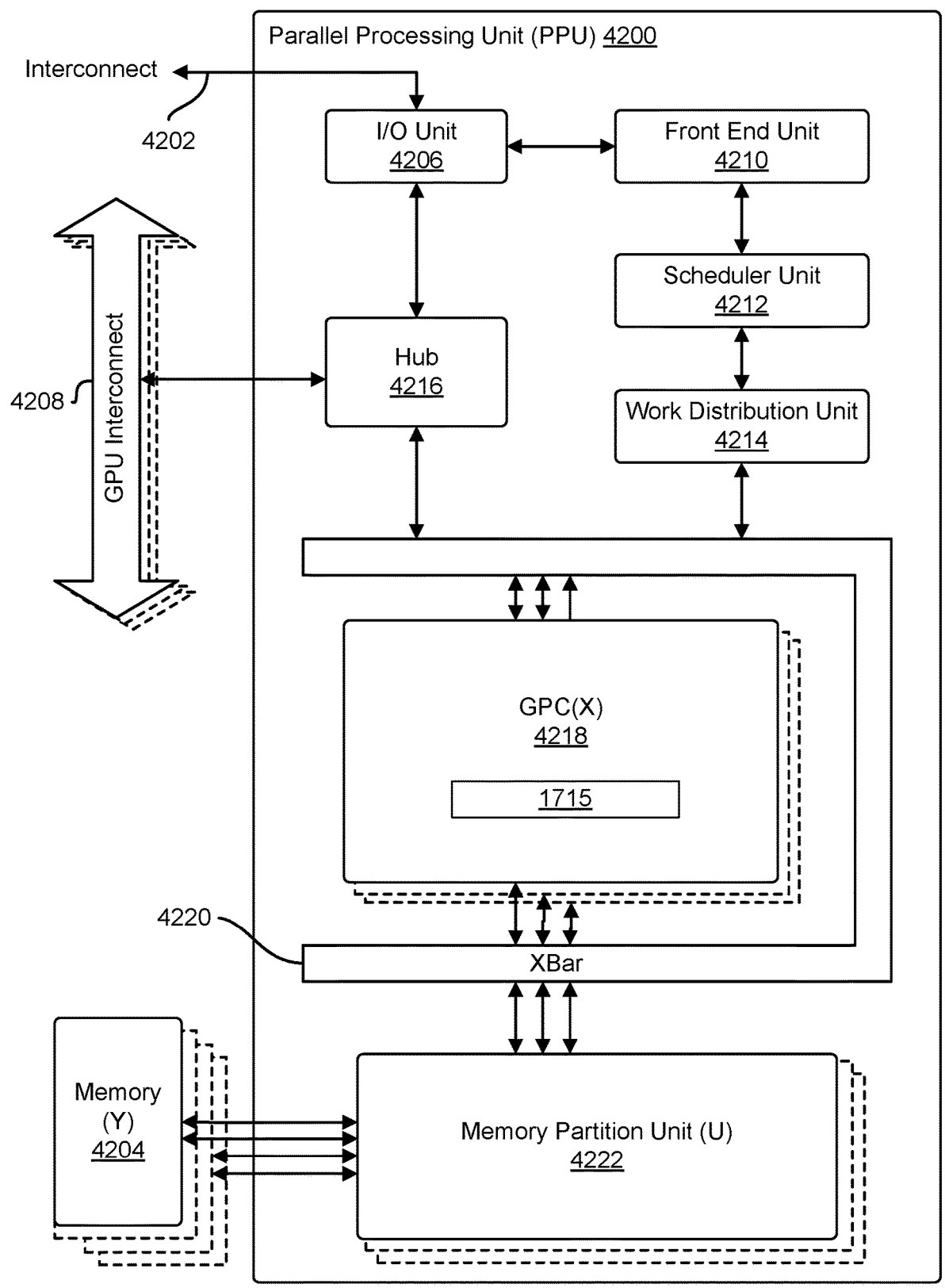
FIG. 42 illustrates a parallel processing unit ("PPU"), according to at least one embodiment.

FIG. 42 illustrates a parallel processing unit ("PPU") 4200, according to at least one embodiment. In at least one embodiment, PPU 4200 is configured with machine-readable code that, if executed by PPU 4200, causes PPU 4200 to perform some or all of processes and techniques described throughout this disclosure. In at least one embodiment, PPU 4200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4200. In at least one embodiment, PPU 4200 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4200 is utilized to perform computations such as linear algebra operations and machine-learning operations. FIG. 42 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4200 are configured to accelerate High Performance Computing ("HPC"), data center, and machine learning applications. In at least one embodiment, PPU 4200 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4200 includes, without limitation, an Input/Output ("I/O") unit 4206, a front-end unit 4210, a scheduler unit 4212, a work distribution unit 4214, a hub 4216, a crossbar ("Xbar") 4220, one or more general processing clusters ("GPCs") 4218, and one or more partition units ("memory partition units") 4222. In at least one embodiment, PPU 4200 is connected to a host processor or other PPUs 4200 via one or more high-speed GPU interconnects ("GPU interconnects") 4208. In at least one embodiment, PPU 4200 is connected to a host processor or other peripheral devices via an interconnect 4202. In at least one embodiment, PPU 4200 is connected to a local memory comprising one or more memory devices ("memory") 4204. In at least one embodiment, memory devices 4204 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4208 may refer to a wire-based multi-lane communications link that is used by systems to scale and include one or more PPUs 4200 combined with one or more central processing units ("CPUs"), supports cache coherence between PPUs 4200 and CPUs, and CPU mastering. In at least one embodiment, data and/or commands are transmitted by high-speed GPU interconnect 4208 through hub 4216 to/from other units of PPU 4200 such as one or more copy engines, video encoders, video decoders, power management units, and other components which may not be explicitly illustrated in FIG. 42.

In at least one embodiment, I/O unit 4206 is configured to transmit and receive communications (e.g., commands, data) from a host processor (not illustrated in FIG. 42) over system bus 14202. In at least one embodiment, I/O unit 4206 communicates with host processor directly via system bus 4202 or through one or more intermediate devices such as a memory bridge. In at least one embodiment, I/O unit 4206 may communicate with one or more other processors, such as one or more of PPUs 4200 via system bus 4202. In at least one embodiment, I/O unit 4206 implements a Peripheral Component Interconnect Express ("PCIe") interface for communications over a PCIe bus. In at least one embodiment, I/O unit 4206 implements interfaces for communicating with external devices.

In at least one embodiment, I/O unit 4206 decodes packets received via system bus 4202. In at least one embodiment, at least some packets represent commands configured to cause PPU 4200 to perform various operations. In at least one embodiment, I/O unit 4206 transmits decoded commands to various other units of PPU 4200 as specified by commands. In at least one embodiment, commands are transmitted to front-end unit 4210 and/or transmitted to hub 4216 or other units of PPU 4200 such as one or more copy engines, a video encoder, a video decoder, a power management unit, etc. (not explicitly illustrated in FIG. 42). In at least one embodiment, I/O unit 4206 is configured to route communications between and among various logical units of PPU 4200.

In at least one embodiment, a program executed by host processor encodes a command stream in a buffer that provides workloads to PPU 4200 for processing. In at least one embodiment, a workload comprises instructions and data to be processed by those instructions. In at least one embodiment, buffer is a region in a memory that is accessible (e.g., read/write) by both host processor and PPU 4200—a host interface unit may be configured to access buffer in a system memory connected to system bus 4202 via memory requests transmitted over system bus 4202 by I/O unit 4206. In at least one embodiment, host processor writes command stream to buffer and then transmits a pointer to start of command stream to PPU 4200 such that front-end unit 4210 receives pointers to one or more command streams and manages one or more command streams, reading commands from command streams and forwarding commands to various units of PPU 4200.

In at least one embodiment, front-end unit 4210 is coupled to scheduler unit 4212 that configures various GPCs 4218 to process tasks defined by one or more command streams. In at least one embodiment, scheduler unit 4212 is configured to track state information related to various tasks managed by scheduler unit 4212 where state information may indicate which of GPCs 4218 a task is assigned to, whether task is active or inactive, a priority level associated with task, and so forth. In at least one embodiment, scheduler unit 4212 manages execution of a plurality of tasks on one or more of GPCs 4218.

In at least one embodiment, scheduler unit 4212 is coupled to work distribution unit 4214 that is configured to dispatch tasks for execution on GPCs 4218. In at least one embodiment, work distribution unit 4214 tracks a number of scheduled tasks received from scheduler unit 4212 and work distribution unit 4214 manages a pending task pool and an active task pool for each of GPCs 4218. In at least one embodiment, pending task pool comprises a number of slots (e.g., 32 slots) that contain tasks assigned to be processed by a particular GPC 4218; active task pool may comprise a number of slots (e.g., 4 slots) for tasks that are actively being processed by GPCs 4218 such that as one of GPCs 4218 completes execution of a task, that task is evicted from active task pool for GPC 4218 and one of other tasks from pending task pool is selected and scheduled for execution on GPC 4218. In at least one embodiment, if an active task is idle on GPC 4218, such as while waiting for a data dependency to be resolved, then active task is evicted from GPC 4218 and returned to pending task pool while another task in pending task pool is selected and scheduled for execution on GPC 4218.

In at least one embodiment, work distribution unit 4214 communicates with one or more GPCs 4218 via XBar 4220. In at least one embodiment, XBar 4220 is an interconnect network that couples many of units of PPU 4200 to other units of PPU 4200 and can be configured to couple work distribution unit 4214 to a particular GPC 4218. In at least one embodiment, one or more other units of PPU 4200 may also be connected to XBar 4220 via hub 4216.

In at least one embodiment, tasks are managed by scheduler unit 4212 and dispatched to one of GPCs 4218 by work distribution unit 4214. GPC 4218 is configured to process task and generate results. In at least one embodiment, results may be consumed by other tasks within GPC 4218, routed to a different GPC 4218 via XBar 4220, or stored in memory 4204. In at least one embodiment, results can be written to memory 4204 via partition units 4222, which implement a memory interface for reading and writing data to/from memory 4204. In at least one embodiment, results can be transmitted to another PPU 4204 or CPU via high-speed GPU interconnect 4208. In at least one embodiment, PPU 4200 includes, without limitation, a number U of partition units 4222 that is equal to number of separate and distinct memory devices 4204 coupled to PPU 4200. In at least one embodiment, partition unit 4222 will be described in more detail herein in conjunction with FIG. 44.

In at least one embodiment, a host processor executes a driver kernel that implements an application programming interface ("API") that enables one or more applications executing on host processor to schedule operations for execution on PPU 4200. In at least one embodiment, multiple compute applications are simultaneously executed by PPU 4200 and PPU 4200 provides isolation, quality of service ("QoS"), and independent address spaces for multiple compute applications. In at least one embodiment, an application generates instructions (e.g., in form of API calls) that cause driver kernel to generate one or more tasks for execution by PPU 4200 and driver kernel outputs tasks to one or more streams being processed by PPU 4200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 44.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, deep learning application processor is used to train a machine learning model, such as a neural network, to predict or infer information provided to PPU 4200. In at least one embodiment, deep learning application processor 4200 is used to infer or predict information based on a trained machine learning model (e.g., neural network) that has been trained by another processor or system or by PPU 4200. In at least one embodiment, PPU 4200 may be used to perform one or more neural network use cases described herein.

Figure 43:
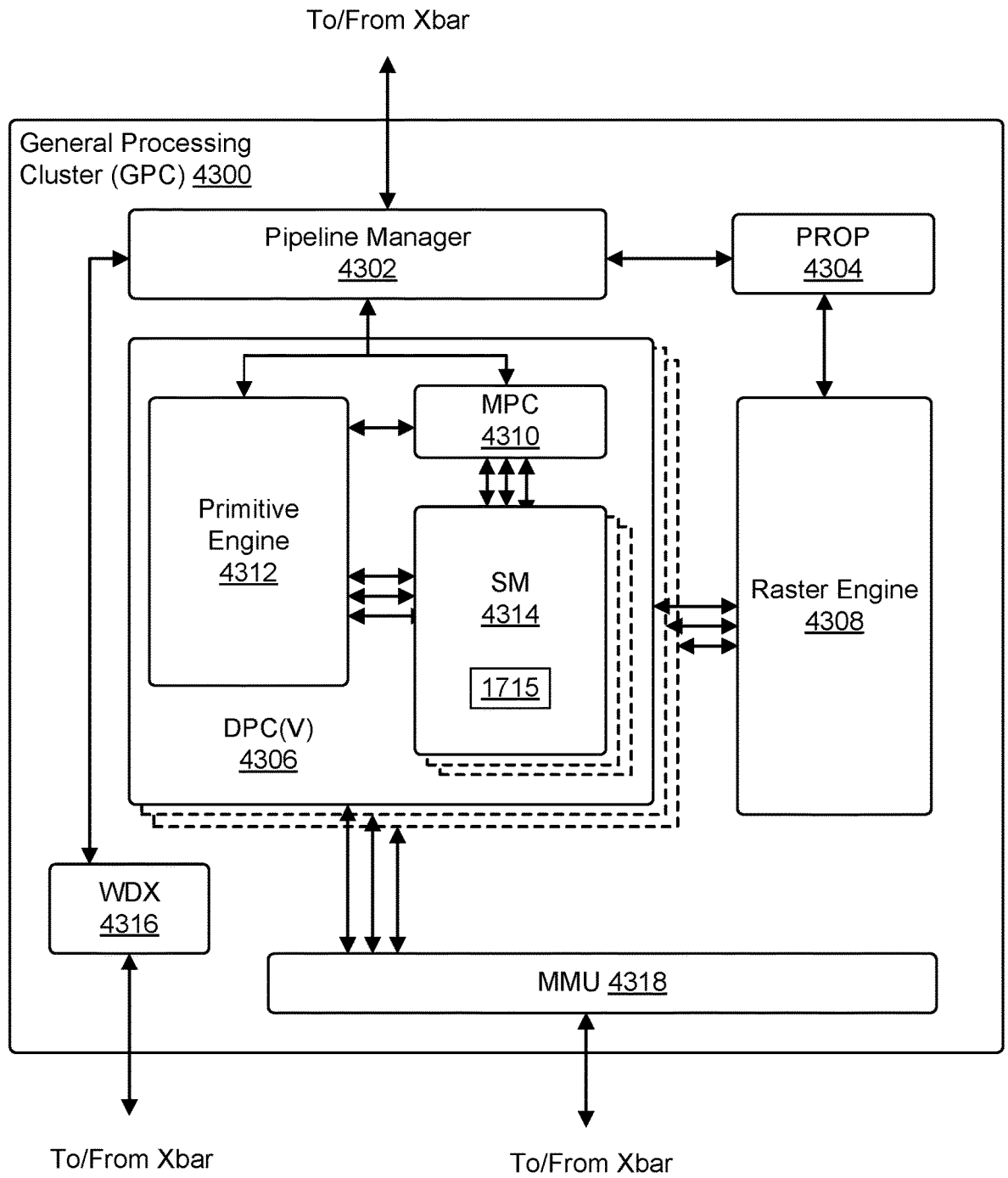
FIG. 43 illustrates a general processing cluster ("GPC"), according to at least one embodiment.

FIG. 43 illustrates a general processing cluster ("GPC") 4300, according to at least one embodiment. In at least one embodiment, GPC 4300 is GPC 4218 of FIG. 42. In at least one embodiment, each GPC 4300 includes, without limitation, a number of hardware units for processing tasks and each GPC 4300 includes, without limitation, a pipeline manager 4302, a pre-raster operations unit ("PROP") 4304, a raster engine 4308, a work distribution crossbar ("WDX") 4316, a memory management unit ("MMU") 4318, one or more Data Processing Clusters ("DPCs") 4306, and any suitable combination of parts.

In at least one embodiment, operation of GPC 4300 is controlled by pipeline manager 4302. In at least one embodiment, pipeline manager 4302 manages configuration of one or more DPCs 4306 for processing tasks allocated to GPC 4300. In at least one embodiment, pipeline manager 4302 configures at least one of one or more DPCs 4306 to implement at least a portion of a graphics rendering pipeline.

In at least one embodiment, DPC 4306 is configured to execute a vertex shader program on a programmable streaming multi-processor ("SM") 4314. In at least one embodiment, pipeline manager 4302 is configured to route packets received from a work distribution unit to appropriate logical units within GPC 4300, in at least one embodiment, and some packets may be routed to fixed function hardware units in PROP 4304 and/or raster engine 4308 while other packets may be routed to DPCs 4306 for processing by a primitive engine 4312 or SM 4314. In at least one embodiment, pipeline manager 4302 configures at least one of DPCs 4306 to implement a neural network model and/or a computing pipeline.

In at least one embodiment, PROP unit 4304 is configured, in at least one embodiment, to route data generated by raster engine 4308 and DPCs 4306 to a Raster Operations ("ROP") unit in partition unit 4222, described in more detail above in conjunction with FIG. 42. In at least one embodiment, PROP unit 4304 is configured to perform optimizations for color blending, organize pixel data, perform address translations, and more. In at least one embodiment, raster engine 4308 includes, without limitation, a number of fixed function hardware units configured to perform various raster operations, in at least one embodiment, and raster engine 4308 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4308 comprises fragments to be processed by any suitable entity such as by a fragment shader implemented within DPC 4306.

In at least one embodiment, each DPC 4306 included in GPC 4300 comprise, without limitation, an M-Pipe Controller ("MPC") 4310; primitive engine 4312; one or more SMs 4314; and any suitable combination thereof. In at least one embodiment, MPC 4310 controls operation of DPC 4306, routing packets received from pipeline manager 4302 to appropriate units in DPC 4306. In at least one embodiment, packets associated with a vertex are routed to primitive engine 4312, which is configured to fetch vertex attributes associated with vertex from memory; in contrast, packets associated with a shader program may be transmitted to SM 4314.

In at least one embodiment, SM 4314 comprises, without limitation, a programmable streaming processor that is configured to process tasks represented by a number of threads. In at least one embodiment, SM 4314 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4314 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4314 are described in more detail herein.

In at least one embodiment, MMU 4318 provides an interface between GPC 4300 and memory partition unit (e.g., partition unit 4222 of FIG. 42) and MMU 4318 provides translation of virtual addresses into physical addresses, memory protection, and arbitration of memory requests. In at least one embodiment, MMU 4318 provides one or more translation lookaside buffers ("TLBs") for performing translation of virtual addresses into physical addresses in memory.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, deep learning application processor is used to train a machine learning model, such as a neural network, to predict or infer information provided to GPC 4300. In at least one embodiment, GPC 4300 is used to infer or predict information based on a trained machine learning model (e.g., neural network) that has been trained by another processor or system or by GPC 4300. In at least one embodiment, GPC 4300 may be used to perform one or more neural network use cases described herein.

Figure 44:
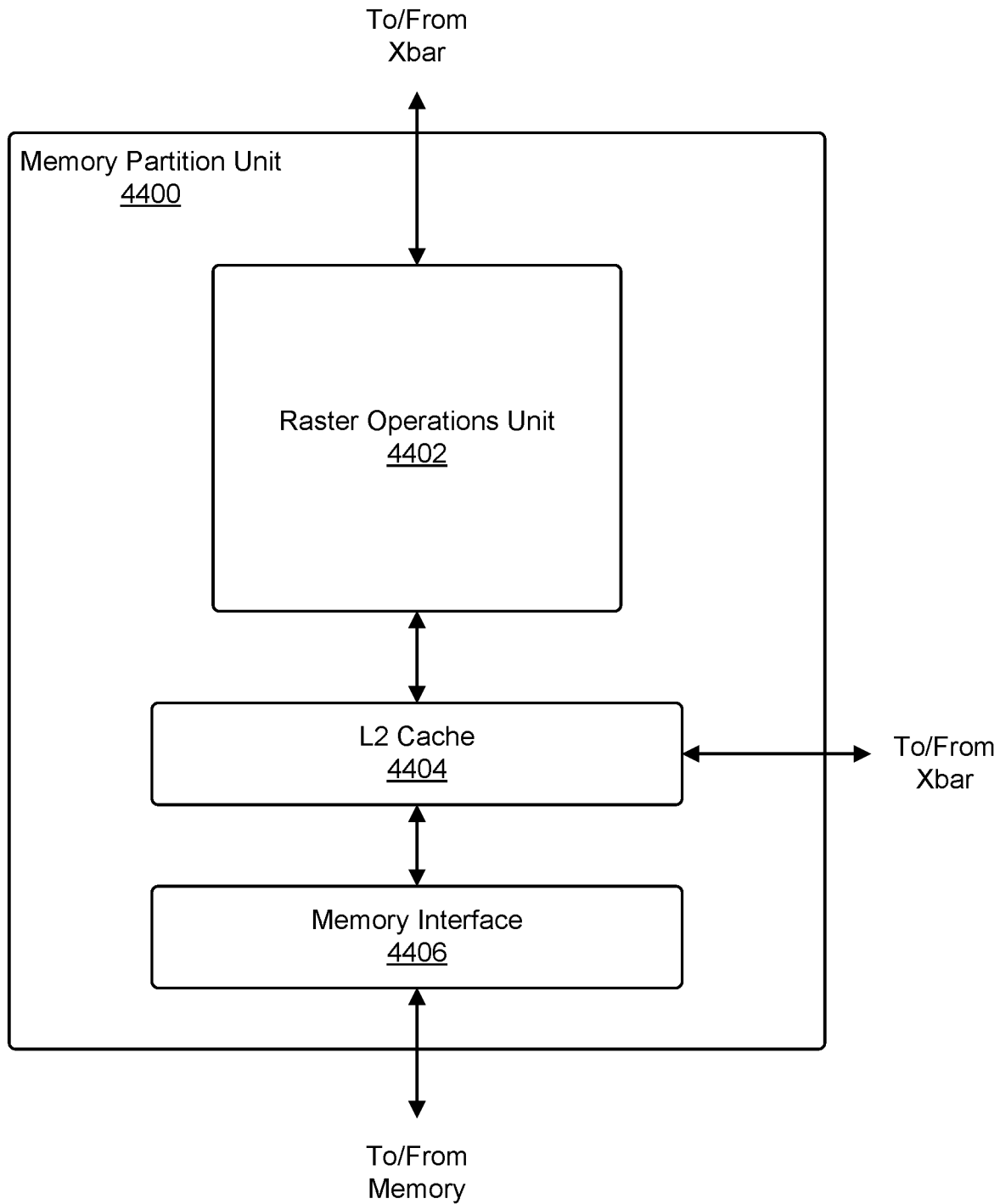
FIG. 44 illustrates a memory partition unit of a parallel processing unit ("PPU"), according to at least one embodiment.

FIG. 44 illustrates a memory partition unit 4400 of a parallel processing unit ("PPU"), in accordance with at least one embodiment. In at least one embodiment, memory partition unit 4400 includes, without limitation, a Raster Operations ("ROP") unit 4402; a level two ("L2") cache 4404; a memory interface 4406; and any suitable combination thereof, memory interface 4406 is coupled to memory, memory interface 4406 may implement 32, 64, 128, 1024-bit data buses, or like, for high-speed data transfer. In at least one embodiment, PPU incorporates U memory interfaces 4406, one memory interface 4406 per pair of partition units 4400, where each pair of partition units 4400 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4406 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4400 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 4208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4400 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4204 of FIG. 42 or other system memory is fetched by memory partition unit 4400 and stored in L2 cache 4404, which is located on-chip and is shared between various GPCs, in accordance with at least one embodiment. Each memory partition unit 4400, in at least one embodiment, includes, without limitation, at least a portion of L2 cache associated with a corresponding memory device. In at least one embodiment, lower level caches are implemented in various units within GPCs. In at least one embodiment, each of SMs 4314 may implement a level one ("L1") cache wherein L1 cache is private memory that is dedicated to a particular SM 4314 and data from L2 cache 4404 is fetched and stored in each of L1 caches for processing in functional units of SMs 4314. In at least one embodiment, L2 cache 4404 is coupled to memory interface 4406 and XBar 4220.

ROP unit 4402 performs graphics raster operations related to pixel color, such as color compression, pixel blending, and more, in at least one embodiment. ROP unit 4402, in at least one embodiment, implements depth testing in conjunction with raster engine 4308, receiving a depth for a sample location associated with a pixel fragment from culling engine of raster engine 4308. In at least one embodiment, depth is tested against a corresponding depth in a depth buffer for a sample location associated with fragment. In at least one embodiment, if fragment passes depth test for sample location, then ROP unit 4402 updates depth buffer and transmits a result of depth test to raster engine 4308. It will be appreciated that number of partition units 4400 may be different than number of GPCs and, therefore, each ROP unit 4402 can, in at least one embodiment, be coupled to each of GPCs. In at least one embodiment, ROP unit 4402 tracks packets received from different GPCs and determines which that a result generated by ROP unit 4402 is routed to through XBar 4220.

Figure 45:
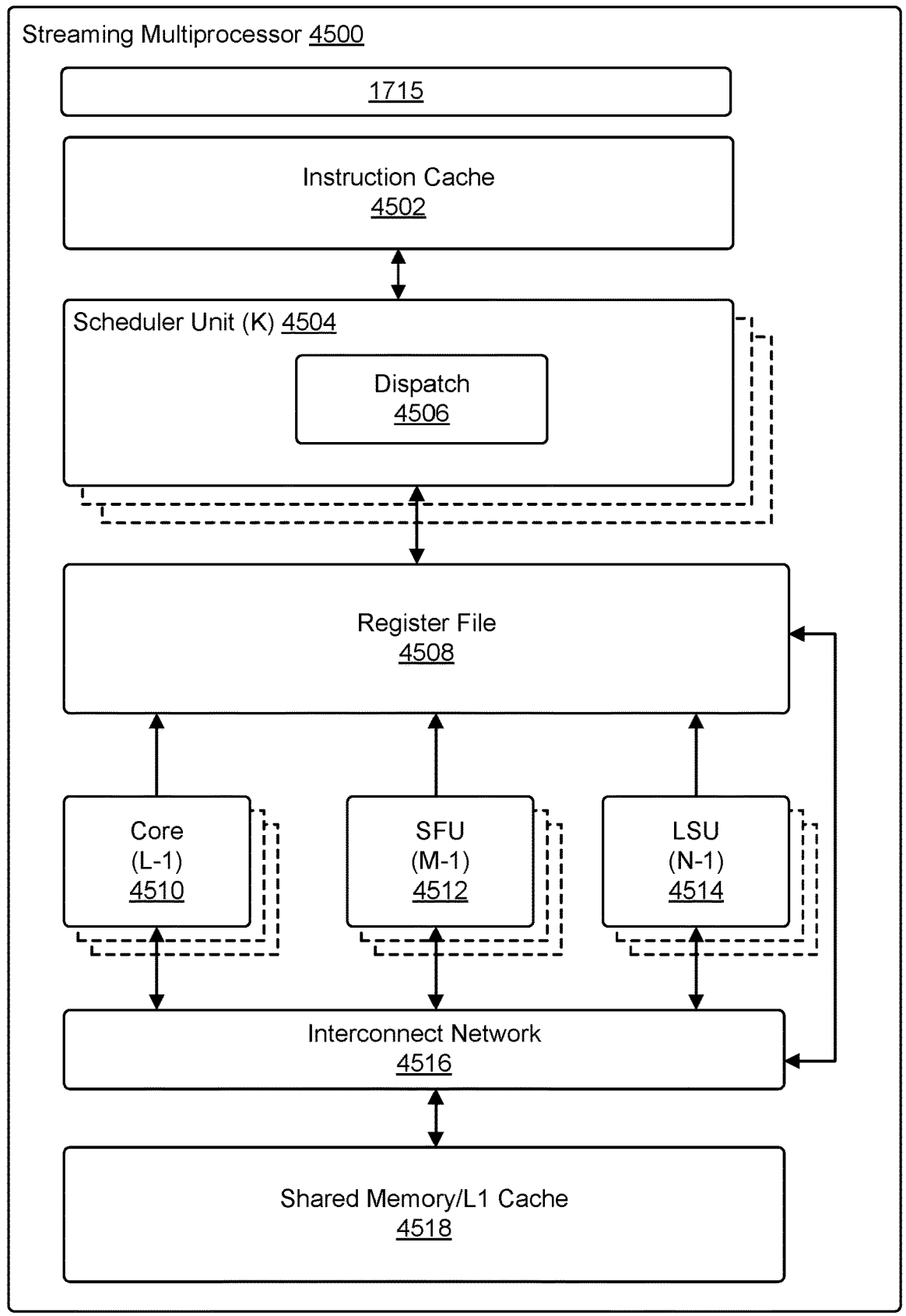
FIG. 45 illustrates a streaming multi-processor, according to at least one embodiment.

FIG. 45 illustrates a streaming multi-processor ("SM") 4500, according to at least one embodiment. In at least one embodiment, SM 4500 is SM of FIG. 43. In at least one embodiment, SM 4500 includes, without limitation, an instruction cache 4502; one or more scheduler units 4504; a register file 4508; one or more processing cores ("cores") 4510; one or more special function units ("SFUs") 4512; one or more load/store units ("LSUs") 4514; an interconnect network 4516; a shared memory/level one ("L1") cache 4518; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4500. In at least one embodiment, scheduler unit 4504 receives tasks from work distribution unit and manages instruction scheduling for one or more thread blocks assigned to SM 4500. In at least one embodiment, scheduler unit 4504 schedules thread blocks for execution as warps of parallel threads, wherein each thread block is allocated at least one warp. In at least one embodiment, each warp executes threads. In at least one embodiment, scheduler unit 4504 manages a plurality of different thread blocks, allocating warps to different thread blocks and then dispatching instructions from plurality of different cooperative groups to various functional units (e.g., processing cores 4510, SFUs 4512, and LSUs 4514) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4506 is configured to transmit instructions to one or more of functional units and scheduler unit 4504 includes, without limitation, two dispatch units 4506 that enable two different instructions from same warp to be dispatched during each clock cycle. In at least one embodiment, each scheduler unit 4504 includes a single dispatch unit 4506 or additional dispatch units 4506.

In at least one embodiment, each SM 4500, in at least one embodiment, includes, without limitation, register file 4508 that provides a set of registers for functional units of SM 4500. In at least one embodiment, register file 4508 is divided between each of functional units such that each functional unit is allocated a dedicated portion of register file 4508. In at least one embodiment, register file 4508 is divided between different warps being executed by SM 4500 and register file 4508 provides temporary storage for operands connected to data paths of functional units. In at least one embodiment, each SM 4500 comprises, without limitation, a plurality of L processing cores 4510. In at least one embodiment, SM 4500 includes, without limitation, a large number (e.g., 128 or more) of distinct processing cores 4510. In at least one embodiment, each processing core 4510, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4510 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4500 comprises, without limitation, M SFUs 4512 that perform special functions (e.g., attribute evaluation, reciprocal square root, and like). In at least one embodiment, SFUs 4512 include, without limitation, a tree traversal unit configured to traverse a hierarchical tree data structure. In at least one embodiment, SFUs 4512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4500. In at least one embodiment, texture maps are stored in shared memory/L1 cache 4518. In at least one embodiment, texture units implement texture operations such as filtering operations using mip-maps (e.g., texture maps of varying levels of detail), in accordance with at least one embodiment. In at least one embodiment, each SM 4500 includes, without limitation, two texture units.

Each SM 4500 comprises, without limitation, N LSUs 4514 that implement load and store operations between shared memory/L1 cache 4518 and register file 4508, in at least one embodiment. Each SM 4500 includes, without limitation, interconnect network 4516 that connects each of functional units to register file 4508 and LSU 4514 to register file 4508 and shared memory/L1 cache 4518 in at least one embodiment. In at least one embodiment, interconnect network 4516 is a crossbar that can be configured to connect any of functional units to any of registers in register file 4508 and connect LSUs 4514 to register file 4508 and memory locations in shared memory/L1 cache 4518.

In at least one embodiment, shared memory/L1 cache 4518 is an array of on-chip memory that allows for data storage and communication between SM 4500 and primitive engine and between threads in SM 4500, in at least one embodiment. In at least one embodiment, shared memory/L1 cache 4518 comprises, without limitation, 128 KB of storage capacity and is in path from SM 4500 to partition unit. In at least one embodiment, shared memory/L1 cache 4518, in at least one embodiment, is used to cache reads and writes. In at least one embodiment, one or more of shared memory/L1 cache 4518, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4518 enables shared memory/L1 cache 4518 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4500 to execute program and perform calculations, shared memory/L1 cache 4518 to communicate between threads, and LSU 4514 to read and write global memory through shared memory/L1 cache 4518 and memory partition unit. In at least one embodiment, when configured for general purpose parallel computation, SM 4500 writes commands that scheduler unit 4504 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices, graphics card may be configured to interface with a PCIe slot on a motherboard of a desktop computer. In at least one embodiment, PPU may be an integrated graphics processing unit ("iGPU") included in chipset of motherboard.

Inference and/or training logic 1715 are used to perform inferencing and/or training operations associated with one or more embodiments. Details regarding inference and/or training logic 1715 are provided herein in conjunction with FIGS. 17A and/or 17B. In at least one embodiment, deep learning application processor is used to train a machine learning model, such as a neural network, to predict or infer information provided to SM 4500. In at least one embodiment, SM 4500 is used to infer or predict information based on a trained machine learning model (e.g., neural network) that has been trained by another processor or system or by SM 4500. In at least one embodiment, SM 4500 may be used to perform one or more neural network use cases described herein.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2304 and/or secondary storage. Computer programs, if executed by one or more processors, enable system 2300 to perform various functions in accordance with at least one embodiment. Memory 2304, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2302; parallel processing system 2312; an integrated circuit capable of at least a portion of capabilities of both CPU 2302; parallel processing system 2312; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2300 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2312 includes, without limitation, a plurality of parallel processing units ("PPUs") 2314 and associated memories 2316. In at least one embodiment, PPUs 2314 are connected to a host processor or other peripheral devices via an interconnect 2318 and a switch 2320 or multiplexer. In at least one embodiment, parallel processing system 2312 distributes computational tasks across PPUs 2314 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2314, although such shared memory may incur performance penalties relative to use of local memory and registers resident to a PPU 2314. In at least one embodiment, operation of PPUs 2314 is synchronized through use of a command such as _syncthreads( ), wherein all threads in a block (e.g., executed across multiple PPUs 2314) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted, term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items), number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein, set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing claims.

What is claimed is:

1. A processor comprising: one or more circuits to cause one or more neural networks to be selected from a plurality of neural networks based, at least in part, on a difference between a first accuracy of the one or more neural networks to inference information from a first data set, and a second accuracy of the one or more neural networks to inference information from a second data set.

2. The processor of claim 1 wherein:
one or more performance characteristics of the one or more neural networks resulting from inferencing on the first data set indicate how well the one or more neural networks perform using training data; and
one or more performance characteristics resulting from inferencing on second data set by the one or more neural networks indicate how the one or more neural networks perform using validation data.

3. The processor of claim 1, wherein:
an architecture of the one or more neural networks is evaluated using an objective function based on a generalization error; and
the generalization error is based at least in part on a difference between a validation loss and a training loss.

4. The processor of claim 1, wherein determining an architecture of the one or more neural networks is performed using a gradient estimate of a differentiable loss function based at least in part on a relaxation of discrete variables.

5. The processor of claim 1, wherein determining an architecture of the one or more neural networks is performed using a surrogate function that represents a non-differentiable loss function.

6. The processor of claim 4, wherein the differentiable loss function is a measure of a cross-entropy loss of the one or more neural networks.

7. The processor of claim 5, wherein the non-differentiable loss function is a measure of latency of the one or more neural networks.

8. A system comprising: one or more processors to be configured to cause at least one or more neural networks to be selected from a plurality of neural networks based, at least in part, on a difference between a first accuracy of the one or more neural networks to inference information from a first data set, and a second accuracy of the one or more neural networks to inference information from a second data set.

9. The system of claim 8, wherein:
one or more performance characteristics of the one or more neural networks resulting from inferencing on the first data set using the one or more neural networks indicate how well the one or more neural networks perform using training data; and
one or more performance characteristics resulting from testing the one or more neural network by inferencing on the second data set indicate how the one or more neural networks perform using validation data.

10. The system of claim 8, wherein:
a network architecture of the one or more neural networks is determined using a gradient of a differentiable loss function; and
the gradient is estimated using a Gumbel-Softmax distribution.

11. The system of claim 8, wherein:
a network architecture of the one or more neural network is determined using a gradient of a non-differentiable loss function; and
a non-differentiable loss is approximated with a surrogate function.

12. The system of claim 10, wherein the differentiable loss function is based at least in part on cross-entropy loss.

13. The system of claim 11, wherein the non-differentiable loss is based at least in part on network latency or network accuracy.

14. The system of claim 8, wherein a network architecture of the one or more neural networks is determined using differentiable architecture search.

15. The system of claim 8, wherein sparsity of a network architecture of the one or more neural networks is enforced by using a paired-input cell structure.

16. A non-transitory machine-readable medium having stored thereon a set of instructions, which if performed by one or more processors, cause the one or more processors to cause at least one or more neural networks to be selected from a plurality of neural networks based, at least in part, on a difference between a first accuracy of the one or more neural networks to inference information from a first data set, and a second accuracy of the one or more neural networks to inference information from a second data set.

17. The non-transitory machine-readable medium of claim 16, wherein:
a gradient estimate of a loss is used to determine an architecture of the one or more neural networks and the loss is non-differentiable; and
the gradient is estimated using a neural network trained to model a loss function.

18. The non-transitory machine-readable medium of claim 16, wherein:
a gradient estimate of a loss is used to determine an architecture of the one or more neural networks and the loss is differentiable; and
the gradient is estimated using samples from a conditional Gumbel-Softmax distribution.

19. The non-transitory machine-readable medium of claim 16, wherein:
an architecture of the one or more neural networks is selected based on an objective function; and
the objective function is a function of latency and accuracy.

20. The non-transitory machine-readable medium of claim 16, wherein:
an input selector selects two nodes of previous nodes; and
an operation selector selects two operations for each input.

21. The non-transitory machine-readable medium of claim 16, wherein a process of estimating fa gradient does not introduce bias to the gradient, and wherein the gradient is estimated to determine an architecture of the one or more neural networks.

22. An autonomous vehicle comprising at least one or more neural networks selected from a plurality of neural networks based, at least in part, on a difference between a first accuracy of the one or more neural networks to inference information from a first data set, and a second accuracy of the one or more neural networks to inference information from a second data set.

23. The autonomous vehicle of claim 22, wherein:
an input selector selects two nodes of previous nodes; and
an operation selector selects two operations for each input.

24. The autonomous vehicle of claim 22, wherein:
the autonomous vehicle includes a camera that captures an image; and
the image is processed by the one or more neural networks to identify an object in the image.

25. The autonomous vehicle of claim 22, wherein:
the autonomous vehicle includes a camera that captures an image; and
the image is processed by the one or more neural networks to produce a vehicle control signal.

* * * * *